(12) United States Patent
Butcher, III

(10) Patent No.: US 8,930,264 B1
(45) Date of Patent: Jan. 6, 2015

(54) METHODS, SOFTWARE PROGRAMS, AND SYSTEMS FOR MANAGING ONE OR MORE LIABILITIES

(71) Applicant: Goldman, Sachs & Co., New York, NY (US)

(72) Inventor: George H. Butcher, III, New Rochelle, NY (US)

(73) Assignee: Goldman, Sachs & Co., New York, NY (US)

( * ) Notice: Subject to any disclaimer, the term of this patent is extended or adjusted under 35 U.S.C. 154(b) by 60 days.

(21) Appl. No.: 14/036,917

(22) Filed: Sep. 25, 2013

Related U.S. Application Data

(60) Division of application No. 10/102,195, filed on Mar. 20, 2002, now Pat. No. 8,548,901, which is a continuation-in-part of application No. 09/896,630, filed on Jun. 29, 2001, now Pat. No. 7,373,328, which is a continuation-in-part of application No. 09/723,692, filed on Nov. 28, 2000, now abandoned.

(51) Int. Cl.
*G06Q 40/00* (2012.01)
*G06Q 40/06* (2012.01)

(52) U.S. Cl.
CPC .................................... *G06Q 40/06* (2013.01)
USPC ............................................ 705/38; 705/37

(58) Field of Classification Search
USPC ..................................................... 705/37, 38
See application file for complete search history.

(56) References Cited

U.S. PATENT DOCUMENTS

| | | | |
|---|---|---|---|
| 3,946,218 A | | 3/1976 | Rode et al. |
| 4,739,478 A | * | 4/1988 | Roberts et al. ............. 705/36 R |
| 5,508,731 A | | 4/1996 | Kohorn |
| 5,689,649 A | | 11/1997 | Altman et al. |
| 5,704,045 A | | 12/1997 | King et al. |
| 5,742,775 A | | 4/1998 | King |
| 5,799,287 A | | 8/1998 | Dembo |
| 5,857,176 A | | 1/1999 | Ginsberg |
| 5,875,437 A | | 2/1999 | Atkins |
| 5,930,762 A | | 7/1999 | Masch |
| 5,966,700 A | | 10/1999 | Gould et al. |
| 5,987,436 A | | 11/1999 | Halbrook |
| 6,021,397 A | | 2/2000 | Jones et al. |
| 6,026,364 A | * | 2/2000 | Whitworth .................. 705/36 R |
| 6,026,388 A | | 2/2000 | Liddy et al. |
| 6,070,151 A | * | 5/2000 | Frankel ....................... 705/36 R |
| 6,105,007 A | | 8/2000 | Norris |
| 6,148,293 A | | 11/2000 | King |
| 6,233,566 B1 | | 5/2001 | Levine et al. |
| 6,236,973 B1 | | 5/2001 | Dillard |
| 6,321,212 B1 | * | 11/2001 | Lange ......................... 705/36 R |
| 6,338,047 B1 | | 1/2002 | Wallman |

(Continued)

OTHER PUBLICATIONS

Fox, Mike, "Managing Debt: How to Get the Best Deal," Canadian Machinery and Metalworking, vol. 94, Issue 7, 3 pages, Sep./Oct. 1999.

(Continued)

*Primary Examiner* — Muriel Tinkler
(74) *Attorney, Agent, or Firm* — Perkins Coie LLP

(57) ABSTRACT

The present invention relates to various methods, software programs, and systems for managing one or more liabilities. More particularly, certain embodiments of the present invention relate to methods, software programs, and systems for managing debt in the form of at least one credit issued by a borrower.

17 Claims, 130 Drawing Sheets

(56) References Cited

U.S. PATENT DOCUMENTS

| | | | |
|---|---|---|---|
| 7,373,328 B1 | 5/2008 | Butcher, III | |
| 8,266,034 B1 | 9/2012 | Butcher, Iii | |
| 8,355,973 B2* | 1/2013 | Geller et al. | 705/36 R |
| 2001/0037277 A1* | 11/2001 | Willis et al. | 705/36 |
| 2001/0042785 A1 | 11/2001 | Walker et al. | |
| 2002/0019793 A1 | 2/2002 | Frattalone | |
| 2002/0077955 A1* | 6/2002 | Ramm | 705/37 |
| 2002/0161681 A1 | 10/2002 | Richman et al. | |
| 2002/0194124 A1 | 12/2002 | Hobbs et al. | |
| 2004/0117302 A1 | 6/2004 | Weichert et al. | |

OTHER PUBLICATIONS

Rosenberg, Joyce M., "Shop Around for Best Rates: Consumers May Find Good Deals At Own Institutions," Charleston Daily Mail, 2 pages, May 15, 2000.

Smith, Scott D., "Innovative Uses for Municipal Investment Contracts," Topics in Health Care Financing, vol. 21, Issue 2, 5 pages, Winter 1994.

Balfour, Alexander, "Markets Thrown Off Balance As the Old Economic Order Ends," Euromoney, 47 pages, Jun. 1994.

Langbein, Stanley I., "The Thrift Crisis and The Consitution," Washington and Lee Law Review, vol. 53, No. 1, 58 pages, 1996.

Abken, Peter A., "Over-The-Counter Financial Derivatives: Risky Business?," Federal Reserve Bank of Atlanta, vol. 79, No. 2, 20 pages, Mar./Apr. 1994.

Anonymous,"Progress in programs: The annual software review", Trusts & Estates, Jun. 1994: 133,6; ProQuest Central, p. 10, 22 pages.

Stevens et al., "Comparative financing costs for competitive and negotiated Pennsylvania school disctict bonds", Journal of Public Budgeting, Accounting & Financial Management; Winter 1998; 9, 4; ProQuest Central, p. 529, 23 pages.

Harry McCawley, "Proposed regulations for debt instruments calling for one or more contingent payments; Detailed analysis—Part 2.", Tax Management Memorandum 36.19, Sep. 18, 1995, 267, 12 pages.

\* cited by examiner

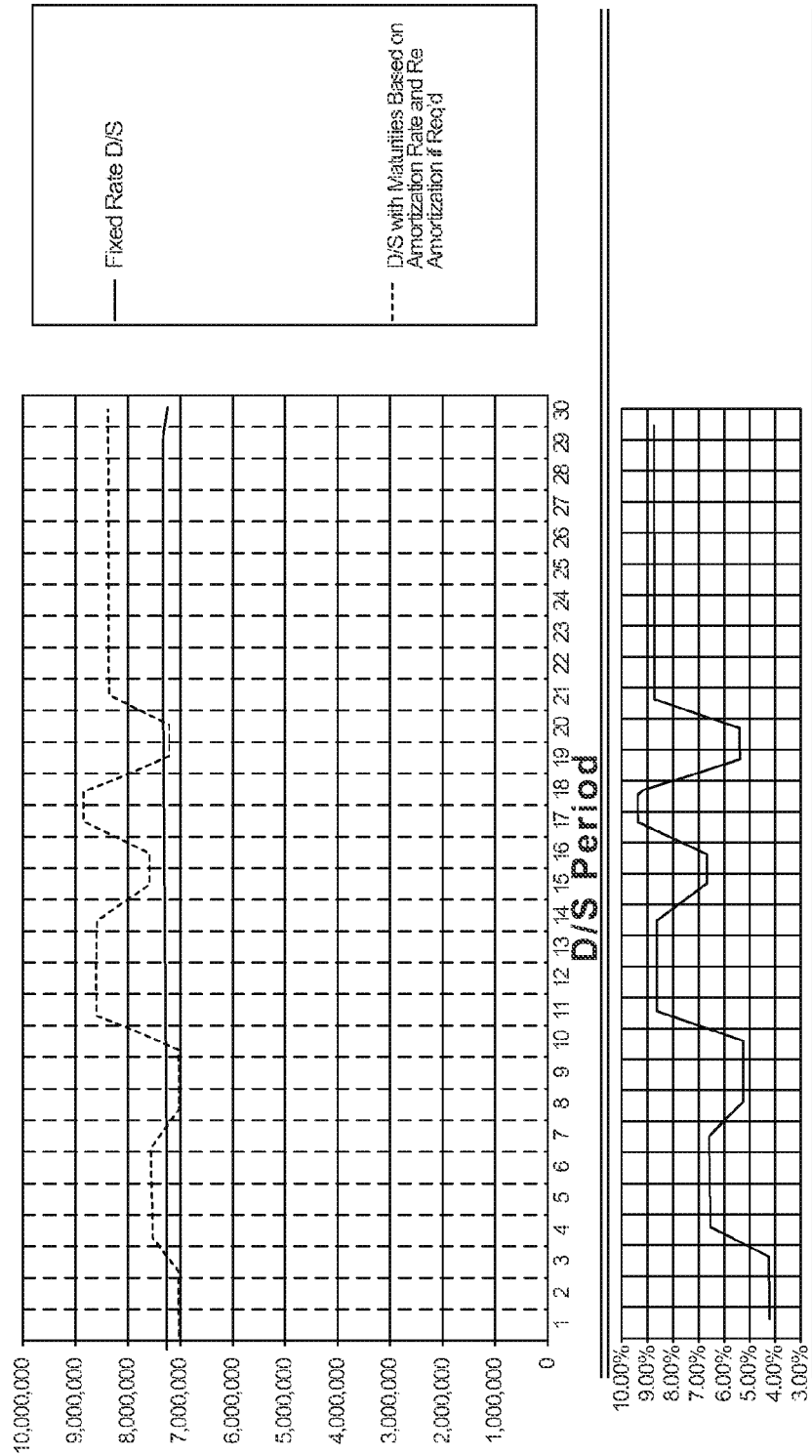

| PV Savings (Loss) | Period | Interest Rate Excluding Remarketing Costs | Corpus Investment Rate |
|---|---|---|---|
| N/A | 1 | 4.25% | 0.00% |
|  | 2 | 4.25% | 0.00% |
|  | 3 | 4.25% | 0.00% |
| (2,617,204) | 4 | 6.50% | 0.00% |
| -2.62% | 5 | 6.50% | 0.00% |
|  | 6 | 6.50% | 0.00% |
|  | 7 | 6.50% | 0.00% |
|  | 8 | 6.50% | 0.00% |
|  | 9 | 6.50% | 0.00% |
|  | 10 | 6.50% | 0.00% |
| (2,665,887) | 11 | 6.50% | 0.00% |
| -2.67% | 12 | 6.50% | 0.00% |
|  | 13 | 6.50% | 0.00% |
|  | 14 | 6.50% | 0.00% |
|  | 15 | 6.50% | 0.00% |
|  | 16 | 6.50% | 0.00% |
| (2,854,000) | 17 | 6.50% | 0.00% |
| -2.65% | 18 | 6.50% | 0.00% |
|  | 19 | 6.50% | 0.00% |
|  | 20 | 6.50% | 0.00% |
|  | 21 | 6.50% | 0.00% |
| (2,518,284) | 22 | 6.50% | 0.00% |
| -2.52% | 23 | 6.50% | 0.00% |
|  | 24 | 6.50% | 0.00% |
|  | 25 | 6.50% | 0.00% |
|  | 26 | 6.50% | 0.00% |
|  | 27 | 6.50% | 0.00% |
|  | 28 | 6.50% | 0.00% |
|  | 29 | 6.50% | 0.00% |
|  | 30 | 6.50% | 0.00% |

*FIG. 4U*

|                                                          |                |
| -------------------------------------------------------- | -------------- |
| Par                                                      | $100,000,000   |
| Amortization Rate                                        | 5.70%          |
| Fixed Rate                                               | 6.00%          |
| Matching Short-Term Investments                          | 0.00%          |
| Remarketing Costs                                        | 0.30%          |
| Rate of Return on Gross D/S (incl remarketing costs)     | 6.24%          |
| Corpus Earnings                                          | 6              |
| Reserve Earnings                                         | 3              |
| Level Debt Service                                       |                |

Corpus and Reserve Earnings
1 = Fixed RateArbitrage Yield
2 = Fixed Rt Arb Yld plus Recoverable Costs
3 = Periodic Rates
4 = Periodic Rates plus Recoverable Costs
5 = Taxable Periodic Rate

|                              |        | Periods |
| ---------------------------- | ------ | ------- |
| Tax-Exempt Taxable Ratio1    | 65.00% | 30      |
| Tax-Exempt Taxable Ratio2    | 0.00%  | 0       |

*FIG. 4V*

PV Savings
(Loss)

| | Period | Interest Rate Excluding Remarketing Costs | Corpus Investment Rate |
|---|---|---|---|
| N/A | 1 | 4.25% | 0.00% |
| | 2 | 4.25% | 0.00% |
| | 3 | 3.50% | 0.00% |
| 22,164,717 | 4 | 3.50% | 0.00% |
| 22.18% | 5 | 3.50% | 0.00% |
| | 6 | 3.50% | 0.00% |
| | 7 | 3.50% | 0.00% |
| | 8 | 3.50% | 0.00% |
| | 9 | 3.50% | 0.00% |
| | 10 | 3.50% | 0.00% |
| 15,980,817 | 11 | 3.50% | 0.00% |
| 15.98% | 12 | 3.50% | 0.00% |
| | 13 | 3.50% | 0.00% |
| | 14 | 3.50% | 0.00% |
| | 15 | 3.50% | 0.00% |
| | 16 | 3.50% | 0.00% |
| 16,980,817 | 17 | 3.50% | 0.00% |
| 16.98% | 18 | 3.50% | 0.00% |
| | 19 | 3.50% | 0.00% |
| | 20 | 3.50% | 0.00% |
| | 21 | 3.50% | 0.00% |
| 16,697,434 | 22 | 3.50% | 0.00% |
| 16.70% | 23 | 3.50% | 0.00% |
| | 24 | 3.50% | 0.00% |
| | 25 | 3.50% | 0.00% |
| | 26 | 3.50% | 0.00% |
| | 27 | 3.50% | 0.00% |
| | 28 | 3.50% | 0.00% |
| | 29 | 3.50% | 0.00% |
| | 30 | 3.50% | 0.00% |

*FIG. 4W*

| | | | | |
|---|---|---|---|---|
| Par | $100,000,000 | Corpus and Reserve Earnings | | |
| Amortization Rate | 5.70% | 1 = | Fixed Rate Arbitrage Yield | |
| Fixed Rate | 6.00% | 2 = | Fixed Rt Arb Yld plus Recoverable Costs | |
| Matching Short-Term Investments | 0.00% | 3 = | Periodic Rates | |
| Remarketing Costs | 0.30% | 4 = | Periodic Rates plus Recoverable Costs | |
| Internal Rate of Return on Gross D/S (incl remarketing costs) | 3.91% | 5 = | Taxable Periodic Rate | |
| Corpus Earnings | 6 | | | Periods |
| Reserve Earnings | 3 | Tax-Exempt Taxable Ratio1 | 65.00% | 30 |
| Level Debt Service | | Tax-Exempt Taxable Ratio2 | 0.00% | 0 |

*FIG. 4X*

|   | Maturity | Fixed Rate Bond Principal | MMD | Spread to MMD (Bps) | Fixed Rate | Annual Interest on Maturing Principal |
|---|---|---|---|---|---|---|
| 0 | 2/1/2002 | | | | | |
| 1 | 2/1/2003 | 42,580,000 | 1.800% | 0 | 1.800% | 766,440 |
| 2 | 2/1/2004 | 43,345,000 | 2.460% | 0 | 2.460% | 1,066,287 |
| 3 | 2/1/2005 | 44,410,000 | 2.960% | 0 | 2.960% | 1,314,536 |
| 4 | 2/1/2006 | 45,725,000 | 3.360% | 1 | 3.370% | 1,540,933 |
| 5 | 2/1/2007 | 47,265,000 | 3.660% | 2 | 3.680% | 1,739,352 |
| 6 | 2/1/2008 | 49,005,000 | 3.970% | 2 | 3.990% | 1,955,300 |
| 7 | 2/1/2009 | 50,960,000 | 4.170% | 3 | 4.200% | 2,140,320 |
| 8 | 2/1/2010 | 53,100,000 | 4.320% | 4 | 4.360% | 2,315,160 |
| 9 | 2/1/2011 | 55,415,000 | 4.420% | 5 | 4.470% | 2,477,051 |
| 10 | 2/1/2012 | 57,895,000 | 4.520% | 6 | 4.580% | 2,651,591 |
| 11 | 2/1/2013 | 60,545,000 | 4.640% | 7 | 4.710% | 2,851,670 |
| 12 | 2/1/2014 | 63,395,000 | 4.740% | 7 | 4.810% | 3,049,300 |
| 13 | 2/1/2015 | | 4.840% | 7 | 4.910% | |
| 14 | 2/1/2016 | | 4.940% | 8 | 5.020% | |
| 15 | 2/1/2017 | | 5.020% | 8 | 5.100% | |
| 16 | 2/1/2018 | | 5.080% | 8 | 5.160% | |
| 17 | 2/1/2019 | | 5.130% | 9 | 5.220% | |
| 18 | 2/1/2020 | | 5.180% | 9 | 5.270% | |
| 19 | 2/1/2021 | | 5.200% | 10 | 5.300% | |
| 20 | 2/1/2022 | | 5.220% | 10 | 5.320% | |
| 21 | 2/1/2023 | | | | | |
| 22 | 2/1/2024 | | | | | |
| 23 | 2/1/2025 | | | | | |
| 24 | 2/1/2026 | | | | | |
| 25 | 2/1/2027 | | | | | |
| 26 | 2/1/2028 | | | | | |
| 27 | 2/1/2029 | | | | | |
| 28 | 2/1/2030 | | | | | |
| 29 | 2/1/2031 | | | | | |
| 30 | 2/1/2032 | | | | | |
|   |   | 613,640,000 | | | | |

*FIG. 5A*

|  | Dated Date | 2/1/2002 |
|---|---|---|
|  | First Payment Date | 2/1/2003 |
|  |  | 0 |
|  | Fixed Rate Bond Yield | 4.279% |

| Aggregate Accrued Interest | Debt Service | Present Value |
|---|---|---|
| 23,867,938 | 66,447,938 | 63,721,590 |
| 23,101,498 | 66,446,498 | 61,105,780 |
| 22,035,211 | 66,445,211 | 58,597,485 |
| 20,720,675 | 66,445,675 | 56,193,633 |
| 19,179,742 | 66,444,742 | 53,887,262 |
| 17,440,390 | 66,445,390 | 51,676,780 |
| 15,485,091 | 66,445,091 | 49,556,268 |
| 13,344,771 | 66,444,771 | 47,522,754 |
| 11,029,611 | 66,444,611 | 45,572,793 |
| 8,552,560 | 66,447,560 | 43,704,890 |
| 5,900,969 | 66,445,969 | 41,910,682 |
| 3,049,300 | 66,444,300 | 40,190,084 |

Amortization Rate 3.500%

| Period | Maturity | VRDB Principal | BMA | Spread to BMA (Bps) | VRDB Interest | Liquidity Cost, if any Bps) |
|---|---|---|---|---|---|---|
| 0 | 02/01/02 | | | | | |
| 1 | 02/01/03 | 42,024,491 | 1.995% | 10 | 2.095% | 0 |
| 2 | 02/01/04 | 43,495,348 | 2.756% | 10 | 2.856% | 0 |
| 3 | 02/01/05 | 45,017,685 | 3.229% | 10 | 3.329% | 0 |
| 4 | 02/01/06 | 46,593,304 | 4.784% | 10 | 4.884% | 0 |
| 5 | 02/01/07 | 48,224,070 | 5.032% | 10 | 5.132% | 0 |
| 6 | 02/01/08 | 49,911,912 | 5.590% | 10 | 5.690% | 0 |
| 7 | 02/01/09 | 51,658,829 | 6.497% | 10 | 6.597% | 0 |
| 8 | 02/01/10 | 53,466,888 | 5.795% | 10 | 5.895% | 0 |
| 9 | 02/01/11 | 55,338,229 | 4.179% | 10 | 4.279% | 0 |
| 10 | 02/01/12 | 57,275,067 | 2.677% | 10 | 2.777% | 0 |
| 11 | 02/01/13 | 59,279,694 | 2.313% | 10 | 2.413% | 0 |
| 12 | 02/01/14 | 61,354,484 | 3.321% | 10 | 3.421% | 0 |
| 13 | 02/01/15 | | 4.226% | | | |
| 14 | 02/01/16 | | 3.860% | | | |
| 15 | 02/01/17 | | 4.017% | | | |
| 16 | 02/01/18 | | 3.890% | | | |
| 17 | 02/01/19 | | 3.795% | | | |
| 18 | 02/01/20 | | 4.574% | | | |
| 19 | 02/01/21 | | 3.022% | | | |
| 20 | 02/01/22 | | 3.022% | | | |
| | | 613,640,000 | | | | |

*FIG. 6A*

|  |  |  |  |  |  | Fixed Rate Bond Yield | 4.279% |
|  |  |  |  |  |  | VRDB Rate before costs | 3.911% |
|  |  |  |  |  |  |  | 0 |
|  |  |  |  |  |  | VRDB Yield | 4.291% |

| Period | Maturity | Remkg Cost, if any (Bps) | All-In Interest Cost | VRDB Interest | Debt Service | Present Value |
| --- | --- | --- | --- | --- | --- | --- |
| 0 | 02/01/02 |  |  |  |  |  |
| 1 | 02/01/03 | 28 | 2.375% | 14,573,950 | 56,598,441 | 54,269,573 |
| 2 | 02/01/04 | 28 | 3.136% | 17,925,862 | 61,421,210 | 56,470,579 |
| 3 | 02/01/05 | 28 | 3.609% | 19,059,857 | 64,077,542 | 56,488,709 |
| 4 | 02/01/06 | 28 | 5.164% | 24,946,845 | 71,540,149 | 60,472,453 |
| 5 | 02/01/07 | 28 | 5.412% | 23,623,855 | 71,847,925 | 58,233,635 |
| 6 | 02/01/08 | 28 | 5.970% | 23,180,355 | 73,092,267 | 56,804,539 |
| 7 | 02/01/09 | 28 | 6.877% | 23,268,586 | 74,927,415 | 55,834,714 |
| 8 | 02/01/10 | 28 | 6.175% | 17,705,434 | 71,172,322 | 50,854,175 |
| 9 | 02/01/11 | 28 | 4.559% | 10,633,459 | 65,971,688 | 45,198,603 |
| 10 | 02/01/12 | 28 | 3.057% | 5,438,206 | 62,713,273 | 41,198,254 |
| 11 | 02/01/13 | 28 | 2.693% | 3,248,114 | 62,527,808 | 39,386,237 |
| 12 | 02/01/14 | 28 | 3.701% | 2,270,919 | 63,625,403 | 38,428,529 |
| 13 | 02/01/15 |  |  |  |  |  |
| 14 | 02/01/16 |  |  |  |  |  |
| 15 | 02/01/17 |  |  |  |  |  |
| 16 | 02/01/18 |  |  |  |  |  |
| 17 | 02/01/19 |  |  |  |  |  |
| 18 | 02/01/20 |  |  |  |  |  |
| 19 | 02/01/21 |  |  |  |  |  |
| 20 | 02/01/22 |  |  |  |  |  |
|  |  |  |  |  |  | 613,640,000 |

*FIG. 6B*

| Period | Maturity | Annual Savings vs Fixed Rate | Present Value Savings |
|---|---|---|---|
| 0 | 02/01/02 | | |
| 1 | 02/01/03 | 9,849,497 | 9,445,374 |
| 2 | 02/01/04 | 5,025,287 | 4,621,374 |
| 3 | 02/01/05 | 2,367,669 | 2,088,028 |
| 4 | 02/01/06 | (5,094,475) | (4,308,438) |
| 5 | 02/01/07 | (5,403,183) | (4,382,028) |
| 6 | 02/01/08 | (6,646,877) | (5,169,497) |
| 7 | 02/01/09 | (8,482,325) | (6,326,312) |
| 8 | 02/01/10 | (4,727,552) | (3,381,249) |
| 9 | 02/01/11 | 472,923 | 324,367 |
| 10 | 02/01/12 | 3,734,287 | 2,456,172 |
| 11 | 02/01/13 | 3,918,161 | 2,471,373 |
| 12 | 02/01/14 | 2,818,897 | 1,705,063 |
| 13 | 02/01/15 | | |
| 14 | 02/01/16 | | |
| 15 | 02/01/17 | | |
| 16 | 02/01/18 | | |
| 17 | 02/01/19 | | |
| 18 | 02/01/20 | | |
| 19 | 02/01/21 | | |
| 20 | 02/01/22 | | |
| | | (2,167,691) | (455,773) |

*FIG. 6C*

Term of Issue    12
Average BMA    4.014%

| Period | Maturity | VRDB Principal | BMA | Spread to BMA (Bps) | VRDB Interest | Liquidity Cost, if any Bps) |
|---|---|---|---|---|---|---|
| 0 | 02/01/02 | | | | | |
| 1 | 02/01/03 | 42,580,000 | 1.995% | 10 | 2.095% | |
| 2 | 02/01/04 | 43,345,000 | 2.756% | 10 | 2.856% | |
| 3 | 02/01/05 | 44,410,000 | 3.229% | 10 | 3.329% | |
| 4 | 02/01/06 | 45,725,000 | 4.784% | 10 | 4.884% | |
| 5 | 02/01/07 | 47,265,000 | 5.032% | 10 | 5.132% | |
| 6 | 02/01/08 | 49,005,000 | 5.590% | 10 | 5.690% | |
| 7 | 02/01/09 | 50,960,000 | 6.497% | 10 | 6.597% | |
| 8 | 02/01/10 | 53,100,000 | 5.795% | 10 | 5.895% | |
| 9 | 02/01/11 | 55,415,000 | 4.179% | 10 | 4.279% | |
| 10 | 02/01/12 | 57,895,000 | 2.677% | 10 | 2.777% | |
| 11 | 02/01/13 | 60,545,000 | 2.313% | 10 | 2.413% | |
| 12 | 02/01/14 | 63,395,000 | 3.321% | 10 | 3.421% | |
| 13 | 02/01/15 | 0 | 4.226% | 10 | 4.326% | |
| 14 | 02/01/16 | 0 | 3.860% | 10 | | |
| 15 | 02/01/17 | 0 | 4.017% | 10 | | |
| 16 | 02/01/18 | 0 | 3.890% | 10 | | |
| 17 | 02/01/19 | 0 | 3.795% | 10 | | |
| 18 | 02/01/20 | 0 | 4.574% | 10 | | |
| 19 | 02/01/21 | 0 | 3.022% | 10 | | |
| 20 | 02/01/22 | 0 | 3.022% | 10 | | |
| | | 613,640,000 | | | | |

*FIG. 7A*

|  |  | Fixed Rate Bond Yield | 4.279% |
|---|---|---|---|
|  |  | VRDB Rate before Costs | 3.914% |
|  |  |  | 0 |
|  |  | VRDB Yield | 4.294% |

| Period | Maturity | Remkg Cost, if any (Bps) | All-In Interest Cost | VRDB Interest | Debt Service | Present Value |
|---|---|---|---|---|---|---|
| 0 | 02/01/02 |  |  |  |  |  |
| 1 | 02/01/03 | 28 | 2.375% | 14,573,950 | 57,153,950 | 54,800,956 |
| 2 | 02/01/04 | 28 | 3.136% | 17,908,442 | 61,253,442 | 56,313,726 |
| 3 | 02/01/05 | 28 | 3.609% | 19,045,234 | 63,455,234 | 55,936,218 |
| 4 | 02/01/06 | 28 | 5.164% | 24,957,304 | 70,682,304 | 59,741,790 |
| 5 | 02/01/07 | 28 | 5.412% | 23,681,808 | 70,946,808 | 57,496,615 |
| 6 | 02/01/08 | 28 | 5.970% | 23,301,539 | 72,306,539 | 56,186,098 |
| 7 | 02/01/09 | 28 | 6.877% | 23,470,539 | 74,430,539 | 55,455,465 |
| 8 | 02/01/10 | 28 | 6.175% | 17,929,946 | 71,029,946 | 50,743,048 |
| 9 | 02/01/11 | 28 | 4.559% | 10,815,929 | 66,230,929 | 45,366,763 |
| 10 | 02/01/12 | 28 | 3.057% | 5,558,205 | 63,453,205 | 41,674,692 |
| 11 | 02/01/13 | 28 | 2.693% | 3,337,124 | 63,882,124 | 40,229,077 |
| 12 | 02/01/14 | 28 | 3.701% | 2,346,445 | 65,741,445 | 39,695,552 |
| 13 | 02/01/15 | 28 | 4.606% |  |  |  |
| 14 | 02/01/16 | 28 |  |  |  |  |
| 15 | 02/01/17 | 28 |  |  |  |  |
| 16 | 02/01/18 | 28 |  |  |  |  |
| 17 | 02/01/19 | 28 |  |  |  |  |
| 18 | 02/01/20 | 28 |  |  |  |  |
| 19 | 02/01/21 | 28 |  |  |  |  |
| 20 | 02/01/22 | 28 |  |  |  |  |
|  |  |  |  |  |  | 613,640,000 |

*FIG. 7B*

| Period | Maturity | Annual Savings vs Fixed Rate | Present Value Savings |
|---|---|---|---|
| 0 | 02/01/02 | | |
| 1 | 02/01/03 | 9,293,988 | 8,912,657 |
| 2 | 02/01/04 | 5,193,056 | 4,775,658 |
| 3 | 02/01/05 | 2,989,976 | 2,636,835 |
| 4 | 02/01/06 | (4,236,629) | (3,582,951) |
| 5 | 02/01/07 | (4,502,066) | (3,651,215) |
| 6 | 02/01/08 | (5,861,149) | (4,558,409) |
| 7 | 02/01/09 | (7,985,449) | (5,955,730) |
| 8 | 02/01/10 | (4,585,175) | (3,279,417) |
| 9 | 02/01/11 | 213,682 | 146,559 |
| 10 | 02/01/12 | 2,994,355 | 1,969,492 |
| 11 | 02/01/13 | 2,563,845 | 1,617,141 |
| 12 | 02/01/14 | 702,855 | 425,135 |
| 13 | 02/01/15 | | |
| 14 | 02/01/16 | | |
| 15 | 02/01/17 | | |
| 16 | 02/01/18 | | |
| 17 | 02/01/19 | | |
| 18 | 02/01/20 | | |
| 19 | 02/01/21 | | |
| 20 | 02/01/22 | | |
| | | (3,218,712) | (544,246) |

*FIG. 7C*

| Period | Maturity | Principal Balance | All-in VRDB Rate | Interest | Maturing Principal |
|---|---|---|---|---|---|
| 0 | 02/01/02 | | | | |
| 1 | 02/01/03 | 613,640,000 | 2.375% | 14,573,950 | 42,580,000 |
| 2 | 02/01/04 | 570,766,013 | 3.136% | 17,899,222 | 43,345,000 |
| 3 | 02/01/05 | 522,218,737 | 3.609% | 18,846,874 | 44,410,000 |
| 4 | 02/01/06 | 474,620,401 | 5.164% | 24,508,841 | 45,725,000 |
| 5 | 02/01/07 | 432,683,567 | 5.412% | 23,416,813 | 47,265,000 |
| 6 | 02/01/08 | 389,655,639 | 5.970% | 23,262,175 | 49,005,000 |
| 7 | 02/01/09 | 346,472,424 | 6.877% | 23,825,539 | 50,960,000 |
| 8 | 02/01/10 | 303,852,872 | 6.175% | 18,763,787 | 53,100,000 |
| 9 | 02/01/11 | 256,171,888 | 4.559% | 11,678,554 | 55,415,000 |
| 10 | 02/01/12 | 201,405,832 | 3.057% | 6,156,433 | 57,895,000 |
| 11 | 02/01/13 | 141,114,705 | 2.693% | 3,799,559 | 60,545,000 |
| 12 | 02/01/14 | 78,468,295 | 3.701% | 2,904,354 | 63,395,000 |
| 13 | 02/01/15 | 14,928,349 | 4.606% | 687,532 | 0 |
| 14 | 02/01/16 | | | | |
| 15 | 02/01/17 | | | | |
| 16 | 02/01/18 | | | | |
| 17 | 02/01/19 | | | | |
| 18 | 02/01/20 | | | | |
| 19 | 02/01/21 | | | | |
| 20 | 02/01/22 | | | | |
| | | | | | 613,640,000 |

*FIG. 7D*

| Period | Maturity | Maturing Principal Plus Interest | Savings vs Fixed Rate before Additional Principal | Additional Principal | Other Principal Adjustments |
|---|---|---|---|---|---|
| 0 | 02/01/02 | | | | |
| 1 | 02/01/03 | 57,153,950 | 9,293,988 | 9,293,988 | (9,000,000) |
| 2 | 02/01/04 | 61,244,222 | 5,202,275 | 5,202,275 | |
| 3 | 02/01/05 | 63,256,874 | 3,188,336 | 3,188,336 | |
| 4 | 02/01/06 | 70,233,841 | (3,788,167) | (3,788,167) | |
| 5 | 02/01/07 | 70,681,813 | (4,237,071) | (4,237,071) | |
| 6 | 02/01/08 | 72,267,175 | (5,821,785) | (5,821,785) | |
| 7 | 02/01/09 | 74,785,539 | (8,340,448) | (8,340,448) | |
| 8 | 02/01/10 | 71,863,787 | (5,419,016) | (5,419,016) | |
| 9 | 02/01/11 | 67,093,554 | (648,944) | (648,944) | |
| 10 | 02/01/12 | 64,051,433 | 2,396,127 | 2,396,127 | |
| 11 | 02/01/13 | 64,344,559 | 2,101,410 | 2,101,410 | |
| 12 | 02/01/14 | 66,299,354 | 144,945 | 144,945 | |
| 13 | 02/01/15 | 687,532 | 65,756,767 | 14,928,349 | |
| 14 | 02/01/16 | | | | |
| 15 | 02/01/17 | | | | |
| 16 | 02/01/18 | | | | |
| 17 | 02/01/19 | | | | |
| 18 | 02/01/20 | | | | |
| 19 | 02/01/21 | | | | |
| 20 | 02/01/22 | | | | |
| | | | 9,000,000 | | (9,000,000) |
| | | | 613,640,000 | | |
| | | | 9,000,000 | | |
| | | | 613,640,000 | | |

*FIG. 7E*

|  |  |  | Fixed Rate Bond Yield | 4.279% |
|--|--|--|--|--|
|  |  | Reduction in Yield from Accelerating DS | | 0.003% |
|  |  |  | BMA | 3.910% |
|  |  |  |  | (0) |
|  |  |  | VRDB Yield | 4.290% |

| Period | Maturity | Cumulative Total Principal Paid | Actual Principal Amortization | Total Debt Service | Present Value |
|---|---|---|---|---|---|
| 0 | 02/01/02 | | | | |
| 1 | 02/01/03 | 42,873,988 | 42,873,988 | 57,447,938 | 55,084,650 |
| 2 | 02/01/04 | 91,421,263 | 48,547,275 | 66,446,498 | 61,092,007 |
| 3 | 02/01/05 | 139,019,599 | 47,598,336 | 66,445,211 | 58,577,675 |
| 4 | 02/01/06 | 180,956,433 | 41,936,833 | 66,445,675 | 56,168,304 |
| 5 | 02/01/07 | 223,984,361 | 43,027,929 | 66,444,742 | 53,856,902 |
| 6 | 02/01/08 | 267,167,576 | 43,183,215 | 66,445,390 | 51,641,845 |
| 7 | 02/01/09 | 309,787,128 | 42,619,552 | 66,445,091 | 49,517,185 |
| 8 | 02/01/10 | 357,468,112 | 47,680,984 | 66,444,771 | 47,479,923 |
| 9 | 02/01/11 | 412,234,168 | 54,766,056 | 66,444,611 | 45,526,588 |
| 10 | 02/01/12 | 472,525,295 | 60,291,127 | 66,447,560 | 43,655,658 |
| 11 | 02/01/13 | 535,171,705 | 62,646,410 | 66,445,969 | 41,858,753 |
| 12 | 02/01/14 | 598,711,651 | 63,539,945 | 66,444,300 | 40,135,763 |
| 13 | 02/01/15 | 613,640,000 | 14,928,349 | 15,615,881 | 9,044,748 |
| 14 | 02/01/16 | | | | |
| 15 | 02/01/17 | | | | |
| 16 | 02/01/18 | | | | |
| 17 | 02/01/19 | | | | |
| 18 | 02/01/20 | | | | |
| 19 | 02/01/21 | | | | |
| 20 | 02/01/22 | | | | |
|  |  |  | 613,640,000 |  | 613,640,000 |

*FIG. 7F*

| Period | Maturity | Savings vs Fixed Rate | Present Value Savings From VRDBs | Breakeven VRDB Rate before spread and costs |
|---|---|---|---|---|
| 0 | 02/01/02 | | | 3.899% |
| 1 | 02/01/03 | 9,000,000 | 8,630,732 | 3.986% |
| 2 | 02/01/04 | 0 | 0 | 4.258% |
| 3 | 02/01/05 | 0 | 0 | 4.509% |
| 4 | 02/01/06 | 0 | 0 | 4.435% |
| 5 | 02/01/07 | 0 | 0 | 4.252% |
| 6 | 02/01/08 | 0 | 0 | 3.783% |
| 7 | 02/01/09 | 0 | 0 | 2.671% |
| 8 | 02/01/10 | 0 | 0 | 1.109% |
| 9 | 02/01/11 | 0 | 0 | (0.893%) |
| 10 | 02/01/12 | 0 | 0 | (4.291%) |
| 11 | 02/01/13 | 0 | 0 | (15.703%) |
| 12 | 02/01/14 | 0 | 0 | |
| 13 | 02/01/15 | (15,615,881) | (9,058,010) | |
| 14 | 02/01/16 | | | |
| 15 | 02/01/17 | | | |
| 16 | 02/01/18 | | | |
| 17 | 02/01/19 | | | |
| 18 | 02/01/20 | | | |
| 19 | 02/01/21 | | | |
| 20 | 02/01/22 | | | |
| | | (6,615,881) | (427,278) | |

*FIG. 7G*

| Period | Maturity | Expected Principal Maturities | Actual Principal Maturities | Actual Maturity % of Expected Maturity | Accelerated/ (Deferred) Amounts |
|---|---|---|---|---|---|
| 0 | 02/01/02 | | | | |
| 1 | 02/01/03 | 42,580,000 | 42,873,988 | 100.690% | 293,988 |
| 2 | 02/01/04 | 43,345,000 | 48,547,275 | 112.002% | 5,202,275 |
| 3 | 02/01/05 | 44,410,000 | 47,598,336 | 107.179% | 3,188,336 |
| 4 | 02/01/06 | 45,725,000 | 41,936,833 | 91.715% | (3,788,167) |
| 5 | 02/01/07 | 47,265,000 | 43,027,929 | 91.035% | (4,237,071) |
| 6 | 02/01/08 | 49,005,000 | 43,183,215 | 88.120% | (5,821,785) |
| 7 | 02/01/09 | 50,960,000 | 42,619,552 | 83.633% | (8,340,448) |
| 8 | 02/01/10 | 53,100,000 | 47,680,984 | 89.795% | (5,419,016) |
| 9 | 02/01/11 | 55,415,000 | 54,766,056 | 98.829% | (648,944) |
| 10 | 02/01/12 | 57,895,000 | 60,291,127 | 104.139% | 2,396,127 |
| 11 | 02/01/13 | 60,545,000 | 62,646,410 | 103.471% | 2,101,410 |
| 12 | 02/01/14 | 63,395,000 | 63,539,945 | 100.229% | 144,945 |
| 13 | 02/01/15 | 0 | 14,928,349 | | 0 |
| 14 | 02/01/16 | | | | |
| 15 | 02/01/17 | | | | |
| 16 | 02/01/18 | | | | |
| 17 | 02/01/19 | | | | |
| 18 | 02/01/20 | | | | |
| 19 | 02/01/21 | | | | |
| 20 | 02/01/22 | | | | |
| | | 613,640,000 | 613,640,000 | | |

*FIG. 7H*

|   | | Virtual Swaps I Results |
|---|---|---|
|   | | Virtual Swaps II Results |
|   | | Totals |

|    | Maturity  | Invested Amounts from Virtual Swap I | Invested Amounts from Virtual Swap II | Total Amount Applied to Defease Maturities |
|----|-----------|--------------------------------------|---------------------------------------|--------------------------------------------|
| 0  | 2/1/2002  |             |             |             |
| 1  | 2/1/2003  | 42,580,000  | 0           | 42,580,000  |
| 2  | 2/1/2004  | 42,580,000  | 0           | 42,580,000  |
| 3  | 2/1/2005  | 17,150,000  | 26,955,000  | 44,105,000  |
| 4  | 2/1/2006  | 28,555,000  | 16,230,000  | 44,785,000  |
| 5  | 2/1/2007  | 30,265,000  | 17,000,000  | 47,265,000  |
| 6  | 2/1/2008  | 25,465,000  | 23,540,000  | 49,005,000  |
| 7  | 2/1/2009  | 34,000,000  | 16,960,000  | 50,960,000  |
| 8  | 2/1/2010  | 19,010,000  | 34,090,000  | 53,100,000  |
| 9  | 2/1/2011  | 40,320,000  | 15,095,000  | 55,415,000  |
| 10 | 2/1/2012  | 36,145,000  | 0           | 36,145,000  |
| 11 | 2/1/2013  | 0           | 0           | 0           |
| 12 | 2/1/2014  | 0           | 0           | 0           |
| 13 | 2/1/2015  |             |             |             |
| 14 | 2/1/2016  |             |             |             |
| .  |           |             |             |             |
| .  |           |             |             |             |
| .  |           |             |             |             |
| 29 | 2/1/2031  |             |             |             |
| 30 | 2/1/2032  |             |             |             |
|    |           | 316,070,000 | 149,870,000 | 465,940,000 |

*FIG. 8A*

| Invested Amounts | Gross Savings | Savings % | PV Savings at Issuer's Discount Rate | Savings % |
|---|---|---|---|---|
| 316,070,000 | 20,787,709 | 6.577% | 17,273,952 | 5.465% |
| 149,870,000 | 10,195,584 | 6.803% | 8,449,676 | 5.638% |
| 465,940,000 | 30,983,292 | 6.650% | 25,723,629 | 5.521% |

| Gross Benefit as % of Amount Used to Defease Bonds | Gross Benefit $ | Present Value Benefit (Discounted at Issuer's Fixed Bond Yield) | Present Value Benefit $ | Present Value (Discounted at LIBOR) as % of Invested Amount |
|---|---|---|---|---|
| 7.360% | 3,133,770 | 6.033% | 2,569,001 | 5.626% |
| 6.378% | 2,715,569 | 5.332% | 2,270,557 | 5.031% |
| 7.340% | 3,237,320 | 6.016% | 2,653,347 | 5.599% |
| 6.597% | 2,954,497 | 5.498% | 2,462,407 | 5.166% |
| 6.531% | 3,086,748 | 5.449% | 2,575,424 | 5.121% |
| 5.981% | 2,930,919 | 5.041% | 2,470,571 | 4.769% |
| 7.037% | 3,585,914 | 5.813% | 2,962,357 | 5.427% |
| 7.329% | 3,891,840 | 6.018% | 3,195,561 | 5.599% |
| 7.022% | 3,891,154 | 5.786% | 3,206,235 | 5.399% |
| 4.304% | 1,555,562 | 3.758% | 1,358,168 | 3.636% |
| 0.000% | 0 | 0.000% | 0 | 0.000% |
| 0.000% | 0 | 0.000% | 0 | 0.000% |

|  | 30,983,292 |  | 25,723,629 |  |

*FIG. 8B*

| PV Savings Discounted at LIBOR | Savings % | PV Savings as of Today at Issuer's Discount Rate | Savings % |
|---|---|---|---|
| 16,211,268 | 5.129% | 13,984,735 | 4.425% |
| 7,911,144 | 5.279% | 6,586,822 | 4.395% |
| 24,122,412 | 5.177% | 20,571,557 | 4.415% |

Present
Value
Benefit $ 2,395,455
2,142,036
2,469,423
2,313,415
2,420,386
2,337,053
2,765,748
2,973,138
2,991,630
1,314,127
0
0

*FIG. 8C*

| | | Fixed Rate Bond Yield | | | 4.279% |
|---|---|---|---|---|---|
| | Maturity | Fixed Rate Maturities Available to Retire VRDBs or other Bonds | Aggregate Amount Available to Retire VRDBs or other Bonds | Par Amount Available to be Retired | Arbitrage Yield on defeased bond issue |
| 0 | 2/1/2002 | | | | |
| 1 | 2/1/2003 | 42,580,000 | 42,580,000 | 85,010,000 | 5.750% |
| 2 | 2/1/2004 | 43,345,000 | 85,925,000 | 42,580,000 | 5.750% |
| 3 | 2/1/2005 | 44,410,000 | 130,335,000 | 17,150,000 | 5.750% |
| 4 | 2/1/2006 | 45,725,000 | 176,060,000 | 28,555,000 | 5.750% |
| 5 | 2/1/2007 | 47,265,000 | 223,325,000 | 30,265,000 | 5.750% |
| 6 | 2/1/2008 | 49,005,000 | 272,330,000 | 25,465,000 | 5.500% |
| 7 | 2/1/2009 | 50,960,000 | 323,290,000 | 34,000,000 | 5.750% |
| 8 | 2/1/2010 | 53,100,000 | 376,390,000 | 19,010,000 | 5.750% |
| 9 | 2/1/2011 | 55,415,000 | 431,805,000 | 40,320,000 | 5.750% |
| 10 | 2/1/2012 | 57,895,000 | 489,700,000 | 36,145,000 | 5.500% |
| 11 | 2/1/2013 | 60,545,000 | 550,245,000 | 0 | |
| 12 | 2/1/2014 | 63,395,000 | 613,640,000 | 0 | |
| 13 | 2/1/2015 | | | | |
| 14 | 2/1/2016 | | | | |
| 15 | 2/1/2017 | | | | |
| 16 | 2/1/2018 | | | 154,525,000 | 0 |
| 17 | 2/1/2019 | | | 0 | 0 |
| 18 | 2/1/2020 | | | 0 | 0 |
| 19 | 2/1/2021 | | | 0 | 0 |
| 20 | 2/1/2022 | | | | |
| 21 | 2/1/2023 | | | | |
| . | | | | | |
| . | | | | | |
| . | | | | | |
| 30 | 2/1/2032 | | | | |
| | | 613,640,000 | | 513,025,000 | |

*FIG. 9A*

| | Maturity | Interest Coupon | Maturity of defeased bond maturity | Issue Type | Series of Fixed Rate Bonds Defeased | Bond Status |
|---|---|---|---|---|---|---|
| 0 | 2/1/2002 | | | | | |
| 1 | 2/1/2003 | 6.000% | 11/8/2011 | Refunding | 1996 Series A | Non-callable |
| 2 | 2/1/2004 | 6.000% | 11/8/2011 | Refunding | 1996 Series A | Non-callable |
| 3 | 2/1/2005 | 6.500% | 11/9/2014 | Refunding | 1996 Series A | Non-callable |
| 4 | 2/1/2006 | 5.7; 6.0% | 2/1/2014 | Consolidate | 2000 Series A | Non refundable |
| 5 | 2/1/2007 | 5.6; 6.0% | 2/1/2015 | Consolidate | 2000 Series A | Non refundable |
| 6 | 2/1/2008 | 5.375; 6.0% | 9/1/2014 | Consolidate | 2000 Series B | Non refundable |
| 7 | 2/1/2009 | 5.800% | 2/1/2017 | Consolidate | 2000 Series A | Non refundable |
| 8 | 2/1/2010 | 5.875% | 2/1/2018 | Consolidate | 2000 Series A | Non refundable |
| 9 | 2/1/2011 | 5.875% | 2/1/2020 | Consolidate | 2000 Series A | Non refundable |
| 10 | 2/1/2012 | 5.250% | 9/1/2017 | Consolidate | 2000 Series B | Non refundable |
| 11 | 2/1/2013 | | | | | |
| 12 | 2/1/2014 | | | | | |
| 13 | 2/1/2015 | | | | | |
| 14 | 2/1/2016 | | | | | |
| 15 | 2/1/2017 | | | | | |
| 16 | 2/1/2018 | 0 | 40,489 | Refunding | 1996 Series A | Non-callable |
| 17 | 2/1/2019 | 0 | 40,489 | Refunding | 1996 Series A | Non-callable |
| 18 | 2/1/2020 | 0 | 40,489 | Refunding | 1996 Series A | Non-callable |
| 19 | 2/1/2021 | 0 | 40,489 | Refunding | 1996 Series A | Non-callable |
| 20 | 2/1/2022 | | | | | |
| 21 | 2/1/2023 | | | | | |
| . | | | | | | |
| . | | | | | | |
| . | | | | | | |
| 30 | 2/1/2032 | | | | | |

*FIG. 9B*

| | Maturity | Invested Amount | Balance of Amount Available for Investment | Balance of Maturity Available for Defeasance | Virtual Swap Term in Years | Fixed Receiver LIBOR Swap Rate for Swap Term |
|---|---|---|---|---|---|---|
| 0 | 2/1/2002 | | | | | |
| 1 | 2/1/2003 | 42,580,000 | 0 | 42,430,000 | 8.75 | 5.889% |
| 2 | 2/1/2004 | 42,580,000 | 765,000 | 0 | 7.75 | 5.758% |
| 3 | 2/1/2005 | 17,150,000 | 27,260,000 | 0 | 9.75 | 5.994% |
| 4 | 2/1/2006 | 28,555,000 | 17,170,000 | 0 | 8.00 | 5.881% |
| 5 | 2/1/2007 | 30,265,000 | 17,000,000 | 0 | 8.00 | 5.881% |
| 6 | 2/1/2008 | 25,465,000 | 23,540,000 | 0 | 6.58 | 5.590% |
| 7 | 2/1/2009 | 34,000,000 | 16,960,000 | 0 | 8.00 | 5.881% |
| 8 | 2/1/2010 | 19,010,000 | 34,090,000 | 0 | 8.00 | 5.881% |
| 9 | 2/1/2011 | 40,320,000 | 15,095,000 | 0 | 9.00 | 5.938% |
| 10 | 2/1/2012 | 36,145,000 | 21,750,000 | 0 | 5.58 | 5.367% |
| 11 | 2/1/2013 | 0 | 60,545,000 | 0 | 0.00 | 0.000% |
| 12 | 2/1/2014 | 0 | 63,395,000 | 0 | 0.00 | 0.000% |
| 13 | 2/1/2015 | | | | | |
| 14 | 2/1/2016 | | | | | |
| 15 | 2/1/2017 | | | | | |
| 16 | 2/1/2018 | | | | | |
| 17 | 2/1/2019 | | | | | |
| 18 | 2/1/2020 | | | | | |
| 19 | 2/1/2021 | | | | | |
| 20 | 2/1/2022 | | | | | |
| 21 | 2/1/2023 | | | | | |
| . | | | | | | |
| . | | | | | | |
| . | | | | | | |
| 30 | 2/1/2032 | | | | | |
| | | 316,070,000 | 297,570,000 | 42,430,000 | | |

*FIG. 9C*

| | Maturity | Available Yield of on Invstmnt for Term | Yield of Virtual Fixed Receiver Swap | Yield on Fixed Payor Swap | Spread between Virtual Fixed Receiver Rate and Fixed Payor Rate | Gross Benefit % |
|---|---|---|---|---|---|---|
| 0 | 2/1/2002 | | | | | |
| 1 | 2/1/2003 | 5.639% | 5.639% | 4.798% | 0.841% | 7.360% |
| 2 | 2/1/2004 | 5.508% | 5.508% | 4.686% | 0.823% | 6.378% |
| 3 | 2/1/2005 | 5.744% | 5.744% | 4.892% | 0.852% | 8.312% |
| 4 | 2/1/2006 | 5.631% | 5.631% | 4.791% | 0.840% | 6.722% |
| 5 | 2/1/2007 | 5.631% | 5.631% | 4.791% | 0.840% | 6.722% |
| 6 | 2/1/2008 | 5.340% | 5.340% | 4.535% | 0.804% | 5.296% |
| 7 | 2/1/2009 | 5.631% | 5.631% | 4.791% | 0.840% | 6.722% |
| 8 | 2/1/2010 | 5.631% | 5.631% | 4.791% | 0.840% | 6.722% |
| 9 | 2/1/2011 | 5.738% | 5.738% | 4.886% | 0.852% | 7.668% |
| 10 | 2/1/2012 | 5.117% | 5.117% | 4.347% | 0.771% | 4.304% |
| 11 | 2/1/2013 | 0.000% | 0.000% | 0.000% | 0.000% | 0.000% |
| 12 | 2/1/2014 | 0.000% | 0.000% | 0.000% | 0.000% | 0.000% |
| 13 | 2/1/2015 | | | | | |
| 14 | 2/1/2016 | | | | | |
| 15 | 2/1/2017 | | | | | |
| 16 | 2/1/2018 | | | | | |
| 17 | 2/1/2019 | | | | | |
| 18 | 2/1/2020 | | | | | |
| 19 | 2/1/2021 | | | | | |
| 20 | 2/1/2022 | | | | | |
| 21 | 2/1/2023 | | | | | |
| . | | | | | | |
| . | | | | | | |
| . | | | | | | |
| 30 | 2/1/2032 | | | | | |

Gross Saving
PV Saving
PV Sa

|  | | % Savings | $ Savings |
|---|---|---|---|
| s as % of Invested Amount | | 6.577% | $20,787,709 |
| s at Issuer's Discount Rate | | 5.465% | $17,273,952 |
| vings Discounted at LIBOR | | 5.129% | 16,211,268 |

|  | Maturity | Gross Benefit $ | Present Value Benefit (Discounted at Issuers Fixed Bond Yield) | Present Value Benefit $ as of dates of defeasance | Present Value (Discounted at LIBOR) as % of Invested Amount |
|---|---|---|---|---|---|
| 0 | 2/1/2002 | | | | |
| 1 | 2/1/2003 | 3,133,770 | 6.033% | 2,569,001 | 5.626% |
| 2 | 2/1/2004 | 2,715,569 | 5.332% | 2,270,557 | 5.031% |
| 3 | 2/1/2005 | 1,425,451 | 6.682% | 1,145,878 | 6.159% |
| 4 | 2/1/2006 | 1,919,417 | 5.593% | 1,596,951 | 5.242% |
| 5 | 2/1/2007 | 2,034,361 | 5.593% | 1,692,583 | 5.242% |
| 6 | 2/1/2008 | 1,348,601 | 4.532% | 1,154,087 | 4.331% |
| 7 | 2/1/2009 | 2,285,421 | 5.593% | 1,901,464 | 5.242% |
| 8 | 2/1/2010 | 1,277,819 | 5.593% | 1,063,142 | 5.242% |
| 9 | 2/1/2011 | 3,091,738 | 6.255% | 2,522,122 | 5.798% |
| 10 | 2/1/2012 | 1,555,562 | 3.758% | 1,358,168 | 3.636% |
| 11 | 2/1/2013 | 0 | 0.000% | 0 | 0.000% |
| 12 | 2/1/2014 | 0 | 0.000% | 0 | 0.000% |
| 13 | 2/1/2015 | | | | |
| 14 | 2/1/2016 | | | | |
| 15 | 2/1/2017 | | | | |
| 16 | 2/1/2018 | | | | |
| 17 | 2/1/2019 | | | | |
| 18 | 2/1/2020 | | | | |
| 19 | 2/1/2021 | | | | |
| 20 | 2/1/2022 | | | | |
| 21 | 2/1/2023 | | | | |
| . | | | | | |
| . | | | | | |
| 30 | 2/1/2032 | | | | |
| | | 20,787,709 | | 17,273,952 | |

*FIG. 9E*

Discounted to
Today 13,984,735

| | Maturity | Present Value Benefit $ as of date of defeasance | Additional Permitted Yield | Dollar Value of Additional Permitted Yield |
|---|---|---|---|---|
| 0 | 2/1/2002 | | | |
| 1 | 2/1/2003 | 2,395,455 | N/A | N/A |
| 2 | 2/1/2004 | 2,142,036 | N/A | N/A |
| 3 | 2/1/2005 | 1,056,354 | N/A | N/A |
| 4 | 2/1/2006 | 1,496,946 | 0.119% | 272,042 |
| 5 | 2/1/2007 | 1,586,590 | 0.119% | 288,333 |
| 6 | 2/1/2008 | 1,103,010 | 0.160% | 268,385 |
| 7 | 2/1/2009 | 1,782,390 | 0.119% | 323,917 |
| 8 | 2/1/2010 | 996,566 | 0.119% | 181,108 |
| 9 | 2/1/2011 | 2,337,794 | 0.012% | 43,985 |
| 10 | 2/1/2012 | 1,314,127 | 0.383% | 772,143 |
| 11 | 2/1/2013 | 0 | 0.000% | 0 |
| 12 | 2/1/2014 | 0 | 0.000% | 0 |
| 13 | 2/1/2015 | | | |
| 14 | 2/1/2016 | | | |
| 15 | 2/1/2017 | | | |
| 16 | 2/1/2018 | | | |
| 17 | 2/1/2019 | | | |
| 18 | 2/1/2020 | | | |
| 19 | 2/1/2021 | | | |
| 20 | 2/1/2022 | | | |
| 21 | 2/1/2023 | | | |
| . | | | | |
| . | | | | |
| . | | | | |
| 30 | 2/1/2032 | | | |
| | | 16,211,268 | | 2,149,912 |

*FIG. 9F*

|   | | Fixed Rate Bond Yield | | | 4.279% |
|---|---|---|---|---|---|

| | Maturity | Fixed Rate Maturities Available to Retire VRDBs or other Bonds | Aggregate Amount Available to Retire VRDBs or other Bonds | Par Amount Available to be Retired | Arbitrage Yield on defeased bond issue |
|---|---|---|---|---|---|
| 0 | 2/1/2002 | | | | |
| 1 | 2/1/2003 | 0 | 0 | 0 | |
| 2 | 2/1/2004 | 765,000 | 765,000 | 0 | |
| 3 | 2/1/2005 | 27,260,000 | 28,025,000 | 26,955,000 | 5.750% |
| 4 | 2/1/2006 | 17,170,000 | 45,195,000 | 16,230,000 | 5.750% |
| 5 | 2/1/2007 | 17,000,000 | 62,195,000 | 42,465,000 | 5.500% |
| 6 | 2/1/2008 | 23,540,000 | 85,735,000 | 32,075,000 | 5.750% |
| 7 | 2/1/2009 | 16,960,000 | 102,695,000 | 35,970,000 | 5.750% |
| 8 | 2/1/2010 | 34,090,000 | 136,785,000 | 38,085,000 | 5.750% |
| 9 | 2/1/2011 | 15,095,000 | 151,880,000 | 51,240,000 | 5.500% |
| 10 | 2/1/2012 | 21,750,000 | 173,630,000 | 0 | |
| 11 | 2/1/2013 | 60,545,000 | 234,175,000 | 0 | |
| 12 | 2/1/2014 | 63,395,000 | 297,570,000 | 0 | |
| 13 | 2/1/2015 | | | | |
| 14 | 2/1/2016 | | | | |
| 15 | 2/1/2017 | | | | |
| 16 | 2/1/2018 | | | 154,525,000 | 0 |
| 17 | 2/1/2019 | | | 0 | 0 |
| 18 | 2/1/2020 | | | 0 | 0 |
| 19 | 2/1/2021 | | | 0 | 0 |
| 20 | 2/1/2022 | | | | |
| . | | | | | |
| . | | | | | |
| . | | | | | |
| 29 | 2/1/2031 | | | | |
| 30 | 2/1/2032 | | | | |
| | | 297,570,000 | | 397,545,000 | |

*FIG. 10A*

|    | Maturity | Interest Coupon | Maturity of defeased bond maturity | Issue Type | Series of Fixed Rate Bonds Defeased | Bond Status |
|----|----------|-----------------|-----------------------------------|------------|-------------------------------------|-------------|
| 0  | 2/1/2002 |                 |                                   |            |                                     |             |
| 1  | 2/1/2003 |                 |                                   |            |                                     |             |
| 2  | 2/1/2004 |                 |                                   |            |                                     |             |
| 3  | 2/1/2005 | 5.5; 6.0%       | 2/1/2013                          | Consolidated | 2000 Series A                     | Non refundable |
| 4  | 2/1/2006 | 5.000%          | 11/1/2013                         | Refunding  | 1996 Series A                       | Non refundable |
| 5  | 2/1/2007 | 5.375; 6.0%     | 9/1/2014                          | Consolidated | 2000 Series B                     | Non refundable |
| 6  | 2/1/2008 | 6.000%          | 2/1/2016                          | Consolidated | 2000 Series A                     | Non refundable |
| 7  | 2/1/2009 | 5.875%          | 2/1/2018                          | Consolidated | 2000 Series A                     | Non refundable |
| 8  | 2/1/2010 | 5.875%          | 2/1/2019                          | Consolidated | 2000 Series A                     | Non refundable |
| 9  | 2/1/2011 | 5.250%          | 9/1/2017                          | Consolidated | 2000 Series B                     | Non refundable |
| 10 | 2/1/2012 |                 |                                   |            |                                     |             |
| 11 | 2/1/2013 |                 |                                   |            |                                     |             |
| 12 | 2/1/2014 |                 |                                   |            |                                     |             |
| 13 | 2/1/2015 |                 |                                   |            |                                     |             |
| 14 | 2/1/2016 |                 |                                   |            |                                     |             |
| 15 | 2/1/2017 |                 |                                   |            |                                     |             |
| 16 | 2/1/2018 | 0               | 40,489                            | Refunding  | 1996 Series A                       | Non-callable |
| 17 | 2/1/2019 | 0               | 40,489                            | Refunding  | 1996 Series A                       | Non-callable |
| 18 | 2/1/2020 | 0               | 40,489                            | Refunding  | 1996 Series A                       | Non-callable |
| 19 | 2/1/2021 | 0               | 40,489                            | Refunding  | 1996 Series A                       | Non-callable |
| 20 | 2/1/2022 |                 |                                   |            |                                     |             |
| .  |          |                 |                                   |            |                                     |             |
| .  |          |                 |                                   |            |                                     |             |
| .  |          |                 |                                   |            |                                     |             |
| 29 | 2/1/2031 |                 |                                   |            |                                     |             |
| 30 | 2/1/2032 |                 |                                   |            |                                     |             |

*FIG. 10B*

|   | Maturity | Invested Amount | Balance of Amount Available for Investment | Balance of Maturity Available for Defeasance | Virtual Swap Term in Years | Fixed Receiver LIBOR Swap Rate for Swap Term |
|---|---|---|---|---|---|---|
| 0 | 2/1/2002 | | | | | |
| 1 | 2/1/2003 | 0 | 0 | 0 | 0.00 | 0.000% |
| 2 | 2/1/2004 | 0 | 765,000 | 0 | 0.00 | 0.000% |
| 3 | 2/1/2005 | 26,955,000 | 305,000 | 0 | 8.00 | 5.881% |
| 4 | 2/1/2006 | 16,230,000 | 940,000 | 0 | 7.75 | 5.758% |
| 5 | 2/1/2007 | 17,000,000 | 0 | 25,465,000 | 7.58 | 5.756% |
| 6 | 2/1/2008 | 23,540,000 | 0 | 8,535,000 | 8.00 | 5.881% |
| 7 | 2/1/2009 | 16,960,000 | 0 | 19,010,000 | 9.00 | 5.988% |
| 8 | 2/1/2010 | 34,090,000 | 0 | 3,995,000 | 9.00 | 5.988% |
| 9 | 2/1/2011 | 15,095,000 | 0 | 36,145,000 | 6.58 | 5.590% |
| 10 | 2/1/2012 | 0 | 21,750,000 | 0 | 0.00 | 0.000% |
| 11 | 2/1/2013 | 0 | 60,545,000 | 0 | 0.00 | 0.000% |
| 12 | 2/1/2014 | 0 | 63,395,000 | 0 | 0.00 | 0.000% |
| 13 | 2/1/2015 | | | | | |
| 14 | 2/1/2016 | | | | | |
| 15 | 2/1/2017 | | | | | |
| 16 | 2/1/2018 | | | | | |
| 17 | 2/1/2019 | | | | | |
| 18 | 2/1/2020 | | | | | |
| 19 | 2/1/2021 | | | | | |
| 20 | 2/1/2022 | | | | | |
| . | | | | | | |
| . | | | | | | |
| . | | | | | | |
| 29 | 2/1/2031 | | | | | |
| 30 | 2/1/2032 | | | | | |
| | | 149,870,000 | 147,700,000 | 93,150,000 | | |

*FIG. 10C*

| | Maturity | Available Yield of on Invstmnt for Term | Yield of Virtual Fixed Receiver Swap | Yield on Fixed Payor Swap | Spread between Virtual Fixed Receiver Rate and Fixed Payor Rate | Gross Benefit % |
|---|---|---|---|---|---|---|
| 0 | 2/1/2002 | | | | | |
| 1 | 2/1/2003 | 0.000% | 0.000% | 0.000% | 0.000% | 0.000% |
| 2 | 2/1/2004 | 0.000% | 0.000% | 0.000% | 0.000% | 0.000% |
| 3 | 2/1/2005 | 5.631% | 5.631% | 4.791% | 0.840% | 6.722% |
| 4 | 2/1/2006 | 5.508% | 5.508% | 4.686% | 0.823% | 6.378% |
| 5 | 2/1/2007 | 5.506% | 5.500% | 4.684% | 0.816% | 6.191% |
| 6 | 2/1/2008 | 5.631% | 5.631% | 4.791% | 0.840% | 6.722% |
| 7 | 2/1/2009 | 5.738% | 5.738% | 4.886% | 0.852% | 7.668% |
| 8 | 2/1/2010 | 5.738% | 5.738% | 4.886% | 0.852% | 7.668% |
| 9 | 2/1/2011 | 5.340% | 5.340% | 4.535% | 0.804% | 5.296% |
| 10 | 2/1/2012 | 0.000% | 0.000% | 0.000% | 0.000% | 0.000% |
| 11 | 2/1/2013 | 0.000% | 0.000% | 0.000% | 0.000% | 0.000% |
| 12 | 2/1/2014 | 0.000% | 0.000% | 0.000% | 0.000% | 0.000% |
| 13 | 2/1/2015 | | | | | |
| 14 | 2/1/2016 | | | | #N/A | |
| 15 | 2/1/2017 | | | | | |
| 16 | 2/1/2018 | | | | | |
| 17 | 2/1/2019 | | | | | |
| 18 | 2/1/2020 | | | | | |
| 19 | 2/1/2021 | | | | | |
| 20 | 2/1/2022 | | | | | |
| . | | | | | | |
| . | | | | | | |
| . | | | | | | |
| 29 | 2/1/2031 | | | | | |
| 30 | 2/1/2032 | | | | | |

Gross Saving
PV Saving
PV Sa

*FIG. 10D*

|  |  | % Savings | $ Savings |
|---|---|---|---|
| s as % of Invested Amount | | 6.803% | $10,195,584 |
| s at Issuer's Discount Rate | | 5.638% | $8,449,676 |
| vings Discounted at LIBOR | | 5.279% | 7,911,144 |

|  | Maturity | Gross Benefit $ | Present Value Benefit (Discounted at Issuer's Fixed Bond Yield) | Present Value Benefit $ as of dates of defeasance | Present Value (Discounted at LIBOR) as % of Invested Amount |
|---|---|---|---|---|---|
| 0 | 2/1/2002 | | | | |
| 1 | 2/1/2003 | 0 | 0.000% | 0 | 0.000% |
| 2 | 2/1/2004 | 0 | 0.000% | 0 | 0.000% |
| 3 | 2/1/2005 | 1,811,868 | 5.593% | 1,507,470 | 5.242% |
| 4 | 2/1/2006 | 1,035,079 | 5.332% | 865,457 | 5.031% |
| 5 | 2/1/2007 | 1,052,388 | 5.193% | 882,841 | 4.905% |
| 6 | 2/1/2008 | 1,582,318 | 5.593% | 1,316,485 | 5.242% |
| 7 | 2/1/2009 | 1,300,493 | 6.255% | 1,060,892 | 5.798% |
| 8 | 2/1/2010 | 2,614,021 | 6.255% | 2,132,419 | 5.798% |
| 9 | 2/1/2011 | 799,416 | 4.532% | 684,113 | 4.331% |
| 10 | 2/1/2012 | 0 | 0.000% | 0 | 0.000% |
| 11 | 2/1/2013 | 0 | 0.000% | 0 | 0.000% |
| 12 | 2/1/2014 | 0 | 0.000% | 0 | 0.000% |
| 13 | 2/1/2015 | | | | |
| 14 | 2/1/2016 | | | | |
| 15 | 2/1/2017 | | | | |
| 16 | 2/1/2018 | | | | |
| 17 | 2/1/2019 | | | | |
| 18 | 2/1/2020 | | | | |
| 19 | 2/1/2021 | | | | |
| 20 | 2/1/2022 | | | | |
| . | | | | | |
| . | | | | | |
| . | | | | | |
| 29 | 2/1/2031 | | | | |
| 30 | 2/1/2032 | | | | |
| | | 10,195,584 | | 8,449,676 | |

*FIG. 10E*

Discounted to Today 6,586,822

| | Maturity | Present Value Benefit $ as of date of defeasance | Additional Permitted Yield | Dollar Value of Additional Permitted Yield |
|---|---|---|---|---|
| 0 | 2/1/2002 | | | |
| 1 | 2/1/2003 | 0 | 0.000% | 0 |
| 2 | 2/1/2004 | 0 | 0.000% | 0 |
| 3 | 2/1/2005 | 1,413,069 | 0.119% | 256,799 |
| 4 | 2/1/2006 | 816,469 | 0.242% | 303,797 |
| 5 | 2/1/2007 | 833,796 | 0.000% | 0 |
| 6 | 2/1/2008 | 1,234,043 | 0.119% | 224,265 |
| 7 | 2/1/2009 | 983,358 | 0.012% | 18,501 |
| 8 | 2/1/2010 | 1,976,572 | 0.012% | 37,188 |
| 9 | 2/1/2011 | 653,836 | 0.160% | 159,092 |
| 10 | 2/1/2012 | 0 | 0.000% | 0 |
| 11 | 2/1/2013 | 0 | 0.000% | 0 |
| 12 | 2/1/2014 | 0 | 0.000% | 0 |
| 13 | 2/1/2015 | | | |
| 14 | 2/1/2016 | | | |
| 15 | 2/1/2017 | | | |
| 16 | 2/1/2018 | | | |
| 17 | 2/1/2019 | | | |
| 18 | 2/1/2020 | | | |
| 19 | 2/1/2021 | | | |
| 20 | 2/1/2022 | | | |
| . | | | | |
| . | | | | |
| 29 | 2/1/2031 | | | |
| 30 | 2/1/2032 | | | |
| | | 7,911,144 | | 999,643 |

*FIG. 10F*

| Swap Term | Fixed Receiver LIBOR Swap Rate for Swap Term | Yield for 1/10th of a year | Spread Between LIBOR and Available Invstmnt (Bps) | Forward Premium Payable to Issuer on Invstmnt (Bps) | Fixed Receiver Yield on Virtual Fixed Receiver Swap | Yield for 1/10th of a year | Spot Fixed Payor Rate for Swap Term | Forward Premium Payable by Issuer on swap (Bps) |
|---|---|---|---|---|---|---|---|---|
| 0 | 0.000% | 0.000% | 0 | | 0.000% | 0.000% | 0.000% | 0 |
| 1 | 2.459% | 0.120% | 25 | | 2.209% | 0.120% | 1.893% | |
| 2 | 3.658% | 0.085% | 25 | | 3.408% | 0.085% | 2.688% | |
| 3 | 4.507% | 0.051% | 25 | | 4.257% | 0.051% | 3.313% | |
| 4 | 5.020% | 0.033% | 25 | | 4.770% | 0.033% | 3.702% | |
| 5 | 5.354% | 0.023% | 25 | | 5.104% | 0.023% | 3.955% | |
| 6 | 5.580% | 0.017% | 25 | | 5.330% | 0.017% | 4.147% | |
| 7 | 5.749% | 0.013% | 25 | | 5.499% | 0.013% | 4.297% | |
| 8 | 5.881% | 0.011% | 25 | | 5.631% | 0.011% | 4.411% | |
| 9 | 5.986% | 0.009% | 25 | | 5.738% | 0.009% | 4.506% | |
| 10 | 6.075% | 0.008% | 25 | | 5.825% | 0.008% | 4.587% | |
| 11 | 6.151% | 0.007% | 25 | | 5.901% | 0.007% | 4.659% | |
| 12 | 6.217% | 0.006% | 25 | | 5.967% | 0.006% | 4.725% | |
| 13 | 6.272% | 0.005% | 25 | | 6.022% | 0.005% | 4.777% | |
| 14 | 6.317% | 0.003% | 25 | | 6.057% | 0.003% | 4.822% | |
| 15 | 6.352% | 0.002% | 25 | | 6.102% | 0.002% | 4.859% | |
| 16 | 6.369% | 0.002% | 25 | | 6.119% | 0.002% | 4.885% | |
| 17 | 6.385% | 0.002% | 25 | | 6.135% | 0.002% | 4.910% | |
| 18 | 6.402% | 0.002% | 25 | | 6.152% | 0.002% | 4.936% | |
| 19 | 6.418% | 0.002% | 25 | | 6.168% | 0.002% | 4.961% | |
| 20 | 6.434% | 0.000% | 25 | | 6.184% | 0.000% | 4.987% | |
| 21 | 6.437% | 0.000% | 25 | | 6.187% | 0.000% | 4.995% | |
| 22 | 6.440% | 0.000% | 25 | | 6.190% | 0.000% | 5.004% | |
| 23 | 6.443% | 0.000% | 25 | | 6.193% | 0.000% | 5.012% | |
| 24 | 6.445% | 0.000% | 25 | | 6.195% | 0.000% | 5.021% | |
| 25 | 6.448% | ####### | 25 | | 6.198% | 0.000% | 5.030% | |
| 26 | 6.446% | ####### | 25 | | 6.196% | (0.000%) | 5.035% | |
| 27 | 6.444% | ####### | 25 | | 6.194% | (0.000%) | 5.040% | |
| 28 | 6.443% | ####### | 25 | | 6.193% | (0.000%) | 5.045% | |
| 29 | 6.441% | ####### | 25 | | 6.191% | (0.000%) | 5.050% | |
| 30 | 6.439% | ####### | 25 | | 6.189% | (0.619%) | 5.055% | |

FIG. 11A

| Remktg and Liquidity Cost | Issuer's Spread to BMA | All-in Fixed Payor Swap Rate | Yield for 1/10th of a year | Spread between Virtual Fixed Receiver Rate and Fixed Payor Rate | Spread for 1/10th of a year | Rates as of 12/18/2001 | |
|---|---|---|---|---|---|---|---|
| | | | | | | LIBOR | BMA |
| 0 | 0 | 0.000% | 0.000% | 0.000% | 0.000% | | |
| 28 | 10 | 2.273% | 0.080% | (0.064%) | 0.040% | 2.459 | 1.893 |
| 28 | 10 | 3.068% | 0.062% | 0.339% | 0.023% | 3.658 | 2.688 |
| 28 | 10 | 3.693% | 0.039% | 0.564% | 0.012% | 4.507 | 3.313 |
| 28 | 10 | 4.062% | 0.025% | 0.688% | 0.008% | 5.020 | 3.702 |
| 28 | 10 | 4.335% | 0.019% | 0.769% | 0.003% | 5.354 | 3.955 |
| 28 | 10 | 4.527% | 0.015% | 0.803% | 0.002% | 5.580 | 4.147 |
| 28 | 10 | 4.677% | 0.011% | 0.822% | 0.002% | 5.749 | 4.297 |
| 28 | 10 | 4.791% | 0.010% | 0.840% | 0.001% | 5.881 | 4.411 |
| 28 | 10 | 4.886% | 0.008% | 0.852% | 0.001% | 5.988 | 4.506 |
| 28 | 10 | 4.967% | 0.007% | 0.858% | 0.000% | 6.075 | 4.587 |
| 28 | 10 | 5.039% | 0.007% | 0.862% | 0.000% | 6.151 | 4.659 |
| 28 | 10 | 5.105% | 0.005% | 0.862% | 0.000% | 6.217 | 4.725 |
| 28 | 10 | 5.157% | 0.004% | 0.865% | 0.000% | 6.272 | 4.777 |
| 28 | 10 | 5.202% | 0.004% | 0.865% | (0.000%) | 6.317 | 4.822 |
| 28 | 10 | 5.239% | 0.003% | 0.863% | (0.001%) | 6.352 | 4.859 |
| 28 | 10 | 5.265% | 0.003% | 0.854% | (0.001%) | 6.369 | 4.885 |
| 28 | 10 | 5.290% | 0.003% | 0.845% | (0.001%) | 6.385 | 4.910 |
| 28 | 10 | 5.316% | 0.003% | 0.836% | (0.001%) | 6.402 | 4.936 |
| 28 | 10 | 5.341% | 0.003% | 0.827% | (0.001%) | 6.418 | 4.961 |
| 28 | 10 | 5.367% | 0.001% | 0.818% | (0.001%) | 6.434 | 4.987 |
| 28 | 10 | 5.375% | 0.001% | 0.812% | (0.001%) | 6.437 | 4.995 |
| 28 | 10 | 5.384% | 0.001% | 0.806% | (0.001%) | 6.440 | 5.004 |
| 28 | 10 | 5.392% | 0.001% | 0.800% | (0.001%) | 6.443 | 5.012 |
| 28 | 10 | 5.401% | 0.001% | 0.794% | (0.001%) | 6.445 | 5.021 |
| 28 | 10 | 5.410% | 0.000% | 0.789% | (0.001%) | 6.448 | 5.030 |
| 28 | 10 | 5.415% | 0.000% | 0.782% | (0.001%) | 6.446 | 5.035 |
| 28 | 10 | 5.420% | 0.000% | 0.775% | (0.001%) | 6.444 | 5.040 |
| 28 | 10 | 5.425% | 0.000% | 0.768% | (0.001%) | 6.443 | 5.045 |
| 28 | 10 | 5.430% | 0.000% | 0.761% | (0.001%) | 6.441 | 5.050 |
| 28 | 10 | 5.435% | (0.543%) | 0.754% | (0.075%) | 6.439 | 5.055 |

*FIG. 11B*

| Start Date | Par Amount Applied to Defease Maturities | Arbitrage Yield on defeased bond issue | Interest Coupon | Maturity of defeased bond maturity | Type of Issue |
|---|---|---|---|---|---|
| 2/1/2003 | 13,510,000 | 5.750% | 4.750% | 2/1/2001 | Consolidated |
| 2/1/2003 | 15,075,000 | 5.750% | 4.600% | 2/1/2002 | Consolidated |
| 2/1/2003 | 15,765,000 | 5.750% | 4.7, 5.5% | 2/1/2003 | Consolidated |
| 2/1/2003 | 16,560,000 | 5.750% | 4.8; 5.5% | 2/1/2004 | Consolidated |
| 2/1/2003 | 17,420,000 | 5.750% | 5.0; 5.75% | 2/1/2005 | Consolidated |
| 2/1/2003 | 18,360,000 | 5.750% | 5.1; 5.75% | 2/1/2006 | Consolidated |
| 2/1/2003 | 19,280,000 | 5.750% | 5.125; 5.75% | 2/1/2007 | Consolidated |
| 2/1/2003 | 20,365,000 | 5.750% | 5.2; 5.75% | 2/1/2008 | Consolidated |
| 2/1/2003 | 21,505,000 | 5.750% | 5.2; 5.75% | 2/1/2009 | Consolidated |
| 2/1/2003 | 22,765,000 | 5.750% | 5.3; 6.0% | 2/1/2010 | Consolidated |
| 2/1/2003 | 24,030,000 | 5.750% | 5.3; 6.0% | 2/1/2011 | Consolidated |
| 2/1/2003 | 25,445,000 | 5.750% | 5.4; 6.0% | 2/1/2012 | Consolidated |
| 2/1/2003 | 26,955,000 | 5.750% | 5.5; 6.0% | 2/1/2013 | Consolidated |
| 2/1/2003 | 28,555,000 | 5.750% | 5.7; 6.0% | 2/1/2014 | Consolidated |
| 2/1/2003 | 30,265,000 | 5.750% | 5.6; 6.0% | 2/1/2015 | Consolidated |
| 2/1/2003 | 32,075,000 | 5.750% | 6.000% | 2/1/2016 | Consolidated |
| 2/1/2003 | 34,000,000 | 5.750% | 5.800% | 2/1/2017 | Consolidated |
| 2/1/2003 | 35,970,000 | 5.750% | 5.875% | 2/1/2018 | Consolidated |
| 2/1/2003 | 38,085,000 | 5.750% | 5.875% | 2/1/2019 | Consolidated |
| 2/1/2003 | 40,320,000 | 5.750% | 5.875% | 2/1/2020 | Consolidated |
| 2/1/2003 | 17,645,000 | 5.500% | 5.500% | 9/1/2001 | Consolidated |
| 2/1/2003 | 23,035,000 | 5.500% | 4.625% | 9/1/2002 | Consolidated |
| 2/1/2003 | 24,100,000 | 5.500% | 4.750% | 9/1/2003 | Consolidated |
| 2/1/2003 | 25,245,000 | 5.500% | 4.800% | 9/1/2004 | Consolidated |
| 2/1/2003 | 26,455,000 | 5.500% | 4.875% | 9/1/2005 | Consolidated |
| 2/1/2003 | 27,745,000 | 5.500% | 5.500% | 9/1/2006 | Consolidated |

*FIG. 12A*

| Series of Fixed Rate Bonds Defeased | Bond Status | Virtual Swap Term in Years | Fixed Receiver LIBOR Swap Rate for Swap Term | All-in Fixed Receiver Swap Rate | Virtual Fixed Receiver Rate |
|---|---|---|---|---|---|
| 2000 Series A | Non-callable | 0.00 | 0.000% | 0.000% | 0.000% |
| 2000 Series A | Non-callable | 0.00 | 0.000% | 0.000% | 0.000% |
| 2000 Series A | Non-callable | 0.00 | 0.000% | 0.000% | 0.000% |
| 2000 Series A | Non-callable | 1.00 | 2.459% | 2.209% | 2.209% |
| 2000 Series A | Non-callable | 2.00 | 3.658% | 3.408% | 3.408% |
| 2000 Series A | Non-callable | 3.00 | 4.507% | 4.257% | 4.257% |
| 2000 Series A | Non-callable | 4.00 | 5.020% | 4.770% | 4.770% |
| 2000 Series A | Non-callable | 5.00 | 5.354% | 5.104% | 5.104% |
| 2000 Series A | Non-callable | 6.00 | 5.580% | 5.330% | 5.330% |
| 2000 Series A | Non-callable | 7.00 | 5.749% | 5.499% | 5.499% |
| 2000 Series A | Non refundable | 8.00 | 5.881% | 5.631% | 5.631% |
| 2000 Series A | Non refundable | 9.00 | 5.988% | 5.738% | 5.738% |
| 2000 Series A | Non refundable | 10.00 | 6.075% | 5.825% | 5.750% |
| 2000 Series A | Non refundable | 11.00 | 6.151% | 5.901% | 5.750% |
| 2000 Series A | Non refundable | 12.00 | 6.217% | 5.967% | 5.750% |
| 2000 Series A | Non refundable | 13.00 | 6.272% | 6.022% | 5.750% |
| 2000 Series A | Non refundable | 14.00 | 6.317% | 6.067% | 5.750% |
| 2000 Series A | Non refundable | 15.00 | 6.352% | 6.102% | 5.750% |
| 2000 Series A | Non refundable | 16.00 | 6.369% | 6.119% | 5.750% |
| 2000 Series A | Non refundable | 17.00 | 6.385% | 6.135% | 5.750% |
| 2000 Series B | Non-callable | 0.00 | 0.000% | 0.000% | 0.000% |
| 2000 Series B | Non-callable | 0.00 | 0.000% | 0.000% | 0.000% |
| 2000 Series B | Non-callable | 0.58 | 0.000% | 0.000% | 0.000% |
| 2000 Series B | Non-callable | 1.58 | 2.529% | 2.279% | 2.279% |
| 2000 Series B | Non-callable | 2.58 | 3.707% | 3.457% | 3.457% |
| 2000 Series B | Non-callable | 3.58 | 4.537% | 4.287% | 4.287% |

*FIG. 12B*

| Fixed Payor Rate | Spread between Virtual Fixed Receiver Rate and Fixed Payor Rate | Gross Benefit % | Gross Benefit $ | Present Value Benefit (Discounted at Issuer's Fixed Bond Yield) | Present Value Benefit $ |
|---|---|---|---|---|---|
| | | | | Discount Rate | 4.279% |
| 0.000% | 0.000% | 0.000% | 0 | 0.000% | 0 |
| 0.000% | 0.000% | 0.000% | 0 | 0.000% | 0 |
| 0.000% | 0.000% | 0.000% | 0 | 0.000% | 0 |
| 2.273% | (0.064%) | (0.064%) | (10,679) | 0.062% | (10,241) |
| 3.068% | 0.339% | 0.679% | 118,198 | 0.637% | 111,023 |
| 3.693% | 0.564% | 1.693% | 310,890 | 1.558% | 286,069 |
| 4.082% | 0.688% | 2.750% | 530,293 | 2.480% | 478,084 |
| 4.335% | 0.769% | 3.844% | 782,819 | 3.396% | 691,574 |
| 4.527% | 0.803% | 4.820% | 1,036,605 | 4.174% | 897,516 |
| 4.677% | 0.822% | 5.751% | 1,309,114 | 4.880% | 1,111,019 |
| 4.791% | 0.840% | 6.722% | 1,615,255 | 5.593% | 1,343,888 |
| 4.886% | 0.852% | 7.668% | 1,951,123 | 6.255% | 1,591,651 |
| 4.967% | 0.783% | 7.833% | 2,111,496 | 6.266% | 1,689,110 |
| 5.039% | 0.711% | 7.816% | 2,231,980 | 6.133% | 1,751,159 |
| 5.105% | 0.645% | 7.743% | 2,343,508 | 5.959% | 1,803,566 |
| 5.157% | 0.593% | 7.704% | 2,471,164 | 5.817% | 1,865,778 |
| 5.202% | 0.548% | 7.668% | 2,606,978 | 5.680% | 1,931,307 |
| 5.239% | 0.511% | 7.658% | 2,754,525 | 5.567% | 2,002,529 |
| 5.265% | 0.485% | 7.763% | 2,956,654 | 5.539% | 2,109,662 |
| 5.290% | 0.460% | 7.817% | 3,151,822 | 5.475% | 2,207,580 |
| 0.000% | 0.000% | 0.000% | 0 | 0.000% | 0 |
| 0.000% | 0.000% | 0.000% | 0 | 0.000% | 0 |
| 0.000% | 0.000% | 0.000% | 0 | 0.000% | 0 |
| 2.320% | (0.041%) | (0.065%) | (16,362) | (0.061%) | (15,502) |
| 3.105% | 0.352% | 0.910% | 240,834 | 0.845% | 223,511 |
| 3.716% | 0.572% | 2.048% | 568,301 | 1.862% | 516,723 |

*FIG. 12C*

| Present Value (Discounted at LIBOR) as % of Invested Amount | Present Value Benefit $ |
|---|---|
| 0.000% | 0 |
| 0.000% | 0 |
| 0.000% | 0 |
| (0.063%) | (10,423) |
| 0.643% | 112,016 |
| 1.551% | 284,836 |
| 2.437% | 469,885 |
| 3.296% | 671,253 |
| 4.003% | 860,879 |
| 4.627% | 1,053,392 |
| 5.242% | 1,259,731 |
| 5.798% | 1,475,327 |
| 5.745% | 1,548,569 |
| 5.561% | 1,588,014 |
| 5.346% | 1,618,019 |
| 5.164% | 1,656,360 |
| 4.992% | 1,697,324 |
| 4.846% | 1,743,166 |
| 4.782% | 1,821,089 |
| 4.687% | 1,889,805 |
| 0.000% | 0 |
| 0.000% | 0 |
| 0.000% | 0 |
| (0.063%) | (15,844) |
| 0.853% | 225,699 |
| 1.852% | 513,852 |

*FIG. 12D*

| Start Date | Par Amount Applied to Defease Maturities | Arbitrage Yield on defeased bond issue | Interest Coupon | Maturity of defeased bond maturity | Type of Issue |
|---|---|---|---|---|---|
| 2/1/2003 | 29,210,000 | 5.500% | 5.000% | 9/1/2007 | Consolidated |
| 2/1/2003 | 30,670,000 | 5.500% | 5.500% | 9/1/2008 | Consolidated |
| 2/1/2003 | 32,300,000 | 5.500% | 5.750% | 9/1/2009 | Consolidated |
| 2/1/2003 | 34,090,000 | 5.500% | 5.750% | 9/1/2010 | Consolidated |
| 2/1/2003 | 4,560,000 | 5.500% | 5.200% | 9/1/2011 | Consolidated |
| 2/1/2003 | 4,115,000 | 5.500% | 5.250% | 9/1/2012 | Consolidated |
| 2/1/2003 | 40,165,000 | 5.500% | 5.3; 5.75% | 9/1/2013 | Consolidated |
| 2/1/2003 | 42,465,000 | 5.500% | 5.375; 6.0% | 9/1/2014 | Consolidated |
| 2/1/2003 | 6,630,000 | 5.500% | 5.400% | 9/1/2015 | Consolidated |
| 2/1/2003 | 51,240,000 | 5.500% | 5.250% | 9/1/2017 | Consolidated |
| 2/1/2003 | 7,325,000 | 5.250% | 4.750% | 9/1/2001 | Consolidated |
| 2/1/2003 | 7,660,000 | 5.250% | 4.750% | 9/1/2002 | Consolidated |
| 2/1/2003 | 8,015,000 | 5.250% | 5.000% | 9/1/2003 | Consolidated |
| 2/1/2003 | 8,395,000 | 5.250% | 5.000% | 9/1/2004 | Consolidated |
| 2/1/2003 | 8,805,000 | 5.250% | 5.000% | 9/1/2005 | Consolidated |
| 2/1/2003 | 9,240,000 | 5.250% | 5.050% | 9/1/2006 | Consolidated |
| 2/1/2003 | 15,790,000 | 5.750% | 5.000% | 11/2/2002 | Refunding |
| 2/1/2003 | 3,325,000 | 5.750% | 4.600% | 11/3/2003 | Refunding |
| 2/1/2003 | 3,485,000 | 5.750% | 5.000% | 11/3/2004 | Refunding |
| 2/1/2003 | 43,630,000 | 5.750% | 4.750% | 11/4/2005 | Refunding |
| 2/1/2003 | 45,985,000 | 5.750% | 6.000% | 11/5/2006 | Refunding |
| 2/1/2003 | 48,855,000 | 5.750% | 6.000% | 11/6/2008 | Refunding |
| 2/1/2003 | 154,525,000 | 5.750% | 6.000% | 11/7/2010 | Refunding |
| 2/1/2003 | 85,010,000 | 5.750% | 6.000% | 11/8/2011 | Refunding |
| 2/1/2003 | 17,150,000 | 5.750% | 6.500% | 11/9/2014 | Refunding |
| 2/1/2003 | 54,370,000 | 5.750% | 5.000% | 11/1/2007 | Refunding |
| 2/1/2003 | 123,130,000 | 5.750% | 5.000% | 11/2/2009 | Refunding |

*FIG. 12E*

| Series of Fixed Rate Bonds Defeased | Bond Status | Virtual Swap Term in Years | Fixed Receiver LIBOR Swap Rate for Swap Term | All-in Fixed Receiver Swap Rate | Virtual Fixed Receiver Rate |
|---|---|---|---|---|---|
| 2000 Series B | Non-callable | 4.58 | 5.039% | 4.789% | 4.789% |
| 2000 Series B | Non-callable | 5.58 | 5.367% | 5.117% | 5.117% |
| 2000 Series B | Non-callable | 6.58 | 5.590% | 5.340% | 5.340% |
| 2000 Series B | Non-callable | 7.58 | 5.756% | 5.506% | 5.500% |
| 2000 Series B | Non refundable | 8.58 | 5.887% | 5.637% | 5.500% |
| 2000 Series B | Non refundable | 9.58 | 5.993% | 5.743% | 5.500% |
| 2000 Series B | Non refundable | 10.58 | 6.079% | 5.829% | 5.500% |
| 2000 Series B | Non refundable | 11.58 | 6.155% | 5.905% | 5.500% |
| 2000 Series B | Non refundable | 12.58 | 6.220% | 5.970% | 5.500% |
| 2000 Series B | Non refundable | 14.58 | 6.319% | 6.069% | 5.500% |
| 1996 Series C | Non-callable | 0.00 | 0.000% | 0.000% | 0.000% |
| 1996 Series C | Non-callable | 0.00 | 0.000% | 0.000% | 0.000% |
| 1996 Series C | Non-callable | 0.58 | 0.000% | 0.000% | 0.000% |
| 1996 Series C | Non-callable | 1.58 | 2.529% | 2.279% | 2.279% |
| 1996 Series C | Non-callable | 2.58 | 3.707% | 3.457% | 3.457% |
| 1996 Series C | Non-callable | 3.58 | 4.537% | 4.287% | 4.287% |
| 1996 Series A | Non-callable | 0.00 | 0.000% | 0.000% | 0.000% |
| 1996 Series A | Non-callable | 0.75 | 0.000% | 0.000% | 0.000% |
| 1996 Series A | Non-callable | 1.75 | 2.549% | 2.299% | 2.299% |
| 1996 Series A | Non-callable | 2.75 | 3.721% | 3.471% | 3.471% |
| 1996 Series A | Non-callable | 3.75 | 4.546% | 4.296% | 4.296% |
| 1996 Series A | Non-callable | 5.75 | 5.371% | 5.121% | 5.121% |
| 1996 Series A | Non-callable | 7.75 | 5.758% | 5.508% | 5.508% |
| 1996 Series A | Non-callable | 8.75 | 5.889% | 5.639% | 5.639% |
| 1996 Series A | Non-callable | 11.75 | 6.156% | 5.906% | 5.750% |
| 1996 Series A | Non refundable | 4.75 | 5.045% | 4.795% | 4.795% |
| 1996 Series A | Non refundable | 6.75 | 5.593% | 5.343% | 5.343% |

*FIG. 12F*

Discount Rate    4.279%

| Fixed Payor Rate | Spread between Virtual Fixed Receiver Rate and Fixed Payor Rate | Gross Benefit % | Gross Benefit $ | Present Value Benefit (Discounted at Issuer's Fixed Bond Yield) | Present Value Benefit $ |
|---|---|---|---|---|---|
| 4.097% | 0.692% | 3.173% | 926,919 | 2.827% | 825,815 |
| 4.347% | 0.771% | 4.304% | 1,319,936 | 3.758% | 1,152,442 |
| 4.535% | 0.804% | 5.296% | 1,710,576 | 4.532% | 1,463,852 |
| 4.684% | 0.816% | 6.191% | 2,110,347 | 5.193% | 1,770,356 |
| 4.796% | 0.704% | 6.041% | 275,453 | 4.968% | 226,552 |
| 4.891% | 0.609% | 5.840% | 240,323 | 4.710% | 193,818 |
| 4.971% | 0.529% | 5.600% | 2,249,083 | 4.429% | 1,778,880 |
| 5.043% | 0.457% | 5.291% | 2,246,811 | 4.105% | 1,743,058 |
| 5.108% | 0.392% | 4.935% | 327,206 | 3.756% | 249,020 |
| 5.204% | 0.296% | 4.310% | 2,208,248 | 3.158% | 1,618,011 |
| 0.000% | 0.000% | 0.000% | 0 | 0.000% | 0 |
| 0.000% | 0.000% | 0.000% | 0 | 0.000% | 0 |
| 0.000% | 0.000% | 0.000% | 0 | 0.000% | 0 |
| 2.320% | (0.041%) | (0.065%) | (5,441) | (0.061%) | (5,155) |
| 3.105% | 0.352% | 0.910% | 80,157 | 0.845% | 74,391 |
| 3.716% | 0.572% | 2.048% | 189,263 | 1.862% | 172,086 |
| 0.000% | 0.000% | 0.000% | 0 | 0.000% | 0 |
| 0.000% | 0.000% | 0.000% | 0 | 0.000% | 0 |
| 2.333% | (0.034%) | (0.060%) | (2,086) | (0.057%) | (1,970) |
| 3.115% | 0.356% | 0.979% | 427,315 | 0.906% | 395,222 |
| 3.722% | 0.574% | 2.151% | 989,262 | 1.949% | 896,423 |
| 4.350% | 0.771% | 4.435% | 2,166,941 | 3.860% | 1,885,633 |
| 4.686% | 0.823% | 6.378% | 9,854,938 | 5.332% | 8,239,967 |
| 4.798% | 0.841% | 7.360% | 6,256,500 | 6.033% | 5,128,951 |
| 5.044% | 0.706% | 8.292% | 1,422,045 | 6.412% | 1,099,678 |
| 4.101% | 0.694% | 3.295% | 1,791,552 | 2.926% | 1,590,757 |
| 4.538% | 0.805% | 5.432% | 6,688,438 | 4.633% | 5,704,714 |

*FIG. 12G*

| Presented Value (Discounted at LIBOR) as % of Invested Amount | Present Value Benefit $ |
|---|---|
| 2.772% | 809,678 |
| 3.636% | 1,115,072 |
| 4.331% | 1,399,066 |
| 4.905% | 1,672,007 |
| 4.638% | 211,495 |
| 4.347% | 178,892 |
| 4.043% | 1,623,794 |
| 3.706% | 1,573,707 |
| 3.355% | 222,410 |
| 2.763% | 1,415,721 |
| 0.000% | 0 |
| 0.000% | 0 |
| 0.000% | 0 |
| (0.063%) | (5,269) |
| 0.853% | 75,119 |
| 1.852% | 171,130 |
| 0.000% | 0 |
| 0.000% | 0 |
| (0.058%) | (2,015) |
| 0.915% | 399,167 |
| 1.938% | 891,099 |
| 3.731% | 1,822,838 |
| 5.031% | 7,773,559 |
| 5.626% | 4,782,472 |
| 5.782% | 991,591 |
| 2.867% | 1,558,564 |
| 4.423% | 5,446,637 |

*FIG. 12H*

| Start Date | Par Amount Applied to Defease Maturities | Arbitrage Yield on defeased bond issue | Interest Coupon | Maturity of defeased bond maturity | Type of Issue |
|---|---|---|---|---|---|
| 2/1/2003 | 52,415,000 | 5.750% | 5.2%:5.4% | 11/3/2012 | Refunding |
| 2/1/2003 | 16,230,000 | 5.750% | 5.000% | 11/1/2013 | Refunding |
| 2/1/2003 | 14,005,000 | 5.000% | 4.400% | 3/1/2001 | Consolidated |
| 2/1/2003 | 14,620,000 | 5.000% | 4.500% | 3/1/2002 | Consolidated |
| 2/1/2003 | 15,280,000 | 5.000% | 4.600% | 3/1/2003 | Consolidated |
| 2/1/2003 | 15,980,000 | 5.000% | 5.000% | 3/1/2004 | Consolidated |
| 2/1/2003 | 16,730,000 | 5.000% | 5.000% | 3/1/2005 | Consolidated |
| 2/1/2003 | 17,535,000 | 5.000% | 5.000% | 3/1/2006 | Consolidated |
| 2/1/2003 | 18,395,000 | 5.000% | 5.000% | 3/1/2007 | Consolidated |
| 2/1/2003 | 10,535,000 | 5.000% | 5.000% | 3/1/2001 | Consolidated |
| 2/1/2003 | 11,010,000 | 5.000% | 5.000% | 3/1/2002 | Consolidated |
| 2/1/2003 | 11,515,000 | 5.000% | 5.000% | 3/1/2003 | Consolidated |
| 2/1/2003 | 12,055,000 | 5.000% | 5.000% | 3/1/2004 | Consolidated |
| 2/1/2003 | 12,635,000 | 5.000% | 5.000% | 3/1/2005 | Consolidated |
| 2/1/2003 | 13,255,000 | 5.000% | 5.000% | 3/1/2006 | Consolidated |
| 2/1/2003 | 13,910,000 | 5.000% | 5.000% | 3/1/2007 | Consolidated |
| 2/1/2003 | 38,670,000 | 5.500% | 5.000% | 3/1/2001 | Refunding |
| 2/1/2003 | 2,205,000 | 5.500% | 5.000% | 3/1/2002 | Refunding |
| 2/1/2003 | 2,315,000 | 5.500% | 5.000% | 3/1/2003 | Refunding |
| 2/1/2003 | 27,885,000 | 5.500% | 5.000% | 3/1/2004 | Refunding |
| 2/1/2003 | 2,045,000 | 5.500% | 5.000% | 3/1/2005 | Refunding |
| 2/1/2003 | 2,150,000 | 5.500% | 5.000% | 3/1/2006 | Refunding |
| 2/1/2003 | 19,370,000 | 5.500% | 5.000% | 3/1/2007 | Refunding |
| 2/1/2003 | 33,035,000 | 5.500% | 5.750% | 3/1/2008 | Refunding |
| 2/1/2003 | 65,390,000 | 5.500% | 5.750% | 3/1/2009 | Refunding |
| 2/1/2003 | 59,300,000 | 5.500% | 5.750% | 3/1/2010 | Refunding |
| 2/1/2003 | 10,800,000 | 5.500% | 5.750% | 3/1/2011 | Refunding |

*FIG. 121*

| Series of Fixed Rate Bonds Defeased | Bond Status | Virtual Swap Term in Years | Fixed Receiver LIBOR Swap Rate For Swap Term | All-in Fixed Receiver Swap Rate | Virtual Fixed Receiver Rate |
|---|---|---|---|---|---|
| 1996 Series A | Non refundable | 9.75 | 5.994% | 5.744% | 5.744% |
| 1996 Series A | Non refundable | 10.75 | 6.081% | 5.831% | 5.750% |
| 1997 Series A | Non-callable | 0.00 | 0.000% | 0.000% | 0.000% |
| 1997 Series A | Non-callable | 0.00 | 0.000% | 0.000% | 0.000% |
| 1997 Series A | Non-callable | 0.08 | 0.000% | 0.000% | 0.000% |
| 1997 Series A | Non-callable | 1.08 | 2.469% | 2.219% | 2.219% |
| 1997 Series A | Non-callable | 2.08 | 3.665% | 3.415% | 3.415% |
| 1997 Series A | Non-callable | 3.08 | 4.512% | 4.262% | 4.262% |
| 1997 Series A | Non-callable | 4.08 | 5.022% | 4.772% | 4.772% |
| 1997 Series B | Non-callable | 0.00 | 0.000% | 0.000% | 0.000% |
| 1997 Series B | Non-callable | 0.00 | 0.000% | 0.000% | 0.000% |
| 1997 Series B | Non-callable | 0.08 | 0.000% | 0.000% | 0.000% |
| 1997 Series B | Non-callable | 1.08 | 2.469% | 2.219% | 2.219% |
| 1997 Series B | Non-callable | 2.08 | 3.665% | 3.415% | 3.415% |
| 1997 Series B | Non-callable | 3.08 | 4.512% | 4.262% | 4.262% |
| 1997 Series B | Non-callable | 4.08 | 5.022% | 4.772% | 4.772% |
| 1997 Series B | Non-callable | 0.00 | 0.000% | 0.000% | 0.000% |
| 1997 Series B | Non-callable | 0.00 | 0.000% | 0.000% | 0.000% |
| 1997 Series B | Non-callable | 0.08 | 0.000% | 0.000% | 0.000% |
| 1997 Series B | Non-callable | 1.08 | 2.469% | 2.219% | 2.219% |
| 1997 Series B | Non-callable | 2.08 | 3.665% | 3.415% | 3.415% |
| 1997 Series B | Non-callable | 3.08 | 4.512% | 4.262% | 4.262% |
| 1997 Series B | Non-callable | 4.08 | 5.022% | 4.772% | 4.772% |
| 1997 Series B | Non-callable | 5.08 | 5.356% | 5.106% | 5.106% |
| 1997 Series B | Non-callable | 6.08 | 5.581% | 5.331% | 5.331% |
| 1997 Series B | Non-callable | 7.08 | 5.750% | 5.500% | 5.500% |
| 1997 Series B | Non-callable | 8.08 | 5.882% | 5.632% | 5.500% |

*FIG. 12J*

|  |  |  |  | Discount Rate | 4.279% |
|---|---|---|---|---|---|
| Fixed Payor Rate | Spread between Virtual Fixed Receiver Rate and Fixed Payor Rate | Gross Benefit % | Gross Benefit $ | Present Value Benefit (Discounted at Issuer's Fixed Bond Yield) | Present Value Benefit $ |
| 4.892% | 0.852% | 8.312% | 4,356,562 | 6.682% | 3,502,109 |
| 4.972% | 0.778% | 8.362% | 1,357,194 | 6.593% | 1,069,989 |
| 0.000% | 0.000% | 0.000% | 0 | 0.000% | 0 |
| 0.000% | 0.000% | 0.000% | 0 | 0.000% | 0 |
| 0.000% | 0.000% | 0.000% | 0 | 0.000% | 0 |
| 2.280% | (0.061%) | (0.066%) | (10,581) | (0.063%) | (10,130) |
| 3.074% | 0.341% | 0.711% | 118,900 | 0.666% | 111,491 |
| 3.696% | 0.565% | 1.744% | 305,723 | 1.602% | 280,834 |
| 4.084% | 0.688% | 2.811% | 517,000 | 2.530% | 465,310 |
| 0.000% | 0.000% | 0.000% | 0 | 0.000% | 0 |
| 0.000% | 0.000% | 0.000% | 0 | 0.000% | 0 |
| 0.000% | 0.000% | 0.000% | 0 | 0.000% | 0 |
| 2.280% | (0.061%) | (0.066%) | (7,982) | (0.063%) | (7,642) |
| 3.074% | 0.341% | 0.711% | 89,797 | 0.666% | 84,201 |
| 3.696% | 0.565% | 1.744% | 231,101 | 1.602% | 212,287 |
| 4.084% | 0.688% | 2.811% | 390,947 | 2.530% | 351,860 |
| 0.000% | 0.000% | 0.000% | 0 | 0.000% | 0 |
| 0.000% | 0.000% | 0.000% | 0 | 0.000% | 0 |
| 0.000% | 0.000% | 0.000% | 0 | 0.000% | 0 |
| 2.280% | (0.061%) | (0.066%) | (18,464) | (0.063%) | (17,676) |
| 3.074% | 0.341% | 0.711% | 14,534 | 0.666% | 13,628 |
| 3.696% | 0.565% | 1.744% | 37,485 | 1.602% | 34,434 |
| 4.084% | 0.688% | 2.811% | 544,402 | 2.530% | 489,973 |
| 4.337% | 0.769% | 3.909% | 1,291,495 | 3.448% | 1,139,039 |
| 4.528% | 0.804% | 4.888% | 3,196,373 | 4.225% | 2,762,868 |
| 4.678% | 0.822% | 5.820% | 3,451,332 | 4.931% | 2,924,217 |
| 4.791% | 0.709% | 5.727% | 607,085 | 4.757% | 504,262 |

*FIG. 12K*

| Present Value (Discounted at LIBOR) as % of Invested Amount | Present Value Benefit $ |
|---|---|
| 6.159% | 3,228,501 |
| 6.010% | 975,499 |
| 0.000% | 0 |
| 0.000% | 0 |
| 0.000% | 0 |
| (0.065%) | (10,316) |
| 0.672% | 112,503 |
| 1.594% | 279,576 |
| 2.485% | 457,173 |
| 0.000% | 0 |
| 0.000% | 0 |
| 0.000% | 0 |
| (0.065%) | (7,782) |
| 0.672% | 84,966 |
| 1.594% | 211,336 |
| 2.485% | 345,707 |
| 0.000% | 0 |
| 0.000% | 0 |
| 0.000% | 0 |
| (0.065%) | (18,001) |
| 0.672% | 13,752 |
| 1.594% | 34,279 |
| 2.485% | 481,405 |
| 3.345% | 1,105,077 |
| 4.051% | 2,648,730 |
| 4.673% | 2,771,000 |
| 4.457% | 472,406 |

*FIG. 12L*

| Number | First VRDB Maturity Date | Par Amount Applied to Defease Maturities | Arbitrage Yield on defeased bond issue | Interest Coupon | Maturity of defeased bond maturity |
|---|---|---|---|---|---|
| 54 | 2/1/2003 | 52,415,000 | 5.750% | 5.2%; 5.4% | 11/3/2012 |
| 55 | 2/1/2003 | 16,230,000 | 5.750% | 5.000% | 11/1/2013 |
| 51 | 2/1/2003 | 17,150,000 | 5.750% | 6.500% | 11/9/2014 |
| 13 | 2/1/2003 | 26,955,000 | 5.750% | 5.5; 6.0% | 2/1/2013 |
| 12 | 2/1/2003 | 25,445,000 | 5.750% | 5.4; 6.0% | 2/1/2012 |
| 14 | 2/1/2003 | 28,555,000 | 5.750% | 5.7; 6.0% | 2/1/2014 |
| 50 | 2/1/2003 | 85,010,000 | 5.750% | 6.000% | 11/8/2011 |
| 15 | 2/1/2003 | 30,265,000 | 5.750% | 5.6; 6.0% | 2/1/2015 |
| 16 | 2/1/2003 | 32,075,000 | 5.750% | 6.000% | 2/1/2016 |
| 17 | 2/1/2003 | 34,000,000 | 5.750% | 5.800% | 2/1/2017 |
| 11 | 2/1/2003 | 24,030,000 | 5.750% | 5.3; 6.0% | 2/1/2011 |
| 18 | 2/1/2003 | 35,970,000 | 5.750% | 5.875% | 2/1/2018 |
| 19 | 2/1/2003 | 38,085,000 | 5.750% | 5.875% | 2/1/2019 |
| 20 | 2/1/2003 | 40,320,000 | 5.750% | 5.875% | 2/1/2020 |
| 49 | 2/1/2003 | 154,525,000 | 5.750% | 6.000% | 11/7/2010 |
| 30 | 2/1/2003 | 34,090,000 | 5.500% | 5.750% | 9/1/2010 |
| 31 | 2/1/2003 | 4,560,000 | 5.500% | 5.200% | 9/1/2011 |
| 79 | 2/1/2003 | 59,300,000 | 5.500% | 5.750% | 3/1/2010 |
| 10 | 2/1/2003 | 22,765,000 | 5.750% | 5.3; 6.0% | 2/1/2010 |
| 80 | 2/1/2003 | 10,600,000 | 5.500% | 5.750% | 3/1/2011 |
| 32 | 2/1/2003 | 4,115,000 | 5.500% | 5.250% | 9/1/2012 |
| 53 | 2/1/2003 | 123,130,000 | 5.750% | 5.000% | 11/2/2009 |
| 29 | 2/1/2003 | 32,300,000 | 5.500% | 5.750% | 9/1/2009 |
| 33 | 2/1/2003 | 40,165,000 | 5.500% | 5.3; 5.75% | 9/1/2013 |
| 78 | 2/1/2003 | 65,390,000 | 5.500% | 5.750% | 3/1/2009 |
| 9 | 2/1/2003 | 21,505,000 | 5.750% | 5.2; 5.75% | 2/1/2009 |
| 34 | 2/1/2003 | 42,465,000 | 5.500% | 5.375; 6.0% | 9/1/2014 |
| 48 | 2/1/2003 | 48,855,000 | 5.750% | 6.000% | 11/6/2008 |
| 28 | 2/1/2003 | 30,670,000 | 5.500% | 5.500% | 9/1/2008 |
| 35 | 2/1/2003 | 6,630,000 | 5.500% | 5.400% | 9/1/2015 |
| 77 | 2/1/2003 | 33,035,000 | 5.500% | 5.750% | 3/1/2008 |
| 8 | 2/1/2003 | 20,365,000 | 5.750% | 5.2; 5.75% | 2/1/2008 |
| 36 | 2/1/2003 | 51,240,000 | 5.500% | 5.250% | 9/1/2017 |

*FIG. 13A*

| Type of Issue | Series of Fixed Rate Bonds Defeased | Bond Status | Virtual Swap Term in Years | Fixed Receiver LIBOR Swap Rate for Swap Term | All-in Fixed Receiver Swap Rate |
| --- | --- | --- | --- | --- | --- |
| Refunding | 1996 Series A | Non refundable | 9.75 | 5.994% | 5.744% |
| Refunding | 1996 Series A | Non refundable | 10.75 | 6.081% | 5.831% |
| Refunding | 1996 Series A | Non-callable | 11.75 | 6.156% | 5.906% |
| Consolidated | 2000 Series A | Non refundable | 10.00 | 6.075% | 5.825% |
| Consolidated | 2000 Series A | Non refundable | 9.00 | 5.988% | 5.738% |
| Consolidated | 2000 Series A | Non refundable | 11.00 | 6.151% | 5.901% |
| Refunding | 1996 Series A | Non-callable | 8.75 | 5.889% | 5.639% |
| Consolidated | 2000 Series A | Non refundable | 12.00 | 6.217% | 5.967% |
| Consolidated | 2000 Series A | Non refundable | 13.00 | 6.272% | 6.022% |
| Consolidated | 2000 Series A | Non refundable | 14.00 | 6.317% | 6.067% |
| Consolidated | 2000 Series A | Non refundable | 8.00 | 5.881% | 5.631% |
| Consolidated | 2000 Series A | Non refundable | 15.00 | 6.352% | 6.102% |
| Consolidated | 2000 Series A | Non refundable | 16.00 | 6.369% | 6.119% |
| Consolidated | 2000 Series A | Non refundable | 17.00 | 6.385% | 6.135% |
| Refunding | 1996 Series A | Non-callable | 7.75 | 5.758% | 5.508% |
| Consolidated | 2000 Series B | Non-callable | 7.58 | 5.756% | 5.506% |
| Consolidated | 2000 Series B | Non refundable | 8.58 | 5.887% | 5.637% |
| Refunding | 1997 Series B | Non-callable | 7.08 | 5.750% | 5.500% |
| Consolidated | 2000 Series A | Non-callable | 7.00 | 5.749% | 5.499% |
| Refunding | 1997 Series B | Non-callable | 8.08 | 5.882% | 5.632% |
| Consolidated | 2000 Series B | Non refundable | 9.58 | 5.993% | 5.743% |
| Refunding | 1996 Series A | Non refundable | 6.75 | 5.593% | 5.343% |
| Consolidated | 2000 Series B | Non-callable | 6.58 | 5.590% | 5.340% |
| Consolidated | 2000 Series B | Non refundable | 10.58 | 6.079% | 5.829% |
| Refunding | 1997 Series B | Non-callable | 6.08 | 5.581% | 5.331% |
| Consolidated | 2000 Series A | Non-callable | 6.00 | 5.580% | 5.330% |
| Consolidated | 2000 Series B | Non refundable | 11.58 | 6.155% | 5.905% |
| Refunding | 1996 Series A | Non-callable | 5.75 | 5.371% | 5.121% |
| Consolidated | 2000 Series B | Non-callable | 5.58 | 5.367% | 5.117% |
| Consolidated | 2000 Series B | Non refundable | 12.58 | 6.220% | 5.970% |
| Refunding | 1997 Series B | Non-callable | 5.08 | 5.356% | 5.106% |
| Consolidated | 2000 Series A | Non-callable | 5.00 | 5.354% | 5.104% |
| Consolidated | 2000 Series B | Non refundable | 14.58 | 6.319% | 6.069% |

*FIG. 13B*

| Virtual Fixed Receiver Rate | Fixed Payor Rate | Spread between Virtual Fixed Receiver Rate and Fixed Payor Rate | Gross Benefit % | Gross Benefit $ |
|---|---|---|---|---|
| 5.744% | 4.892% | 0.852% | 8.312% | 4,356,562 |
| 5.750% | 4.972% | 0.778% | 8.362% | 1,357,194 |
| 5.750% | 5.044% | 0.706% | 8.292% | 1,422,045 |
| 5.750% | 4.967% | 0.783% | 7.833% | 2,111,496 |
| 5.738% | 4.886% | 0.852% | 7.668% | 1,951,123 |
| 5.750% | 5.039% | 0.711% | 7.816% | 2,231,980 |
| 5.639% | 4.798% | 0.841% | 7.360% | 6,256,500 |
| 5.750% | 5.105% | 0.645% | 7.743% | 2,343,508 |
| 5.750% | 5.157% | 0.593% | 7.704% | 2,471,164 |
| 5.750% | 5.202% | 0.548% | 7.668% | 2,606,978 |
| 5.631% | 4.791% | 0.840% | 6.722% | 1,615,255 |
| 5.750% | 5.239% | 0.511% | 7.658% | 2,754,525 |
| 5.750% | 5.265% | 0.485% | 7.763% | 2,956,654 |
| 5.750% | 5.290% | 0.460% | 7.817% | 3,151,822 |
| 5.508% | 4.686% | 0.823% | 6.378% | 9,854,938 |
| 5.500% | 4.684% | 0.816% | 6.191% | 2,110,347 |
| 5.500% | 4.796% | 0.704% | 6.041% | 275,453 |
| 5.500% | 4.678% | 0.822% | 5.820% | 3,451,332 |
| 5.499% | 4.677% | 0.822% | 5.751% | 1,309,114 |
| 5.500% | 4.791% | 0.709% | 5.727% | 607,085 |
| 5.500% | 4.891% | 0.609% | 5.840% | 240,323 |
| 5.343% | 4.538% | 0.805% | 5.432% | 6,688,438 |
| 5.340% | 4.535% | 0.804% | 5.296% | 1,710,576 |
| 5.500% | 4.971% | 0.529% | 5.600% | 2,249,083 |
| 5.331% | 4.528% | 0.804% | 4.888% | 3,196,373 |
| 5.330% | 4.527% | 0.803% | 4.820% | 1,036,605 |
| 5.500% | 5.043% | 0.457% | 5.291% | 2,246,811 |
| 5.121% | 4.350% | 0.771% | 4.435% | 2,166,941 |
| 5.117% | 4.347% | 0.771% | 4.304% | 1,319,936 |
| 5.500% | 5.108% | 0.392% | 4.935% | 327,206 |
| 5.106% | 4.337% | 0.769% | 3.909% | 1,291,495 |
| 5.104% | 4.335% | 0.769% | 3.844% | 782,819 |
| 5.500% | 5.204% | 0.296% | 4.310% | 2,208,248 |

*FIG. 13C*

| Present Value Benefit (Discounted at Issuer's Fixed Bond Yield) | Present Value Benefit $ | Present Value (Discounted at LIBOR) as % of Invested Amount | Present Value Benefit $ |
|---|---|---|---|
| 6.682% | 3,502,109 | 6.159% | 3,228,501 |
| 6.593% | 1,069,989 | 6.010% | 975,499 |
| 6.412% | 1,099,678 | 5.782% | 991,591 |
| 6.266% | 1,689,110 | 5.745% | 1,548,569 |
| 6.255% | 1,591,651 | 5.798% | 1,475,327 |
| 6.133% | 1,751,159 | 5.561% | 1,588,014 |
| 6.033% | 5,128,951 | 5.626% | 4,782,472 |
| 5.959% | 1,803,566 | 5.346% | 1,618,019 |
| 5.817% | 1,865,778 | 5.164% | 1,656,360 |
| 5.680% | 1,931,307 | 4.992% | 1,697,324 |
| 5.593% | 1,343,888 | 5.242% | 1,259,731 |
| 5.567% | 2,002,529 | 4.846% | 1,743,166 |
| 5.539% | 2,109,662 | 4.782% | 1,821,089 |
| 5.475% | 2,207,580 | 4.687% | 1,889,805 |
| 5.332% | 8,239,967 | 5.031% | 7,773,559 |
| 5.193% | 1,770,356 | 4.905% | 1,672,007 |
| 4.968% | 226,552 | 4.638% | 211,495 |
| 4.931% | 2,924,217 | 4.673% | 2,771,000 |
| 4.880% | 1,111,019 | 4.627% | 1,053,392 |
| 4.757% | 504,262 | 4.457% | 472,406 |
| 4.710% | 193,818 | 4.347% | 178,892 |
| 4.633% | 5,704,714 | 4.423% | 5,446,637 |
| 4.532% | 1,463,852 | 4.331% | 1,399,066 |
| 4.429% | 1,778,880 | 4.043% | 1,623,794 |
| 4.225% | 2,762,868 | 4.051% | 2,648,730 |
| 4.174% | 897,516 | 4.003% | 860,879 |
| 4.105% | 1,743,058 | 3.706% | 1,573,707 |
| 3.860% | 1,885,633 | 3.731% | 1,822,838 |
| 3.758% | 1,152,442 | 3.636% | 1,115,072 |
| 3.756% | 249,020 | 3.355% | 222,410 |
| 3.448% | 1,139,039 | 3.345% | 1,105,077 |
| 3.396% | 691,574 | 3.296% | 671,253 |
| 3.158% | 1,618,011 | 2.763% | 1,415,721 |

*FIG. 13D*

| Par Amount Applied to Defease Maturities | Aggregate Amount Invested | Aggregate PV Savings | % Savings | Amounts Applied to Defease Non-Callable Bonds |
|---|---|---|---|---|
| 52,415,000 | 52,415,000 | 3,502,109 | 6.682% | 0 |
| 16,230,000 | 68,645,000 | 4,572,099 | 6.660% | 0 |
| 17,150,000 | 85,795,000 | 5,671,777 | 6.611% | 17,150,000 |
| 26,955,000 | 112,750,000 | 7,360,887 | 6.529% | 0 |
| 25,445,000 | 138,195,000 | 8,952,538 | 6.478% | 0 |
| 28,555,000 | 166,750,000 | 10,703,697 | 6.419% | 0 |
| 85,010,000 | 251,760,000 | 15,832,649 | 6.289% | 85,010,000 |
| 30,265,000 | 282,025,000 | 17,636,214 | 6.253% | 0 |
| 32,075,000 | 314,100,000 | 19,501,993 | 6.209% | 0 |
| 34,000,000 | 348,100,000 | 21,433,300 | 6.157% | 0 |
| 24,030,000 | 372,130,000 | 22,777,188 | 6.121% | 0 |
| 35,970,000 | 408,100,000 | 24,779,717 | 6.072% | 0 |
| 38,085,000 | 446,185,000 | 26,889,379 | 6.027% | 0 |
| 40,320,000 | 486,505,000 | 29,096,958 | 5.981% | 0 |
| 154,525,000 | 641,030,000 | 37,336,925 | 5.825% | 154,525,000 |
| 34,090,000 | 675,120,000 | 39,107,281 | 5.793% | 34,090,000 |
| 4,560,000 | 679,680,000 | 39,333,834 | 5.787% | 0 |
| 59,300,000 | 738,980,000 | 42,258,051 | 5.718% | 59,300,000 |
| 22,765,000 | 761,745,000 | 43,369,070 | 5.693% | 22,765,000 |
| 10,600,000 | 772,345,000 | 43,873,332 | 5.681% | 10,600,000 |
| 4,115,000 | 776,460,000 | 44,067,150 | 5.675% | 0 |
| 123,130,000 | 899,590,000 | 49,771,864 | 5.553% | 0 |
| 32,300,000 | 931,890,000 | 51,235,716 | 5.498% | 32,300,000 |
| 40,165,000 | 972,055,000 | 53,014,596 | 5.454% | 0 |
| 65,390,000 | 1,037,445,000 | 55,777,464 | 5.376% | 65,390,000 |
| 21,505,000 | 1,058,950,000 | 56,674,980 | 5.352% | 21,505,000 |
| 42,465,000 | 1,101,415,000 | 58,418,038 | 5.304% | 0 |
| 48,855,000 | 1,150,270,000 | 60,303,671 | 5.243% | 48,855,000 |
| 30,670,000 | 1,180,940,000 | 61,456,113 | 5.204% | 30,670,000 |
| 6,630,000 | 1,187,570,000 | 61,705,133 | 5.196% | 0 |
| 33,035,000 | 1,220,605,000 | 62,844,172 | 5.149% | 33,035,000 |
| 20,365,000 | 1,240,970,000 | 63,535,746 | 5.120% | 20,365,000 |
| 51,240,000 | 1,292,210,000 | 65,153,757 | 5.042% | 0 |

*FIG. 13E*

| $ PV Savings from Retiring Non-Callable Bonds | % PV Savings from Non-callable Bonds | Aggregate Amount Used to Retire Non-Callable Bonds | Aggregate $ PV Savings from Non-Callable Bonds | Aggregate % PV Savings from Non-Callable Bonds | Years Remaining as of 2002 |
|---:|---:|---:|---:|---:|:---:|
| 0 | 0.000% | 0 | 0 | 0.000% | N/A |
| 0 | 0.000% | 0 | 0 | 0.000% | N/A |
| 1,099,678 | 6.412% | 17,150,000 | 1,099,678 | 6.412% | N/A |
| 0 | 0.000% | 17,150,000 | 1,099,678 | 6.412% | N/A |
| 0 | 0.000% | 17,150,000 | 1,099,678 | 6.412% | N/A |
| 0 | 0.000% | 17,150,000 | 1,099,678 | 6.412% | N/A |
| 5,128,951 | 6.033% | 102,160,000 | 6,228,629 | 6.097% | N/A |
| 0 | 0.000% | 102,160,000 | 6,228,629 | 6.097% | N/A |
| 0 | 0.000% | 102,160,000 | 6,228,629 | 6.097% | N/A |
| 0 | 0.000% | 102,160,000 | 6,228,629 | 6.097% | N/A |
| 0 | 0.000% | 102,160,000 | 6,228,629 | 6.097% | N/A |
| 0 | 0.000% | 102,160,000 | 6,228,629 | 6.097% | N/A |
| 0 | 0.000% | 102,160,000 | 6,228,629 | 6.097% | N/A |
| 0 | 0.000% | 102,160,000 | 6,228,629 | 6.097% | N/A |
| 8,239,967 | 5.332% | 256,685,000 | 14,468,596 | 5.637% | N/A |
| 1,770,356 | 5.193% | 290,775,000 | 16,238,952 | 5.585% | N/A |
| 0 | 0.000% | 290,775,000 | 16,238,952 | 5.585% | N/A |
| 2,924,217 | 4.931% | 350,075,000 | 19,163,170 | 5.474% | N/A |
| 1,111,019 | 4.880% | 372,840,000 | 20,274,189 | 5.438% | N/A |
| 504,262 | 4.757% | 383,440,000 | 20,778,450 | 5.419% | N/A |
| 0 | 0.000% | 383,440,000 | 20,778,450 | 5.419% | N/A |
| 0 | 0.000% | 383,440,000 | 20,778,450 | 5.419% | N/A |
| 1,463,852 | 4.532% | 415,740,000 | 22,242,303 | 5.350% | N/A |
| 0 | 0.000% | 415,740,000 | 22,242,303 | 5.350% | N/A |
| 2,762,868 | 4.225% | 481,130,000 | 25,005,171 | 5.197% | N/A |
| 897,516 | 4.174% | 502,635,000 | 25,902,687 | 5.153% | N/A |
| 0 | 0.000% | 502,635,000 | 25,902,687 | 5.153% | N/A |
| 1,885,633 | 3.860% | 551,490,000 | 27,788,320 | 5.039% | N/A |
| 1,152,442 | 3.758% | 582,160,000 | 28,940,762 | 4.971% | N/A |
| 0 | 0.000% | 582,160,000 | 28,940,762 | 4.971% | N/A |
| 1,139,039 | 3.448% | 615,195,000 | 30,079,801 | 4.889% | N/A |
| 691,574 | 3.396% | 635,560,000 | 30,771,375 | 4.842% | N/A |
| 0 | 0.000% | 635,560,000 | 30,771,375 | 4.842% | N/A |

*FIG. 13F*

| Years Remaining as of 2003 | Years Remaining as of 2004 | Years Remaining as of 2005 | Years Remaining as of 2006 | Years Remaining as of 2007 | Years Remaining as of 2008 |
|---|---|---|---|---|---|
| 9.75 | 8.75 | 7.75 | 6.75 | 5.75 | 4.75 |
| 10.75 | 9.75 | 8.75 | 7.75 | 6.75 | 5.75 |
| 11.75 | 10.75 | 9.75 | 8.75 | 7.75 | 6.75 |
| 10.00 | 9.00 | 8.00 | 7.00 | 6.00 | 5.00 |
| 9.00 | 8.00 | 7.00 | 6.00 | 5.00 | 4.00 |
| 11.00 | 10.00 | 9.00 | 8.00 | 7.00 | 6.00 |
| 8.75 | 7.75 | 6.75 | 5.75 | 4.75 | 3.75 |
| 12.00 | 11.00 | 10.00 | 9.00 | 8.00 | 7.00 |
| 13.00 | 12.00 | 11.00 | 10.00 | 9.00 | 8.00 |
| 14.00 | 13.00 | 12.00 | 11.00 | 10.00 | 9.00 |
| 8.00 | 7.00 | 6.00 | 5.00 | 4.00 | 3.00 |
| 15.00 | 14.00 | 13.00 | 12.00 | 11.00 | 10.00 |
| 16.00 | 15.00 | 14.00 | 13.00 | 12.00 | 11.00 |
| 17.00 | 16.00 | 15.00 | 14.00 | 13.00 | 12.00 |
| 7.75 | 6.75 | 5.75 | 4.75 | 3.75 | 2.75 |
| 7.58 | 6.58 | 5.58 | 4.58 | 3.58 | 2.58 |
| 8.58 | 7.58 | 6.58 | 5.58 | 4.58 | 3.58 |
| 7.08 | 6.08 | 5.08 | 4.08 | 3.08 | 2.08 |
| 7.00 | 6.00 | 5.00 | 4.00 | 3.00 | 2.00 |
| 8.08 | 7.08 | 6.08 | 5.08 | 4.08 | 3.08 |
| 9.58 | 8.58 | 7.58 | 6.58 | 5.58 | 4.58 |
| 6.75 | 5.75 | 4.75 | 3.75 | 2.75 | 1.75 |
| 6.58 | 5.58 | 4.58 | 3.58 | 2.58 | 1.58 |
| 10.58 | 9.58 | 8.58 | 7.58 | 6.58 | 5.58 |
| 6.08 | 5.08 | 4.08 | 3.08 | 2.08 | 1.08 |
| 6.00 | 5.00 | 4.00 | 3.00 | 2.00 | 1.00 |
| 11.58 | 10.58 | 9.58 | 8.58 | 7.58 | 6.58 |
| 5.75 | 4.75 | 3.75 | 2.75 | 1.75 | 0.75 |
| 5.58 | 4.58 | 3.58 | 2.58 | 1.58 | 0.58 |
| 12.58 | 11.58 | 10.58 | 9.58 | 8.58 | 7.58 |
| 5.08 | 4.08 | 3.08 | 2.08 | 1.08 | 0.08 |
| 5.00 | 4.00 | 3.00 | 2.00 | 1.00 | 0.00 |
| 14.58 | 13.58 | 12.58 | 11.58 | 10.58 | 9.58 |

*FIG. 13G*

| Years Remaining as of 2009 | Years Remaining as of 2010 | Years Remaining as of 2011 | Years Remaining as of 2012 |
|---|---|---|---|
| 3.75 | 2.75 | 1.75 | 0.75 |
| 4.75 | 3.75 | 2.75 | 1.75 |
| 5.75 | 4.75 | 3.75 | 2.75 |
| 4.00 | 3.00 | 2.00 | 1.00 |
| 3.00 | 2.00 | 1.00 | 0.00 |
| 5.00 | 4.00 | 3.00 | 2.00 |
| 2.75 | 1.75 | 0.75 | 0.00 |
| 6.00 | 5.00 | 4.00 | 3.00 |
| 7.00 | 6.00 | 5.00 | 4.00 |
| 8.00 | 7.00 | 6.00 | 5.00 |
| 2.00 | 1.00 | 0.00 | 0.00 |
| 9.00 | 8.00 | 7.00 | 6.00 |
| 10.00 | 9.00 | 8.00 | 7.00 |
| 11.00 | 10.00 | 9.00 | 8.00 |
| 1.75 | 0.75 | 0.00 | 0.00 |
| 1.58 | 0.58 | 0.00 | 0.00 |
| 2.58 | 1.58 | 0.58 | 0.00 |
| 1.08 | 0.08 | 0.00 | 0.00 |
| 1.00 | 0.00 | 0.00 | 0.00 |
| 2.08 | 1.08 | 0.08 | 0.00 |
| 3.58 | 2.58 | 1.58 | 0.58 |
| 0.75 | 0.00 | 0.00 | 0.00 |
| 0.58 | 0.00 | 0.00 | 0.00 |
| 4.58 | 3.58 | 2.58 | 1.58 |
| 0.08 | 0.00 | 0.00 | 0.00 |
| 0.00 | 0.00 | 0.00 | 0.00 |
| 5.58 | 4.58 | 3.58 | 2.58 |
| 0.00 | 0.00 | 0.00 | 0.00 |
| 0.00 | 0.00 | 0.00 | 0.00 |
| 6.58 | 5.58 | 4.58 | 3.58 |
| 0.00 | 0.00 | 0.00 | 0.00 |
| 0.00 | 0.00 | 0.00 | 0.00 |
| 8.58 | 7.58 | 6.58 | 5.58 |

*FIG. 13H*

| Number | First VRDB Maturity Date | Par Amount Applied to Defease Maturities | Arbitrage Yield on defeased bond issue | Interest Coupon | Maturity of defeased bond maturity |
|---|---|---|---|---|---|
| 52 | 2/1/2003 | 54,370,000 | 5.750% | 5.000% | 11/1/2007 |
| 27 | 2/1/2003 | 29,210,000 | 5.500% | 5.000% | 9/1/2007 |
| 62 | 2/1/2003 | 18,395,000 | 5.000% | 5.000% | 3/1/2007 |
| 69 | 2/1/2003 | 13,910,000 | 5.000% | 5.000% | 3/1/2007 |
| 76 | 2/1/2003 | 19,370,000 | 5.500% | 5.000% | 3/1/2007 |
| 7 | 2/1/2003 | 19,280,000 | 5.750% | 5.125; 5.75% | 2/1/2007 |
| 47 | 2/1/2003 | 45,985,000 | 5.750% | 6.000% | 11/5/2006 |
| 26 | 2/1/2003 | 27,745,000 | 5.500% | 5.500% | 9/1/2006 |
| 42 | 2/1/2003 | 9,240,000 | 5.250% | 5.050% | 9/1/2006 |
| 61 | 2/1/2003 | 17,535,000 | 5.000% | 5.000% | 3/1/2006 |
| 68 | 2/1/2003 | 13,255,000 | 5.000% | 5.000% | 3/1/2006 |
| 75 | 2/1/2003 | 2,150,000 | 5.500% | 5.000% | 3/1/2006 |
| 6 | 2/1/2003 | 18,360,000 | 5.750% | 5.1; 5.75% | 2/1/2006 |
| 46 | 2/1/2003 | 43,630,000 | 5.750% | 4.750% | 11/4/2005 |
| 25 | 2/1/2003 | 26,455,000 | 5.500% | 4.875% | 9/1/2005 |
| 41 | 2/1/2003 | 8,805,000 | 5.250% | 5.000% | 9/1/2005 |
| 60 | 2/1/2003 | 16,730,000 | 5.000% | 5.000% | 3/1/2005 |
| 67 | 2/1/2003 | 12,635,000 | 5.000% | 5.000% | 3/1/2005 |
| 74 | 2/1/2003 | 2,045,000 | 5.500% | 5.000% | 3/1/2005 |
| 5 | 2/1/2003 | 17,420,000 | 5.750% | 5.0; 5.75% | 2/1/2005 |
| 1 | 2/1/2003 | 13,510,000 | 5.750% | 4.750% | 2/1/2001 |
| 2 | 2/1/2003 | 15,075,000 | 5.750% | 4.600% | 2/1/2002 |
| 21 | 2/1/2003 | 17,645,000 | 5.500% | 5.500% | 9/1/2001 |
| 22 | 2/1/2003 | 23,035,000 | 5.500% | 4.625% | 9/1/2002 |
| 37 | 2/1/2003 | 7,325,000 | 5.250% | 4.750% | 9/1/2001 |
| 38 | 2/1/2003 | 7,660,000 | 5.250% | 4.750% | 9/1/2002 |
| 43 | 2/1/2003 | 15,790,000 | 5.750% | 5.000% | 11/2/2002 |
| 56 | 2/1/2003 | 14,005,000 | 5.000% | 4.400% | 3/1/2001 |
| 57 | 2/1/2003 | 14,620,000 | 5.000% | 4.500% | 3/1/2002 |
| 63 | 2/1/2003 | 10,535,000 | 5.000% | 5.000% | 3/1/2001 |
| 64 | 2/1/2003 | 11,010,000 | 5.000% | 5.000% | 3/1/2002 |
| 70 | 2/1/2003 | 38,670,000 | 5.500% | 5.000% | 3/1/2001 |
| 71 | 2/1/2003 | 2,205,000 | 5.500% | 5.000% | 3/1/2002 |

*FIG. 131*

| Type of Issue | Series of Fixed Rate Bonds Defeased | Bond Status | Virtual Swap Term in Years | Fixed Receiver LIBOR Swap Rate for Swap Term | All-in Fixed Receiver Swap Rate |
|---|---|---|---|---|---|
| Refunding | 1996 Series A | Non refundable | 4.75 | 5.045% | 4.795% |
| Consolidated | 2000 Series B | Non-callable | 4.58 | 5.039% | 4.789% |
| Consolidated | 1997 Series A | Non-callable | 4.08 | 5.022% | 4.772% |
| Consolidated | 1997 Series B | Non-callable | 4.08 | 5.022% | 4.772% |
| Refunding | 1997 Series B | Non-callable | 4.08 | 5.022% | 4.772% |
| Consolidated | 2000 Series A | Non-callable | 4.00 | 5.020% | 4.770% |
| Refunding | 1996 Series A | Non-callable | 3.75 | 4.546% | 4.296% |
| Consolidated | 2000 Series B | Non-callable | 3.58 | 4.537% | 4.287% |
| Consolidated | 1996 Series C | Non-callable | 3.58 | 4.537% | 4.287% |
| Consolidated | 1997 Series A | Non-callable | 3.08 | 4.512% | 4.262% |
| Consolidated | 1997 Series B | Non-callable | 3.08 | 4.512% | 4.262% |
| Refunding | 1997 Series B | Non-callable | 3.08 | 4.512% | 4.262% |
| Consolidated | 2000 Series A | Non-callable | 3.00 | 4.507% | 4.257% |
| Refunding | 1996 Series A | Non-callable | 2.75 | 3.721% | 3.471% |
| Consolidated | 2000 Series B | Non-callable | 2.58 | 3.707% | 3.457% |
| Consolidated | 1996 Series C | Non-callable | 2.58 | 3.707% | 3.457% |
| Consolidated | 1997 Series A | Non-callable | 2.08 | 3.665% | 3.415% |
| Consolidated | 1997 Series B | Non-callable | 2.08 | 3.665% | 3.415% |
| Refunding | 1997 Series B | Non-callable | 2.08 | 3.665% | 3.415% |
| Consolidated | 2000 Series A | Non-callable | 2.00 | 3.658% | 3.408% |
| Consolidated | 2000 Series A | Non-callable | 0.00 | 0.000% | 0.000% |
| Consolidated | 2000 Series A | Non-callable | 0.00 | 0.000% | 0.000% |
| Consolidated | 2000 Series B | Non-callable | 0.00 | 0.000% | 0.000% |
| Consolidated | 2000 Series B | Non-callable | 0.00 | 0.000% | 0.000% |
| Consolidated | 1996 Series C | Non-callable | 0.00 | 0.000% | 0.000% |
| Consolidated | 1996 Series C | Non-callable | 0.00 | 0.000% | 0.000% |
| Refunding | 1996 Series A | Non-callable | 0.00 | 0.000% | 0.000% |
| Consolidated | 1997 Series A | Non-callable | 0.00 | 0.000% | 0.000% |
| Consolidated | 1997 Series A | Non-callable | 0.00 | 0.000% | 0.000% |
| Consolidated | 1997 Series B | Non-callable | 0.00 | 0.000% | 0.000% |
| Consolidated | 1997 Series B | Non-callable | 0.00 | 0.000% | 0.000% |
| Refunding | 1997 Series B | Non-callable | 0.00 | 0.000% | 0.000% |
| Refunding | 1997 Series B | Non-callable | 0.00 | 0.000% | 0.000% |

*FIG. 13J*

| Virtual Fixed Receiver Rate | Fixed Payor Rate | Spread between Virtual Fixed Receiver Rate and Fixed Payor Rate | Gross Benefit % | Gross Benefit $ |
|---|---|---|---|---|
| 4.795% | 4.101% | 0.694% | 3.295% | 1,791,552 |
| 4.789% | 4.097% | 0.692% | 3.173% | 926,919 |
| 4.772% | 4.084% | 0.688% | 2.811% | 517,000 |
| 4.772% | 4.084% | 0.688% | 2.811% | 390,947 |
| 4.772% | 4.084% | 0.688% | 2.811% | 544,402 |
| 4.770% | 4.082% | 0.688% | 2.750% | 530,293 |
| 4.296% | 3.722% | 0.574% | 2.151% | 989,262 |
| 4.287% | 3.716% | 0.572% | 2.048% | 568,301 |
| 4.287% | 3.716% | 0.572% | 2.048% | 189,263 |
| 4.262% | 3.696% | 0.565% | 1.744% | 305,723 |
| 4.262% | 3.696% | 0.565% | 1.744% | 231,101 |
| 4.262% | 3.696% | 0.565% | 1.744% | 37,485 |
| 4.257% | 3.693% | 0.564% | 1.693% | 310,890 |
| 3.471% | 3.115% | 0.356% | 0.979% | 427,315 |
| 3.457% | 3.105% | 0.352% | 0.910% | 240,834 |
| 3.457% | 3.105% | 0.352% | 0.910% | 80,157 |
| 3.415% | 3.074% | 0.341% | 0.711% | 118,900 |
| 3.415% | 3.074% | 0.341% | 0.711% | 89,797 |
| 3.415% | 3.074% | 0.341% | 0.711% | 14,534 |
| 3.408% | 3.068% | 0.339% | 0.679% | 118,198 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |

*FIG. 13K*

| Present Value Benefit (Discounted at Issuer's Fixed Bond Yield) | Present Value Benefit $ | Present Value (Discounted at LIBOR) as % of Invested Amount | Present Value Benefit $ |
|---|---|---|---|
| 2.926% | 1,590,757 | 2.867% | 1,558,564 |
| 2.827% | 825,815 | 2.772% | 809,678 |
| 2.530% | 465,310 | 2.485% | 457,173 |
| 2.530% | 351,860 | 2.485% | 345,707 |
| 2.530% | 489,973 | 2.485% | 481,405 |
| 2.480% | 478,084 | 2.437% | 469,885 |
| 1.949% | 896,423 | 1.938% | 891,099 |
| 1.862% | 516,723 | 1.852% | 513,852 |
| 1.862% | 172,086 | 1.852% | 171,130 |
| 1.602% | 280,834 | 1.594% | 279,576 |
| 1.602% | 212,287 | 1.594% | 211,336 |
| 1.602% | 34,434 | 1.594% | 34,279 |
| 1.558% | 286,069 | 1.551% | 284,836 |
| 0.906% | 395,222 | 0.915% | 399,167 |
| 0.845% | 223,511 | 0.853% | 225,699 |
| 0.845% | 74,391 | 0.853% | 75,119 |
| 0.666% | 111,491 | 0.672% | 112,503 |
| 0.666% | 84,201 | 0.672% | 84,966 |
| 0.666% | 13,628 | 0.672% | 13,752 |
| 0.637% | 111,023 | 0.643% | 112,016 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |

*FIG. 13L*

| Par Amount Applied to Defease Maturities | Aggregate Amount Invested | Aggregate PV Savings | % Savings | Amounts Applied to Defease Non-Callable Bonds |
|---|---|---|---|---|
| 54,370,000 | 1,346,580,000 | 66,744,513 | 4.957% | 0 |
| 29,210,000 | 1,375,790,000 | 67,570,329 | 4.911% | 29,210,000 |
| 18,395,000 | 1,394,185,000 | 68,035,639 | 4.880% | 18,395,000 |
| 13,910,000 | 1,408,095,000 | 68,387,499 | 4.857% | 13,910,000 |
| 19,370,000 | 1,427,465,000 | 68,877,472 | 4.825% | 19,370,000 |
| 19,280,000 | 1,446,745,000 | 69,355,556 | 4.794% | 19,280,000 |
| 45,985,000 | 1,492,730,000 | 70,251,980 | 4.706% | 45,985,000 |
| 27,745,000 | 1,520,475,000 | 70,768,703 | 4.654% | 27,745,000 |
| 9,240,000 | 1,529,715,000 | 70,940,789 | 4.638% | 9,240,000 |
| 17,535,000 | 1,547,250,000 | 71,221,623 | 4.603% | 17,535,000 |
| 13,255,000 | 1,560,505,000 | 71,433,910 | 4.578% | 13,255,000 |
| 2,150,000 | 1,562,655,000 | 71,468,344 | 4.574% | 2,150,000 |
| 18,360,000 | 1,581,015,000 | 71,754,413 | 4.539% | 18,360,000 |
| 43,630,000 | 1,624,645,000 | 72,149,635 | 4.441% | 43,630,000 |
| 26,455,000 | 1,651,100,000 | 72,373,146 | 4.383% | 26,455,000 |
| 8,805,000 | 1,659,905,000 | 72,447,537 | 4.365% | 8,805,000 |
| 16,730,000 | 1,676,635,000 | 72,559,028 | 4.328% | 16,730,000 |
| 12,635,000 | 1,689,270,000 | 72,643,229 | 4.300% | 12,635,000 |
| 2,045,000 | 1,691,315,000 | 72,656,857 | 4.296% | 2,045,000 |
| 17,420,000 | 1,708,735,000 | 72,767,880 | 4.259% | 17,420,000 |
| 13,510,000 | 1,722,245,000 | 72,767,880 | 4.225% | 13,510,000 |
| 15,075,000 | 1,737,320,000 | 72,767,880 | 4.189% | 15,075,000 |
| 17,645,000 | 1,754,965,000 | 72,767,880 | 4.146% | 17,645,000 |
| 23,035,000 | 1,778,000,000 | 72,767,880 | 4.093% | 23,035,000 |
| 7,325,000 | 1,785,325,000 | 72,767,880 | 4.076% | 7,325,000 |
| 7,660,000 | 1,792,985,000 | 72,767,880 | 4.058% | 7,660,000 |
| 15,790,000 | 1,808,775,000 | 72,767,880 | 4.023% | 15,790,000 |
| 14,005,000 | 1,822,780,000 | 72,767,880 | 3.992% | 14,005,000 |
| 14,620,000 | 1,837,400,000 | 72,767,880 | 3.960% | 14,620,000 |
| 10,535,000 | 1,847,935,000 | 72,767,880 | 3.938% | 10,535,000 |
| 11,010,000 | 1,858,945,000 | 72,767,880 | 3.914% | 11,010,000 |
| 38,670,000 | 1,897,615,000 | 72,767,880 | 3.835% | 38,670,000 |
| 2,205,000 | 1,899,820,000 | 72,767,880 | 3.830% | 2,205,000 |

*FIG. 13M*

| $ PV Savings from Retiring Non-Callable Bonds | % PV Savings from Non-callable bonds | Aggregate Amount Used to Retire Non-Callable Bonds | Aggregate $ PV Savings from Non-Callable Bonds | Aggregate % PV Savings from Non-Callable Bonds | Years Remaining as of 2002 |
|---:|---:|---:|---:|---:|:---:|
| 0 | 0.000% | 635,560,000 | 30,771,375 | 4.842% | N/A |
| 825,815 | 2.827% | 664,770,000 | 31,597,190 | 4.753% | N/A |
| 465,310 | 2.530% | 683,165,000 | 32,062,500 | 4.693% | N/A |
| 351,860 | 2.530% | 697,075,000 | 32,414,360 | 4.650% | N/A |
| 489,973 | 2.530% | 716,445,000 | 32,904,334 | 4.593% | N/A |
| 478,084 | 2.480% | 735,725,000 | 33,382,418 | 4.537% | N/A |
| 896,423 | 1.949% | 781,710,000 | 34,278,841 | 4.385% | N/A |
| 516,723 | 1.862% | 809,455,000 | 34,795,565 | 4.299% | N/A |
| 172,086 | 1.862% | 818,695,000 | 34,967,650 | 4.271% | N/A |
| 280,834 | 1.602% | 836,230,000 | 35,248,485 | 4.215% | N/A |
| 212,287 | 1.602% | 849,485,000 | 35,460,772 | 4.174% | N/A |
| 34,434 | 1.602% | 851,635,000 | 35,495,206 | 4.168% | N/A |
| 286,069 | 1.558% | 869,995,000 | 35,781,275 | 4.113% | N/A |
| 395,222 | 0.906% | 913,625,000 | 36,176,497 | 3.960% | N/A |
| 223,511 | 0.845% | 940,080,000 | 36,400,008 | 3.872% | N/A |
| 74,391 | 0.845% | 948,885,000 | 36,474,399 | 3.844% | N/A |
| 111,491 | 0.666% | 965,615,000 | 36,585,890 | 3.789% | N/A |
| 84,201 | 0.666% | 978,250,000 | 36,670,091 | 3.749% | N/A |
| 13,628 | 0.666% | 980,295,000 | 36,683,719 | 3.742% | N/A |
| 111,023 | 0.637% | 997,715,000 | 36,794,742 | 3.688% | N/A |
| 0 | 0.000% | 1,011,225,000 | 36,794,742 | 3.639% | N/A |
| 0 | 0.000% | 1,026,300,000 | 36,794,742 | 3.585% | N/A |
| 0 | 0.000% | 1,043,945,000 | 36,794,742 | 3.525% | N/A |
| 0 | 0.000% | 1,066,980,000 | 36,794,742 | 3.448% | N/A |
| 0 | 0.000% | 1,074,305,000 | 36,794,742 | 3.425% | N/A |
| 0 | 0.000% | 1,081,965,000 | 36,794,742 | 3.401% | N/A |
| 0 | 0.000% | 1,097,755,000 | 36,794,742 | 3.352% | N/A |
| 0 | 0.000% | 1,111,760,000 | 36,794,742 | 3.310% | N/A |
| 0 | 0.000% | 1,126,380,000 | 36,794,742 | 3.267% | N/A |
| 0 | 0.000% | 1,136,915,000 | 36,794,742 | 3.236% | N/A |
| 0 | 0.000% | 1,147,925,000 | 36,794,742 | 3.205% | N/A |
| 0 | 0.000% | 1,186,595,000 | 36,794,742 | 3.101% | N/A |
| 0 | 0.000% | 1,188,800,000 | 36,794,742 | 3.095% | N/A |

*FIG. 13N*

| Years Remaining as of 2003 | Years Remaining as of 2004 | Years Remaining as of 2005 | Years Remaining as of 2006 | Years Remaining as of 2007 | Years Remaining as of 2008 |
|---|---|---|---|---|---|
| 4.75 | 3.75 | 2.75 | 1.75 | 0.75 | 0.00 |
| 4.58 | 3.58 | 2.58 | 1.58 | 0.58 | 0.00 |
| 4.08 | 3.08 | 2.08 | 1.08 | 0.08 | 0.00 |
| 4.08 | 3.08 | 2.08 | 1.08 | 0.08 | 0.00 |
| 4.08 | 3.08 | 2.08 | 1.08 | 0.08 | 0.00 |
| 4.00 | 3.00 | 2.00 | 1.00 | 0.00 | 0.00 |
| 3.75 | 2.75 | 1.75 | 0.75 | 0.00 | 0.00 |
| 3.58 | 2.58 | 1.58 | 0.58 | 0.00 | 0.00 |
| 3.58 | 2.58 | 1.58 | 0.58 | 0.00 | 0.00 |
| 3.08 | 2.08 | 1.08 | 0.08 | 0.00 | 0.00 |
| 3.08 | 2.08 | 1.08 | 0.08 | 0.00 | 0.00 |
| 3.08 | 2.08 | 1.08 | 0.08 | 0.00 | 0.00 |
| 3.00 | 2.00 | 1.00 | 0.00 | 0.00 | 0.00 |
| 2.75 | 1.75 | 0.75 | 0.00 | 0.00 | 0.00 |
| 2.58 | 1.58 | 0.58 | 0.00 | 0.00 | 0.00 |
| 2.58 | 1.58 | 0.58 | 0.00 | 0.00 | 0.00 |
| 2.08 | 1.08 | 0.08 | 0.00 | 0.00 | 0.00 |
| 2.08 | 1.08 | 0.08 | 0.00 | 0.00 | 0.00 |
| 2.08 | 1.08 | 0.08 | 0.00 | 0.00 | 0.00 |
| 2.00 | 1.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |
| 0.00 | 0.00 | 0.00 | 0.00 | 0.00 | 0.00 |

*FIG. 130*

| Years Remaining as of 2009 | Years Remaining as of 2010 | Years Remaining as of 2011 | Years Remaining as of 2012 |
|---|---|---|---|
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |

*FIG. 13P*

| Number | First VRDB Maturity Date | Par Amount Applied to Defease Maturities | Arbitrage Yield on defeased bond issue | Interest Coupon | Maturity of defeased bond maturity |
|---|---|---|---|---|---|
| 81 | 1/0/1900 | 0 | 0.000% | 0.000% | 1/0/1900 |
| 3 | 2/1/2003 | 15,765,000 | 5.750% | 4.7; 5.5% | 2/1/2003 |
| 58 | 2/1/2003 | 15,280,000 | 5.000% | 4.600% | 3/1/2003 |
| 65 | 2/1/2003 | 11,515,000 | 5.000% | 5.000% | 3/1/2003 |
| 72 | 2/1/2003 | 2,315,000 | 5.500% | 5.000% | 3/1/2003 |
| 23 | 2/1/2003 | 24,100,000 | 5.500% | 4.750% | 9/1/2003 |
| 39 | 2/1/2003 | 6,015,000 | 5.250% | 5.000% | 9/1/2003 |
| 44 | 2/1/2003 | 3,325,000 | 5.750% | 4.600% | 11/3/2003 |
| 45 | 2/1/2003 | 3,485,000 | 5.750% | 5.000% | 11/3/2004 |
| 24 | 2/1/2003 | 25,245,000 | 5.500% | 4.800% | 9/1/2004 |
| 40 | 2/1/2003 | 8,395,000 | 5.250% | 5.000% | 9/1/2004 |
| 4 | 2/1/2003 | 16,560,000 | 5.750% | 4.8; 5.5% | 2/1/2004 |
| 59 | 2/1/2003 | 15,980,000 | 5.000% | 5.000% | 3/1/2004 |
| 66 | 2/1/2003 | 12,055,000 | 5.000% | 5.000% | 3/1/2004 |
| 73 | 2/1/2003 | 27,885,000 | 5.500% | 5.000% | 3/1/2004 |

*FIG. 13Q*

| Type of Issue | Series of Fixed Rate Bonds Defeased | Bond Status | Virtual Swap Term in Years | Fixed Receiver LIBOR Swap Rate for Swap Term | All-in Fixed Receiver Swap Rate |
|---|---|---|---|---|---|
| 1/0/1900 | 1/0/1900 | 0 | 0.00 | 0.000% | 0.000% |
| Consolidated | 2000 Series A | Non-callable | 0.00 | 0.000% | 0.000% |
| Consolidated | 1997 Series A | Non-callable | 0.08 | 0.000% | 0.000% |
| Consolidated | 1997 Series B | Non-callable | 0.08 | 0.000% | 0.000% |
| Refunding | 1997 Series B | Non-callable | 0.08 | 0.000% | 0.000% |
| Consolidated | 2000 Series B | Non-callable | 0.58 | 0.000% | 0.000% |
| Consolidated | 1996 Series C | Non-callable | 0.58 | 0.000% | 0.000% |
| Refunding | 1996 Series A | Non-callable | 0.75 | 0.000% | 0.000% |
| Refunding | 1996 Series A | Non-callable | 1.75 | 2.549% | 2.299% |
| Consolidated | 2000 Series B | Non-callable | 1.58 | 2.529% | 2.279% |
| Consolidated | 1996 Series C | Non-callable | 1.58 | 2.529% | 2.279% |
| Consolidated | 2000 Series A | Non-callable | 1.00 | 2.459% | 2.209% |
| Consolidated | 1997 Series A | Non-callable | 1.08 | 2.469% | 2.219% |
| Consolidated | 1997 Series B | Non-callable | 1.08 | 2.469% | 2.219% |
| Refunding | 1997 Series B | Non-callable | 1.08 | 2.469% | 2.219% |

*FIG. 13R*

| Virtual Fixed Receiver Rate | Fixed Payor Rate | Spread between Virtual Fixed Receiver Rate and Fixed Payor Rate | Gross Benefit % | Gross Benefit $ |
|---|---|---|---|---|
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 0.000% | 0.000% | 0.000% | 0.000% | 0 |
| 2.299% | 2.333% | (0.034%) | (0.060%) | (2,086) |
| 2.279% | 2.320% | (0.041%) | (0.065%) | (16,362) |
| 2.279% | 2.320% | (0.041%) | (0.065%) | (5,441) |
| 2.209% | 2.273% | (0.064%) | (0.064%) | (10,679) |
| 2.219% | 2.280% | (0.061%) | (0.066%) | (10,581) |
| 2.219% | 2.280% | (0.061%) | (0.066%) | (7,982) |
| 2.219% | 2.280% | (0.061%) | (0.066%) | (18,464) |

*FIG. 13S*

| Present Value Benefit (Discounted at Issuer's Fixed Bond Yield) | Present Value Benefit $ | Present Value (Discounted at LIBOR) as % of Invested Amount | Present Value Benefit $ |
|---|---|---|---|
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| 0.000% | 0 | 0.000% | 0 |
| (0.057%) | (1,970) | (0.058%) | (2,015) |
| (0.061%) | (15,502) | (0.063%) | (15,844) |
| (0.061%) | (5,155) | (0.063%) | (5,269) |
| (0.062%) | (10,241) | (0.063%) | (10,423) |
| (0.063%) | (10,130) | (0.065%) | (10,316) |
| (0.063%) | (7,642) | (0.065%) | (7,782) |
| (0.063%) | (17,676) | (0.065%) | (18,001) |

*FIG. 13T*

| Par Amount Applied to Defease Maturities | Aggregate Amount Invested | Aggregate PV Savings | % Savings | Amounts Applied to Defease Non-Callable Bonds |
|---|---|---|---|---|
| 0 | 1,899,820,000 | 72,767,880 | 3.830% | 0 |
| 15,765,000 | 1,915,585,000 | 72,767,880 | 3.799% | 15,765,000 |
| 15,280,000 | 1,930,865,000 | 72,767,880 | 3.769% | 15,280,000 |
| 11,515,000 | 1,942,380,000 | 72,767,880 | 3.746% | 11,515,000 |
| 2,315,000 | 1,944,695,000 | 72,767,880 | 3.742% | 2,315,000 |
| 24,100,000 | 1,968,795,000 | 72,767,880 | 3.696% | 24,100,000 |
| 8,015,000 | 1,976,810,000 | 72,767,880 | 3.681% | 8,015,000 |
| 3,325,000 | 1,980,135,000 | 72,767,880 | 3.675% | 3,325,000 |
| 3,485,000 | 1,983,620,000 | 72,765,911 | 3.668% | 3,485,000 |
| 25,245,000 | 2,008,865,000 | 72,750,409 | 3.621% | 25,245,000 |
| 8,395,000 | 2,017,260,000 | 72,745,253 | 3.606% | 8,395,000 |
| 16,560,000 | 2,033,820,000 | 72,735,012 | 3.576% | 16,560,000 |
| 15,980,000 | 2,049,800,000 | 72,724,883 | 3.548% | 15,980,000 |
| 12,055,000 | 2,061,855,000 | 72,717,241 | 3.527% | 12,055,000 |
| 27,885,000 | 2,089,740,000 | 72,699,565 | 3.479% | 27,885,000 |

*FIG. 13U*

| $ PV Savings from Retiring Non-Callable Bonds | % PV Savings from Non-callable bonds | Aggregate Amount Used to Retire Non-Callable Bonds | Aggregate $ PV Savings from Non-Callable Bonds | Aggregate % PV Savings from Non-Callable Bonds | Years Remaining as of 2002 |
|---|---|---|---|---|---|
| 0 | 0.000% | 1,186,800,000 | 36,794,742 | 3.095% | 0.00 |
| 0 | 0.000% | 1,204,565,000 | 36,794,742 | 3.055% | N/A |
| 0 | 0.000% | 1,219,845,000 | 36,794,742 | 3.016% | N/A |
| 0 | 0.000% | 1,231,360,000 | 36,794,742 | 2.988% | N/A |
| 0 | 0.000% | 1,233,675,000 | 36,794,742 | 2.983% | N/A |
| 0 | 0.000% | 1,257,775,000 | 36,794,742 | 2.925% | N/A |
| 0 | 0.000% | 1,265,790,000 | 36,794,742 | 2.907% | N/A |
| 0 | 0.000% | 1,269,115,000 | 36,794,742 | 2.899% | N/A |
| (1,970) | (0.057%) | 1,272,600,000 | 36,792,773 | 2.891% | N/A |
| (15,502) | (0.061%) | 1,297,845,000 | 36,777,270 | 2.834% | N/A |
| (5,155) | (0.061%) | 1,306,240,000 | 36,772,115 | 2.815% | N/A |
| (10,241) | (0.062%) | 1,322,800,000 | 36,761,874 | 2.779% | N/A |
| (10,130) | (0.063%) | 1,336,780,000 | 36,751,745 | 2.745% | N/A |
| (7,642) | (0.063%) | 1,350,835,000 | 36,744,103 | 2.720% | N/A |
| (17,676) | (0.063%) | 1,378,720,000 | 36,726,427 | 2.664% | N/A |

*FIG. 13V*

| Years Remaining as of 2003 | Years Remaining as of 2004 | Years Remaining as of 2005 | Years Remaining as of 2006 | Years Remaining as of 2007 | Years Remaining as of 2008 |
|---|---|---|---|---|---|
| 0.00 | 0.00 | 0.00 | 0.00 | 0.00 | 0.00 |
| 0.00 | 0.00 | 0.00 | 0.00 | 0.00 | 0.00 |
| 0.08 | 0.00 | 0.00 | 0.00 | 0.00 | 0.00 |
| 0.08 | 0.00 | 0.00 | 0.00 | 0.00 | 0.00 |
| 0.08 | 0.00 | 0.00 | 0.00 | 0.00 | 0.00 |
| 0.58 | 0.00 | 0.00 | 0.00 | 0.00 | 0.00 |
| 0.58 | 0.00 | 0.00 | 0.00 | 0.00 | 0.00 |
| 0.75 | 0.00 | 0.00 | 0.00 | 0.00 | 0.00 |
| 1.75 | 0.75 | 0.00 | 0.00 | 0.00 | 0.00 |
| 1.58 | 0.58 | 0.00 | 0.00 | 0.00 | 0.00 |
| 1.58 | 0.58 | 0.00 | 0.00 | 0.00 | 0.00 |
| 1.00 | 0.00 | 0.00 | 0.00 | 0.00 | 0.00 |
| 1.08 | 0.08 | 0.00 | 0.00 | 0.00 | 0.00 |
| 1.08 | 0.08 | 0.00 | 0.00 | 0.00 | 0.00 |
| 1.08 | 0.08 | 0.00 | 0.00 | 0.00 | 0.00 |

*FIG. 13W*

| Years Remaining as of 2009 | Years Remaining as of 2010 | Years Remaining as of 2011 | Years Remaining as of 2012 |
|---|---|---|---|
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |
| 0.00 | 0.00 | 0.00 | 0.00 |

*FIG. 13X*

| | | |
|---|---|---|
| Par | 1,250,000,000 | |
| Level DS | 99,393,434 | |
| Par less Principal | 0 | |
| Par of VRDBs | 613,640,000 | |
| Bond Term | 20 | |

| Period | Maturity | Principal | Interest Rate | Annual Interest | Aggregate Accrued Interest |
|---|---|---|---|---|---|
| 0 | 02/01/02 | | | | |
| 1 | 02/01/03 | 42,578,339 | 1.800% | 766,410 | 56,815,096 |
| 2 | 02/01/04 | 43,344,749 | 2.460% | 1,066,281 | 56,048,685 |
| 3 | 02/01/05 | 44,411,029 | 2.960% | 1,314,566 | 54,982,405 |
| 4 | 02/01/06 | 45,725,596 | 3.370% | 1,540,953 | 53,667,838 |
| 5 | 02/01/07 | 47,266,549 | 3.680% | 1,739,409 | 52,126,886 |
| 6 | 02/01/08 | 49,005,957 | 3.990% | 1,955,338 | 50,387,477 |
| 7 | 02/01/09 | 50,961,295 | 4.200% | 2,140,374 | 48,432,139 |
| 8 | 02/01/10 | 53,101,670 | 4.360% | 2,315,233 | 46,291,764 |
| 9 | 02/01/11 | 55,416,902 | 4.470% | 2,477,136 | 43,976,532 |
| 10 | 02/01/12 | 57,894,038 | 4.580% | 2,651,547 | 41,499,396 |
| 11 | 02/01/13 | 60,545,585 | 4.710% | 2,851,697 | 38,847,849 |
| 12 | 02/01/14 | 63,397,282 | 4.810% | 3,049,409 | 35,996,152 |
| 13 | 02/01/15 | 66,446,691 | 4.910% | 3,262,533 | 32,946,743 |
| 14 | 02/01/16 | 69,709,224 | 5.020% | 3,499,403 | 29,684,210 |
| 15 | 02/01/17 | 73,208,627 | 5.100% | 3,733,640 | 26,184,807 |
| 16 | 02/01/18 | 76,942,267 | 5.160% | 3,970,221 | 22,451,167 |
| 17 | 02/01/19 | 80,912,488 | 5.220% | 4,223,632 | 18,480,946 |
| 18 | 02/01/20 | 85,136,120 | 5.270% | 4,486,673 | 14,257,315 |
| 19 | 02/01/21 | 89,622,793 | 5.300% | 4,750,008 | 9,770,641 |
| 20 | 02/01/22 | 94,372,801 | 5.320% | 5,020,633 | 5,020,633 |
| 21 | 02/01/23 | | | | |
| . | | | | | |
| . | | | | | |
| . | | | | | |
| 30 | 02/01/32 | | | | |
| | | 1,250,000,000 | | | |
| | Financed | 636,351,010 | | | |
| | Balance | 613,648,990 | | | |

*FIG. 14A*

| Rounding Down | Rounding Up | Rounded Principal | Cumulative Principal | Annual Interest |
|---|---|---|---|---|
| 0 | 42,580,000 | 42,580,000 | 42,580,000 | 766,440 |
| 43,345,000 | 0 | 43,345,000 | 85,925,000 | 1,066,287 |
| 44,410,000 | 0 | 44,410,000 | 130,335,000 | 1,314,536 |
| 0 | 45,725,000 | 45,725,000 | 176,060,000 | 1,540,933 |
| 0 | 47,265,000 | 47,265,000 | 223,325,000 | 1,739,352 |
| 0 | 49,005,000 | 49,005,000 | 272,330,000 | 1,955,300 |
| 50,960,000 | 0 | 50,960,000 | 323,290,000 | 2,140,320 |
| 53,100,000 | 0 | 53,100,000 | 376,390,000 | 2,315,160 |
| 0 | 55,415,000 | 55,415,000 | 431,805,000 | 2,477,051 |
| 57,895,000 | 0 | 57,895,000 | 489,700,000 | 2,651,591 |
| 0 | 60,545,000 | 60,545,000 | 550,245,000 | 2,851,670 |
| 0 | 63,395,000 | 63,395,000 | 613,640,000 | 3,049,300 |
| 0 | 66,445,000 | 66,445,000 | 680,085,000 | 3,262,450 |
| 0 | 69,710,000 | 69,710,000 | 749,795,000 | 3,499,442 |
| 0 | 73,210,000 | 73,210,000 | 823,005,000 | 3,733,710 |
| 76,940,000 | 0 | 76,940,000 | 899,945,000 | 3,970,104 |
| 80,910,000 | 0 | 80,910,000 | 980,855,000 | 4,223,502 |
| 0 | 85,135,000 | 85,135,000 | 1,065,990,000 | 4,486,615 |
| 89,625,000 | 0 | 89,625,000 | 1,155,615,000 | 4,750,125 |
| 94,375,000 | 0 | 94,385,000 | 1,250,000,000 | 5,021,282 |
| | | 1,250,000,000 | | |
| | | 636,360,000 | | |
| | | 613,640,000 | | |

*FIG. 14B*

| Aggregate Accrued Interest | Debt Service |
|---|---|
| 56,815,167 | 99,395,167 |
| 56,048,727 | 99,393,727 |
| 54,982,440 | 99,392,440 |
| 53,667,904 | 99,392,904 |
| 52,126,971 | 99,391,971 |
| 50,387,619 | 99,392,619 |
| 48,432,320 | 99,392,320 |
| 46,292,000 | 99,392,000 |
| 43,976,840 | 99,391,840 |
| 41,499,789 | 99,394,789 |
| 38,848,198 | 99,393,198 |
| 35,996,529 | 99,391,529 |
| 32,947,229 | 99,392,229 |
| 29,684,780 | 99,394,780 |
| 26,185,338 | 99,395,338 |
| 22,451,628 | 99,391,628 |
| 18,481,524 | 99,391,524 |
| 14,258,022 | 99,393,022 |
| 9,771,407 | 99,396,407 |
| 5,021,282 | 99,406,282 |

*FIG. 14C*

| | | | | | |
|---|---|---|---|---|---|
| Par | 613,640,000 | | | | |
| Level DS | 63,501,891 | | | | |
| Par less Principal | 0 | | | | |
| Amortization Rate | 3.500% | | | | |
| VRDB Term | 12 | | | | |

| Period | Maturity | Principal | Interest Rate | Annual Interest | Cumulative Interest |
|---|---|---|---|---|---|
| 0 | 02/01/02 | | | | |
| 1 | 02/01/03 | 42,024,491 | 3.500% | 1,470,857 | 21,477,400 |
| 2 | 02/01/04 | 43,495,348 | 3.500% | 1,522,337 | 20,006,543 |
| 3 | 02/01/05 | 45,017,685 | 3.500% | 1,575,619 | 18,484,206 |
| 4 | 02/01/06 | 46,593,304 | 3.500% | 1,630,766 | 16,908,587 |
| 5 | 02/01/07 | 48,224,070 | 3.500% | 1,687,842 | 15,277,821 |
| 6 | 02/01/08 | 49,911,912 | 3.500% | 1,746,917 | 13,589,979 |
| 7 | 02/01/09 | 51,658,829 | 3.500% | 1,808,059 | 11,843,062 |
| 8 | 02/01/10 | 53,466,888 | 3.500% | 1,871,341 | 10,035,003 |
| 9 | 02/01/11 | 55,338,229 | 3.500% | 1,936,838 | 8,163,662 |
| 10 | 02/01/12 | 57,275,067 | 3.500% | 2,004,627 | 6,226,824 |
| 11 | 02/01/13 | 59,279,694 | 3.500% | 2,074,789 | 4,222,196 |
| 12 | 02/01/14 | 61,354,484 | 3.500% | 2,147,407 | 2,147,407 |
| 13 | 02/01/15 | | | | |
| 14 | 02/01/16 | | | | |
| . | | | | | |
| . | | | | | |
| . | | | | | |
| 29 | 02/01/31 | | | | |
| 30 | 02/01/32 | | | | |
| | Financed Balance | 613,640,000 | | | |

*FIG. 15A*

| Rounding Down | Rounding Up | Rounded Principal | Cumulative Principal | Annual Interest |
|---|---|---|---|---|
| 42,025,000 | 0 | 42,025,000 | 42,025,000 | 1,470,875 |
| 0 | 43,495,000 | 43,495,000 | 85,520,000 | 1,522,325 |
| 0 | 45,020,000 | 45,020,000 | 130,540,000 | 1,575,700 |
| 46,595,000 | 0 | 46,595,000 | 177,135,000 | 1,630,825 |
| 48,225,000 | 0 | 48,225,000 | 225,360,000 | 1,687,875 |
| 49,910,000 | 0 | 49,910,000 | 275,270,000 | 1,746,850 |
| 0 | 51,660,000 | 51,660,000 | 326,930,000 | 1,808,100 |
| 0 | 53,465,000 | 53,465,000 | 380,395,000 | 1,871,275 |
| 0 | 55,340,000 | 55,340,000 | 435,735,000 | 1,936,900 |
| 0 | 57,275,000 | 57,275,000 | 493,010,000 | 2,004,625 |
| 0 | 59,280,000 | 59,280,000 | 552,290,000 | 2,074,800 |
| 61,355,000 | 0 | 61,350,000 | 613,640,000 | 2,147,250 |
| | | 613,640,000 | | |

*FIG. 15B*

| Cumulative Interest | Debt Service | Amount by which Maturities are Greater or (Less) than Fixed Rate Maturities |
|---|---|---|
| 21,477,400 | 63,502,400 | (553,848) |
| 20,006,525 | 63,501,525 | 150,599 |
| 18,484,200 | 63,504,200 | 606,656 |
| 16,908,500 | 63,503,500 | 867,708 |
| 15,277,675 | 63,502,675 | 957,521 |
| 13,589,800 | 63,499,800 | 905,955 |
| 11,842,950 | 63,502,950 | 697,534 |
| 10,034,850 | 63,499,850 | 365,218 |
| 8,163,575 | 63,503,575 | (78,673) |
| 6,226,675 | 63,501,675 | (618,971) |
| 4,222,050 | 63,502,050 | (1,265,890) |
| 2,147,250 | 63,497,250 | (2,042,798) |

*FIG. 15C*

| Maturity | Fixed Rate Bond Principal | Fixed Payor Rates | Spread for Actual Rate, if applicable (Bps) | Benefit from Knockout Option, if applicable (Bps) | Liquidity Cost, if any Bps) | Remkg Cost, if any (Bps) |
|---|---|---|---|---|---|---|
| 0 02/01/2002 | | | | | | |
| 1 02/01/2003 | 42,580,000 | 1.893% | 0 | 0 | 0 | 28 |
| 2 02/01/2004 | 43,345,000 | 2.688% | 0 | 0 | 0 | 28 |
| 3 02/01/2005 | 44,410,000 | 3.313% | 0 | 0 | 0 | 28 |
| 4 02/01/2006 | 45,725,000 | 3.702% | 0 | 0 | 0 | 28 |
| 5 02/01/2007 | 47,265,000 | 3.955% | 0 | 0 | 0 | 28 |
| 6 02/01/2008 | 49,005,000 | 4.147% | 0 | 0 | 0 | 28 |
| 7 02/01/2009 | 50,960,000 | 4.297% | 0 | 0 | 0 | 28 |
| 8 02/01/2010 | 53,100,000 | 4.411% | 0 | 0 | 0 | 28 |
| 9 02/01/2011 | 55,415,000 | 4.506% | 0 | 0 | 0 | 28 |
| 10 02/01/2012 | 57,895,000 | 4.587% | 0 | 0 | 0 | 28 |
| 11 02/01/2013 | 60,545,000 | 4.659% | 0 | 0 | 0 | 28 |
| 12 02/01/2014 | 63,395,000 | 4.725% | 0 | 0 | 0 | 28 |
| 13 02/01/2015 | | | | | | |
| 14 02/01/2016 | | | | | | |
| 15 02/01/2017 | | | | | | |
| . | | | | | | |
| . | | | | | | |
| . | | | | | | |
| 29 02/01/2031 | | | | | | |
| 30 02/01/2032 | | | | | | |
| | 613,640,000 | | | | | |

*FIG. 16A*

|  |  |  |  |  |  |
|---|---|---|---|---|---|
|  |  |  |  | Synthetic Bond Yield | 0 |
|  |  |  |  | Synthetic Bond Yield | 4.615% |
|  |  |  |  | Spread Above Fixed Rate Yie | 0.337% |

| Synthetic Fixed Rate | Spread above/(below) Fixed Rate Bonds coupons | Interest on Maturing Principal | Annual Interest | Debt Service | Present Value |
|---|---|---|---|---|---|
| 2.173% | 0.37 | 925,365 | 26,255,644 | 68,835,644 | 65,798,727 |
| 2.968% | 0.51 | 1,286,620 | 25,330,279 | 68,675,279 | 62,749,267 |
| 3.593% | 0.63 | 1,595,590 | 24,043,659 | 68,453,659 | 59,787,307 |
| 3.982% | 0.61 | 1,820,717 | 22,448,069 | 68,173,069 | 56,915,333 |
| 4.235% | 0.56 | 2,001,874 | 20,627,352 | 67,892,352 | 54,180,300 |
| 4.427% | 0.44 | 2,169,303 | 18,625,478 | 67,630,478 | 51,590,188 |
| 4.577% | 0.38 | 2,332,459 | 16,456,175 | 67,416,175 | 49,157,849 |
| 4.691% | 0.33 | 2,490,754 | 14,123,716 | 67,223,716 | 46,854,940 |
| 4.786% | 0.32 | 2,652,095 | 11,632,962 | 67,047,962 | 44,670,680 |
| 4.867% | 0.29 | 2,817,552 | 8,980,867 | 66,875,867 | 42,590,283 |
| 4.939% | 0.23 | 2,990,569 | 6,163,315 | 66,708,315 | 40,609,269 |
| 5.005% | 0.19 | 3,172,746 | 3,172,746 | 66,567,746 | 38,735,857 |
|  |  |  |  |  | 613,640,000 |

*FIG. 16B*

|  | Maturity |  |  | Year | 1 | 2 |
|---|---|---|---|---|---|---|
|  |  |  |  | VRDB Rates | 2.375% | 3.136% |
|  | Maturity |  | Fixed Rates |  |  |  |
| 0 | 02/01/02 |  |  |  |  |  |
| 1 | 02/01/03 | 42,580,000 | 1.800% |  | 42,580,000 | 0 |
| 2 | 02/01/04 | 43,345,000 | 2.460% |  | 36,843 | 43,345,000 |
| 3 | 02/01/05 | 44,410,000 | 2.960% |  | 259,799 | (70,014) |
| 4 | 02/01/06 | 45,725,000 | 3.370% |  | 454,964 | 121,264 |
| 5 | 02/01/07 | 47,265,000 | 3.680% |  | 616,808 | 276,465 |
| 6 | 02/01/08 | 49,005,000 | 3.990% |  | 791,431 | 443,322 |
| 7 | 02/01/09 | 50,960,000 | 4.200% |  | 930,020 | 571,380 |
| 8 | 02/01/10 | 53,100,000 | 4.360% |  | 1,054,035 | 682,999 |
| 9 | 02/01/11 | 55,415,000 | 4.470% |  | 1,160,944 | 775,643 |
| 10 | 02/01/12 | 57,895,000 | 4.580% |  | 1,276,585 | 876,037 |
| 11 | 02/01/13 | 60,545,000 | 4.710% |  | 1,413,726 | 997,313 |
| 12 | 02/01/14 | 63,395,000 | 4.810% |  | 1,543,668 | 1,109,642 |
| 13 | 02/01/15 |  |  |  |  |  |
| 14 | 02/01/16 |  |  |  | 52,118,823 | 49,129,050 |
| 15 | 02/01/17 | 613,640,000 | Outstanding VRDBs |  | 613,640,000 | 561,521,178 |
| 16 | 02/01/18 |  | Amortization % |  | 122.402% | 113.344% |
| 17 | 02/01/19 |  |  |  |  |  |
| 18 | 02/01/20 |  |  |  |  |  |
| 19 | 02/01/21 |  |  |  |  |  |
| . |  |  |  |  |  |  |
| . |  |  |  |  |  |  |
| . |  |  |  |  |  |  |
| 27 | 02/01/29 |  |  |  |  |  |
| 28 | 02/01/30 |  |  |  |  |  |
| 29 | 02/01/31 |  |  |  |  |  |
| 30 | 02/01/32 |  |  |  |  |  |

*FIG. 17A*

|   |          |   3           |   4           |   5           |   6           |
|---|----------|---------------|---------------|---------------|---------------|
|   |          | 3.609%        | 5.164%        | 5.412%        | 5.970%        |
|   | Maturity |               |               |               |               |
| 0 | 02/01/02 |               |               |               |               |
| 1 | 02/01/03 | 0             | 0             | 0             | 0             |
| 2 | 02/01/04 | 0             | 0             | 0             | 0             |
| 3 | 02/01/05 | 44,410,000    | 0             | 0             | 0             |
| 4 | 02/01/06 | (88,487)      | 45,725,000    | 0             | 0             |
| 5 | 02/01/07 | 65,796        | (651,832)     | 47,265,000    | 0             |
| 6 | 02/01/08 | 231,271       | (499,557)     | (644,544)     | 49,005,000    |
| 7 | 02/01/09 | 355,359       | (395,314)     | (538,539)     | (846,860)     |
| 8 | 02/01/10 | 461,471       | (313,334)     | (456,584)     | (769,588)     |
| 9 | 02/01/11 | 547,015       | (256,265)     | (401,463)     | (722,184)     |
| 10 | 02/01/12 | 639,849      | (193,839)     | (341,046)     | (669,925)     |
| 11 | 02/01/13 | 753,615      | (111,384)     | (259,780)     | (596,056)     |
| 12 | 02/01/14 | 857,132      | (43,069)      | (193,981)     | (539,919)     |
| 13 | 02/01/15 |               |               |               |               |
| 14 | 02/01/16 | 48,233,021   | 43,260,406    | 44,429,063    | 44,860,468    |
| 15 | 02/01/17 | 512,392,127  | 464,159,107   | 420,898,701   | 376,469,637   |
| 16 | 02/01/18 | 108.608%     | 94.610%       | 94.000%       | 91.543%       |
| 17 | 02/01/19 |               |               |               |               |
| 18 | 02/01/20 |               |               |               |               |
| 19 | 02/01/21 |               |               |               |               |
|   | .        |               |               |               |               |
|   | .        |               |               |               |               |
|   | .        |               |               |               |               |
| 27 | 02/01/29 |              |               |               |               |
| 28 | 02/01/30 |              |               |               |               |
| 29 | 02/01/31 |              |               |               |               |
| 30 | 02/01/32 |              |               |               |               |

*FIG. 17B*

|   | Maturity | 7<br>6.877% | 8<br>6.175% | 9<br>4.559% | 10<br>3.057% |
|---|---|---|---|---|---|
| 0 | 02/01/02 | | | | |
| 1 | 02/01/03 | 0 | 0 | 0 | 0 |
| 2 | 02/01/04 | 0 | 0 | 0 | 0 |
| 3 | 02/01/05 | 0 | 0 | 0 | 0 |
| 4 | 02/01/06 | 0 | 0 | 0 | 0 |
| 5 | 02/01/07 | 0 | 0 | 0 | 0 |
| 6 | 02/01/08 | 0 | 0 | 0 | 0 |
| 7 | 02/01/09 | 50,960,000 | 0 | 0 | 0 |
| 8 | 02/01/10 | (1,291,000) | 53,100,000 | 0 | 0 |
| 9 | 02/01/11 | (1,257,724) | (954,497) | 55,415,000 | 0 |
| 10 | 02/01/12 | (1,220,442) | (900,914) | (12,100) | 57,895,000 |
| 11 | 02/01/13 | (1,160,662) | (823,134) | 101,239 | 1,010,597 |
| 12 | 02/01/14 | (1,122,154) | (766,020) | 197,737 | 1,143,368 |
| 13 | 02/01/15 | | | | |
| 14 | 02/01/16 | 44,908,018 | 49,655,434 | 55,701,876 | 60,048,965 |
| 15 | 02/01/17 | 331,609,170 | 286,701,151 | 237,045,717 | 181,343,841 |
| 16 | 02/01/18 | 88.124% | 93.513% | 100.518% | 103.720% |
| 17 | 02/01/19 | | | | |
| 18 | 02/01/20 | | | | |
| 19 | 02/01/21 | | | | |
| ⋮ | | | | | |
| 27 | 02/01/29 | | | | |
| 28 | 02/01/30 | | | | |
| 29 | 02/01/31 | | | | |
| 30 | 02/01/32 | | | | |

*FIG. 17C*

|   | Maturity | 11<br>2.693% | 12<br>3.701% | Total |
|---|---|---|---|---|
| 0 | 02/01/02 |  |  | Total |
| 1 | 02/01/03 | 0 | 0 | 42,580,000 |
| 2 | 02/01/04 | 0 | 0 | 43,381,843 |
| 3 | 02/01/05 | 0 | 0 | 44,599,784 |
| 4 | 02/01/06 | 0 | 0 | 46,212,741 |
| 5 | 02/01/07 | 0 | 0 | 47,572,237 |
| 6 | 02/01/08 | 0 | 0 | 49,326,923 |
| 7 | 02/01/09 | 0 | 0 | 51,036,045 |
| 8 | 02/01/10 | 0 | 0 | 52,467,998 |
| 9 | 02/01/11 | 0 | 0 | 54,306,470 |
| 10 | 02/01/12 | 0 | 0 | 57,349,205 |
| 11 | 02/01/13 | 60,545,000 | 0 | 61,870,472 |
| 12 | 02/01/14 | 1,401,238 | 59,348,637 | 62,936,280 |
| 13 | 02/01/15 |  |  |  |
| 14 | 02/01/16 | 61,946,238 | 59,348,637 | 613,640,000 |
| 15 | 02/01/17 | ######### | 59,348,637 |  |
| 16 | 02/01/18 | 102.314% | 100.000% |  |
| 17 | 02/01/19 |  |  |  |
| 18 | 02/01/20 |  |  |  |
| 19 | 02/01/21 |  |  |  |
| . |  |  |  |  |
| . |  |  |  |  |
| . |  |  |  |  |
| 27 | 02/01/29 |  |  |  |
| 28 | 02/01/30 |  |  |  |
| 29 | 02/01/31 |  |  |  |
| 30 | 02/01/32 |  |  |  |

*FIG. 17D*

|  | Maturity | Accelerated Amortization | Amortization from VRDB Worksheet | Difference | Breakeven VRDB Rate | Breakeven BMA Rate |
|---|---|---|---|---|---|---|
| 0 | 02/01/02 |  |  |  | 4.279% | 3.899% |
| 1 | 02/01/03 | 52,118,823 | 42,873,988 | 9,244,835 | 4.674% | 4.294% |
| 2 | 02/01/04 | 49,129,050 | 48,547,275 | 581,775 | 5.028% | 4.648% |
| 3 | 02/01/05 | 48,233,021 | 47,598,336 | 634,684 | 5.392% | 5.012% |
| 4 | 02/01/06 | 43,260,406 | 41,936,833 | 1,323,573 | 5.501% | 5.121% |
| 5 | 02/01/07 | 44,429,063 | 43,027,929 | 1,401,135 | 5.585% | 5.205% |
| 6 | 02/01/08 | 44,860,468 | 43,183,215 | 1,677,253 | 5.532% | 5.152% |
| 7 | 02/01/09 | 44,908,018 | 42,619,552 | 2,288,466 | 5.124% | 4.744% |
| 8 | 02/01/10 | 49,655,434 | 47,680,984 | 1,974,450 | 4.741% | 4.361% |
| 9 | 02/01/11 | 55,701,876 | 54,766,056 | 935,820 | 4.885% | 4.505% |
| 10 | 02/01/12 | 60,048,965 | 60,291,127 | (242,162) | 6.312% | 5.932% |
| 11 | 02/01/13 | 61,946,238 | 62,646,410 | (700,172) | 11.962% | 11.582% |
| 12 | 02/01/14 | 59,348,637 | 63,539,945 | (4,191,308) |  |  |
| 13 | 02/01/15 |  |  |  |  |  |
| 14 | 02/01/16 | 613,640,000 | 598,711,651 |  |  |  |
| 15 | 02/01/17 |  |  |  |  |  |
| 16 | 02/01/18 |  |  |  |  |  |
| 17 | 02/01/19 |  |  |  |  |  |
| 18 | 02/01/20 |  |  |  |  |  |
| 19 | 02/01/21 |  |  |  |  |  |
| . |  |  |  |  |  |  |
| . |  |  |  |  |  |  |
| . |  |  |  |  |  |  |
| 27 | 02/01/29 |  |  |  |  |  |
| 28 | 02/01/30 |  |  |  |  |  |
| 29 | 02/01/31 |  |  |  |  |  |
| 30 | 02/01/32 |  |  |  |  |  |

*FIG. 17E*

| | Maturity | Increase in Breakeven Rate from Prior Yr |
|---|---|---|
| 0 | 02/01/02 | |
| 1 | 02/01/03 | 0.395% |
| 2 | 02/01/04 | 0.354% |
| 3 | 02/01/05 | 0.364% |
| 4 | 02/01/06 | 0.109% |
| 5 | 02/01/07 | 0.084% |
| 6 | 02/01/08 | (0.053%) |
| 7 | 02/01/09 | (0.408%) |
| 8 | 02/01/10 | (0.383%) |
| 9 | 02/01/11 | 0.144% |
| 10 | 02/01/12 | 1.427% |
| 11 | 02/01/13 | 5.650% |
| 12 | 02/01/14 | |
| 13 | 02/01/15 | |
| 14 | 02/01/16 | |
| 15 | 02/01/17 | |
| 16 | 02/01/18 | |
| 17 | 02/01/19 | |
| 18 | 02/01/20 | |
| 19 | 02/01/21 | |
| . | | |
| . | | |
| . | | |
| 27 | 02/01/29 | |
| 28 | 02/01/30 | |
| 29 | 02/01/31 | |
| 30 | 02/01/32 | |

*FIG. 17F*

|   |   |   | Year | 1 | 2 | 3 |
|---|---|---|---|---|---|---|
|   |   |   | VRDB Rates | 2.375% | 3.136% | 3.609% |
|   | Maturity | Par | Fixed Rates |   |   |   |
| 0 | 02/01/02 |   |   |   |   |   |
| 1 | 02/01/03 | 100 | 1.800% | 100.000% | 0.000% | 0.000% |
| 2 | 02/01/04 | 100 | 2.460% | 0.085% | 100.000% | 0.000% |
| 3 | 02/01/05 | 100 | 2.960% | 0.585% | (0.158%) | 100.000% |
| 4 | 02/01/06 | 100 | 3.370% | 0.995% | 0.265% | (0.194%) |
| 5 | 02/01/07 | 100 | 3.680% | 1.305% | 0.585% | 0.139% |
| 6 | 02/01/08 | 100 | 3.990% | 1.615% | 0.905% | 0.472% |
| 7 | 02/01/09 | 100 | 4.200% | 1.825% | 1.121% | 0.697% |
| 8 | 02/01/10 | 100 | 4.360% | 1.985% | 1.286% | 0.869% |
| 9 | 02/01/11 | 100 | 4.470% | 2.095% | 1.400% | 0.987% |
| 10 | 02/01/12 | 100 | 4.580% | 2.205% | 1.513% | 1.105% |
| 11 | 02/01/13 | 100 | 4.710% | 2.335% | 1.647% | 1.245% |
| 12 | 02/01/14 | 100 | 4.810% | 2.435% | 1.750% | 1.352% |
| 13 | 02/01/15 |   |   |   |   |   |
| 14 | 02/01/16 |   |   |   |   |   |
| 15 | 02/01/17 |   |   |   |   |   |
| 16 | 02/01/18 |   |   |   |   |   |
| 17 | 02/01/19 |   |   |   |   |   |
| 18 | 02/01/20 |   |   |   |   |   |
| 19 | 02/01/21 |   |   |   |   |   |
| . |   |   |   |   |   |   |
| . |   |   |   |   |   |   |
| . |   |   |   |   |   |   |
| 27 | 02/01/29 |   |   |   |   |   |
| 28 | 02/01/30 |   |   |   |   |   |
| 29 | 02/01/31 |   |   |   |   |   |
| 30 | 02/01/32 |   |   |   |   |   |

*FIG. 17G*

|    | Maturity | 4<br>5.164% | 5<br>5.412% | 6<br>5.970% | 7<br>6.877% | 8<br>6.175% |
|----|----------|---------|---------|---------|---------|---------|
| 0  | 02/01/02 |         |         |         |         |         |
| 1  | 02/01/03 | 0.000%  | 0.000%  | 0.000%  | 0.000%  | 0.000%  |
| 2  | 02/01/04 | 0.000%  | 0.000%  | 0.000%  | 0.000%  | 0.000%  |
| 3  | 02/01/05 | 0.000%  | 0.000%  | 0.000%  | 0.000%  | 0.000%  |
| 4  | 02/01/06 | 100.000%| 0.000%  | 0.000%  | 0.000%  | 0.000%  |
| 5  | 02/01/07 | (1.379%)| 100.000%| 0.000%  | 0.000%  | 0.000%  |
| 6  | 02/01/08 | (1.019%)| (1.315%)| 100.000%| 0.000%  | 0.000%  |
| 7  | 02/01/09 | (0.776%)| (1.057%)| (1.662%)| 100.000%| 0.000%  |
| 8  | 02/01/10 | (0.590%)| (0.860%)| (1.449%)| (2.431%)| 100.000%|
| 9  | 02/01/11 | (0.462%)| (0.724%)| (1.303%)| (2.270%)| (1.722%)|
| 10 | 02/01/12 | (0.335%)| (0.589%)| (1.157%)| (2.108%)| (1.556%)|
| 11 | 02/01/13 | (0.184%)| (0.429%)| (0.984%)| (1.917%)| (1.360%)|
| 12 | 02/01/14 | (0.068%)| (0.306%)| (0.852%)| (1.770%)| (1.208%)|
| 13 | 02/01/15 |         |         |         |         |         |
| 14 | 02/01/16 |         |         |         |         |         |
| 15 | 02/01/17 |         |         |         |         |         |
| 16 | 02/01/18 |         |         |         |         |         |
| 17 | 02/01/19 |         |         |         |         |         |
| 18 | 02/01/20 |         |         |         |         |         |
| 19 | 02/01/21 |         |         |         |         |         |
| ⋮  |          |         |         |         |         |         |
| 27 | 02/01/29 |         |         |         |         |         |
| 28 | 02/01/30 |         |         |         |         |         |
| 29 | 02/01/31 |         |         |         |         |         |
| 30 | 02/01/32 |         |         |         |         |         |

*FIG. 17H*

|   |          | 9        | 10       | 11       | 12       |
|---|----------|----------|----------|----------|----------|
|   |          | 4.559%   | 3.057%   | 2.693%   | 3.701%   |
|   | Maturity |          |          |          |          |
| 0 | 02/01/02 |          |          |          |          |
| 1 | 02/01/03 | 0.000%   | 0.000%   | 0.000%   | 0.000%   |
| 2 | 02/01/04 | 0.000%   | 0.000%   | 0.000%   | 0.000%   |
| 3 | 02/01/05 | 0.000%   | 0.000%   | 0.000%   | 0.000%   |
| 4 | 02/01/06 | 0.000%   | 0.000%   | 0.000%   | 0.000%   |
| 5 | 02/01/07 | 0.000%   | 0.000%   | 0.000%   | 0.000%   |
| 6 | 02/01/08 | 0.000%   | 0.000%   | 0.000%   | 0.000%   |
| 7 | 02/01/09 | 0.000%   | 0.000%   | 0.000%   | 0.000%   |
| 8 | 02/01/10 | 0.000%   | 0.000%   | 0.000%   | 0.000%   |
| 9 | 02/01/11 | 100.000% | 0.000%   | 0.000%   | 0.000%   |
| 10| 02/01/12 | (0.021%) | 100.000% | 0.000%   | 0.000%   |
| 11| 02/01/13 | 0.167%   | 1.669%   | 100.000% | 0.000%   |
| 12| 02/01/14 | 0.312%   | 1.804%   | 2.210%   | 93.617%  |
| 13| 02/01/15 |          |          |          |          |
| 14| 02/01/16 |          |          |          |          |
| 15| 02/01/17 |          |          |          |          |
| 16| 02/01/18 |          |          |          |          |
| 17| 02/01/19 |          |          |          |          |
| 18| 02/01/20 |          |          |          |          |
| 19| 02/01/21 |          |          |          |          |
|   | .        |          |          |          |          |
|   | .        |          |          |          |          |
|   | .        |          |          |          |          |
| 27| 02/01/29 |          |          |          |          |
| 28| 02/01/30 |          |          |          |          |
| 29| 02/01/31 |          |          |          |          |
| 30| 02/01/32 |          |          |          |          |

*FIG. 171*

| Maturity | | % of Principal of Maturity Amortized by its Maturity Date |
|---|---|---|
| 0 | 02/01/02 | |
| 1 | 02/01/03 | 101.800% |
| 2 | 02/01/04 | 102.545% |
| 3 | 02/01/05 | 103.387% |
| 4 | 02/01/06 | 104.437% |
| 5 | 02/01/07 | 104.330% |
| 6 | 02/01/08 | 104.647% |
| 7 | 02/01/09 | 104.349% |
| 8 | 02/01/10 | 103.170% |
| 9 | 02/01/11 | 102.470% |
| 10 | 02/01/12 | 103.637% |
| 11 | 02/01/13 | 106.899% |
| 12 | 02/01/14 | 104.086% |
| 13 | 02/01/15 | |
| 14 | 02/01/16 | |
| 15 | 02/01/17 | |
| 16 | 02/01/18 | |
| 17 | 02/01/19 | |
| 18 | 02/01/20 | |
| 19 | 02/01/21 | |
| . | | |
| . | | |
| . | | |
| 27 | 02/01/29 | |
| 28 | 02/01/30 | |
| 29 | 02/01/31 | |
| 30 | 02/01/32 | |

*FIG. 17J*

|   | Maturity | Fixed Rate Bond Principal | MMD | Spread to MMD (Bps) | Fixed Rate | Annual Interest on Maturing Principal |
|---|---|---|---|---|---|---|
| 0 | 2/1/02 | | | | | |
| 1 | 2/1/03 | 17,030,000 | 1.800% | 0 | 1.800% | 306,540 |
| 2 | 2/1/04 | 17,340,000 | 2.460% | 0 | 2.460% | 426,564 |
| 3 | 2/1/05 | 17,765,000 | 2.960% | 0 | 2.960% | 525,844 |
| 4 | 2/1/06 | 18,290,000 | 3.360% | 1 | 3.370% | 616,373 |
| 5 | 2/1/07 | 18,905,000 | 3.660% | 2 | 3.680% | 695,704 |
| 6 | 2/1/08 | 19,600,000 | 3.970% | 2 | 3.990% | 782,040 |
| 7 | 2/1/09 | 20,385,000 | 4.170% | 3 | 4.200% | 856,170 |
| 8 | 2/1/10 | 21,240,000 | 4.320% | 4 | 4.360% | 926,064 |
| 9 | 2/1/11 | 22,165,000 | 4.420% | 5 | 4.470% | 990,776 |
| 10 | 2/1/12 | 23,160,000 | 4.520% | 6 | 4.580% | 1,060,728 |
| 11 | 2/1/13 | 24,220,000 | 4.640% | 7 | 4.710% | 1,140,762 |
| 12 | 2/1/14 | 25,360,000 | 4.740% | 7 | 4.810% | 1,219,816 |
| 13 | 2/1/15 | 26,580,000 | 4.840% | 7 | 4.910% | 1,305,078 |
| 14 | 2/1/16 | 27,885,000 | 4.940% | 8 | 5.020% | 1,399,827 |
| 15 | 2/1/17 | 29,285,000 | 5.020% | 8 | 5.100% | 1,493,535 |
| 16 | 2/1/18 | 30,775,000 | 5.080% | 8 | 5.160% | 1,587,990 |
| 17 | 2/1/19 | 32,365,000 | 5.130% | 9 | 5.220% | 1,689,453 |
| 18 | 2/1/20 | 34,055,000 | 5.180% | 9 | 5.270% | 1,794,699 |
| 19 | 2/1/21 | 35,850,000 | 5.200% | 10 | 5.300% | 1,900,050 |
| 20 | 2/1/22 | 37,745,000 | 5.220% | 10 | 5.320% | 2,008,034 |
| 21 | 2/1/23 | 0 | 5.220% | 10 | 5.320% | 0 |
| 22 | 2/1/24 | 0 | 5.220% | 10 | 5.320% | 0 |
| 23 | 2/1/25 | 0 | 5.220% | 10 | 5.320% | 0 |
| 24 | 2/1/26 | 0 | 5.220% | 10 | 5.320% | 0 |
| 25 | 2/1/27 | 0 | 5.220% | 10 | 5.320% | 0 |
| 26 | 2/1/28 | 0 | 5.220% | 10 | 5.320% | 0 |
| 27 | 2/1/29 | 0 | 5.220% | 10 | 5.320% | 0 |
| 28 | 2/1/30 | 0 | 5.220% | 10 | 5.320% | 0 |
| 29 | 2/1/31 | 0 | 5.220% | 10 | 5.320% | 0 |
| 30 | 2/1/32 | 0 | 5.220% | 10 | 5.320% | 0 |
|   |   | 500,000,000 |   |   |   |   |

*FIG. 18A*

|  |  | Dated Date | 2/1/02 | Back-end Savings |
|---|---|---|---|---|
|  | First Payment Date | | 2/1/03 | |
|  |  |  | (0) | |
|  | Fixed Rate Bond Yield | | 4.893% | |

| Aggregate Accrued Interest | Debt Service | Present Value | BMA Interest Rate Scenario |
|---|---|---|---|
| 22,726,046 | 39,756,046 | 37,901,602 | 2.000% |
| 22,419,506 | 39,759,506 | 36,136,805 | 2.500% |
| 21,992,942 | 39,757,942 | 34,449,828 | 3.500% |
| 21,467,098 | 39,757,098 | 32,842,198 | 4.784% |
| 20,850,725 | 39,755,725 | 31,309,174 | 5.032% |
| 20,155,021 | 39,755,021 | 29,848,211 | 5.590% |
| 19,372,981 | 39,757,981 | 28,458,042 | 6.497% |
| 18,516,811 | 39,756,811 | 27,129,802 | 5.795% |
| 17,590,747 | 39,755,747 | 25,863,625 | 4.179% |
| 16,599,972 | 39,759,972 | 24,659,821 | 2.677% |
| 15,539,244 | 39,759,244 | 23,509,119 | 2.313% |
| 14,398,482 | 39,758,482 | 22,412,093 | 3.321% |
| 13,178,666 | 39,758,666 | 21,366,767 | 4.226% |
| 11,873,588 | 39,758,588 | 20,370,062 | 3.860% |
| 10,473,761 | 39,758,761 | 19,419,973 | 4.017% |
| 8,980,226 | 39,755,226 | 18,512,471 | 3.890% |
| 7,392,236 | 39,757,236 | 17,649,838 | 3.795% |
| 5,702,783 | 39,757,783 | 16,826,783 | 4.574% |
| 3,908,084 | 39,758,084 | 16,042,010 | 3.022% |
| 2,008,034 | 39,753,034 | 15,291,778 | 3.022% |
| 0 | 0 | 0 | 2.313% |
| 0 | 0 | 0 | 3.321% |
| 0 | 0 | 0 | 4.226% |
| 0 | 0 | 0 | 3.860% |
| 0 | 0 | 0 | 4.017% |
| 0 | 0 | 0 | 3.890% |
| 0 | 0 | 0 | 3.795% |
| 0 | 0 | 0 | 4.574% |
| 0 | 0 | 0 | 3.022% |
| 0 | 0 | 0 | 3.022% |

| | | | | Spread to | | Liquidity | Remkg |
| | | VRDB | | BMA | VRDB | Cost, if | Cost, if |
| Period | Maturity | Principal | BMA | (Bps) | Interest | any Bps) | any (Bps) |
|---|---|---|---|---|---|---|---|
| | Amortization Rate | 3.500% | | | | | |
| 0 | 02/01/02 | | | | | | |
| 1 | 02/01/03 | 17,680,538 | 2.000% | 10 | 2.100% | 0 | 28 |
| 2 | 02/01/04 | 18,299,357 | 2.500% | 10 | 2.600% | 0 | 28 |
| 3 | 02/01/05 | 18,939,835 | 3.500% | 10 | 3.600% | 0 | 28 |
| 4 | 02/01/06 | 19,602,729 | 4.784% | 10 | 4.884% | 0 | 28 |
| 5 | 02/01/07 | 20,288,824 | 5.032% | 10 | 5.132% | 0 | 28 |
| 6 | 02/01/08 | 20,998,933 | 5.590% | 10 | 5.690% | 0 | 28 |
| 7 | 02/01/09 | 21,733,896 | 6.497% | 10 | 6.597% | 0 | 28 |
| 8 | 02/01/10 | 22,494,582 | 5.795% | 10 | 5.895% | 0 | 28 |
| 9 | 02/01/11 | 23,281,893 | 4.179% | 10 | 4.279% | 0 | 28 |
| 10 | 02/01/12 | 24,096,759 | 2.677% | 10 | 2.777% | 0 | 28 |
| 11 | 02/01/13 | 24,940,146 | 2.313% | 10 | 2.413% | 0 | 28 |
| 12 | 02/01/14 | 25,813,051 | 3.321% | 10 | 3.421% | 0 | 28 |
| 13 | 02/01/15 | 26,716,507 | 4.226% | 10 | 4.326% | 0 | 28 |
| 14 | 02/01/16 | 27,651,585 | 3.860% | 10 | 3.960% | 0 | 28 |
| 15 | 02/01/17 | 28,619,391 | 4.017% | 10 | 4.117% | 0 | 28 |
| 16 | 02/01/18 | 29,621,069 | 3.890% | 10 | 3.990% | 0 | 28 |
| 17 | 02/01/19 | 30,657,807 | 3.795% | 10 | 3.895% | 0 | 28 |
| 18 | 02/01/20 | 31,730,830 | 4.574% | 10 | 4.674% | 0 | 28 |
| 19 | 02/01/21 | 32,841,409 | 3.022% | 10 | 3.122% | 0 | 28 |
| 20 | 02/01/22 | 33,990,858 | 3.022% | 10 | 3.122% | 0 | 28 |
| 21 | 02/01/23 | 0 | 2.313% | 10 | 2.413% | 0 | 29 |
| 22 | 02/01/24 | 0 | 3.321% | 10 | 3.421% | 0 | 30 |
| 23 | 02/01/25 | 0 | 4.226% | 10 | 4.326% | 0 | 31 |
| 24 | 02/01/26 | 0 | 3.860% | 10 | 3.960% | 0 | 32 |
| 25 | 02/01/27 | 0 | 4.017% | 10 | 4.117% | 0 | 33 |
| 26 | 02/01/28 | 0 | 3.890% | 10 | 3.990% | 0 | 34 |
| 27 | 02/01/29 | 0 | 3.795% | 10 | 3.895% | 0 | 35 |
| 28 | 02/01/30 | 0 | 4.574% | 10 | 4.674% | 0 | 36 |
| 29 | 02/01/31 | 0 | 3.022% | 10 | 3.122% | 0 | 37 |
| 30 | 02/01/32 | 0 | 3.022% | 10 | 3.122% | 0 | 38 |

| | | | | Annual | |
|---|---|---|---|---|---|
| Fixed Rate Bond Yield | 4.893% | | | | |
| VRDB Rate before costs | 3.959% | | | | |
| | (0) | | | | |
| VRDB Yield | 4.339% | | | | |

| All-In Interest Cost | VRDB Interest | Debt Service | Present Value | Annual Savings vs Fixed Rate | Present Value Savings |
|---|---|---|---|---|---|
| 2.380% | 11,900,000 | 29,580,538 | 28,350,448 | 10,175,508 | 9,700,865 |
| 2.880% | 13,890,800 | 32,190,158 | 29,568,604 | 7,569,348 | 6,879,664 |
| 3.880% | 18,003,980 | 36,943,815 | 32,523,952 | 2,814,127 | 2,438,411 |
| 5.164% | 22,983,423 | 42,586,152 | 35,932,201 | (2,829,054) | (2,337,001) |
| 5.412% | 23,026,824 | 43,315,648 | 35,027,900 | (3,559,923) | (2,803,577) |
| 5.970% | 24,189,489 | 45,188,423 | 35,022,756 | (5,433,402) | (4,079,417) |
| 6.877% | 26,419,212 | 48,153,108 | 35,768,549 | (8,395,127) | (6,009,080) |
| 6.175% | 22,382,691 | 44,877,273 | 31,949,003 | (5,120,462) | (3,494,172) |
| 4.559% | 15,498,408 | 38,780,301 | 26,460,368 | 975,446 | 634,589 |
| 3.057% | 9,680,035 | 33,776,794 | 22,088,030 | 5,983,177 | 3,710,870 |
| 2.693% | 7,877,882 | 32,818,027 | 20,568,607 | 6,941,216 | 4,104,250 |
| 3.701% | 9,906,276 | 35,719,327 | 21,456,038 | 4,039,155 | 2,276,895 |
| 4.606% | 11,137,573 | 37,854,080 | 21,792,790 | 1,904,585 | 1,023,546 |
| 4.240% | 9,120,717 | 36,772,302 | 20,289,662 | 2,986,285 | 1,530,004 |
| 4.397% | 8,243,405 | 36,862,796 | 19,493,782 | 2,895,965 | 1,414,520 |
| 4.270% | 6,782,428 | 36,403,497 | 18,450,358 | 3,351,728 | 1,560,770 |
| 4.175% | 5,395,218 | 36,053,024 | 17,512,867 | 3,704,211 | 1,644,449 |
| 4.954% | 4,883,230 | 36,614,060 | 17,045,796 | 3,143,723 | 1,330,525 |
| 3.402% | 2,273,432 | 35,114,841 | 15,668,015 | 4,643,243 | 1,873,504 |
| 3.402% | 1,156,266 | 35,147,125 | 15,030,275 | 4,605,909 | 1,771,753 |
| 2.703% | 0 | 0 | 0 | 0 | 0 |
| 3.721% | 0 | 0 | 0 | 0 | 0 |
| 4.636% | 0 | 0 | 0 | 0 | 0 |
| 4.280% | 0 | 0 | 0 | 0 | 0 |
| 4.447% | 0 | 0 | 0 | 0 | 0 |
| 4.330% | 0 | 0 | 0 | 0 | 0 |
| 4.245% | 0 | 0 | 0 | 0 | 0 |
| 5.034% | 0 | 0 | 0 | 0 | 0 |
| 3.492% | 0 | 0 | 0 | 0 | 0 |
| 3.502% | 0 | 0 | 0 | 0 | 0 |
| | | | 500,000,000 | 40,395,658 | 23,171,370 |

*FIG. 18D*

| | | | | Spread to | | Liquidity | Remkg |
| | | VRDB | | BMA | VRDB | Cost, if | Cost, if any |
| Period | Maturity | Principal | BMA | (Bps) | Interest | any Bps) | (Bps) |
|---|---|---|---|---|---|---|---|
| | Term of Issue | 20 | | | | | |
| | Average BMA | 3.930% | | | | | |
| 0 | 02/01/02 | | | | | | |
| 1 | 02/01/03 | 17,030,000 | 2.000% | 10 | 2.100% | | 28 |
| 2 | 02/01/04 | 17,340,000 | 2.500% | 10 | 2.600% | | 28 |
| 3 | 02/01/05 | 17,765,000 | 3.500% | 10 | 3.600% | | 28 |
| 4 | 02/01/06 | 18,290,000 | 4.784% | 10 | 4.884% | | 28 |
| 5 | 02/01/07 | 18,905,000 | 5.032% | 10 | 5.132% | | 28 |
| 6 | 02/01/08 | 19,600,000 | 5.590% | 10 | 5.690% | | 28 |
| 7 | 02/01/09 | 20,385,000 | 6.497% | 10 | 6.597% | | 28 |
| 8 | 02/01/10 | 21,240,000 | 5.795% | 10 | 5.895% | | 28 |
| 9 | 02/01/11 | 22,165,000 | 4.179% | 10 | 4.279% | | 28 |
| 10 | 02/01/12 | 23,160,000 | 2.677% | 10 | 2.777% | | 28 |
| 11 | 02/01/13 | 24,220,000 | 2.313% | 10 | 2.413% | | 28 |
| 12 | 02/01/14 | 25,360,000 | 3.321% | 10 | 3.421% | | 28 |
| 13 | 02/01/15 | 26,580,000 | 4.226% | 10 | 4.326% | | 28 |
| 14 | 02/01/16 | 27,885,000 | 3.860% | 10 | 3.960% | | 28 |
| 15 | 02/01/17 | 29,285,000 | 4.017% | 10 | 4.117% | | 28 |
| 16 | 02/01/18 | 30,775,000 | 3.890% | 10 | 3.990% | | 28 |
| 17 | 02/01/19 | 32,365,000 | 3.795% | 10 | 3.895% | | 28 |
| 18 | 02/01/20 | 34,055,000 | 4.574% | 10 | 4.674% | | 28 |
| 19 | 02/01/21 | 35,850,000 | 3.022% | 10 | 3.122% | | 28 |
| 20 | 02/01/22 | 37,745,000 | 3.022% | 10 | 3.122% | | 28 |
| 21 | 02/01/23 | 0 | 2.313% | 10 | 2.413% | | 29 |
| 22 | 02/01/24 | 0 | 3.321% | 10 | 3.421% | | 30 |
| 23 | 02/01/25 | 0 | 4.226% | 10 | 4.326% | | 31 |
| 24 | 02/01/26 | 0 | 3.860% | 10 | 3.960% | | 32 |
| 25 | 02/01/27 | 0 | 4.017% | 10 | 4.117% | | 33 |
| 26 | 02/01/28 | 0 | 3.890% | 10 | 3.990% | | 34 |
| 27 | 02/01/29 | 0 | 3.795% | 10 | 3.895% | | 35 |
| 28 | 02/01/30 | 0 | 4.574% | 10 | 4.674% | | 36 |
| 29 | 02/01/31 | 0 | 3.022% | 10 | 3.122% | | 37 |
| 30 | 02/01/32 | 0 | 3.022% | 10 | 3.122% | | 38 |
| | | 500,000,000 | | | | | |

*FIG. 18E*

|  | Fixed Rate Bond Yield | 4.893% |
|--|--|--|
|  | VRDB Rate before costs | 3.961% |
|  |  | (0) |
|  | VRDB Yield | 4.341% |

| All-In Interest Cost | VRDB Interest | Debt Service | Present Value | Annual Savings vs Fixed Rate | Present Value Savings |
|---|---|---|---|---|---|
| 2.380% | 11,900,000 | 28,930,000 | 27,726,409 | 10,826,046 | 10,321,059 |
| 2.880% | 13,909,536 | 31,249,536 | 28,703,441 | 8,509,970 | 7,734,581 |
| 3.880% | 18,066,444 | 35,831,444 | 31,542,775 | 3,926,498 | 3,402,268 |
| 5.164% | 23,127,223 | 41,417,223 | 34,943,127 | (1,660,125) | (1,371,382) |
| 5.412% | 23,248,578 | 42,153,578 | 34,084,775 | (2,397,853) | (1,888,402) |
| 5.970% | 24,516,718 | 44,116,718 | 34,188,054 | (4,361,697) | (3,274,778) |
| 6.877% | 26,892,338 | 47,277,338 | 35,113,118 | (7,519,357) | (5,382,219) |
| 6.175% | 22,890,862 | 44,130,862 | 31,412,608 | (4,374,051) | (2,984,826) |
| 4.559% | 15,930,758 | 38,095,758 | 25,988,630 | 1,659,989 | 1,079,928 |
| 3.057% | 10,004,067 | 33,164,067 | 21,683,019 | 6,595,905 | 4,090,894 |
| 2.693% | 8,188,529 | 32,408,529 | 20,307,501 | 7,350,715 | 4,346,381 |
| 3.701% | 10,359,964 | 35,719,964 | 21,451,288 | 4,038,517 | 2,276,536 |
| 4.606% | 11,722,963 | 38,302,963 | 22,045,499 | 1,455,702 | 782,311 |
| 4.240% | 9,665,428 | 37,550,428 | 20,713,221 | 2,208,160 | 1,131,337 |
| 4.397% | 8,798,076 | 38,083,076 | 20,133,069 | 1,675,685 | 818,480 |
| 4.270% | 7,292,599 | 38,067,599 | 19,287,620 | 1,687,626 | 785,862 |
| 4.175% | 5,845,891 | 38,210,891 | 18,554,768 | 1,546,344 | 686,484 |
| 4.954% | 5,333,433 | 39,388,433 | 18,330,835 | 369,350 | 156,321 |
| 3.402% | 2,503,480 | 38,353,480 | 17,106,593 | 1,404,604 | 566,744 |
| 3.402% | 1,283,971 | 39,028,971 | 16,683,649 | 724,063 | 278,525 |
| 2.703% | 0 | 0 | 0 | 0 | 0 |
| 3.721% | 0 | 0 | 0 | 0 | 0 |
| 4.636% | 0 | 0 | 0 | 0 | 0 |
| 4.280% | 0 | 0 | 0 | 0 | 0 |
| 4.447% | 0 | 0 | 0 | 0 | 0 |
| 4.330% | 0 | 0 | 0 | 0 | 0 |
| 4.245% | 0 | 0 | 0 | 0 | 0 |
| 5.034% | 0 | 0 | 0 | 0 | 0 |
| 3.492% | 0 | 0 | 0 | 0 | 0 |
| 3.502% | 0 | 0 | 0 | 0 | 0 |
|  |  |  | 500,000,000 | 33,666,090 | 23,556,106 |

*FIG. 18F*

| Period | Maturity | Principal Balance | All-in VRDB Rate | Interest | Maturing Principal | Maturing Principal Plus Interest | Savings vs Fixed Rate before Additional Principal | Additional Principal | Other Principal Adjustments |
|---|---|---|---|---|---|---|---|---|---|
| 0 | 02/01/02 | 500,000,000 | | | | | | | |
| 1 | 02/01/03 | 492,143,954 | 2.380% | 11,900,000 | 17,030,000 | 28,930,000 | 10,826,046 | 10,826,046 | (20,000,000) |
| 2 | 02/01/04 | 486,558,194 | 2.880% | 14,173,746 | 17,340,000 | 31,513,746 | 8,245,760 | 8,245,760 | (20,000,000) |
| 3 | 02/01/05 | 465,678,710 | 3.880% | 18,878,458 | 17,765,000 | 36,643,458 | 3,114,484 | 3,114,484 | |
| 4 | 02/01/06 | 449,968,714 | 5.164% | 24,047,103 | 18,290,000 | 42,337,103 | (2,580,005) | (2,580,005) | |
| 5 | 02/01/07 | 434,565,274 | 5.412% | 24,352,285 | 18,905,000 | 43,257,285 | (3,501,560) | (3,501,560) | |
| 6 | 02/01/08 | 420,753,503 | 5.970% | 25,943,250 | 19,600,000 | 45,543,250 | (5,788,229) | (5,788,229) | |
| 7 | 02/01/09 | 409,929,077 | 6.877% | 28,933,555 | 20,385,000 | 49,318,555 | (9,560,574) | (9,560,574) | |
| 8 | 02/01/10 | 395,486,562 | 6.175% | 25,314,297 | 21,240,000 | 46,554,297 | (6,797,486) | (6,797,486) | |
| 9 | 02/01/11 | 373,760,550 | 4.559% | 18,029,735 | 22,165,000 | 40,194,735 | (438,988) | (438,988) | |
| 10 | 02/01/12 | 345,425,430 | 3.057% | 11,424,852 | 23,160,000 | 34,584,852 | 5,175,120 | 5,175,120 | |
| 11 | 02/01/13 | 314,966,877 | 2.693% | 9,300,691 | 24,220,000 | 33,520,691 | 6,238,553 | 6,238,553 | |
| 12 | 02/01/14 | 286,866,293 | 3.701% | 11,657,898 | 25,360,000 | 37,017,898 | 2,740,584 | 2,740,584 | |
| 13 | 02/01/15 | 260,319,394 | 4.606% | 13,211,766 | 26,580,000 | 39,791,766 | (33,101) | (33,101) | |
| 14 | 02/01/16 | 231,598,262 | 4.240% | 11,037,455 | 27,885,000 | 38,922,455 | 836,132 | 836,132 | |
| 15 | 02/01/17 | 202,023,778 | 4.397% | 10,184,276 | 29,285,000 | 39,469,276 | 289,484 | 289,484 | |
| 16 | 02/01/18 | 170,894,809 | 4.270% | 8,626,257 | 30,775,000 | 39,401,257 | 353,969 | 353,969 | |
| 17 | 02/01/19 | 138,272,755 | 4.175% | 7,135,182 | 32,365,000 | 39,500,182 | 257,054 | 257,054 | |
| 18 | 02/01/20 | 105,365,586 | 4.954% | 6,850,613 | 34,055,000 | 40,905,613 | (1,147,830) | (1,147,830) | |
| 19 | 02/01/21 | 69,191,721 | 3.402% | 3,584,219 | 35,850,000 | 39,434,219 | 323,865 | 323,865 | |
| 20 | 02/01/22 | 31,792,381 | 3.402% | 2,353,694 | 37,745,000 | 40,098,694 | (345,660) | (345,660) | |
| 21 | 02/01/23 | 0 | 2.703% | 859,199 | 0 | 859,199 | (859,199) | (859,199) | |
| 22 | 02/01/24 | | 3.721% | 0 | 0 | 0 | 0 | 0 | |
| 23 | 02/01/25 | | 4.636% | 0 | 0 | 0 | 0 | 0 | |
| 24 | 02/01/26 | | 4.280% | 0 | 0 | 0 | 0 | 0 | |
| 25 | 02/01/27 | | 4.447% | 0 | 0 | 0 | 0 | 0 | |
| 26 | 02/01/28 | | 4.330% | 0 | 0 | 0 | 0 | 0 | |
| 27 | 02/01/29 | | 4.245% | 0 | 0 | 0 | 0 | 0 | |
| 28 | 02/01/30 | | 5.034% | 0 | 0 | 0 | 0 | 0 | |
| 29 | 02/01/31 | | 3.492% | 0 | 0 | 0 | 0 | 0 | |
| 30 | 02/01/32 | | 3.502% | 0 | 500,000,000 | 0 | 0 | 40,000,000 | (40,000,000) |

FIG. 18G

| | Fixed Rate Bond Yield | 4.893% | | Gross Savings | 7,348,420 |
|---|---|---|---|---|---|
| | Reduction in Yield from Accelerating DS | (0.004%) | | Present Value Savings | 25,270,587 |
| | BMA | 3.965% | | | |
| | | (0) | | | |
| | VRDB Yield | 4.345% | | | |

| Cumulative Total Principal Paid | Actual Principal Amortization | Total Debt Service | Present Value | Savings vs Fixed Rate | Present Value Savings From VRDBs | Breakeven VRDB Rate before spread and costs | All-in VRDB Breakeven Rate |
|---|---|---|---|---|---|---|---|
| 7,856,046 | 7,856,046 | 19,756,046 | 18,933,362 | 20,000,000 | 19,067,088 | 4.512% | 4.892% |
| 13,441,806 | 5,585,760 | 19,759,506 | 18,148,113 | 20,000,000 | 18,177,693 | 4.328% | 4.708% |
| 34,321,290 | 20,879,484 | 39,757,942 | 34,995,081 | 0 | 0 | 4.040% | 4.420% |
| 50,031,286 | 15,709,995 | 39,757,098 | 33,537,098 | 0 | 0 | 4.113% | 4.493% |
| 65,434,726 | 15,403,440 | 39,755,725 | 32,139,431 | 0 | 0 | 4.017% | 4.397% |
| 79,246,497 | 13,811,771 | 39,755,021 | 30,800,530 | 0 | 0 | 3.864% | 4.244% |
| 90,070,923 | 10,824,426 | 39,757,981 | 29,520,127 | 0 | 0 | 3.592% | 3.972% |
| 104,513,438 | 14,442,514 | 39,756,811 | 28,290,013 | 0 | 0 | 3.107% | 3.487% |
| 126,239,450 | 21,726,012 | 39,755,747 | 27,111,230 | 0 | 0 | 2.630% | 3.010% |
| 154,574,570 | 28,335,120 | 39,759,972 | 25,985,021 | 0 | 0 | 2.335% | 2.715% |
| 185,033,123 | 30,458,553 | 39,759,244 | 24,902,492 | 0 | 0 | 2.263% | 2.643% |
| 213,133,707 | 28,100,584 | 39,758,482 | 23,865,042 | 0 | 0 | 2.251% | 2.631% |
| 239,680,606 | 26,546,899 | 39,758,666 | 22,871,355 | 0 | 0 | 1.973% | 2.353% |
| 268,401,738 | 28,721,132 | 39,758,588 | 21,918,900 | 0 | 0 | 1.319% | 1.699% |
| 297,976,222 | 29,574,484 | 39,758,761 | 21,006,241 | 0 | 0 | 0.472% | 0.852% |
| 329,105,191 | 31,128,969 | 39,755,226 | 20,129,706 | 0 | 0 | (0.918%) | (0.538%) |
| 361,727,245 | 32,622,054 | 39,757,236 | 19,292,437 | 0 | 0 | (3.198%) | (2.818%) |
| 394,634,414 | 32,907,170 | 39,757,763 | 18,489,312 | 0 | 0 | (7.421%) | (7.041%) |
| 430,808,279 | 36,173,865 | 39,758,084 | 17,719,512 | 0 | 0 | (17.254%) | (16.874%) |
| 468,207,619 | 37,399,340 | 39,753,034 | 16,979,476 | 0 | 0 | (42.927%) | (42.547%) |
| 500,000,000 | 31,792,381 | 32,651,580 | 13,365,522 | (32,651,580) | (11,974,194) | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| | 500,000,000 | | 500,000,000 | 7,348,420 | 25,270,587 | | |

*FIG. 18H*

| Period | Maturity | Principal Balance | All-in VRDB Rate | Interest | Maturing Principal | Maturing Principal Plus Interest | Savings vs Fixed Rate before Additional Principal | Additional Principal | Other Principal Adjustments |
|---|---|---|---|---|---|---|---|---|---|
| 0 | 02/01/02 | | | | | | | | |
| 1 | 02/01/03 | 500,000,000 | 2.380% | 11,900,000 | 17,030,000 | 28,930,000 | 10,826,046 | 10,826,046 | (1,900,000) |
| 2 | 02/01/04 | 474,043,954 | 2.880% | 13,652,466 | 17,340,000 | 30,992,466 | 8,767,040 | 8,767,040 | (1,900,000) |
| 3 | 02/01/05 | 449,836,914 | 3.880% | 17,453,672 | 17,765,000 | 35,218,672 | 4,539,270 | 4,539,270 | (1,900,000) |
| 4 | 02/01/06 | 429,432,644 | 5.164% | 22,175,398 | 18,290,000 | 40,465,398 | (708,300) | (708,300) | (1,900,000) |
| 5 | 02/01/07 | 413,750,944 | 5.412% | 22,392,181 | 18,905,000 | 41,297,181 | (1,541,456) | (1,541,456) | (1,900,000) |
| 6 | 02/01/08 | 398,287,400 | 5.970% | 23,777,485 | 19,600,000 | 43,377,485 | (3,622,464) | (3,622,464) | (1,900,000) |
| 7 | 02/01/09 | 384,209,865 | 6.877% | 26,420,593 | 20,385,000 | 46,805,593 | (7,047,612) | (7,047,612) | (1,900,000) |
| 8 | 02/01/10 | 372,772,477 | 6.175% | 23,019,770 | 21,240,000 | 44,259,770 | (4,502,959) | (4,502,959) | (1,900,000) |
| 9 | 02/01/11 | 357,935,436 | 4.559% | 16,317,826 | 22,165,000 | 38,482,826 | 1,272,921 | 1,272,921 | (1,900,000) |
| 10 | 02/01/12 | 336,397,515 | 3.057% | 10,282,765 | 23,160,000 | 33,442,765 | 6,317,207 | 6,317,207 | (1,900,000) |
| 11 | 02/01/13 | 308,820,308 | 2.693% | 8,315,086 | 24,220,000 | 32,535,086 | 7,224,158 | 7,224,158 | (1,900,000) |
| 12 | 02/01/14 | 279,276,150 | 3.701% | 10,336,873 | 25,360,000 | 35,696,873 | 4,061,608 | 4,061,608 | (1,900,000) |
| 13 | 02/01/15 | 251,754,542 | 4.606% | 11,594,678 | 26,580,000 | 38,174,678 | 1,583,988 | 1,583,988 | (1,900,000) |
| 14 | 02/01/16 | 225,490,554 | 4.240% | 9,560,724 | 27,885,000 | 37,445,724 | 2,312,863 | 2,312,863 | (1,900,000) |
| 15 | 02/01/17 | 197,192,691 | 4.397% | 8,671,329 | 29,285,000 | 37,956,329 | 1,802,431 | 1,802,431 | (1,900,000) |
| 16 | 02/01/18 | 168,005,260 | 4.270% | 7,173,693 | 30,775,000 | 37,948,693 | 1,806,533 | 1,806,533 | (1,900,000) |
| 17 | 02/01/19 | 137,323,727 | 4.175% | 5,733,526 | 32,365,000 | 38,098,526 | 1,658,710 | 1,658,710 | (1,900,000) |
| 18 | 02/01/20 | 105,200,018 | 4.954% | 5,212,051 | 34,055,000 | 39,267,051 | 490,732 | 490,732 | (1,900,000) |
| 19 | 02/01/21 | 72,554,286 | 3.402% | 2,468,078 | 35,850,000 | 38,318,078 | 1,440,006 | 1,440,006 | (1,900,000) |
| 20 | 02/01/22 | 37,164,280 | 3.402% | 1,264,217 | 37,164,280 | 38,428,496 | 1,324,538 | 0 | 0 |
| 21 | 02/01/23 | 0 | 2.703% | 0 | 0 | 0 | 0 | 0 | |
| 22 | 02/01/24 | 0 | 3.721% | 0 | 0 | 0 | 0 | 0 | |
| 23 | 02/01/25 | 0 | 4.636% | 0 | 0 | 0 | 0 | 0 | |
| 24 | 02/01/26 | 0 | 4.280% | 0 | 0 | 0 | 0 | 0 | |
| 25 | 02/01/27 | 0 | 4.447% | 0 | 0 | 0 | 0 | 0 | |
| 26 | 02/01/28 | 0 | 4.330% | 0 | 0 | 0 | 0 | 0 | |
| 27 | 02/01/29 | 0 | 4.245% | 0 | 0 | 0 | 0 | 0 | |
| 28 | 02/01/30 | 0 | 5.034% | 0 | 0 | 0 | 0 | 0 | |
| 29 | 02/01/31 | 0 | 3.492% | 0 | 0 | 0 | 0 | 0 | |
| 30 | 02/01/32 | 0 | 3.502% | 0 | 0 | 0 | 0 | 0 | |
| | | | | | 499,419,260 | | | 36,680,720 | (36,100,000) |

*FIG. 181*

|  | Fixed Rate Bond Yield | 4.893% | Gross Savings | 37,424,538 |
|  | Reduction in Yield from Accelerating DS | 0.010% | Present Value Savings | 23,673,579 |
|  | BMA | 3.951% |  |  |
|  |  | (0) |  |  |
|  | VRDB Yield | 4.331% |  |  |

| Cumulative Total Principal Paid | Actual Principal Amortization | Total Debt Service | Present Value | Savings vs Fixed Rate | Present Value Savings From VRDBs | Breakeven VRDB Rate before spread and costs | All-in VRDB Breakeven Rate |
| --- | --- | --- | --- | --- | --- | --- | --- |
|  |  |  |  |  |  | 4.512% | 4.892% |
| 25,956,046 | 25,956,046 | 37,856,046 | 36,284,689 | 1,900,000 | 1,811,373 | 4.787% | 5.167% |
| 50,163,086 | 24,207,040 | 37,859,506 | 34,781,735 | 1,900,000 | 1,726,881 | 5.041% | 5.421% |
| 70,567,356 | 20,404,270 | 37,857,942 | 33,336,612 | 1,900,000 | 1,646,329 | 5.200% | 5.580% |
| 86,249,056 | 15,681,700 | 37,857,098 | 31,952,138 | 1,900,000 | 1,569,535 | 5.195% | 5.575% |
| 101,712,600 | 15,463,544 | 37,855,725 | 30,624,734 | 1,900,000 | 1,496,324 | 5.149% | 5.529% |
| 115,790,136 | 14,077,536 | 37,855,021 | 29,352,993 | 1,900,000 | 1,426,527 | 4.998% | 5.378% |
| 127,227,523 | 11,437,388 | 37,857,981 | 28,136,787 | 1,900,000 | 1,359,986 | 4.651% | 5.031% |
| 142,064,564 | 14,837,041 | 37,856,811 | 26,968,031 | 1,900,000 | 1,296,548 | 4.343% | 4.723% |
| 163,602,485 | 21,537,921 | 37,856,747 | 25,847,895 | 1,900,000 | 1,236,079 | 4.271% | 4.651% |
| 191,179,692 | 27,577,207 | 37,859,972 | 24,777,746 | 1,900,000 | 1,178,413 | 4.499% | 4.879% |
| 220,723,850 | 29,544,158 | 37,859,244 | 23,748,796 | 1,900,000 | 1,123,445 | 4.886% | 5.266% |
| 248,245,458 | 27,521,608 | 37,858,482 | 22,762,555 | 1,900,000 | 1,071,041 | 5.130% | 5.510% |
| 274,509,446 | 26,263,988 | 37,858,666 | 21,817,815 | 1,900,000 | 1,021,082 | 5.176% | 5.556% |
| 302,807,309 | 28,297,863 | 37,858,588 | 20,912,142 | 1,900,000 | 973,453 | 5.347% | 5.727% |
| 331,994,740 | 29,187,431 | 37,858,761 | 20,044,197 | 1,900,000 | 928,046 | 5.501% | 5.881% |
| 362,676,273 | 30,681,533 | 37,855,226 | 19,210,393 | 1,900,000 | 884,757 | 5.760% | 6.140% |
| 394,799,982 | 32,123,710 | 37,857,236 | 18,413,971 | 1,900,000 | 843,487 | 6.170% | 6.550% |
| 427,445,714 | 32,645,732 | 37,857,783 | 17,649,885 | 1,900,000 | 804,142 | 5.952% | 6.332% |
| 462,835,720 | 35,390,006 | 37,856,084 | 16,917,395 | 1,900,000 | 766,632 | 6.586% | 6.966% |
| 500,000,000 | 37,164,280 | 36,428,496 | 16,459,491 | 1,324,538 | 509,509 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
|  | 500,000,000 |  | 500,000,000 | 37,424,538 | 23,673,579 |  |  |

*FIG. 18J*

| Period | Maturity | Principal Balance | All-in VRDB Rate | Interest | Maturing Principal | Maturing Principal Plus Interest | Savings vs Fixed Rate before Additional Principal | Additional Principal | Other Principal Adjustments |
|---|---|---|---|---|---|---|---|---|---|
| 0 | 02/01/02 | | | | | | | | |
| 1 | 02/01/03 | 500,000,000 | 2.380% | 11,900,000 | 17,030,000 | 28,930,000 | 10,826,046 | 10,826,046 | (10,000,000) |
| 2 | 02/01/04 | 482,143,954 | 2.880% | 13,885,746 | 17,340,000 | 31,225,746 | 8,533,760 | 8,533,760 | |
| 3 | 02/01/05 | 456,270,194 | 3.880% | 17,703,284 | 17,765,000 | 35,468,284 | 4,289,658 | 4,289,658 | |
| 4 | 02/01/06 | 434,215,535 | 5.164% | 22,422,381 | 18,290,000 | 40,712,381 | (955,283) | (955,283) | |
| 5 | 02/01/07 | 416,880,819 | 5.412% | 22,561,569 | 18,905,000 | 41,466,569 | (1,710,844) | (1,710,844) | |
| 6 | 02/01/08 | 399,686,663 | 5.970% | 23,861,020 | 19,600,000 | 43,461,020 | (3,705,999) | (3,705,999) | |
| 7 | 02/01/09 | 383,792,662 | 6.877% | 26,391,904 | 20,385,000 | 46,776,904 | (7,018,923) | (7,018,923) | |
| 8 | 02/01/10 | 370,426,585 | 6.175% | 22,874,904 | 21,240,000 | 44,114,904 | (4,358,093) | (4,358,093) | |
| 9 | 02/01/11 | 353,544,679 | 4.559% | 16,117,657 | 22,165,000 | 38,282,657 | 1,473,090 | 1,473,090 | |
| 10 | 02/01/12 | 329,906,589 | 3.057% | 10,084,355 | 23,160,000 | 33,244,355 | 6,515,617 | 6,515,617 | |
| 11 | 02/01/13 | 300,230,972 | 2.693% | 8,083,815 | 24,220,000 | 32,303,815 | 7,455,428 | 7,455,428 | |
| 12 | 02/01/14 | 268,555,544 | 3.701% | 9,940,071 | 25,360,000 | 35,300,071 | 4,456,411 | 4,456,411 | |
| 13 | 02/01/15 | 238,737,133 | 4.606% | 10,995,154 | 26,580,000 | 37,575,154 | 2,183,511 | 2,183,511 | |
| 14 | 02/01/16 | 209,973,622 | 4.240% | 8,902,811 | 27,885,000 | 36,787,811 | 2,970,776 | 2,970,776 | |
| 15 | 02/01/17 | 179,117,846 | 4.397% | 7,876,508 | 29,285,000 | 37,161,508 | 2,597,252 | 2,597,252 | |
| 16 | 02/01/18 | 147,235,593 | 4.270% | 6,286,844 | 30,775,000 | 37,061,844 | 2,693,381 | 2,693,381 | |
| 17 | 02/01/19 | 113,767,212 | 4.175% | 4,749,997 | 32,365,000 | 37,114,997 | 2,642,239 | 2,642,239 | |
| 18 | 02/01/20 | 78,759,973 | 4.954% | 3,902,100 | 34,055,000 | 37,957,100 | 1,800,683 | 1,800,683 | |
| 19 | 02/01/21 | 42,904,291 | 3.402% | 1,459,475 | 35,850,000 | 37,309,475 | 2,448,609 | 2,448,609 | |
| 20 | 02/01/22 | 4,605,681 | 3.402% | 156,671 | 4,605,681 | 4,762,352 | 34,990,682 | 0 | |
| 21 | 02/01/23 | 0 | 2.703% | 0 | 0 | 0 | 0 | 0 | |
| 22 | 02/01/24 | 0 | 3.721% | 0 | 0 | 0 | 0 | 0 | |
| 23 | 02/01/25 | 0 | 4.636% | 0 | 0 | 0 | 0 | 0 | |
| 24 | 02/01/26 | 0 | 4.280% | 0 | 0 | 0 | 0 | 0 | |
| 25 | 02/01/27 | 0 | 4.447% | 0 | 0 | 0 | 0 | 0 | |
| 26 | 02/01/28 | 0 | 4.330% | 0 | 0 | 0 | 0 | 0 | |
| 27 | 02/01/29 | 0 | 4.245% | 0 | 0 | 0 | 0 | 0 | |
| 28 | 02/01/30 | 0 | 5.034% | 0 | 0 | 0 | 0 | 0 | |
| 29 | 02/01/31 | 0 | 3.492% | 0 | 0 | 0 | 0 | 0 | |
| 30 | 02/01/32 | 0 | 3.502% | 0 | 0 | 0 | 0 | 0 | |
| | | | | | 466,860,681 | | | 43,139,319 | (10,000,000) |

*FIG. 18K*

|  |  |  |
|---|---|---|
| Fixed Rate Bond Yield | 4.893% |  |
| Reduction in Yield from Accelerating DS | 0.004% |  |
| BMA | 3.957% |  |
|  | 0 |  |
| VRDB Yield | 4.337% |  |

| | |
|---|---|
| Gross Savings | 44,990,682 |
| Present Value Savings | 22,993,391 |

| Cumulative Total Principal Paid | Actual Principal Amortization | Total Debt Service | Present Value | Savings vs Fixed Rate | Present Value Savings From VRDBs | Breakeven VRDB Rate before spread and costs | All-in VRDB Breakeven Rate |
|---|---|---|---|---|---|---|---|
|  |  |  |  |  |  | 4.512% | 4.892% |
| 17,856,046 | 17,856,046 | 29,756,046 | 28,519,229 | 10,000,000 | 9,533,544 | 4.578% | 4.958% |
| 43,729,806 | 25,873,760 | 39,759,506 | 36,522,970 | 0 | 0 | 4.857% | 5.237% |
| 65,784,465 | 22,054,658 | 39,757,942 | 35,003,506 | 0 | 0 | 5.049% | 5.429% |
| 83,119,181 | 17,334,717 | 39,757,098 | 33,547,865 | 0 | 0 | 5.087% | 5.467% |
| 100,313,337 | 17,194,156 | 39,755,725 | 32,152,329 | 0 | 0 | 5.096% | 5.476% |
| 116,207,338 | 15,894,001 | 39,755,021 | 30,815,364 | 0 | 0 | 5.015% | 5.395% |
| 129,573,415 | 13,366,077 | 39,757,981 | 29,536,715 | 0 | 0 | 4.756% | 5.136% |
| 146,455,321 | 16,881,907 | 39,756,811 | 28,308,181 | 0 | 0 | 4.561% | 4.941% |
| 170,093,411 | 23,638,090 | 39,755,747 | 27,130,818 | 0 | 0 | 4.641% | 5.021% |
| 199,769,028 | 29,675,617 | 39,759,972 | 26,005,882 | 0 | 0 | 5.082% | 5.462% |
| 231,444,456 | 31,675,428 | 39,759,244 | 24,924,485 | 0 | 0 | 5.780% | 6.160% |
| 261,262,867 | 29,818,411 | 39,758,482 | 23,888,034 | 0 | 0 | 6.476% | 6.856% |
| 290,026,378 | 28,763,511 | 39,758,666 | 22,895,228 | 0 | 0 | 7.204% | 7.584% |
| 320,882,154 | 30,855,776 | 39,758,588 | 21,943,539 | 0 | 0 | 8.477% | 8.857% |
| 352,764,407 | 31,882,252 | 39,758,761 | 21,031,542 | 0 | 0 | 10.538% | 10.918% |
| 386,232,788 | 33,468,381 | 39,755,226 | 20,155,569 | 0 | 0 | 14.506% | 14.886% |
| 421,240,027 | 35,007,239 | 39,757,236 | 19,318,774 | 0 | 0 | 23.630% | 24.010% |
| 457,095,709 | 35,855,683 | 39,757,783 | 18,516,039 | 0 | 0 | 52.787% | 53.167% |
| 495,394,319 | 38,298,609 | 39,758,084 | 17,746,550 | 0 | 0 | 762.750% | 763.130% |
| 500,000,000 | 4,605,681 | 4,762,352 | 2,037,383 | 34,990,682 | 13,459,847 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
|  | 500,000,000 |  | 500,000,000 | 44,990,682 | 22,993,391 |  |  |

*FIG. 18L*

| Period | Maturity | Principal Balance | All-in VRDB Rate | Interest | Maturing Principal | Maturing Principal Plus Interest | Savings vs Fixed Rate before Additional Principal | Additional Principal | Other Principal Adjustments |
|---|---|---|---|---|---|---|---|---|---|
| 0 | 02/01/02 | | | | | | | | 0 |
| 1 | 02/01/03 | 500,000,000 | 2.380% | 11,900,000 | 17,030,000 | 28,930,000 | 10,826,046 | 10,826,046 | |
| 2 | 02/01/04 | 472,143,954 | 2.880% | 13,597,746 | 17,340,000 | 30,937,746 | 8,821,760 | 8,821,760 | |
| 3 | 02/01/05 | 445,982,194 | 3.860% | 17,304,109 | 17,765,000 | 35,069,109 | 4,688,833 | 4,688,833 | |
| 4 | 02/01/06 | 423,528,361 | 5.164% | 21,870,508 | 18,290,000 | 40,160,508 | (403,410) | (403,410) | |
| 5 | 02/01/07 | 405,641,771 | 5.412% | 21,953,313 | 18,905,000 | 40,858,313 | (1,102,588) | (1,102,588) | |
| 6 | 02/01/08 | 387,839,359 | 5.970% | 23,153,745 | 19,600,000 | 42,753,745 | (2,998,724) | (2,998,724) | |
| 7 | 02/01/09 | 371,238,082 | 6.877% | 25,528,575 | 20,385,000 | 45,913,575 | (6,155,594) | (6,155,594) | |
| 8 | 02/01/10 | 357,008,676 | 6.175% | 22,046,310 | 21,240,000 | 43,286,310 | (3,529,499) | (3,529,499) | |
| 9 | 02/01/11 | 339,298,175 | 4.559% | 15,468,177 | 22,165,000 | 37,633,177 | 2,122,570 | 2,122,570 | |
| 10 | 02/01/12 | 315,010,605 | 3.057% | 9,629,025 | 23,160,000 | 32,789,025 | 6,970,947 | 6,970,947 | |
| 11 | 02/01/13 | 284,679,658 | 2.693% | 7,670,476 | 24,220,000 | 31,890,476 | 7,868,767 | 7,868,767 | |
| 12 | 02/01/14 | 252,790,891 | 3.701% | 9,356,572 | 25,360,000 | 34,716,572 | 5,041,909 | 5,041,909 | |
| 13 | 02/01/15 | 222,388,982 | 4.606% | 10,242,232 | 26,580,000 | 36,822,232 | 2,936,433 | 2,936,433 | |
| 14 | 02/01/16 | 192,872,548 | 4.240% | 8,177,732 | 27,885,000 | 36,062,732 | 3,695,856 | 3,695,856 | |
| 15 | 02/01/17 | 161,291,693 | 4.397% | 7,092,623 | 29,285,000 | 36,377,623 | 3,381,138 | 3,381,138 | |
| 16 | 02/01/18 | 128,625,555 | 4.270% | 5,492,210 | 30,775,000 | 36,267,210 | 3,488,015 | 3,488,015 | |
| 17 | 02/01/19 | 94,362,540 | 4.175% | 3,939,815 | 32,365,000 | 36,304,815 | 3,452,421 | 3,452,421 | |
| 18 | 02/01/20 | 58,545,119 | 4.954% | 2,900,571 | 34,055,000 | 36,955,571 | 2,802,212 | 2,802,212 | |
| 19 | 02/01/21 | 21,687,908 | 3.402% | 737,757 | 21,687,908 | 22,425,665 | 17,332,419 | 0 | |
| 20 | 02/01/22 | 0 | 3.402% | 0 | 0 | 0 | 39,753,034 | 0 | |
| 21 | 02/01/23 | 0 | 2.703% | 0 | 0 | 0 | 0 | 0 | |
| 22 | 02/01/24 | 0 | 3.721% | 0 | 0 | 0 | 0 | 0 | |
| 23 | 02/01/25 | 0 | 4.636% | 0 | 0 | 0 | 0 | 0 | |
| 24 | 02/01/26 | 0 | 4.260% | 0 | 0 | 0 | 0 | 0 | |
| 25 | 02/01/27 | 0 | 4.447% | 0 | 0 | 0 | 0 | 0 | |
| 26 | 02/01/28 | 0 | 4.330% | 0 | 0 | 0 | 0 | 0 | |
| 27 | 02/01/29 | 0 | 4.245% | 0 | 0 | 0 | 0 | 0 | |
| 28 | 02/01/30 | 0 | 5.034% | 0 | 0 | 0 | 0 | 0 | |
| 29 | 02/01/31 | 0 | 3.492% | 0 | 0 | 0 | 0 | 0 | 0 |
| 30 | 02/01/32 | 0 | 3.502% | 0 | 0 | 0 | 0 | 0 | 0 |
| | | | | | 448,092,908 | | | 51,907,092 | |

*FIG. 18M*

| | | | | | | Breakeven | |
|---|---|---|---|---|---|---|---|
| Cumulative | | | | | Present | VRDB Rate | |
| Total | Actual | | | | Value | before | All-in VRDB |
| Principal | Principal | Total Debt | Present | Savings vs | Savings | spread and | Breakeven |
| Paid | Amortization | Service | Value | Fixed Rate | From VRDBs | costs | Rate |
| | | | | | | 4.512% | 4.892% |
| 27,856,046 | 27,856,046 | 39,756,046 | 38,105,260 | 0 | 0 | 4.836% | 5.216% |
| 54,017,806 | 26,161,760 | 39,759,506 | 36,526,198 | 0 | 0 | 5.153% | 5.533% |
| 76,471,639 | 22,453,833 | 39,757,942 | 35,008,147 | 0 | 0 | 5.390% | 5.770% |
| 94,358,229 | 17,886,590 | 39,757,098 | 33,553,796 | 0 | 0 | 5.481% | 5.861% |
| 112,160,641 | 17,802,412 | 39,755,725 | 32,159,434 | 0 | 0 | 5.552% | 5.932% |
| 128,761,918 | 16,601,276 | 39,755,021 | 30,823,536 | 0 | 0 | 5.546% | 5.926% |
| 142,991,324 | 14,229,406 | 39,757,981 | 29,545,853 | 0 | 0 | 5.377% | 5.757% |
| 160,701,825 | 17,710,501 | 39,756,811 | 28,318,190 | 0 | 0 | 5.296% | 5.676% |
| 184,989,395 | 24,287,570 | 39,755,747 | 27,141,611 | 0 | 0 | 5.531% | 5.911% |
| 215,120,342 | 30,130,947 | 39,759,972 | 26,017,377 | 0 | 0 | 6.191% | 6.571% |
| 247,209,109 | 32,088,767 | 39,759,244 | 24,936,604 | 0 | 0 | 7.197% | 7.577% |
| 277,611,018 | 30,401,909 | 39,758,482 | 23,900,706 | 0 | 0 | 8.337% | 8.717% |
| 307,127,452 | 29,516,433 | 39,758,666 | 22,908,385 | 0 | 0 | 9.728% | 10.108% |
| 338,708,307 | 31,580,855 | 39,758,588 | 21,957,120 | 0 | 0 | 12.094% | 12.474% |
| 371,374,445 | 32,666,138 | 39,758,761 | 21,045,488 | 0 | 0 | 16.134% | 16.514% |
| 405,637,460 | 34,263,015 | 39,755,226 | 20,169,825 | 0 | 0 | 24.339% | 24.719% |
| 441,454,881 | 35,817,421 | 39,757,236 | 19,333,293 | 0 | 0 | 45.781% | 46.161% |
| 478,312,092 | 36,857,212 | 39,757,783 | 18,530,774 | 0 | 0 | 154.783% | 155.163% |
| 500,000,000 | 21,687,908 | 22,425,665 | 10,018,402 | 17,332,419 | 6,993,467 | #NUM! | #NUM! |
| 500,000,000 | 0 | 0 | 0 | 39,753,034 | 15,291,778 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| 500,000,000 | 0 | 0 | 0 | 0 | 0 | #NUM! | #NUM! |
| | 500,000,000 | | 500,000,000 | 57,085,453 | 22,285,245 | | |

Fixed Rate Bond Yield 4.893%
Reduction in Yield from Accelerating DS 0.009%
BMA 3.952%
0
VRDB Yield 4.332%

Gross Savings 57,085,453
Present Value Savings 22,285,245

*FIG. 18N*

METHODS, SOFTWARE PROGRAMS, AND SYSTEMS FOR MANAGING ONE OR MORE LIABILITIES

CROSS-REFERENCE TO RELATED APPLICATIONS

This application is a divisional of U.S. patent application Ser. No. 10/102,195, filed Mar. 20, 2002, entitled "Methods, Software Programs, And Systems For Managing One Or More Liabilities," now allowed; which is a continuation-in-part of U.S. patent application Ser. No. 09/896,630, filed Jun. 29, 2001, entitled "Method, Software Program, And System For Managing Debt," and issued as U.S. Pat. No. 7,373,328 on May 13, 2008; which is a continuation-in-part of U.S. application Ser. No. 09/723,692, filed on Nov. 28, 2000, entitled "Method, Software Program, And System For Managing Variable Rate Debt"; each of which are incorporated herein by reference in their entirety.

FIELD OF THE INVENTION

The present invention relates to various methods, software programs, and systems for managing one or more liabilities. More particularly, certain embodiments of the present invention relate to methods, software programs, and systems for managing debt in the form of at least one credit issued by a borrower.

For the purposes of the present application the term "credit" is intended to include, but not be limited to, loan(s), bond(s), issue(s), or other obligation(s).

Further, for the purposes of the present application the term "liability" is intended to include, but not be limited to, credit(s) or other commitments.

Further still, for the purposes of the present application the term "fixed rate" (used in the context of a fixed rate credit or a fixed rate municipal bond, for example) refers to an interest rate that may not vary over time, i.e., remains constant.

Further still, for the purposes of the present application the term "variable rate" (used in the context of a variable rate credit or a variable rate municipal bond, for example) refers to an interest rate that may vary over time, i.e., is capable of changing.

Further still, for the purposes of the present application the term "yield" (used in the context of a yield on a credit or a yield on a municipal bond, for example) refers to an interest rate on the credit or bond, for example.

Further still, for the purposes of the present application the term "current interest rate" and "current yield" (each of which may be used in the context of a credit or variable rate municipal bond, for example) refers to the instantaneous value of the interest rate at any given point in or span of time.

Further still, for the purposes of the present application each of the terms "legal amortization period" and "legal maturity" refers to the span of time over which an obligation is legally required to be retired (e.g., the span of time over which principal is legally required to be repaid). In one example, the end of the legal amortization period marks the time after which the obligation (e.g., the repayment of principal) would be considered in default.

Further still, for the purposes of the present application each of the terms "expected principal amortization period" and "expected maturity" refers to the span of time over which an obligation is expected to be retired by the issuer (e.g., the span of time over which the issuing municipality expects to pay-off an obligation (such as through repayment of principal) based upon certain periodic payments of interest and/or principal). The expectation of the issuer may be set forth by statements made by the issuer. The end of the expected amortization period may coincide with the end of a corresponding legal amortization period or the expected amortization period may end any time earlier. In either case the end of the expected amortization period may not be extended past the end of the corresponding legal amortization period.

Further still, for the purposes of the present application the term "debt service" (and/or "debt service amount") refers to certain periodic repayments of interest and/or principal (e.g., directly or through a mechanism such as installment payments into/out of a sinking fund).

Further still, for the purposes of the present application the term "budgeted debt service" is intended to include, but not be limited to, debt service that is set in a periodic manner (e.g., during the life or term of a bond).

Further still, for the purposes of the present application the term "expected debt service schedule" is intended to include, but not be limited to, a predetermined identification of debt service payments (e.g., predetermined by the time of the issuance of a bond).

Further still, for the purposes of the present application the term "expected debt service" is intended to include, but not be limited to, debt service which is predetermined (e.g., predetermined according to an expected debt service schedule by the time of the issuance of a bond).

Further still, for the purposes of the present application the term "defease" is intended to include, but not be limited to, setting aside funds to pay for something (e.g., to pay-off principal owed in connection with a credit).

Further still, for the purposes of the present application the term "Variable Rate Demand Bond" (or "VRDB") is intended to include, but not be limited to: (i) any of the modes of demand, put, auction or other bonds that may be included under a multi-modal structure and may include commercial paper, extendible commercial paper, and other bullet or balloon maturities that are to be refunded in whole or in part at maturity; (ii) securities (such as extendible commercial paper) of any duration where the ability of the holder to put is dependent on an extension and remarketing of the security with a longer term put or on a fixed rate basic; and/or (iii) synthetic variable rate debt created with an interest rate swap or other financial instruments (where the context permits). In addition, VRDB's may also include floating rate bonds such as indexed floaters for which the interest rate is designed to allow the bonds to trade at or close to par and which are easily callable by the issuer.

Further still, for the purposes of the present application the term "similarly structured" (used in the context of a similarly structured credit or a similarly structured bond, for example) is intended to include, but not be limited to, one credit with a substantially similar term, a substantially similar principal amount, and a substantially similar credit rating to another credit (in the case of a credit) or one bond with a substantially similar term, a substantially similar principal amount, and a substantially similar credit rating to another bond (in the case of a bond).

Further still, for the purposes of the present application the term "savings pattern" is intended to include, but not be limited to, the amount of savings at various points over a span of time (e.g., over the life of a bond).

Further still, for the purposes of the present application the term "an understanding" (such as an understanding between one party and another party) is intended to include, but not be limited to, a written and/or oral: (a) agreement; (b) contract; (c) arrangement; (d) deal; (e) bargain; (f) covenant; or (g) transaction.

Further still, for each term which is identified herein as "intended to include, but not be limited to" certain definition(s), when such term is used in the claims the term is to be construed more specifically as "intended to include at least one of the definition(s)".

BACKGROUND OF THE INVENTION

Municipalities in general have debt structures that may rely exclusively or predominantly on fixed rate debt (such as credits in the form of loans, bonds, issues, or other obligations). Some of the reasons may include the following:

a) Fixed rated debt is accepted and municipal debt managers do not have to justify their decision to use it, even if it imposes an additional cost on the municipality (the additional cost may be in essence the cost of interest rate insurance against the possibility that increasing interest rates may cause the cost of variable rate debt in the future to exceed the cost that can be locked in with fixed rate debt).

b) Interest rates may vary significantly within a budget period.

c) A debt manager may face political risk by issuing variable rate debt. The political risk to the debt manager if he or she elects to issue variable rate debt is not just that the present value cost of variable rate debt may exceed the cost of fixed rated debt over the term of the debt, but also includes the possible risk of being criticized if rates spike in a particular year or group of years, even if the savings in prior years were significant and there were net savings overall (in some cases there may not even be legislative authority to issue variable rate debt, ostensibly due to the interest rate risk associated with such debt).

d) Budgeting planned by a current debt manager may not be carried through in later years by subsequent debt managers and/or political decision makers (thus increasing future interest rate risk).

In issuing such traditional fixed rate debt (e.g., traditional municipal fixed rate bonds), a municipality pays its fixed rate bondholders a higher interest rate (versus non-fixed rate debt) to accept ail of the risks and benefits of ownership of the municipal debt. In essence, the municipality purchases insurance against these risks from its fixed rate bondholders. The compensation to the fixed rate bondholders is both the higher fixed rate and the potential benefits associated with ownership of the debt.

On the other hand, when a municipality does utilize variable rate debt the changes over time in a municipality's variable interest rate generally occur because the issuer retains a variety of risks and benefits associated with ownership of municipal debt that, in the context of fixed rate debt, are transferred to the fixed rate bondholders. Thus, the issuer must generally revise the interest rate on its variable rate debt to reflect both favorable and unfavorable changes in market conditions that affect the value of ownership of the debt in order to keep the value of the debt essentially equal to par. The value of such traditional variable rate debt must be maintained essentially at par to motivate the current debt holder to retain its ownership or to enable the debt to be remarketed to a new holder if the debt is put back to the issuer by the current debt holder. In any case, as seen in Table 1, a number of representative characteristics that generally affect the value of ownership of municipal debt (and the associated risks and benefits of ownership) include:

TABLE 1

Characteristics That Affect The Value of Ownership of Municipal Bonds

| Characteristic | Risk | Benefit |
|---|---|---|
| General level of interest rates | Increasing rates | Decreasing rates |
| Exemption from state/federal tax | Decrease in marginal tax rate or repeal of exemption | Tax increase |
| Credit of issuer | Improvement in credit | Credit deterioration |
| Credit of credit enhancer | Improvement in credit | Credit deterioration |
| Credit of liquidity provider | Improvement in credit | Credit deterioration |
| Supply and demand for municipal bonds | Increase in supply or decrease in demand | Decrease in supply or increase in demand |

As noted above, by issuing traditional fixed rate debt, an issuer essentially fully hedges each of the above characteristics (i.e., the issuer fixes both the cost and the benefit derived from the issuance of the debt). In contrast, by issuing traditional variable rate debt, the issuer retains both the risk and benefit associated with each ownership value characteristic. Given a specific bond interest rate, adverse changes with respect to any ownership value characteristic would cause a decline in the value of the bond and positive changes would cause an increase in the value of the bond. Thus, the issuer must increase the bond interest rate to compensate for adverse changes in order to be able to remarket its bonds. On the other hand, positive changes allow the issuer to decrease its bond interest rate while still being able to remarket its bonds. Further, it is noted that fixed-payer interest rate swaps (in which the issuer makes a fixed rate payment and receives a variable rate payment that offsets the interest payable on the issuer's variable rate bonds) are used to create fixed rate debt "synthetically" by fully or partially hedging the risks of debt ownership. As seen in Table 2, the extent to which such risks are hedged is determined by the methodology used to calculate the variable rate swap payment received by the issuer:

TABLE 2

Alternatives For Hedging Interest Rate Risks With Fixed Payer Interest Rate Swaps

| Variable swap payment | Risks hedged | Risks Not Hedged |
|---|---|---|
| Issuer's actual bond interest rate | Interest rates<br>Federal and state taxes<br>Issuer credit<br>Credit enhancer and liquidity provider credit<br>Municipal supply and demand | None |
| Bond Market Association (BMA) rate | Interest rates<br>Federal taxes<br>Municipal supply and demand | State taxes<br>Issuer credit<br>Credit enhancer and liquidity provider credit |
| BMA rate with a tax flip to a percentage of LIBOR upon certain events involving significant changes in the value of federal tax exemption | Interest rates<br>Partial hedge of federal tax risk<br>Municipal supply and demand | State taxes<br>Issuer credit<br>Credit enhancer and liquidity provider credit<br>Federal tax risk not fully hedged |
| Fixed percentage of LIBOR | Interest rate risk. | Federal and state taxes<br>Issuer credit<br>Credit enhancer and |

TABLE 2-continued

Alternatives For Hedging Interest Rate Risks With Fixed Payer Interest Rate Swaps

| Variable swap payment | Risks hedged | Risks Not Hedged |
|---|---|---|
| | | liquidity provider credit |
| | | Municipal supply and demand |

Of note is the fact that the risk of a deviation between the interest rate on an issuer's variable rate bonds and the variable payment received by the issuer on a fixed-payer swap is referred to as "basis risk". Basis risk exists to some degree on any swap on which the payment received is not calculated using the issuer's actual interest rate.

Also in the financial field, a typical mortgage loan (either fixed rate or variable rate) has had associated therewith at the start of the loan a predetermined amortization period (e.g., 30 years for a typical home mortgage loan). In the case of a typical fixed rate mortgage a predetermined periodic repayment amount calculated to repay interest and principal will remain constant for the entire predetermined amortization period. In contrast, the periodic repayment amount calculated to repay interest and principal associated with a typical variable rate mortgage will vary over the predetermined amortization period in relation to the current interest rate on the mortgage.

As noted above, a typical mortgage loan will conventionally have a fixed, predetermined amortization period (with the required repayment amount remaining constant in the case of a fixed rate mortgage and the required repayment amount changing in the case of a variable rate mortgage). Such required repayment amounts are based at least in part upon the predetermined amortization period and represent minimum repayments. Many typical mortgage loans will permit the early repayment of principal at the option of the mortgagee, wherein the predetermined amortization period is essentially shortened. Of course, the reverse has not typically been permitted. That is, the lengthening of the predetermined amortization period has not been permitted in order to: a) give the fixed rate mortgagee a lower periodic repayment amount; or b) give the variable rate mortgagee a lower periodic repayment amount in the case of a current interest rate which is essentially at the original interest rate; or c) give the variable rate mortgagee an essentially constant periodic repayment amount in the case of a current interest rate which is above the original interest rate.

Accordingly, neither such traditional fixed rate debt, nor such traditional variable rate demand debt, nor such traditional fixed-payer interest rate swaps, nor such traditional mortgage loans necessarily provide for the management of debt such that a principal amortization period associated with the debt may be adjusted as intended according to the present invention.

BRIEF DESCRIPTION OF THE DRAWINGS

FIGS. 5A and 5B show a spreadsheet in connection with an example economic analysis of an embodiment of the present invention;

FIGS. 6A, 6B, and 6C show a spreadsheet in connection with an example economic analysis of an embodiment of the present invention;

FIGS. 7A, 7B and 7C show the left and right portions of a spreadsheet in connection with an example economic analysis of an embodiment of the present invention;

FIGS. 7D, 7E, 7F, and 7G show the left, two middle, and right portions of a spreadsheet in connection with an example economic analysis of an embodiment of the present invention;

FIG. 7H shows an example of a spreadsheet in connection with an example economic analysis of an embodiment of the present invention;

FIGS. 8A, 8B, and 8C show the left, middle, and right portions of a spreadsheet in connection with an example economic analysis of an embodiment of the present invention;

FIGS. 9A, 9B, 9C, 9D, 9D, 9E, and 9F show the left, four middle, and right portions of a spreadsheet in connection with an example economic analysis of an embodiment of the present invention;

FIGS. 10A, 10B, 10C, 10D, 10E, and 10F show the left, four middle, and right portions of a spreadsheet in connection with an example economic analysis of an embodiment of the present invention;

FIGS. 11A and 11B show a spreadsheet in connection with an example economic analysis of an embodiment of the present invention;

FIGS. 12A, 12B, 12C, and 12D show the left, two middle, and right portions of a spreadsheet in connection with an example economic analysis of an embodiment of the present invention;

FIGS. 12E, 12F, 12G, and 12H show the left, two middle, and right portions of a spreadsheet in connection with an example economic analysis of an embodiment of the present invention;

FIGS. 12I, 12J, 12K, and 12L show the left, two middle, and right portions of a spreadsheet in connection with an example economic analysis of an embodiment of the present invention;

FIGS. 13A, 13B, 13C, 13D, 13E, 13F, 13G, and 13H show, from left to right, the left, six middle, and right portions of a spreadsheet in connection with an example economic analysis of an embodiment of the present invention;

FIGS. 13I, 13J, 13K, 13L, 13M, 13N, 13O, and 13P show, from left to right, the left, six middle, and right portions of a spreadsheet in connection with an example economic analysis of an embodiment of the present invention;

FIGS. 13Q, 13R, 13S, 13T, 13U, 13V, 13W, and 13X show, from left to right, the left, six middle and right portions of a spreadsheet in connection with an example economic analysis of an embodiment of the present invention;

FIGS. 14A, 14B, and 14C show a spreadsheet in connection with an example economic analysis of an embodiment of the present invention;

FIGS. 15A, 15B, and 15C show a spreadsheet in connection with an example economic analysis of an embodiment of the present invention;

FIGS. 16A and 16B show a spreadsheet in connection with an example economic analysis of an embodiment of the present invention;

FIGS. 17A, 17B, 17C, 17D, 17E, 17F, 17G, 17H, 17I, and 17J show the left, middle, eight middle, and right portions of a spreadsheet in connection with an example economic analysis of an embodiment of the present invention;

FIGS. 18A, 18B, 18C, 18D, 18E, 18F, 18G, 18H, 18I, 18J, 18K, 18L, 18M and 18N, show left and right portions, respectively, of a spreadsheet in connection with another example economic analysis of an embodiment of the present invention;

Figure 1A:
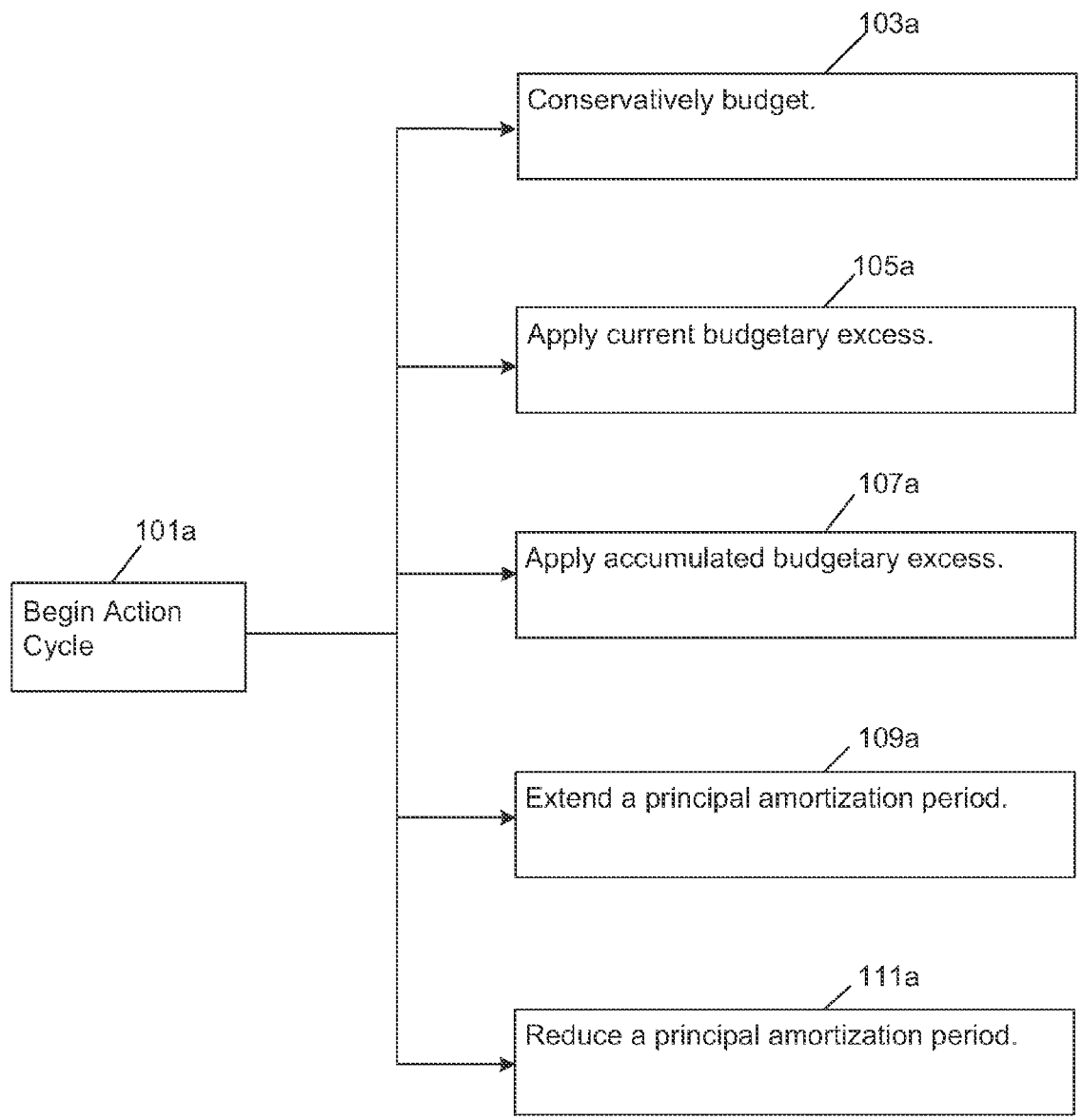
FIG. 1A shows a flowchart of a method according to one embodiment of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. The figures are not necessarily to scale; some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment a method for managing variable rate debt is provided, comprising: budgeting for interest owed on the variable rate debt by the borrower during a time period when an interest rate on the variable rate debt is below a first predetermined low interest rate level; applying at least a portion of any existing current budgetary excess by the borrower to reduce future interest rate risk by performing at least one of i) the early retirement of principal associated with the variable rate debt and ii) the funding of a sinking fund; and applying at least a portion of any accumulated budgetary excess by the borrower during a time period when the interest rate is above a first predetermined high interest rate level to reduce an amount of debt service.

In another embodiment the method may further comprise the step of extending a principal amortization period associated with the variable rate debt by the borrower to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

In yet another embodiment the method may further comprise the step of reducing a principal amortization period associated with the variable rate debt by the borrower during the time period when the interest rate is below a second predetermined low interest rate level, wherein the first predetermined low interest rate level and second predetermined low interest rate level are selected from the group of i) different levels and ii) the same levels.

In a further embodiment a software program for managing variable rate debt is provided, comprising: budgeting means for calculating a budget for interest owed on the variable rate debt during a time period when an interest rate on the variable rate debt is below a first predetermined low interest rate level; current budgetary excess disposition calculation means for calculating a value of at least a portion of any existing current budgetary excess to be applied to reduce future interest rate risk by performing at least one of i) the early retirement of principal associated with the variable rate debt and ii) the funding of a sinking fund; and accumulated budgetary excess disposition calculation means for calculating a value of at least a portion of any accumulated budgetary excess to be applied during a time period when the interest rate is above a first predetermined high interest rate level to reduce an amount of debt service.

In another embodiment the software program may further comprise a principal amortization extension calculation means for calculating an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

In yet another embodiment a system for managing variable rate debt is provided, comprising: memory means for storing a software program; and processing means for processing the software program; wherein the software program includes: budgeting means for calculating a budget for interest owed on the variable rate debt during a time period when an interest rate on the variable rate debt is below a first predetermined low interest rate level; current budgetary excess disposition calculation means for calculating a value of at least a portion of any existing current budgetary excess to be applied to reduce future interest rate risk by performing at least one of i) the early retirement of principal associated with the variable rate debt and ii) the funding of a sinking fund; and accumulated budgetary excess disposition calculation means for calculating a value of at least a portion of any accumulated budgetary excess to be applied during a time period when the interest rate is above a first predetermined high interest rate level to reduce an amount of debt service.

In yet a further embodiment the system may further include the software program further comprising principal amortization extension calculation means for calculating an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels.

In another embodiment a method for managing debt created by an issuer using an interest rate swap in which the issuer makes a fixed rate payment and receives a variable rate payment that at least partially offsets an interest payment on a variable rate bond issued by the issuer is provided, comprising: budgeting an amount by the issuer to cover the fixed rate payment, wherein the budgeted amount is higher than the amount of the fixed rate payment; and applying at least a portion of any current budgetary excess by the issuer resulting from the receipt of the variable rate payment at a level that produces a payment higher than the interest payment on the variable rate bond to perform at least one of i) the early retirement of principal associated with the synthetic fixed rate debt and ii) the funding of a sinking fund.

In a further embodiment the method may further comprise the step of applying at least a portion of any funds in the sinking fund by the issuer to the interest payment on the variable rate bond if the interest payment on the variable rate bond increases above a predetermined high interest rate level.

In yet another embodiment the method may further comprise the step of extending a principal amortization period by the issuer associated with the variable rate bond when the variable rate payment received by the issuer is less than the interest payment on the variable rate bond.

In another embodiment a method for managing variable rate debt is provided, comprising: obligating the borrower to budget for interest owed on the variable rate debt during a time period when an interest rate on the variable rate debt is below a first predetermined low interest rate level to produce a current budgetary excess; and obligating at least a portion of the current budgetary excess be applied by the borrower to reduce future interest rate risk by performing at least one of i) the early retirement of principal associated with the variable rate debt and ii) the funding of a sinking fund.

In yet another embodiment the method may further comprise obligating that at least a portion of any accumulated budgetary excess be applied by the borrower during a time period when the interest rate is above a first predetermined high interest rate level to reduce an amount of debt service associated with the variable rate debt.

In yet another embodiment the method may further comprise obligating that at least a portion of any accumulated funds in the sinking fund be applied by the borrower during a time period when the interest rate is above a first predetermined high interest rate level to reduce an amount of debt service associated with the variable rate debt.

In a further embodiment the borrower may be allowed or required to apply at least one of the current budgetary excess and the accumulated budgetary excess to different credits within a fund of credits. At least two of the credits in the fund of credits may be issued at different times.

The software program may further comprise principal amortization reduction calculation means for calculating a reduction to a principal amortization period associated with the variable rate debt during the time period when the interest rate is below a second predetermined low interest rate level, wherein the first predetermined low interest rate level and second predetermined low interest rate level are selected from the group of i) different levels and ii) the same levels.

In another embodiment the credit may be a bond.

The software program of the system may further comprise principal amortization reduction calculation means for calculating a reduction to a principal amortization period associated with the variable rate debt during the time period when the interest rate is below a second predetermined low interest rate level, wherein the first predetermined low interest rate level and second predetermined low interest rate level are selected from the group of i) different levels and ii) the same levels.

In another embodiment a method for managing basis risk associated with synthetic fixed rate debt created by an issuer using an interest rate swap in which the issuer makes a fixed rate payment and receives a variable rate payment that at least partially offsets an interest payment on a variable rate bond issued by the issuer is provided, comprising: allowing or requiring the issuer to budget a budgeted amount to cover the fixed rate payment, wherein the budgeted amount is higher than the amount of the fixed rate payment; and allowing or requiring the issuer to use at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund.

The method may further comprise allowing or requiring the issuer to apply at least a portion of any funds in the sinking fund to the interest payment on the variable rate bond if the interest payment on the variable rate bond increases above a predetermined high interest rate level.

The predetermined high interest rate level may be a predetermined excess over a current interest rate associated with the variable rate payment to the issuer.

Any amounts applied from the sinking fund may be excluded from a rate covenant calculation associated with the synthetic fixed rate debt.

The method may further comprise the step of allowing or requiring the issuer to extend a principal amortization period associated with the variable rate bond when the variable rate payment received by the issuer is less than the interest payment on the variable rate bond.

The method may further comprise the step of allowing or requiring the issuer to reduce a principal amortization period associated with the variable rate bond when the variable rate payment received by the issuer exceeds the interest payment on the variable rate bond.

In another embodiment a software program for managing basis risk associated with synthetic fixed rate debt created by an issuer using an interest rate swap in which the issuer makes a fixed rate payment and receives a variable rate payment that at least partially offsets an interest payment on a variable rate bond issued by the issuer is provided, comprising: budgeting means for calculating a budgeted amount to caver the fixed rate payment, wherein the budgeted amount is higher than the amount of the fixed rate payment; and current budgetary excess disposition calculation means for calculating the value of at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund.

The software program may further comprise sinking fund disposition calculation means for calculating the value of at least a portion of any funds in the sinking fund to be applied to the interest payment on the variable rate bond if the interest payment on the variable rate bond increases above a predetermined high interest rate level.

The predetermined high interest rate level may be a predetermined excess over a current interest rate associated with the variable rate payment to the issuer.

The software program may further comprise principal amortization extension calculation means for calculating an extension to a principal amortization period associated with the variable rate bond when the variable rate payment received by the issuer is less than the interest payment on the variable rate bond.

The software program may further comprise principal amortization reduction calculation means for calculating a reduction in a principal amortization period associated with the variable rate bond when the variable rate payment received by the issuer exceeds the interest payment on the variable rate bond.

In another embodiment a system for managing basis risk associated with synthetic fixed rate debt created by an issuer using an interest rate swap in which the issuer makes a fixed rate payment and receives a variable rate payment that at least partially offsets an interest payment on a variable rate bond issued by the issuer is provided, comprising: memory means for storing a software program; and processing means for processing the software program; wherein the software program includes: budgeting means for calculating a budgeted amount to cover the fixed rate payment, wherein the budgeted amount is higher than the amount of the fixed rate payment; and current budgetary excess disposition calculation means for calculating the value of at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund.

The software program of the system may further comprise sinking fund disposition calculation means for calculating the value of at least a portion of any funds in the sinking fund to be applied to the interest payment on the variable rate bond if the interest payment on the variable rate bond increases above a predetermined high interest rate level.

The predetermined high interest rate level may be a predetermined excess over a current interest rate associated with the variable rate payment to the issuer.

The software program of the system may further comprise principal amortization extension calculation means for calculating an extension to a principal amortization period associated with the variable rate bond when the variable rate payment received by the issuer is less than the interest payment on the variable rate bond.

The software program of the system may further comprise principal amortization reduction calculation means for calculating a reduction in a principal amortization period associated with the variable rate bond when the variable rate payment received by the issuer exceeds the interest payment on the variable rate bond.

In another embodiment a method for structuring a variable rate municipal bond is provided, comprising: setting a principal amortization period associated with the bond; and permitting extension of the principal amortization period when a current interest rate associated with the bond rises above a high interest threshold.

The method may further comprise permitting reduction of the principal amortization period when a current interest rate associated with the bond falls below a low interest threshold.

The high interest threshold may be above an interest rate which had been associated with the bond at issuance and the low interest threshold may be below the interest rate which had been associated with the bond at issuance.

The bond may have associated therewith a periodic repayment which is maintained between a periodic repayment amount maximum and a periodic repayment amount minimum.

The periodic repayment may be maintained between the periodic repayment amount maximum and the periodic repayment amount minimum due to the extension of the principal amortization period when a current interest rate associated with the bond rises above a high interest threshold and the reduction of the principal amortization period when a current interest rate associated with the bond falls below a low interest threshold.

At the time of the issuance of the variable rate municipal bond the interest rate associated therewith may be below an interest rate on a fixed rate municipal bond having a substantially similar principal amortization period and a substantially similar credit rating.

Each of the high interest threshold and low interest threshold may substantially equal an interest rate which had been associated with the bond at issuance.

The bond may have associated therewith a periodic repayment which is substantially fixed at an initial value.

The periodic repayment may be maintained substantially at the initial value due to the extension of the principal amortization period when a current interest rate associated with the bond rises above the high interest threshold and the reduction of the principal amortization period when a current interest rate associated with the bond falls below the low interest threshold.

At the time of the issuance of the variable rate municipal bond the interest rate associated therewith may be below an interest rate on a fixed rate municipal bond having a substantially similar principal amortization period and a substantially similar credit rating.

In another embodiment a method for structuring a variable rate municipal bond having associated therewith a periodic repayment is provided, comprising: setting a principal amortization period associated with the bond; and permitting extension of the principal amortization period to constrain the periodic repayment to an amount not greater than a periodic repayment amount maximum.

The method may further comprise permitting reduction of the principal amortization period to constrain the periodic repayment to an amount not less than a periodic repayment amount minimum.

The periodic repayment amount maximum may be below a value to which the periodic repayment amount could otherwise rise based on a current interest rate of the bond and the periodic repayment amount minimum may be above a value to which the periodic repayment amount could otherwise fall based on a current interest rate of the bond.

At the time of the issuance of the variable rate municipal bond the interest rate associated therewith may be below an interest rate on a fixed rate municipal bond having a substantially similar principal amortization period and a substantially similar credit rating.

In another embodiment a method for structuring a variable rate municipal bond having associated therewith a periodic repayment which is substantially fixed at an initial value is provided, comprising: setting a principal amortization period associated with the bond; and permitting extension of the principal amortization period to substantially maintain the periodic repayment at the fixed initial value.

The method may further comprise permitting reduction of the principal amortization period to substantially maintain the periodic repayment at the fixed initial value.

The fixed initial value may be below a value to which the periodic repayment could otherwise rise based on a current interest rate of the bond and the fixed initial value may be above a value ta which the periodic repayment could otherwise fall based on a current interest rate of the bond.

At the time of the issuance of the variable rate municipal bond the interest rate associated therewith may be below an interest rate on a fixed rate municipal bond having a substantially similar principal amortization period and a substantially similar and credit rating.

In another embodiment a method for managing debt issued by a borrower, wherein the debt includes variable rate debt in the form of at least one credit issued by the borrower and fixed rate debt in the form of at least one credit issued by the borrower is provided, comprising: obligating the borrower ta extend a principal amortization period associated with at least one of the credits forming the variable rate debt when a yield on such credit forming the variable rate debt is below a yield on at least one of the credits forming the fixed rate debt; and obligating the borrower to at least partially defease at least one of the credits forming the fixed rate debt when a yield on such credit forming the fixed rate debt is above the yield on at least one of the credits forming the variable rate debt, wherein the defeasance is carried out using savings from the extension of the principal amortization period.

The step of obligating the borrower to at least partially defease at least one of the credits forming the fixed rate debt when a yield on such credit forming the fixed rate debt is above the yield on at least one of the credits forming the variable rate debt may further comprise at least partially defeasing one or more credits which are then callable.

At least one of the variable rate credits and at least one of the fixed rate credits may be issued at different times.

At least one of the variable rate credits and fixed rate credits may be a bond.

At least one of the variable rate credits and fixed rate credits may be a municipal bond.

In another embodiment a method for managing debt issued by a borrower, wherein the debt includes variable rate debt in the form of at least one credit issued by the borrower and fixed rate debt in the form of at least one credit issued by the borrower is provided, comprising: obligating the borrower to carry out one action selected from the group of: (a) paying at least an entire debt service amount due on at least one of the credits forming the variable rate debt; and (b) paying less than the entire debt service amount due on at least one of the credits forming the variable rate debt, extending a principal amortization period associated with at least one of the credits forming the variable rate debt, and at least partially defeasing at least one of the credits forming the fixed rate debt, wherein the defeasance is carried out using savings from the extension of the principal amortization period; and obligating the borrower, during a time period when a benchmark interest rate is below a predetermined low interest rate level, to carry out at least one action selected from the group of: (a) reducing a principal amortization period associated with at least one of the credits forming the variable rate debt; and (b) at least partially defeasing at least one of the credits forming the fixed rate debt.

At least one of the steps of: (a) at least partially defeasing at least one of the credits forming the fixed rate debt, wherein the defeasance is carried out using savings from the extension of the principal amortization period; and (b) at least partially defeasing at least one of the credits forming the fixed rate debt during a time period when a benchmark interest rate is below a predetermined low interest rate level may further comprise at least partially defeasing one or more credits which are then callable.

The borrower may have the option of choosing which actions to carry out.

At least one of the variable rate credits and at least one of the fixed rate credits may be issued at different times.

At least one of the variable rate credits and fixed rate credits may be a bond.

At least one of the variable rate credits and fixed rate credits may be a municipal bond.

The benchmark interest rate during the time period may be a short-term tax-exempt interest rate.

In another embodiment a method for managing debt of a borrower is provided, comprising: issuing the debt, wherein the debt includes variable rate debt in the form of at least one credit issued by the borrower and fixed rate debt in the form of at least one credit issued by the borrower; obligating the borrower to extend a principal amortization period associated with at least one credit forming the variable rate debt when a yield on such credit forming the variable rate debt is below a yield on at least one of the credits forming the fixed rate debt; and obligating the borrower to at least partially defease at least one of the credits forming the fixed rate debt when a yield on such credit forming the fixed rate debt is above the yield on at least one of the credits forming the variable rate debt, wherein the defeasance is carried out using savings from the extension of the principal amortization period.

The step of obligating the borrower to at least partially defease at least one of the credits forming the fixed rate debt when a yield on such credit forming the fixed rate debt is above the yield on at least one of the credits forming the variable rate debt may further comprise at least partially defeasing one or more credits which are then callable.

At least one of the variable rate credits and at least one of the fixed rate credits may be issued at different times.

At least one of the variable rate credits and fixed rate credits may be a bond.

At least one of the variable rate credits and fixed rate credits may be a municipal bond.

In another embodiment a method for managing debt of a borrower is provided, comprising: issuing the debt, wherein the debt includes variable rate debt in the form of at least one credit issued by the borrower and fixed rate debt in the form of at least one credit issued by the borrower; obligating the borrower to carry out one action selected from the group of: (a) paying at least an entire debt service amount due on at least one of the credits forming the variable rate debt; and (b) paying less than the entire debt service amount due on at least one of the credits forming the variable rate debt, extending a principal amortization period associated with at least one of the credits forming the variable rate debt, and at least partially defeasing at least one of the credits forming the fixed rate debt, wherein the defeasance is carried out using savings from the extension of the principal amortization period; and obligating the borrower, during a time period when a benchmark interest rate is below a predetermined low interest rate level, to carry out at least one action selected from the group of: (a) reducing a principal amortization period associated with at least one of the credits forming the variable rate debt; and (b) at least partially defeasing at least one of the credits forming the fixed rate debt.

At least one of the steps of: (a) at least partially defeasing at least one of the credits forming the fixed rate debt, wherein the defeasance is carried out using savings from the extension of the principal amortization period; and (b) at least partially defeasing at least one of the credits forming the fixed rate debt during a time period when a benchmark interest rate is below a predetermined low interest rate level may further comprise at least partially defeasing one or more credits which are then callable.

The borrower may have the option of choosing which actions to carry out.

At least one of the variable rate credits and at least one of the fixed rate credits may be issued at different times.

At least one of the variable rate credits and fixed rate credits may be a bond.

At least one of the variable rate credits and fixed rate credits may be a municipal bond.

The benchmark interest rate during the time period may be a short-term tax-exempt interest rate.

In another embodiment a method for managing debt of an issuer of a plurality of municipal bonds is provided, comprising: issuing the debt, wherein the debt includes variable rate debt in the form of at least one municipal bond issued by the issuer and fixed rate debt in the form of at least one municipal bond issued by the issuer; obligating the issuer to carry out one action selected from the group of: (a) paying at least an entire debt service amount due on at least one of the municipal bonds forming the variable rate debt; and (b) paying less than the entire debt service amount due on at least one of the municipal bonds forming the variable rate debt, extending a principal amortization period associated with at least one of the municipal bonds forming the variable rate debt, and at least partially defeasing at least one of the municipal bonds forming the fixed rate debt, wherein the defeasance is carried out using savings from the extension of the principal amortization period; and obligating the issuer, during a time period when a benchmark interest rate is below a predetermined low interest rate level, to carry out at least one action selected from the group of: (a) reducing a principal amortization period associated with at least one of the municipal bonds forming the variable rate debt; and (b) at least partially defeasing at least one of the municipal bonds forming the fixed rate debt.

The benchmark interest rate during the time period may be a short-term tax-exempt interest rate.

In another embodiment a method for managing debt issued by a borrower, wherein the debt includes variable rate debt in the form of at least one credit issued by the borrower, is provided, comprising: permitting the borrower to extend a principal amortization period associated with at least one of the credits forming the variable rate debt; and obligating the borrower to perform at least one of the following two actions using savings from the extension of the principal amortization period: (a) the prepayment of future non-debt expenses; and (b) the funding of a reserve used for future non-debt expenses.

The borrower may have the option of choosing which actions to carry out.

At least one of the variable rate credits may be a bond.

At least one of the variable rate credits may be a municipal bond.

The future non-debt expenses may include contributions to a pension plan.

The step of obligating the borrower to perform at least one of the two actions may further comprise at least one of: (a) placing the obligation in the borrower's bond documents; (b) agreeing with a third party to perform at least one of the two actions; and (c) carrying out a policy of the issuer.

In another embodiment a method for managing debt issued by a borrower, wherein the debt includes at least two credits issued by the borrower is provided, comprising: permitting the borrower to extend a principal amortization period associated with at least a first one of the credits; and permitting the borrower to at least partially defease at least a second one of the credits, wherein the defeasance is carried out using savings from the extension of the principal amortization period.

The borrower may extend the principal amortization period associated with the first one of the credits and at least partially defease the second one of the credits when a yield on the second credit is above a yield on the first credit.

The step of at least partially defeasing at least a second one of the credits when a yield on the second credit is above a yield on the first credit may further comprise at least partially defeasing one or more credits which are then callable.

At least the first credit and the second credit may be issued at different times.

At least one of the first credit and the second credit may be a bond.

At least one of the first credit and second credit may be a municipal bond.

In another embodiment a method for managing debt issued by a borrower, wherein the debt includes at least one credit issued by the borrower is provided, comprising: permitting the borrower to extend a principal amortization period associated with at least one of the credits; and permitting the borrower to perform at least one of the following two actions using savings from the extension of the principal amortization period: (a) the prepayment of future non-debt expenses; and (b) the funding of a reserve used for future non-debt expenses.

The borrower may have the option of choosing which actions to carry out.

At least one of the credits may be selected from the group of: (a) a variable rate credit; and (b) a fixed rate credit.

At least one of the credits may be a bond.

At least one of the credits may be a municipal bond.

The future non-debt expenses may include contributions to a pension plan.

The step of performing at least one of the two actions may further comprise at least one of: (a) placing the obligation in the borrower's bond documents; (b) agreeing with a third party to perform at least one of the two actions; and (c) carrying out a policy of the issuer.

In another embodiment a method for structuring a variable rate municipal bond is provided, comprising: setting an expected principal amortization period for the variable rate municipal bond; setting a budgeted debt service for the variable rate municipal bond, wherein the budgeted debt service minus an actual interest equals an actual principal paid; and permitting adjustment of the expected principal amortization period to the extent that actual principal remains to be paid.

In another embodiment the budgeted debt service may be based on a savings versus debt service associated with a fixed interest rate on a bond which is similarly structured to the variable rate municipal bond.

In another embodiment the variable rate municipal bond may be a term bond.

In another embodiment the savings may be represented by a savings pattern.

In another embodiment the budgeted debt service may be set periodically over the life of the variable rate municipal bond.

In another embodiment the budgeted debt service may be set yearly over the life of the variable rate municipal bond.

In another embodiment the budgeted debt service may remain substantially constant over the life of the variable rate municipal bond.

In another embodiment the budgeted debt service may vary over the life of the variable rate municipal bond.

In another embodiment at least part of the savings may be used to refund a fixed rate bond.

In another embodiment the variable rate municipal bond may be selected from the group including, but not limited to: (a) a single issue variable rate demand bond; and (b) a series of variable rate demand bonds.

In another embodiment a method for structuring a variable rate municipal bond is provided, comprising: setting an expected principal amortization period for the variable rate municipal bond; setting an expected debt service for the variable rate municipal bond, wherein the expected debt service minus an actual interest equals an actual principal paid; and permitting adjustment of the expected principal amortization period to the extent that actual principal remains to be paid.

In another embodiment the expected debt service may be based on at least one of:

i) the expected principal amortization period and a target interest rate that is substantially between an initial interest rate on the variable rate municipal bond and a fixed interest rate on a bond which is similarly structured to the variable rate municipal bond; and ii) a savings versus debt service associated with a fixed interest rate on a bond which is similarly structured to the variable rate municipal bond.

In another embodiment the variable rate municipal bond may be a term bond.

In another embodiment the savings may be represented by a savings pattern.

In another embodiment the target interest rate may remain substantially constant over the life of the variable rate municipal bond.

In another embodiment the target interest rate may vary over the life of the variable rate municipal bond.

In another embodiment the expected debt service may remain substantially constant over the life of the variable rate municipal bond.

In another embodiment the expected debt service may vary over the life of the variable rate municipal bond.

In another embodiment at least part of the savings may be used to refund a fixed rate bond.

In another embodiment the variable rate municipal bond may be selected from the group including, but not limited to: (a) a single issue variable rate demand bond; and (b) a series of variable rate demand bonds.

In another embodiment a method for structuring a variable rate municipal bond is provided, comprising: setting an expected maturity for the bond; setting a legal maturity for the bond, which legal maturity is longer than the expected maturity; periodically budgeting for debt service on the bond; periodically making sinking fund installments, wherein each of the sinking fund installments is substantially equal, for at least a part of the life of the bond, to the budgeted debt service minus actual interest on the bond; and making one or more payments until the legal maturity to the extent that principal remains to be paid on the bond after the expected maturity.

In another embodiment the variable rate municipal bond may be a term bond.

In another embodiment the budgeted debt service may be set periodically over the life of the variable rate municipal bond.

In another embodiment the budgeted debt service may be set yearly over the life of the variable rate municipal bond.

In another embodiment the budgeted debt service may remain substantially constant over the life of the variable rate municipal bond.

In another embodiment the budgeted debt service may vary over the life of the variable rate municipal bond.

In another embodiment the variable rate municipal bond may be selected from the group including, but not limited to: (a) a single issue variable rate demand bond; and (b) a series of variable rate demand bonds.

In another embodiment method for structuring a variable rate municipal bond is provided, comprising: setting an expected maturity for the bond; setting a legal maturity for the bond, which legal maturity is longer than the expected maturity; setting an expected debt service schedule on the bond, wherein the expected debt service schedule identifies a number of expected debt service payments; periodically making sinking fund installments, wherein each of the sinking fund installments does not exceed, for at least a part of the life of the bond, a corresponding one of the expected debt service payments; and making one or more payments until the legal maturity to the extent that principal remains to be paid on the bond after the expected maturity.

In another embodiment the variable rate municipal bond may be a term bond.

In another embodiment the expected debt service may remain substantially constant over the life of the variable rate municipal bond.

In another embodiment the expected debt service may vary over the life of the variable rate municipal bond.

In another embodiment the variable rate municipal bond may be selected from the group including, but not limited to: (a) a single issue variable rate demand bond; and (b) a series of variable rate demand bonds.

In another embodiment the budgeted debt service may be based on a budget estimate of what a short-term interest rate is or will be at the time the estimate is made.

In another embodiment a method for managing debt issued by a borrower, wherein the debt includes at least a first credit issued by the borrower and a second credit issued by the borrower is provided, comprising: setting an expected principal amortization period associated with the first credit; adjusting the expected principal amortization period associated with the first credit; and applying at least part of an amount made available from the adjustment to at least partially defease the second credit.

In another embodiment a credit rating of the first credit may not be adversely affected. In another embodiment the adjustment of the expected principal amortization period associated with the first credit may result in an extension of the expected principal amortization period associated with first credit.

In another embodiment at least part of the amount made available from the adjustment may be applied to at least partially defease the second credit when a yield on the second credit is above a yield on the first credit.

In another embodiment at least part of the amount made available from the adjustment may be applied to at least partially defease the second credit when the second credit is then callable.

In another embodiment the first credit and the second credit may be issued at different times.

In another embodiment the first credit and the second credit may be issued at substantially the same time.

In another embodiment at least one of the first credit and the second credit may be a bond.

In another embodiment at least one of the first credit and the second credit may be a municipal bond.

In another embodiment the step of applying at least part of the amount made available from the adjustment to it least partially defease the second credit may be obligated.

In another embodiment the obligation may result from at least one of (but not limited to): (a) a pattern of the borrower; (b) a practice of the borrower; and (c) an understanding between the borrower and another party.

In another embodiment the understanding may be between at least one of (but not limited to): (a) a holder of at least part of the debt; and (b) a credit rating entity.

In another embodiment the first credit may be selected from the group including, but not limited to: (a) a single issue variable rate demand bond; and (b) a series of variable rate demand bonds.

In another embodiment a method for managing debt issued by a borrower, wherein the debt includes at least a first credit issued by the borrower is provided, comprising: setting an expected principal amortization period associated with the first credit; adjusting the expected principal amortization period associated with the first credit; and applying at least part of an amount made available from the adjustment to pay at least part of a cost associated with the borrower.

In another embodiment a credit rating of the first credit may not be not adversely affected.

In another embodiment the payment of at least part of a cost associated with the borrower may be made through at least one of (but not limited to): (a) the direct payment of a current cost associated with the borrower; (b) the prepayment of a future cost associated with the borrower; and (c) the funding of a reserve used for payment of a future cost associated with the borrower.

In another embodiment the cost associated with the borrower may be selected from the group including, but not limited to: a volatile cost and a non-volatile cost.

In another embodiment the cost associated with the borrower may be selected from the group including: (a) a pension cost; (b) a retiree health care cost; (c) an unemployment insurance cost; (d) a fuel cost; and (e) an electricity cost.

In another embodiment the adjustment of the expected principal amortization period associated with the first credit may result in an extension of the expected principal amortization period associated with first credit.

In another embodiment at least part of the amount made available from the adjustment may be applied to pay at least part of a cost associated with the borrower when a yield on the cost is above a yield on the first credit.

In another embodiment the first credit may be a bond.

In another embodiment the first credit may be a municipal bond.

In another embodiment the step of applying at least part of the amount made available from the adjustment to pay at least part of a cost associated with the borrower may be obligated.

In another embodiment the obligation may from at least one of (but not limited to): (a) a pattern of the borrower; (b) a practice of the borrower; and (c) an understanding between the borrower and another party.

In another embodiment the understanding may be between at least one of (but not limited to): (a) a holder of at least part of the debt; and (b) a credit rating entity.

In another embodiment the first credit may be selected from the group including, but not limited to: (a) a single issue variable rate demand bond; and (b) a series of variable rate demand bonds.

More particularly, the present invention provides for what will hereinafter be referred to as the Municipal Interest Rate Risk Management Program ("MIRRMP"). In one embodiment of the present invention the MIRRMP may be applied to a variable rate debt (e.g., unhedged variable rate debt). Under this embodiment of the MIRRMP approach, the use of variable rate debt by municipal debt managers (or by municipalities that have not yet authorized variable rate debt due to concerns about interest rate risk) is facilitated by helping to reduce the political risk to the debt managers and municipalities if interest rates rise. The MIRRMP approach as applied to variable rate debt may include one or more of the following: a) allowing or requiring conservative budgeting for variable rate debt interest while interest rates are low (e.g., wherein conservative budgeting may include budgeting at a fixed rate and/or at a higher interest rate than is actually expected); b) allowing or requiring that an amount of the current budgetary excess determined by formula be applied to reduce future interest rate risk either by retiring principal early or by funding a sinking fund; c) allowing or requiring the accumulated budgetary excess to be applied in future years when rates are high to reduce the amount of annual debt service; d) allowing or requiring current and accumulated budgetary excess to be applied (whether by retiring debt or by funding a sinking fund for a higher yield bond or a taxable bond, for example) across a series of credits (such as variable rate bonds and/or or fixed rate bonds) issued at different times in order to apply the excess in the most financially advantageous way and to reduce the impact of federal arbitrage limitations.

Further, for borrowers (or "issuers") with a variety of credits within a particular fund, the MIRRMP approach may allow or require the budgetary excess to be applied across different credits.

Further still, to reduce the probability of a spike in rates causing a budgetary problem even in early years, the MIRRMP approach may allow or require the extension of the principal amortization (e.g., from 30 to 35 years) to maintain annual debt service at a predetermined level if rates should rise and the impact of a) the early retirement of principal and/or b) amounts available in the sinking fund to be applied to principal and interest is not sufficient to avoid an increase in debt service;

Further still, when rates are low a higher amortization (i.e., a reduction in term) could be allowed or required compared to the amortization associated with fixed rate credits. Conversely, when rates are high a reduced (i.e., an extended term) or eliminated amortization could be allowed or required in order to maintain debt service at a predetermined budgetary level.

Further still, it is believed that the MIRRMP approach should allow an issuer to exceed the standard 20% limit on variable rate debt (excluding those hedged by short-term assets) imposed by some rating agencies (e.g., STANDARD & POORS) sine the interest risk is significantly reduced. In fact, it is believed that the MIRRMP approach could even obtain the issuer a rating benefit because the practical impact of the MIRRMP is likely to amortize debt more quickly.

Further still, for an issuer that comes to market regularly, the interest risk could be additionally reduced by issuing a portion of each financing as variable rate debt. So, even if rates rise generally, the savings from later issues together with the accumulated excess from earlier issues could be sufficient to prevent debt service from exceeding a predetermined budgetary amount. For an issuer with a lot of outstanding debt, the same economic effect could be accomplished by periodically converting a portion of the issuer's debt to variable rate debt through the use of interest rate swaps.

Typically, income from a municipality's short-term assets is generally affected by changes in interest rates in a manner inverse to the cost of variable rate debt. In other words, during times of rising interest rates, the additional income from a municipality's short term assets would likely offset any increase in the cost of the municipality's variable rate debt. Conversely, during times of falling interest rates, the reduced income from a municipality's short term assets would likely be offset by a decrease in the cost of the municipality's variable rate debt. Thus, combining variable rate debt (rather than fixed rate debt) with a municipality's variable rate assets should result in budgetary stability in that net debt service (variable rate debt service less earnings of short term assets) remains relatively constant regardless of what happens to interest rates. By contrast, combining fixed rated debt with variable rate assets should result in higher net debt service if rates either remain near current levels or go down and lower net debt service if rates increase significantly (producing budgetary volatility as rates rise or fall).

In addition, if financial conditions produce: a) an inverted tax-exempt yield curve (which, it is believed, is generally not seen); and/or b) a significant decrease in the federal tax rate then a borrower could incur current year losses on earlier variable interest rate debt (versus the fixed rates at which the credits, such as bonds, could have been issued).

In another embodiment of the present invention, the MIRRMP may be applied to moderate basis risk associated with an interest rate swap.

More particularly, just as the MIRRMP approach of the present invention can be used to manage the budgetary impact of unhedged variable rate debt, it can also be employed to manage the budgetary impact of basis risk for synthetic fixed rated debt.

In one particular example (which is intended for illustration only, and is not intended to be restrictive), assume that an issuer creates synthetic fixed rate debt using a fixed-payer swap under which the variable rate received by the issuer equals BMA ("Bond Market Association"), with a tax flip to 65% of the London Interbank Offered Rate ("LIBOR") if the marginal tax rate is reduced below 25%. The issuer would have four potential sources of basis risk:

1. Issuer credit risk;
2. Credit enhancer and liquidity provider credit risk
3. State tax risk; and
4. Federal tax risk if a tax flip occurs.

Further, assume that the issuer's variable rate debt is expected to trade at BMA and that the issuer's fixed swap payment is equal to 4.50%.

Given these conditions, the issuer could obligate itself under the MIRRMP approach of the present invention to budget at a slightly higher amount based on a 4.52% fixed swap rate and to receive a variable payment based on BMA plus 2 basis points. To the extent that the issuer's variable rate debt trades, as expected, at BMA or better, the excess amounts received by the issuer could be used to retire principal and/or to fund a sinking fund. Amounts in the sinking fund could be drawn upon in later years if the variable rate debt traded at a rate higher than BMA plus 2 basis points in order to mitigate the budgetary impact of the basis mismatch. Amounts funded from the sinking fund could be excluded from the rate covenant calculation.

Moreover, the variable rate debt could be structured under the MIRRMP approach of the present invention with a longer nominal maturity and with an amortization determined by formula. To the extent that the issuer's variable rate exceeds the variable swap payments (including the results of a tax flip), the amortization could be adjusted (e.g., extended) so as to maintain the issuer's budgetary requirement unchanged. Similarly, additional principal could be amortized from any amounts by which the variable swap payment exceeds the issuer's variable rate. It is noted that the ability to adjust the amortization may be limited by legal requirements governing amortization of the issuer's bonds.

Referring now to FIG. 1A, a flowchart showing a method for managing variable rate debt according to one embodiment of the present invention is shown. As seen in this Fig., starting at Step 101a a borrower begins an action cycle. Each action cycle may occur periodically, such as monthly or annually, for example. During an action cycle the borrower (or the borrower's representative) carries out each step of the method as required given prevailing interest rates and budgetary excess.

More particularly, it is seen that at Step 103a the borrower is required to conservatively budget for interest owed on the variable rate debt during a time period when an interest rate on the variable rate debt is below a first predetermined low interest rate level. At Step 105a the borrower is required to apply at least a portion of any existing current budgetary excess to reduce future interest rate risk by performing at least one of i) the early retirement of principal associated with the variable rate debt and ii) the funding of a sinking fund. At Step 107a the borrower is required to apply at least a portion of any accumulated budgetary excess during a time period when the interest rate is above a first predetermined high interest rate level to reduce an amount of debt service associated with the variable rate debt. At Step 109a the borrower is required to extend a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels. At Step 111a the borrower is required to reduce a principal amortization period associated with the variable rate debt during the time period when the interest rate is below a second predetermined low interest rate level, wherein the first predetermined low interest rate level and second predetermined low interest rate level are selected from the group of i) different levels and ii) the same levels. The borrower may be required to apply at least one of the current budgetary excess and the accumulated budgetary excess to different credits within a fund of credits. At least two of the credits in the fund of credits may be issued at different times and one or more of the credits may be a bond.

It should be noted that the steps described above do not necessarily need to be carried out in the order indicated and not all steps necessarily need to be carried out during any given cycle.

Figure 1B:
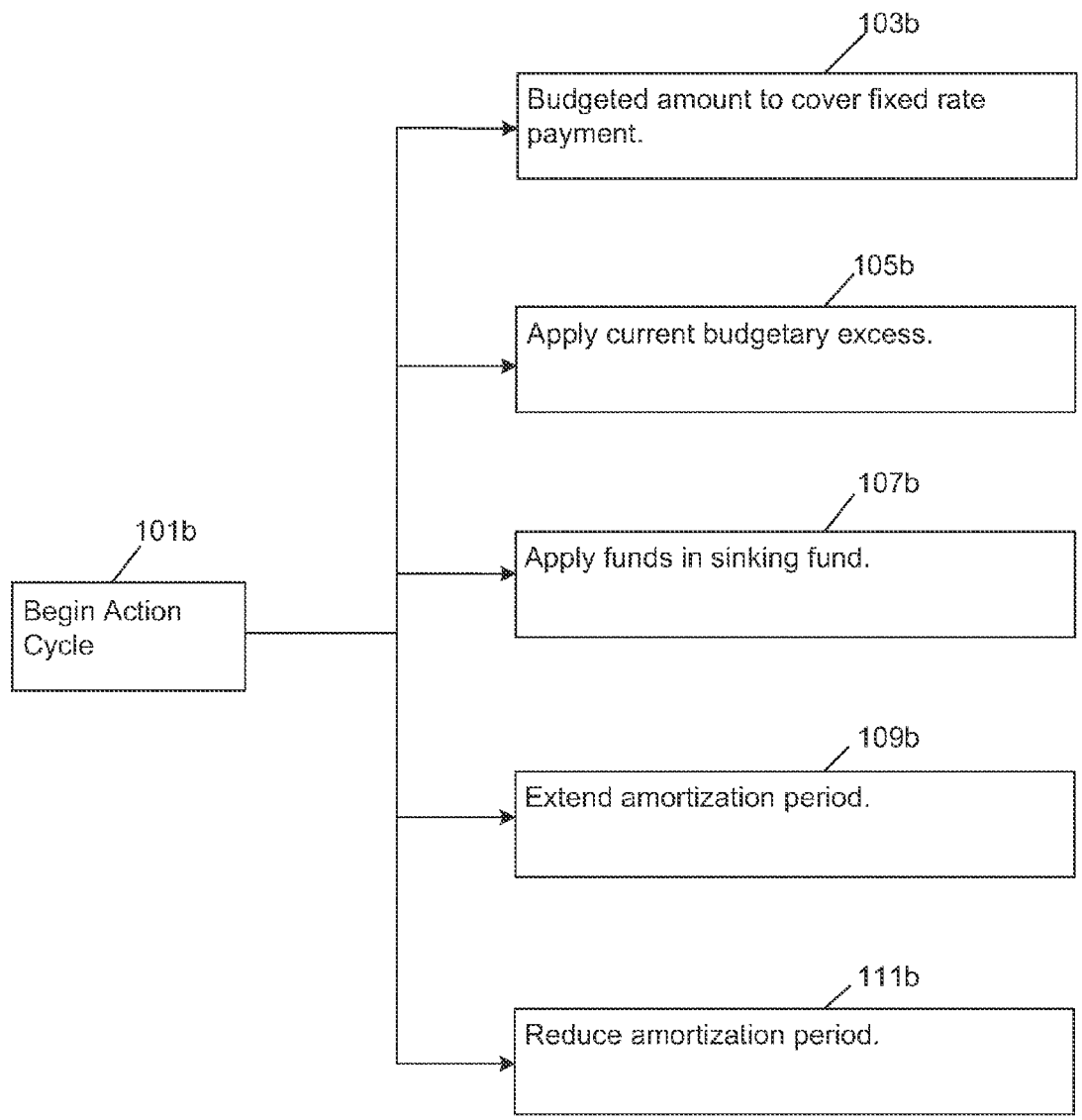
FIG. 1B shows a flowchart of a method according to another embodiment of the present invention.

Referring now to FIG. 1B, a flowchart showing a method for managing basic risk associated with synthetic fixed rate debt created by an issuer using an interest rate swap in which the issuer makes a fixed rate payment and receives a variable rate payment that at least partially offsets an interest payment on a variable rate bond issued by the issuer according to another embodiment of the present invention is shown. As seen in this Fig., starting at Step 101b an issuer begins an action cycle. Each action cycle may occur periodically, such as monthly or annually, for example. During an action cycle the issuer (or the issuer's representative) carries out each step of the method as required given prevailing interest rates and budgetary excess.

More particularly, it is seen that at Step 103b the issuer is required to budget a budgeted amount to cover the fixed rate payment, wherein the budgeted amount is higher than the amount of the fixed rate payment. At Step 105b the issuer is required to apply at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund. At Step 107b the issuer is required to apply at least a portion of any funds in the sinking fund to the interest payment on the variable rate bond if the interest payment on the variable rate bond increases above a predetermined high interest rate level. The predetermined high interest rate level may be a predetermined excess over a current interest rate associated with the variable rate payment to the issuer. Any amounts applied from the sinking fund may be excluded from a rate covenant calculation associated with the synthetic fixed rate debt. At Step 109b an amortization period of the variable rate bond is extended when the variable rate payment received by the issuer is less than the interest payment on the variable rate bond. At Step 111b an amortization period of the variable rate bond is reduced when the variable rate payment received by the issuer exceeds the interest payment on the variable rate bond.

It should be noted that the steps described above do not necessarily need to be carried out in the order indicated and not all steps necessarily need to be carried out during any given cycle. For example, in one embodiment, after Step 101b, Steps 103b, 105b and 107b are conducted together. In another embodiment, after Step 101b, only Step 109b is conducted. In yet another embodiment, after Step 101b, Steps 103b, 105b, 107b and 109b are conducted together. In a further embodiment, after Step 101b, Steps 109b and 111b are conducted together. In yet a further embodiment, after Step 101b, only Step 111b is conducted.

Figure 2A:
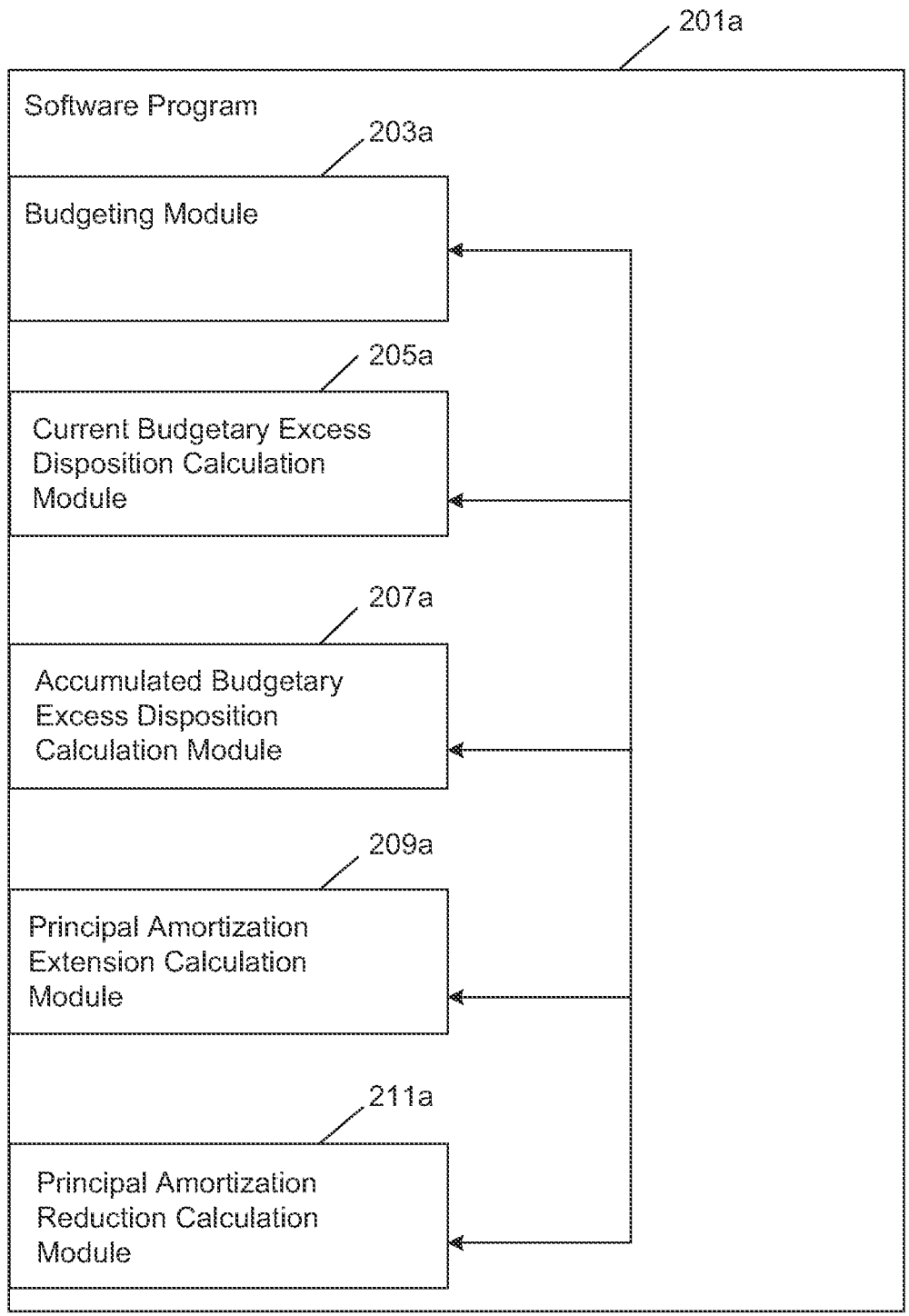
FIG. 2A shows a block diagram of a software program according to another embodiment of the present invention.

Referring now to FIG. 2A, a block diagram of a software program for managing variable rate debt according to one embodiment of the present invention is shown. As seen in this Fig., Software Program 201a includes:

1) Budgeting Module 203a for calculating a conservative budget for interest owed on the variable rate debt during a time period when an interest rate on the variable rate debt is below a first predetermined low interest rate level;

2) Current Budgetary Excess Disposition Calculation Module 205a for calculating a value of at least a portion of any existing current budgetary excess to be applied to reduce future interest rate risk by performing at least one of i) the early retirement of principal associated with the variable rate debt and ii) the funding of a sinking fund;

3) Accumulated Budgetary Excess Disposition Calculation Module 207a for calculating a value of at least a portion of any accumulated budgetary excess to be applied during a time period when the interest rate is above a first predetermined high interest rate level to reduce an amount of debt service associated with the variable rate debt;

4) Principal Amortization Extension Calculation Module 209a for calculating an extension to a principal amortization period associated with the variable rate debt to maintain the amount of debt service below a predetermined debt service level during the time period when the interest rate is above a second predetermined high interest rate level and the impact of the performance of at least one of i) the early retirement of principal and ii) the application to principle and interest of amounts available in the sinking fund is not sufficient to avoid an increase in the amount of debt service above the predetermined debt service level, wherein the first predetermined high interest rate level and second predetermined high interest rate level are selected from the group of i) different levels and ii) the same levels; and 5) Principal Amortization Reduction Calculation Module 211a for calculating a reduction to a principal, amortization period associated with the variable rate debt during the time period when the interest rate is below a second predetermined low interest rate level, wherein the first predetermined low interest rate level and second predetermined low interest rate level are selected from the group of i) different levels and ii) the same levels.

Figure 2B:
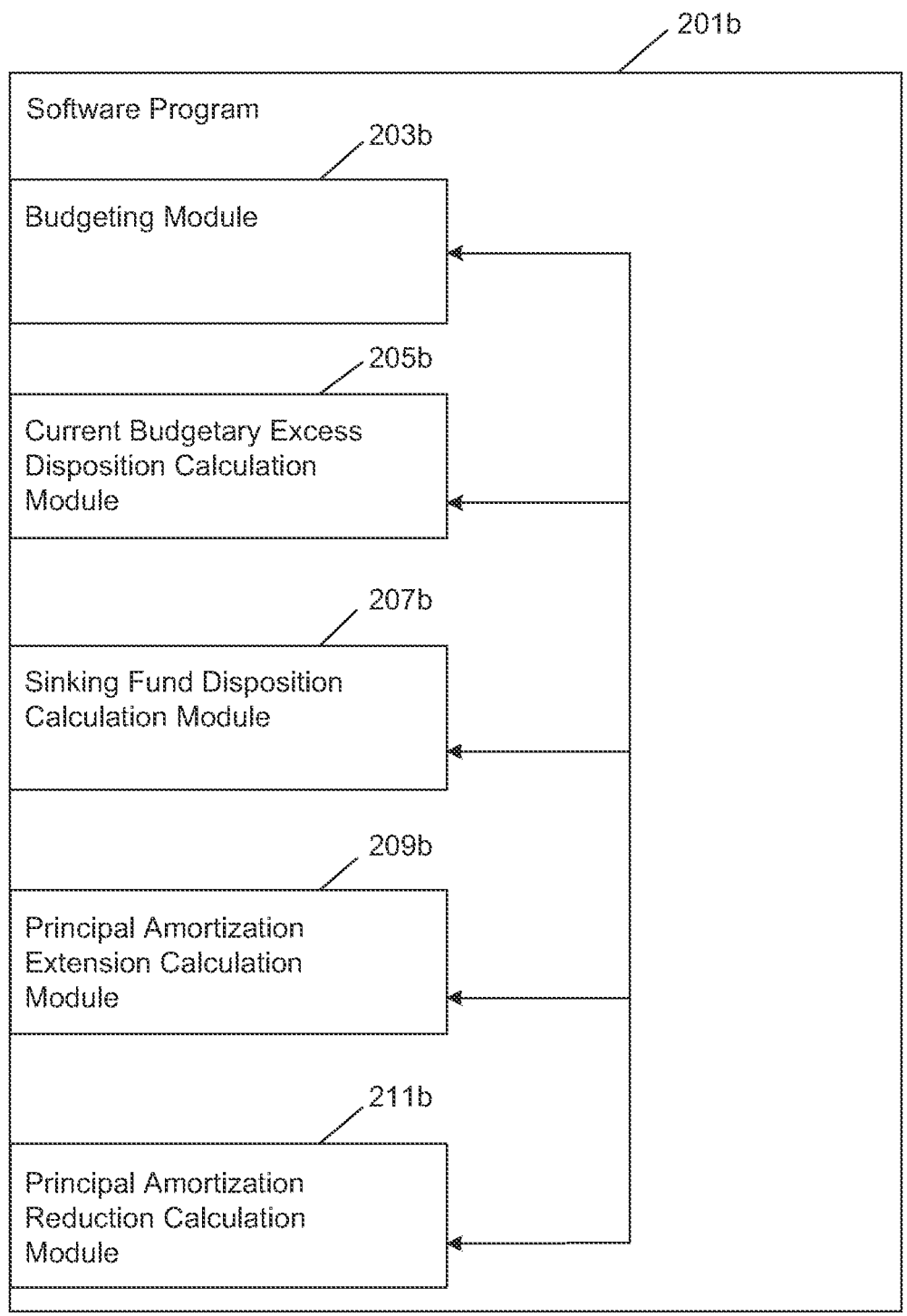
FIG. 2B shows a block diagram of a software program according to another embodiment of the present invention.

Referring now to FIG. 2B, a block diagram of a software program for managing basis risk associated with synthetic fixed rate debt created by an issuer using an interest rate swap in which the issuer makes a fixed rate payment and receives a variable rate payment that at least partially offsets an interest payment on a variable rate bond issued by the issuer according to one embodiment of the present invention is shown. As seen in this Fig., Software Program 201b includes:

1) Budgeting Module 203b for calculating a budgeted amount to cover the fixed rate payment, wherein the budgeted amount is higher than the amount of the fixed rate payment;

2) Current Budgetary Excess Disposition Calculation Module 205b for calculating the value of at least a portion of any current budgetary excess resulting from the receipt of the variable rate payment at a level that produces a payment higher than the interest payment on the variable rate bond to perform at least one of i) the early retirement of principal associated with the synthetic fixed rate debt and ii) the funding of a sinking fund;

3) Sinking Fund Disposition Calculation Module 207b for calculating the value of at least a portion of any funds in the sinking fund to be applied to the interest payment on the variable rate bond if the interest payment on the variable rate bond increases above a predetermined high interest rate level;

4) Principal Amortization Extension Calculation Module 209b for calculating an extension to a principal amortization period associated with the variable rate bond when the variable rate payment received by the issuer is less than the interest payment on the variable rate bond; and 5) Principal Amortization Reduction Calculation Module 211b for calculating a reduction in a principal, amortization period associated with the variable rate bond when the variable rate payment received by the issuer exceeds the interest payment on the variable rate bond.

Figure 3:
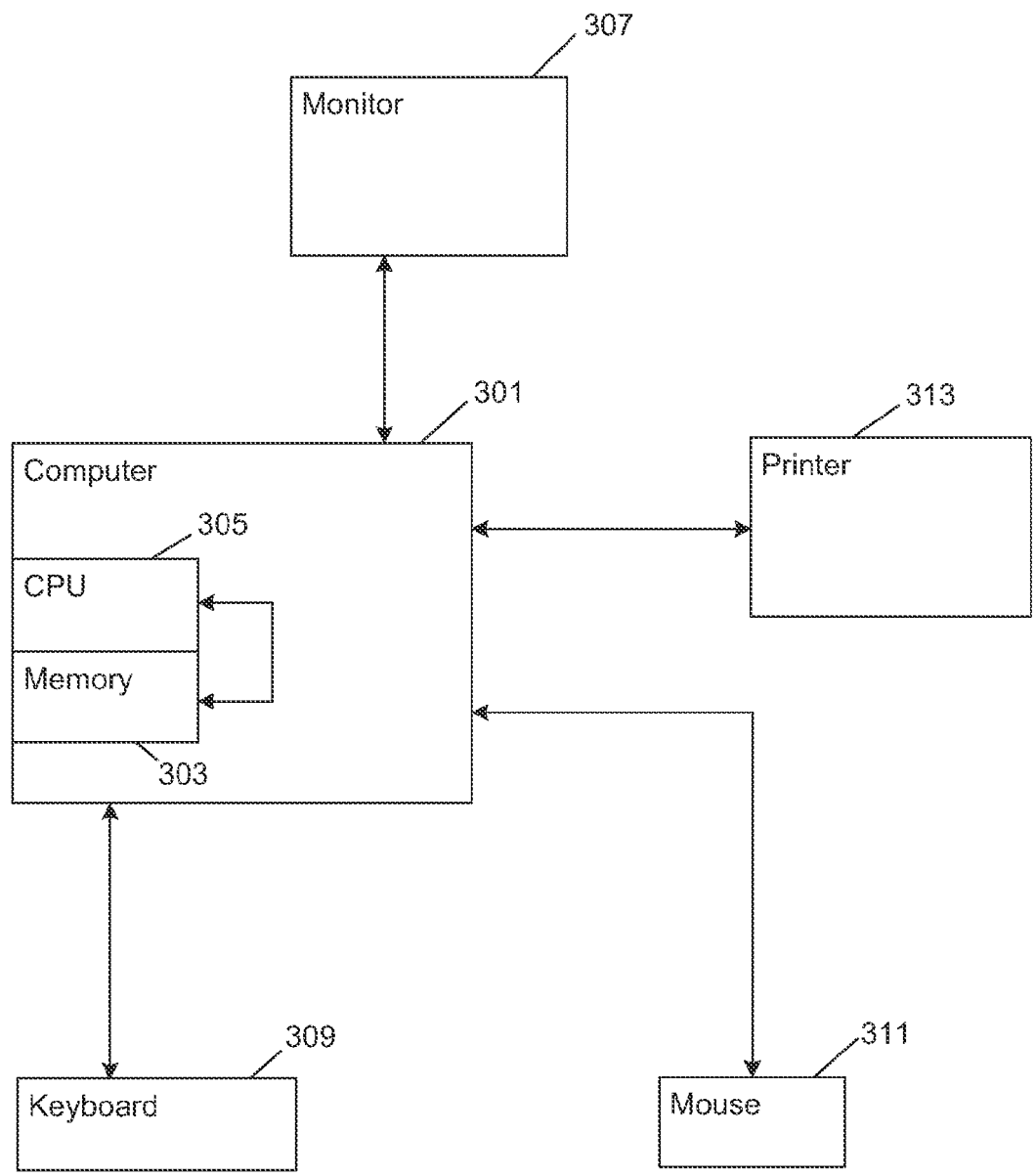
FIG. 3 shows a block diagram of a system according to another embodiment of the present invention.
Figure 4A:
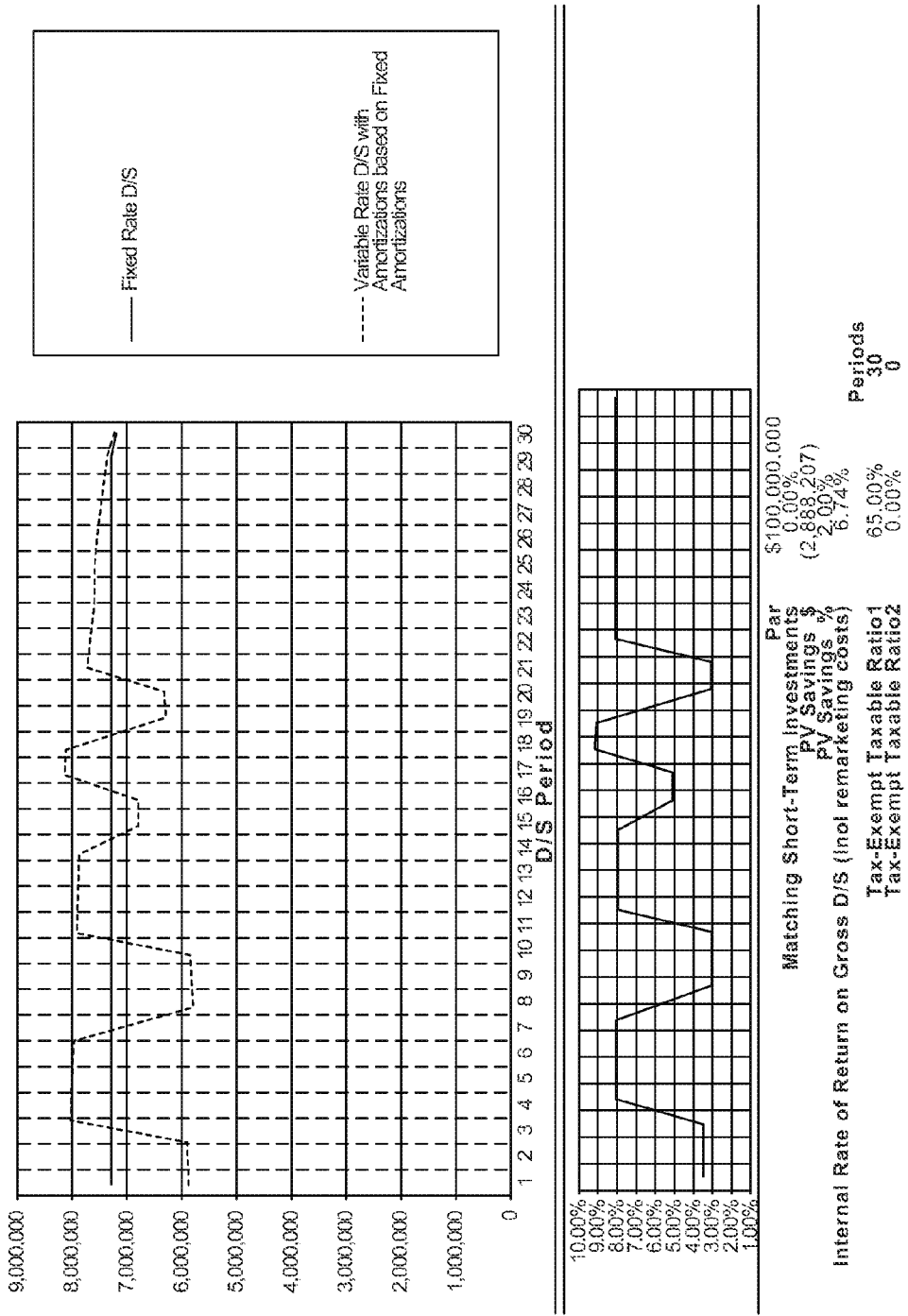
FIGS. 4A-4X show various comparisons of fixed and variable rate options.
Figure 4B:
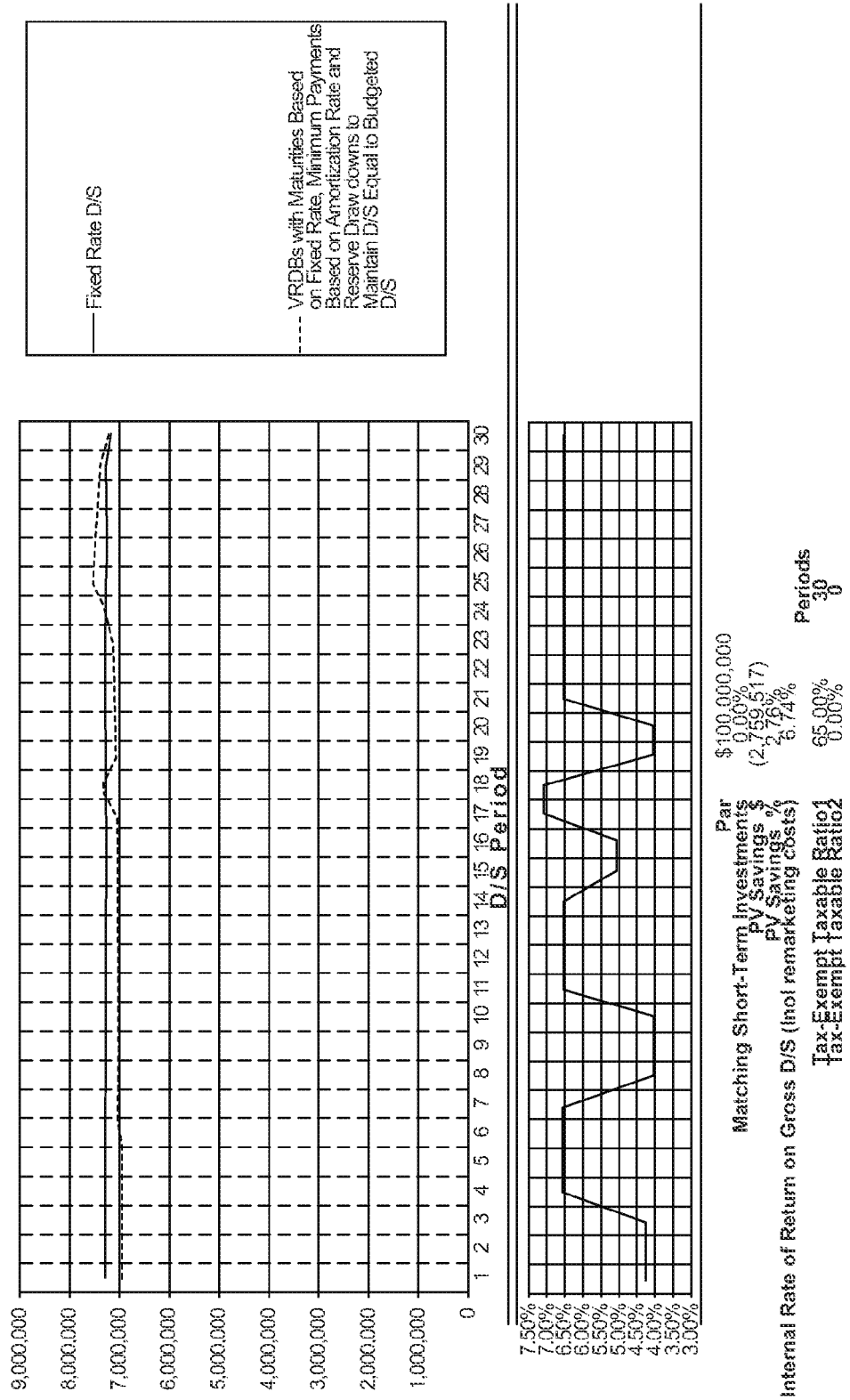
Figure 4C:
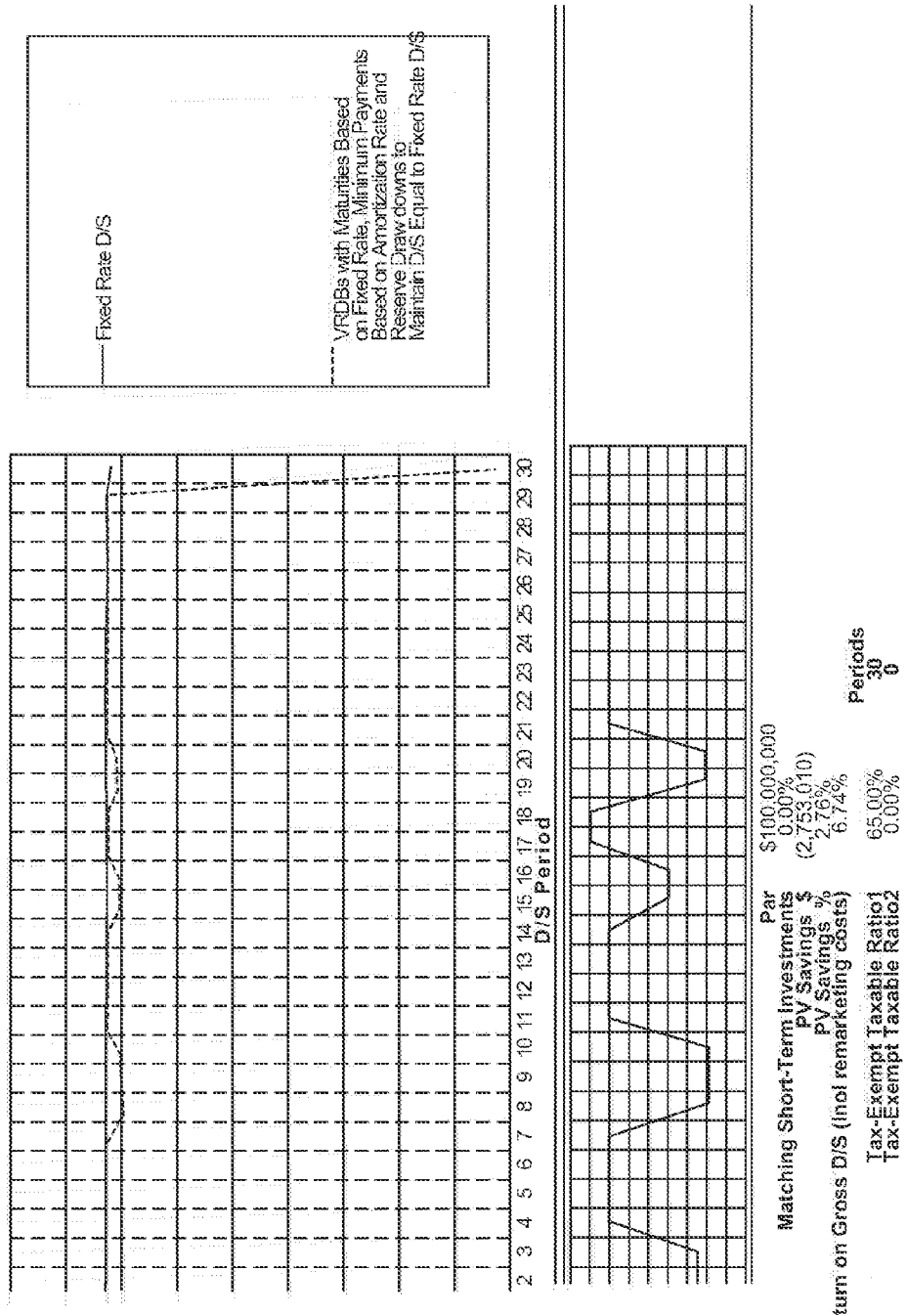
Figure 4D:
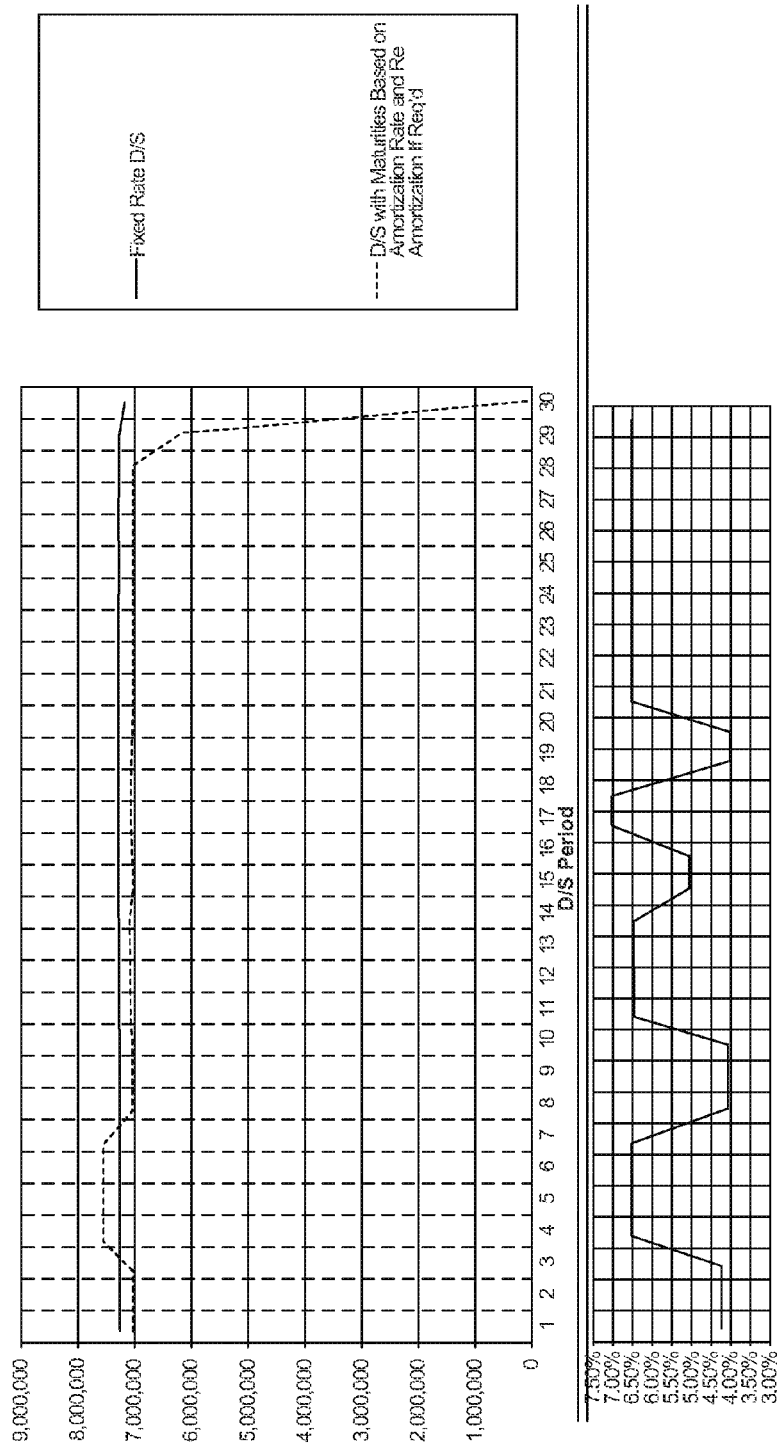
Figure 4E:
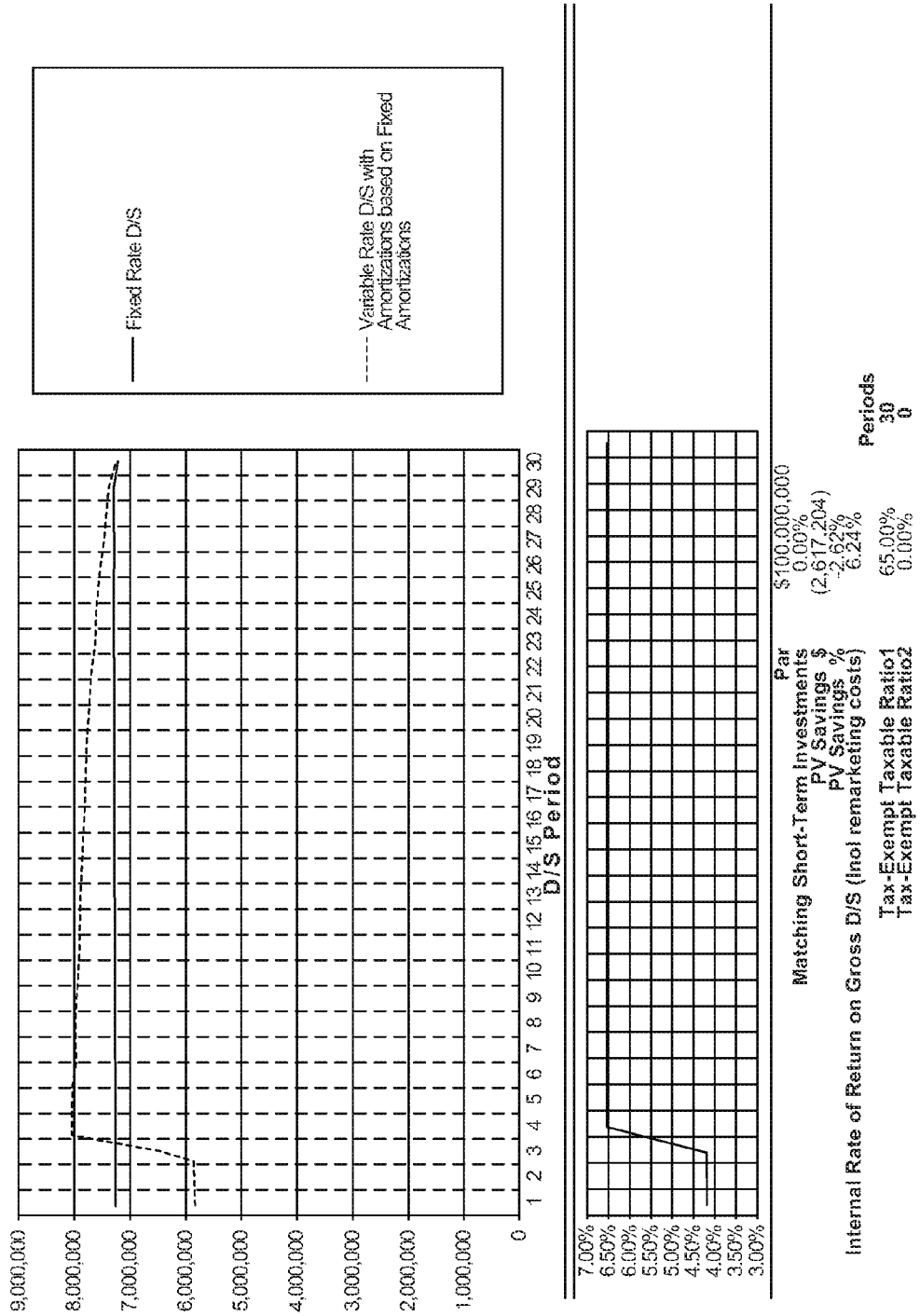
Figure 4F:
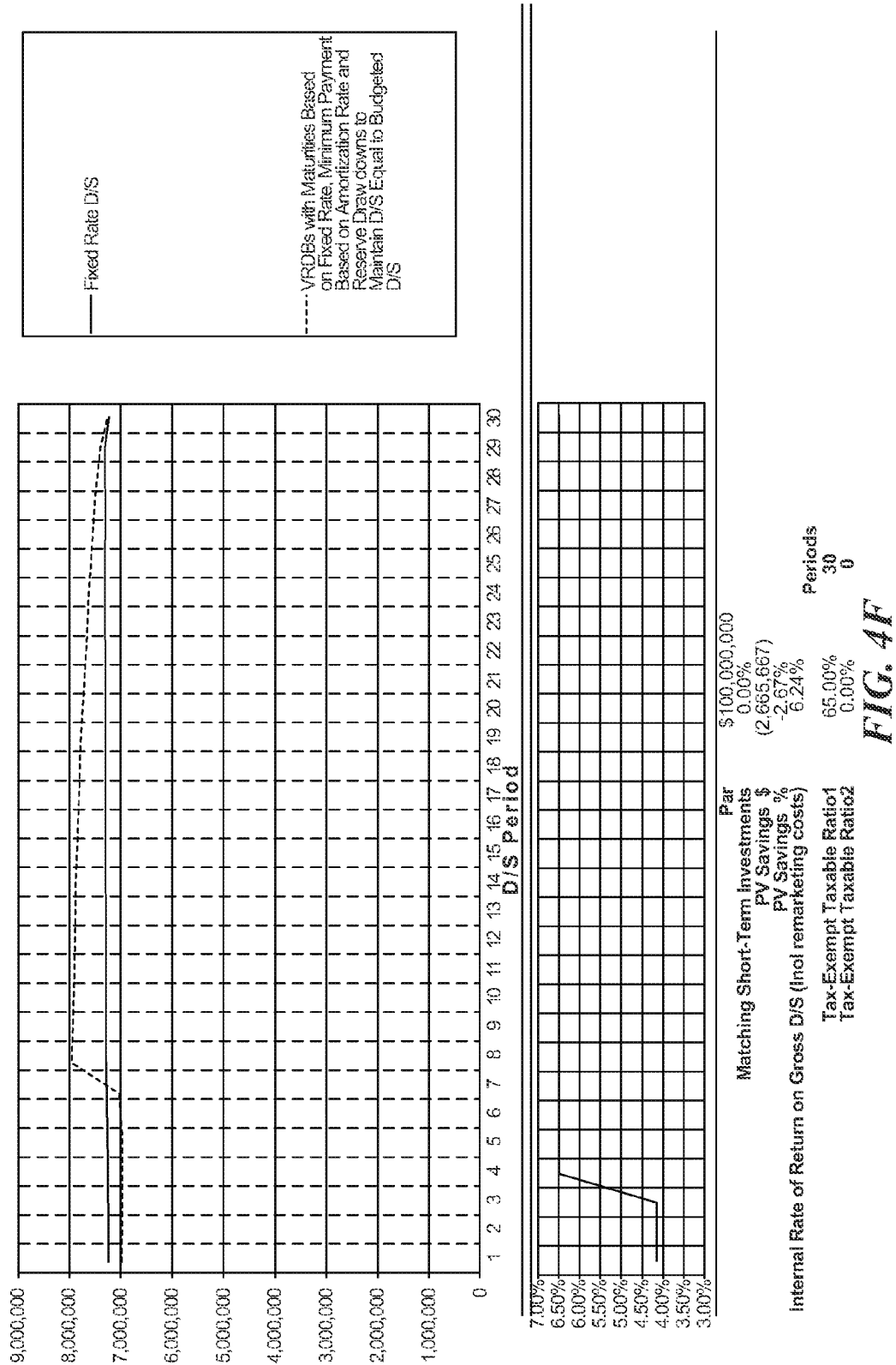
Figure 4G:
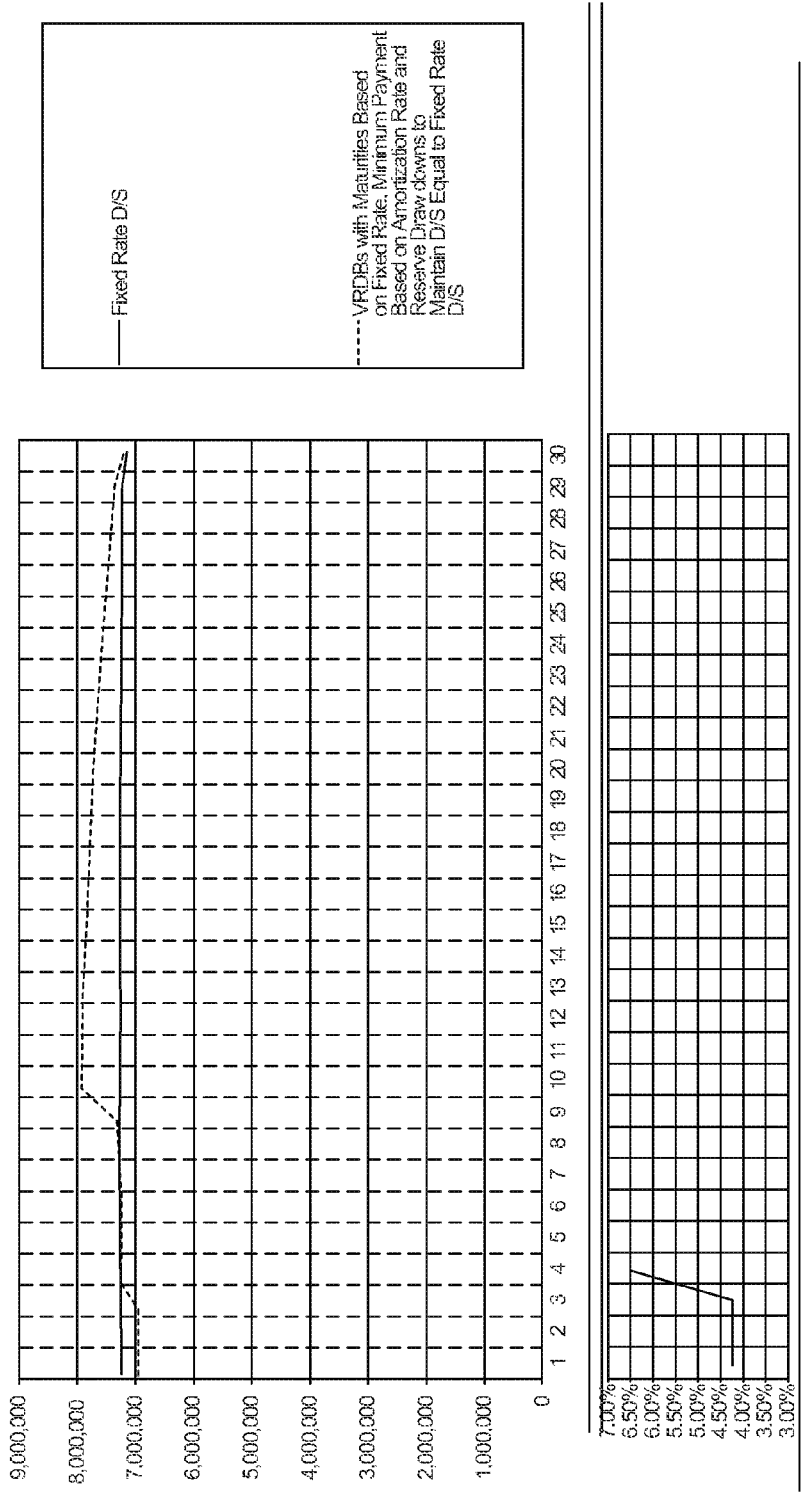
Figure 4H:
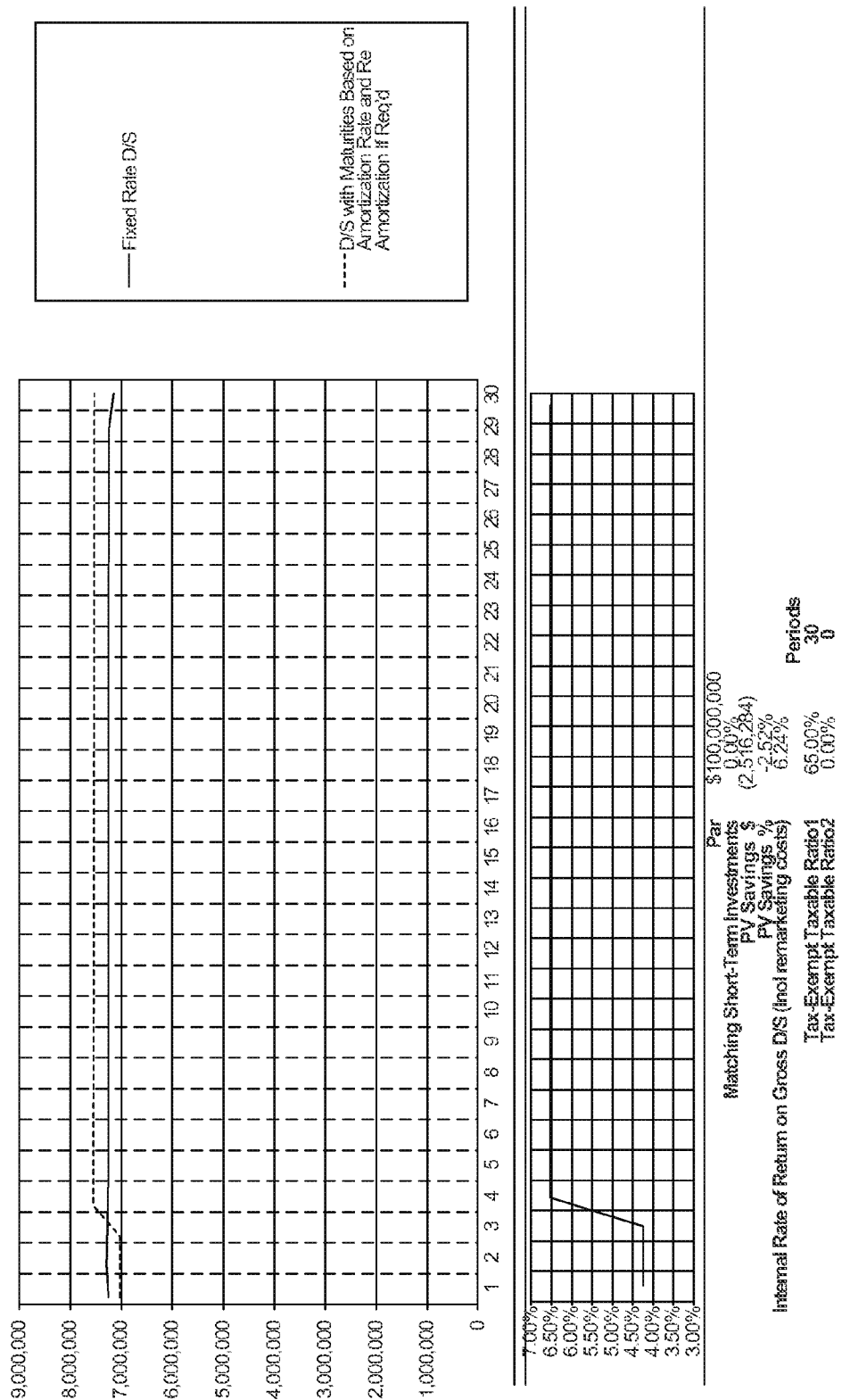
Figure 41:
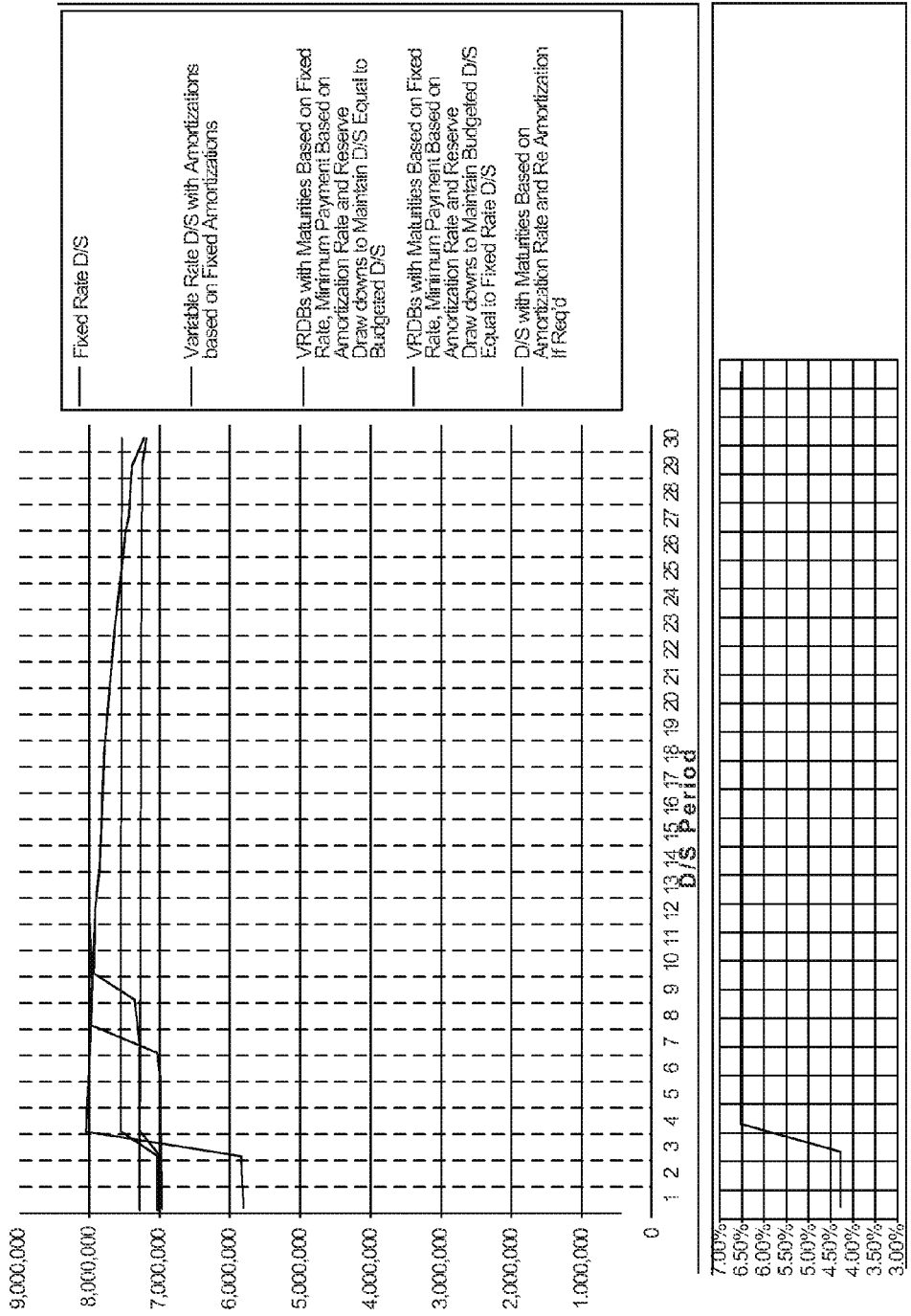
Figure 4J:
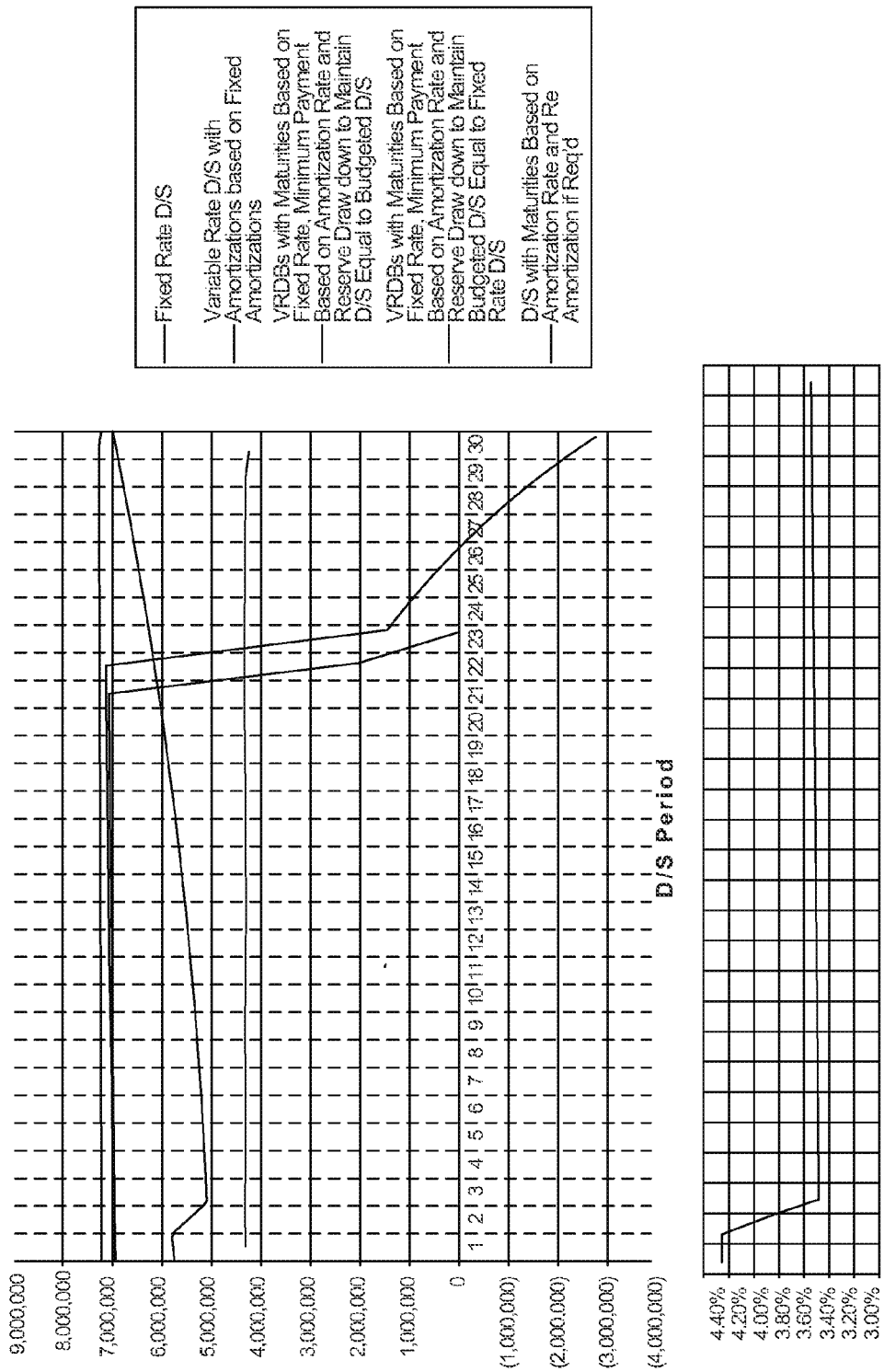
Figure 4K:
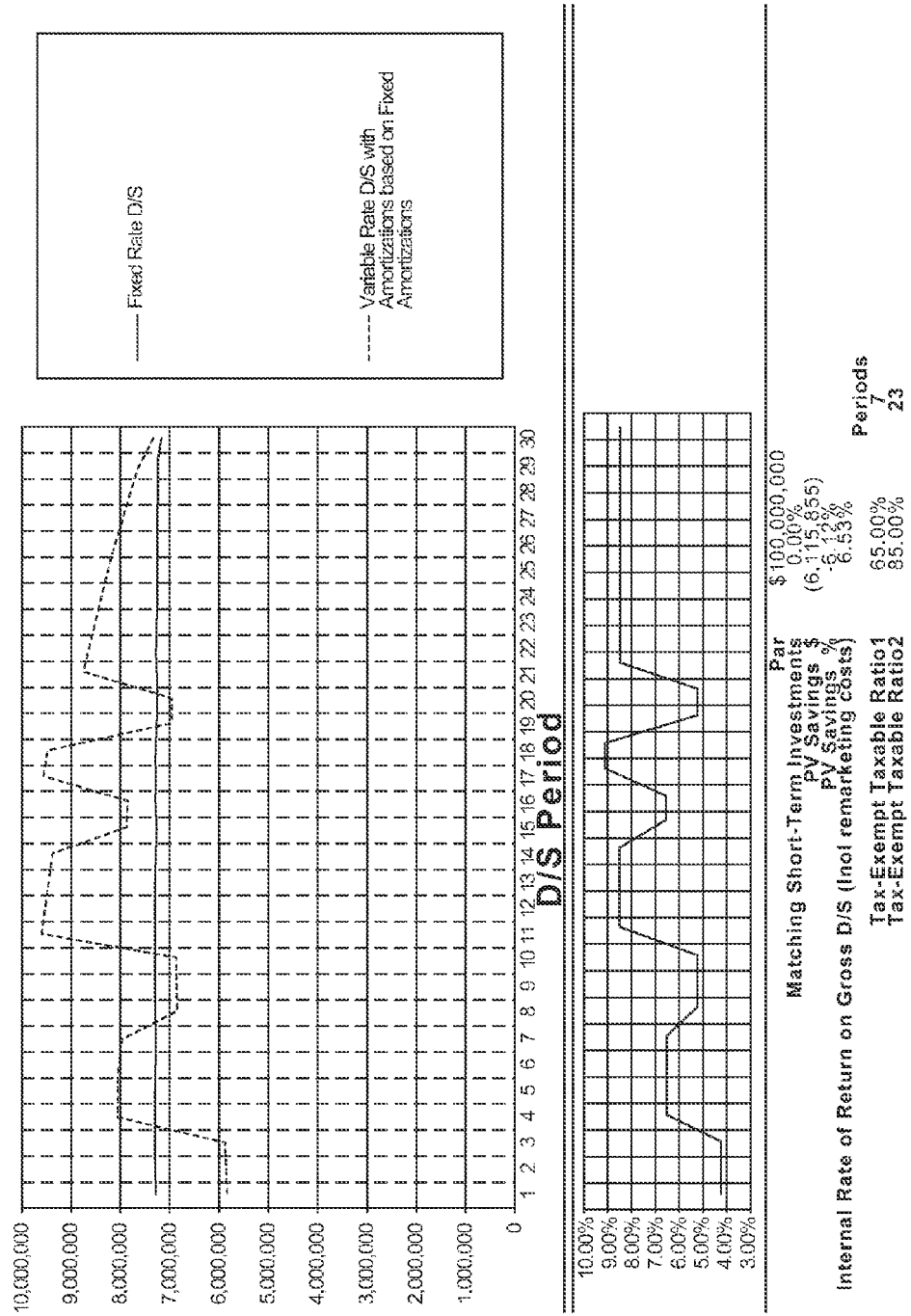
Figure 4L:
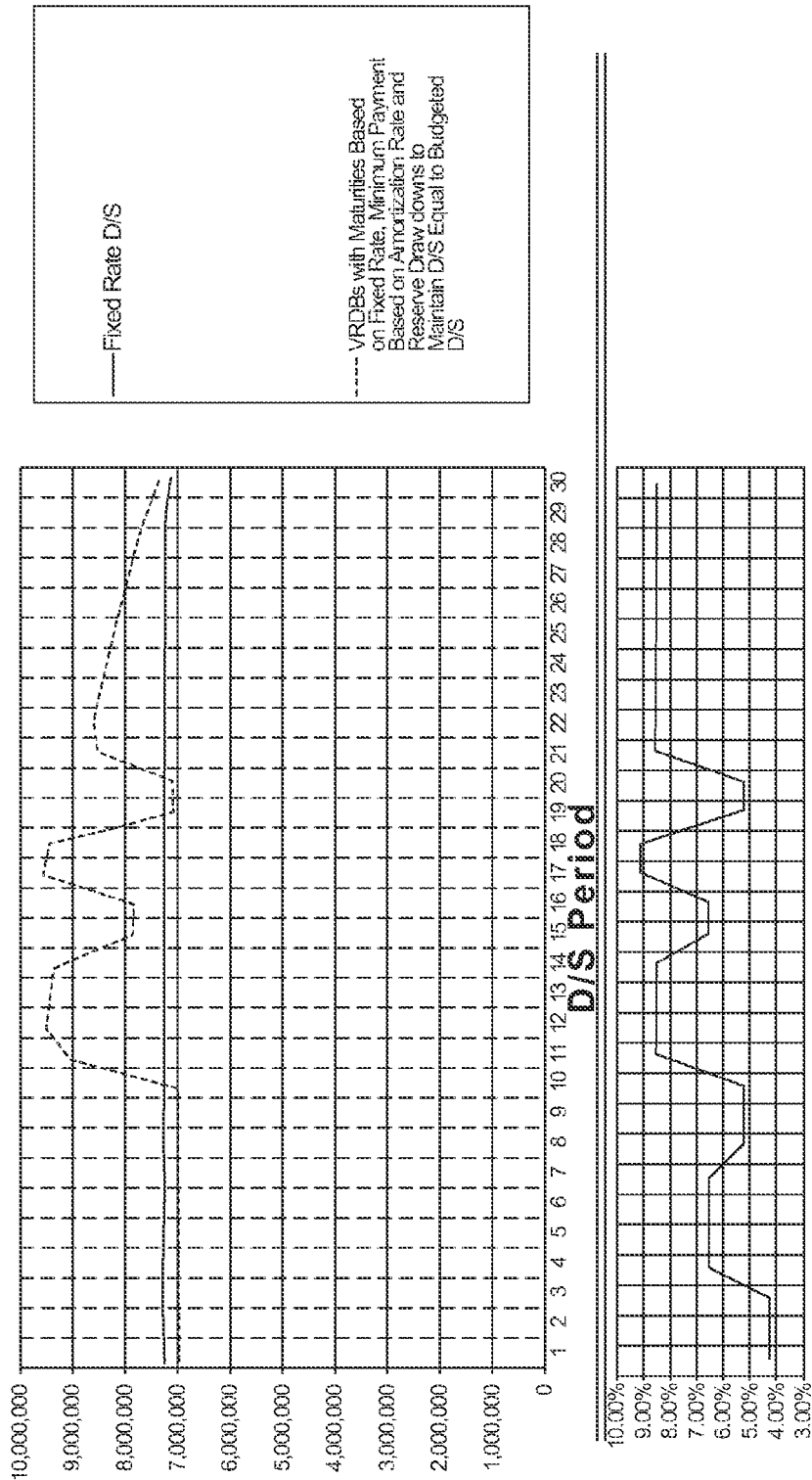
Figure 4M:
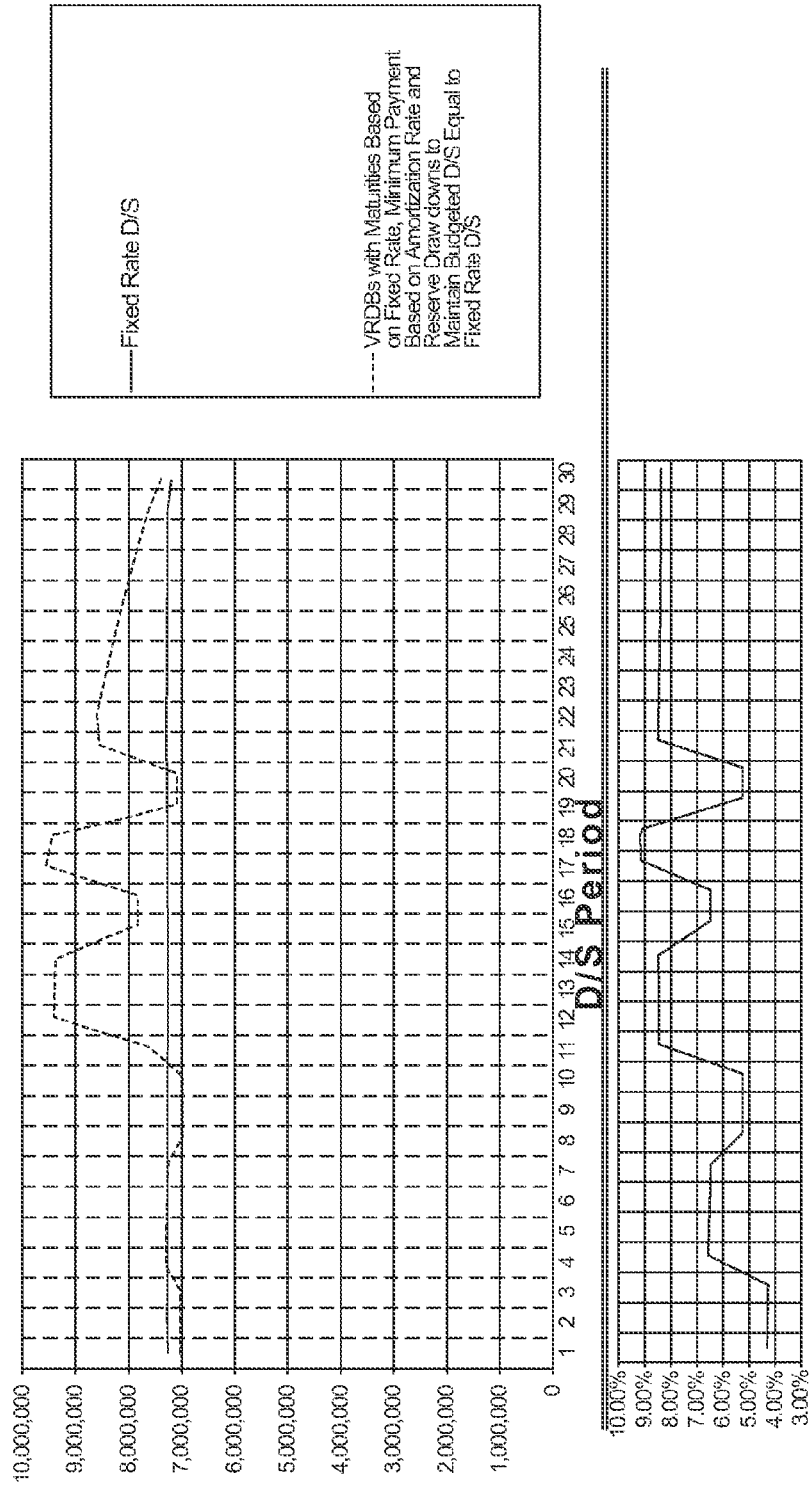
Figure 40:
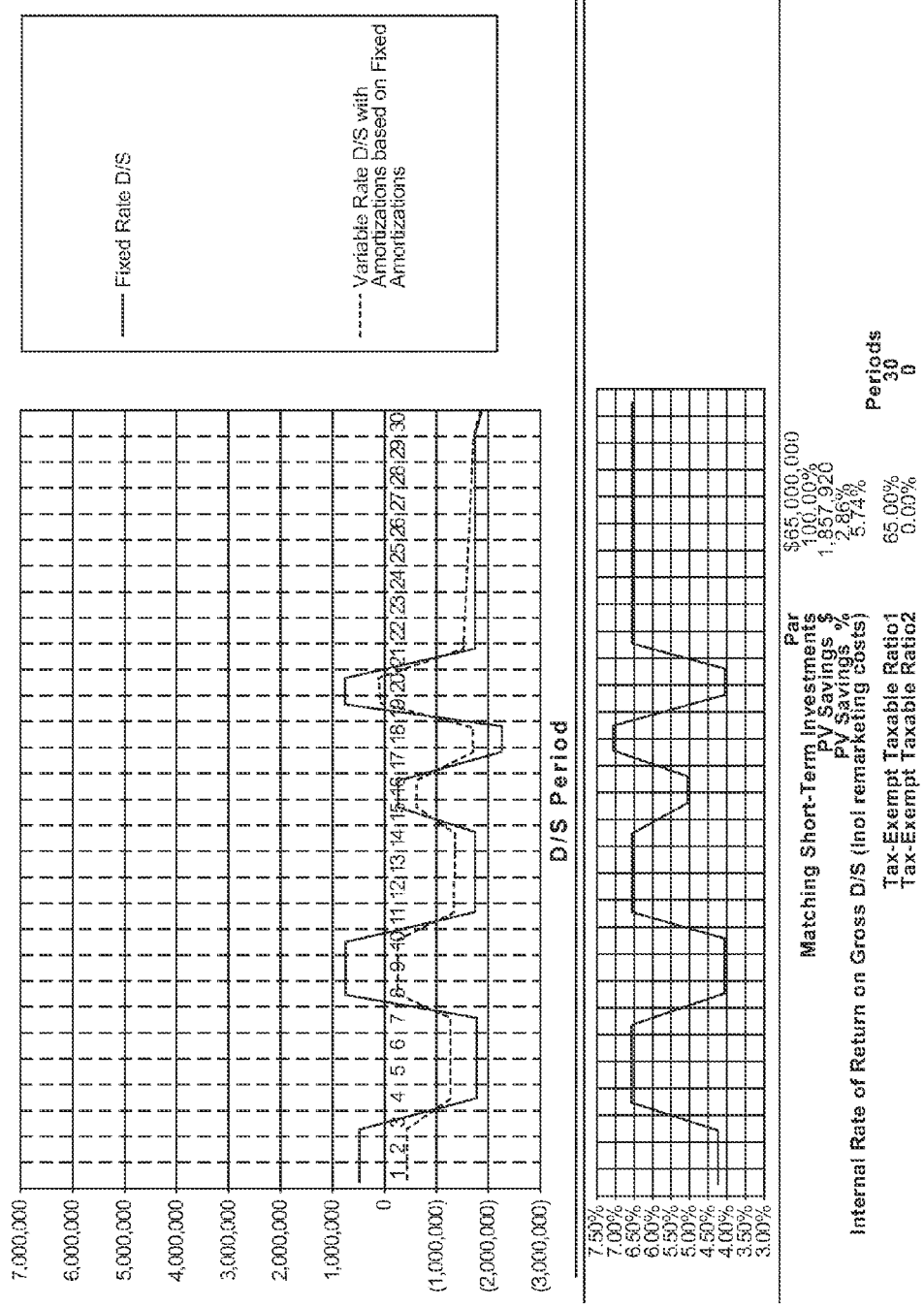
Figure 4P:
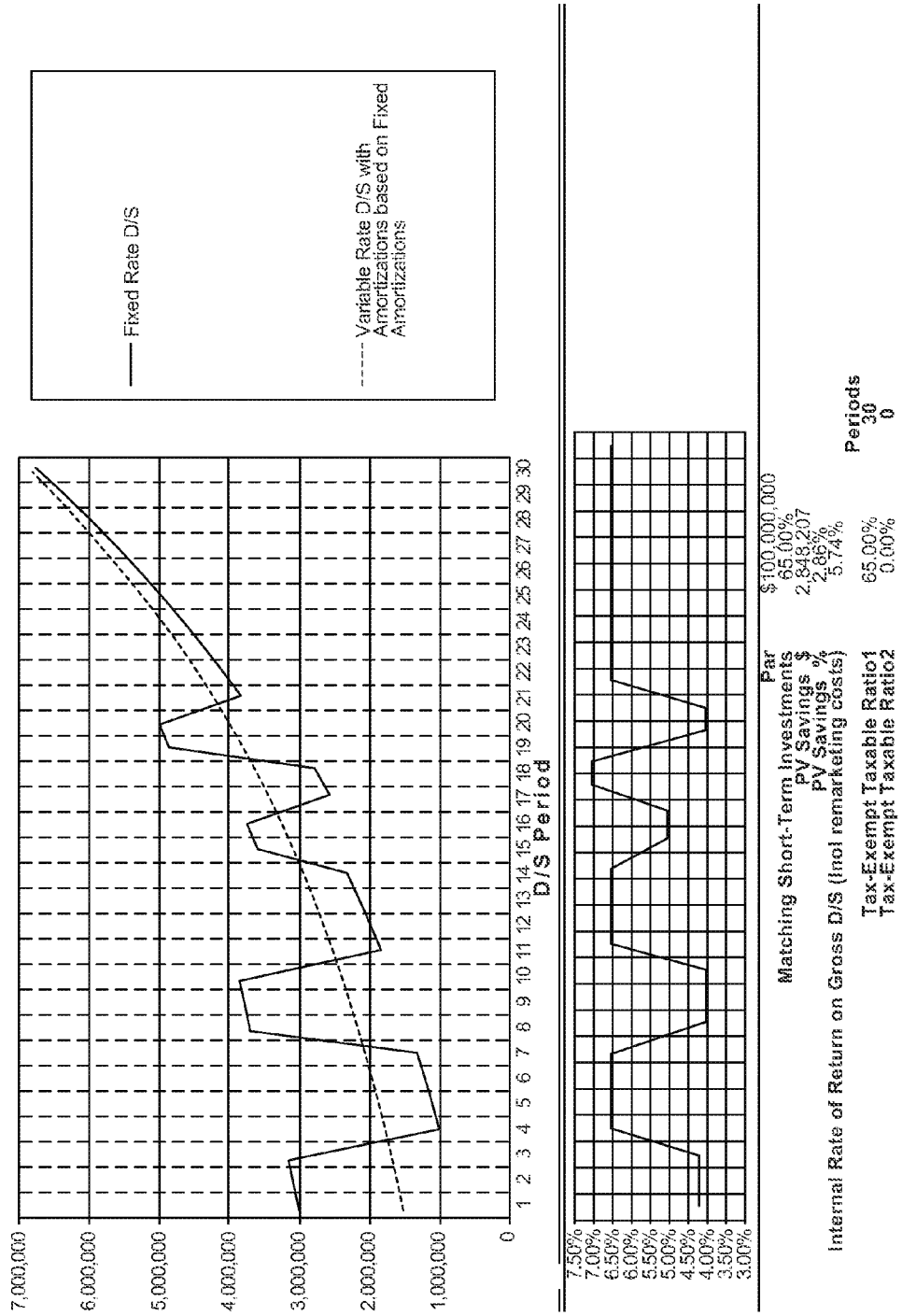
Figure 4Q:
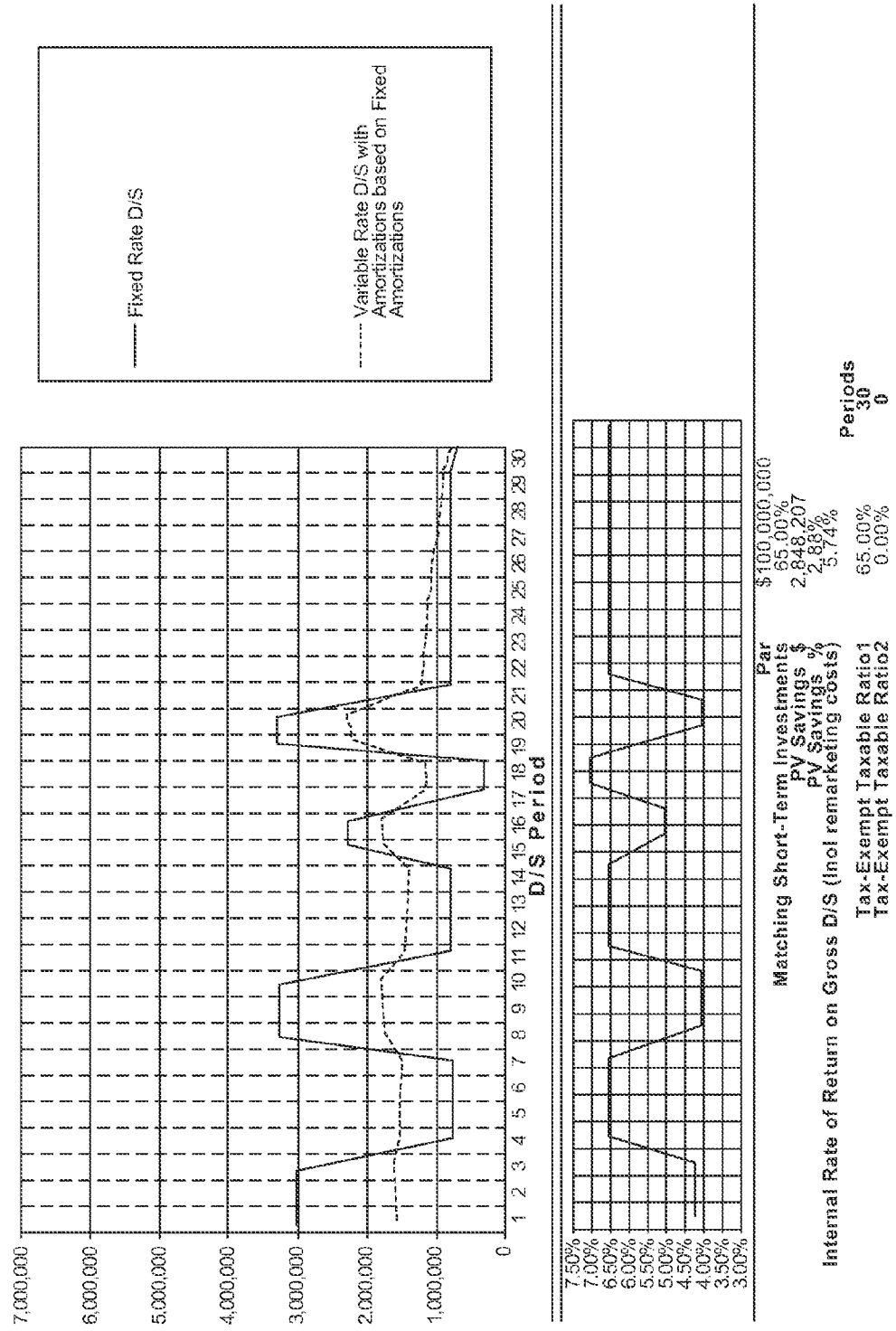
Figure 4R:
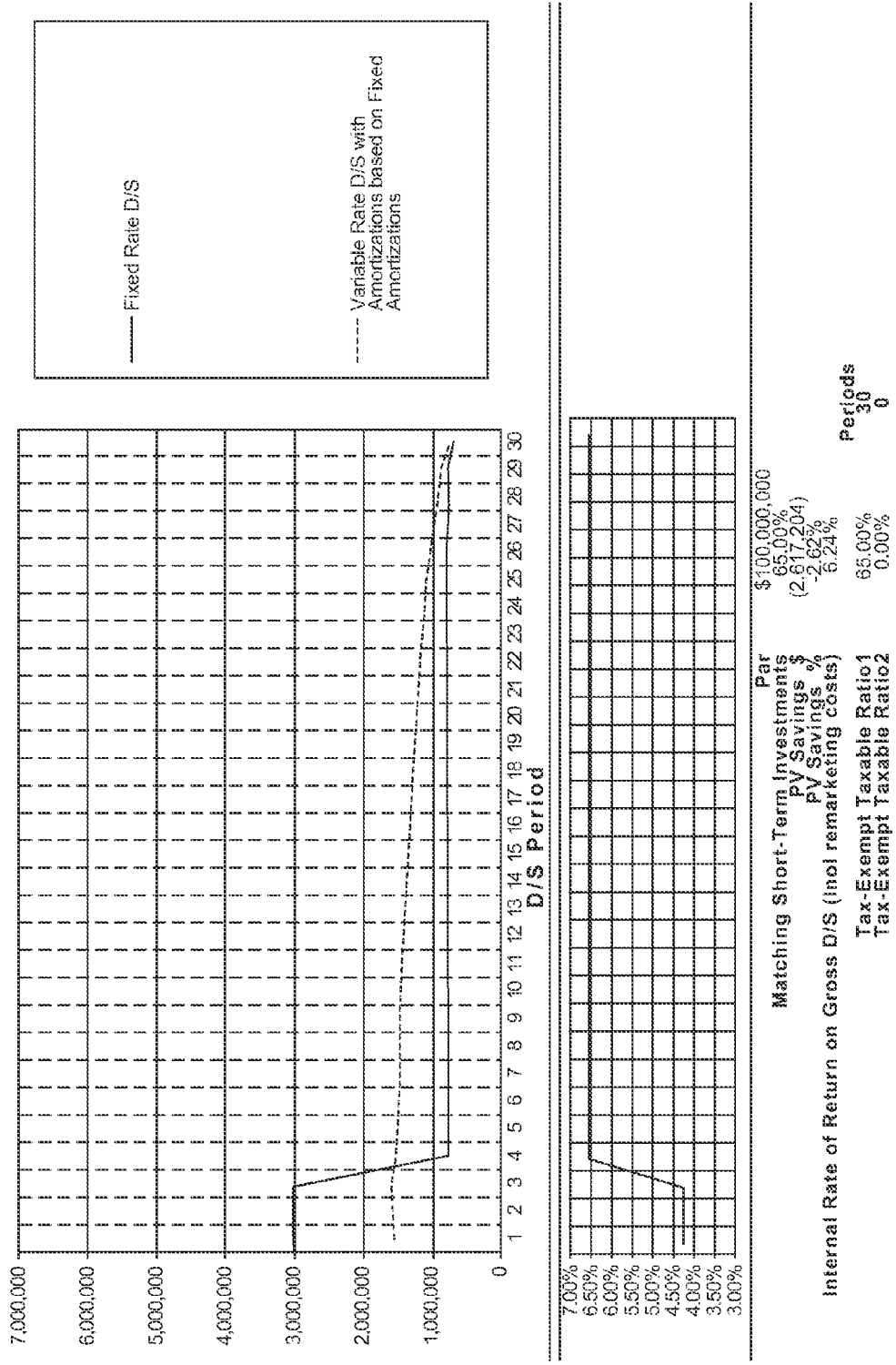
Figure 4S:
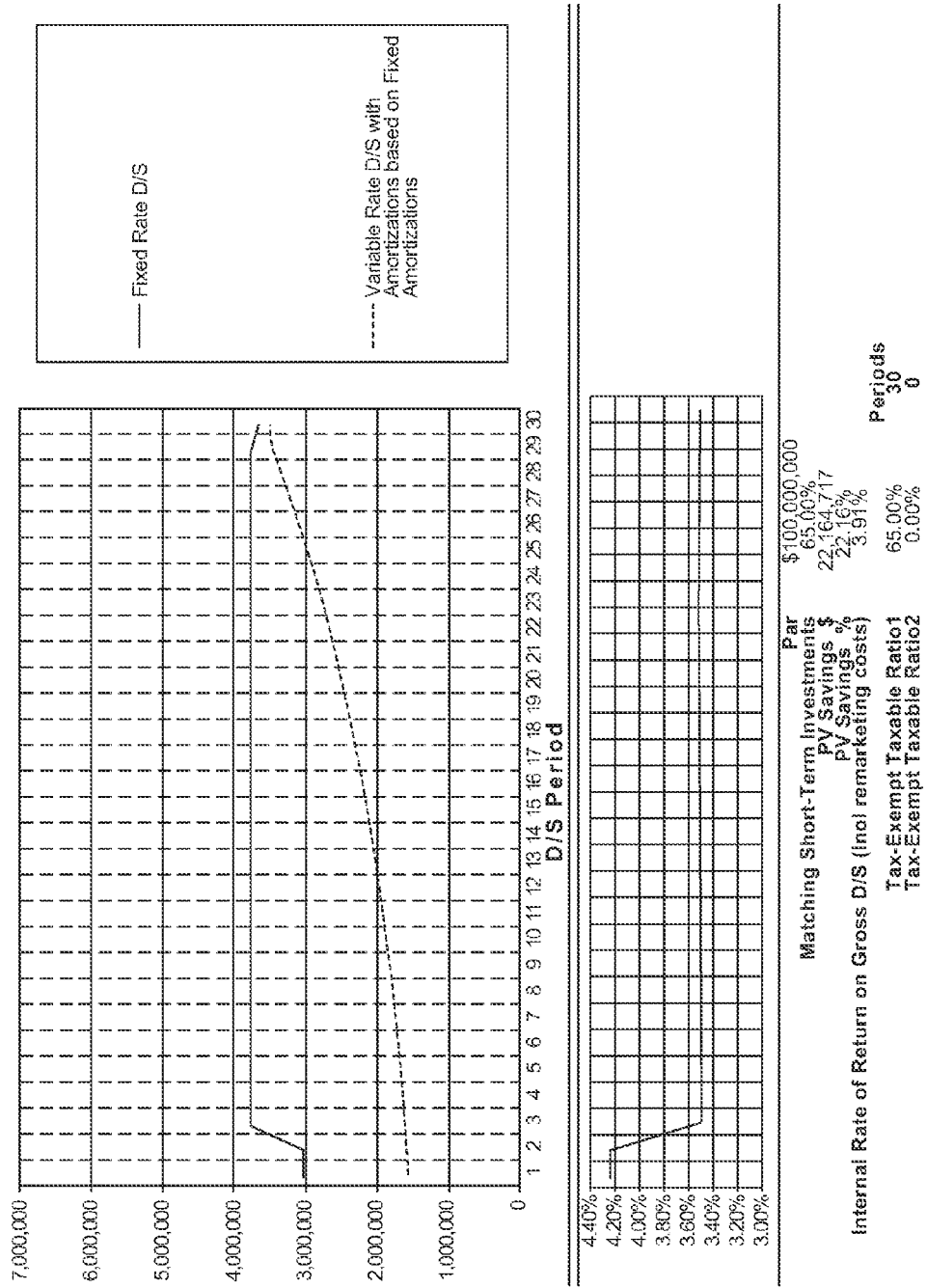
Figure 4T:
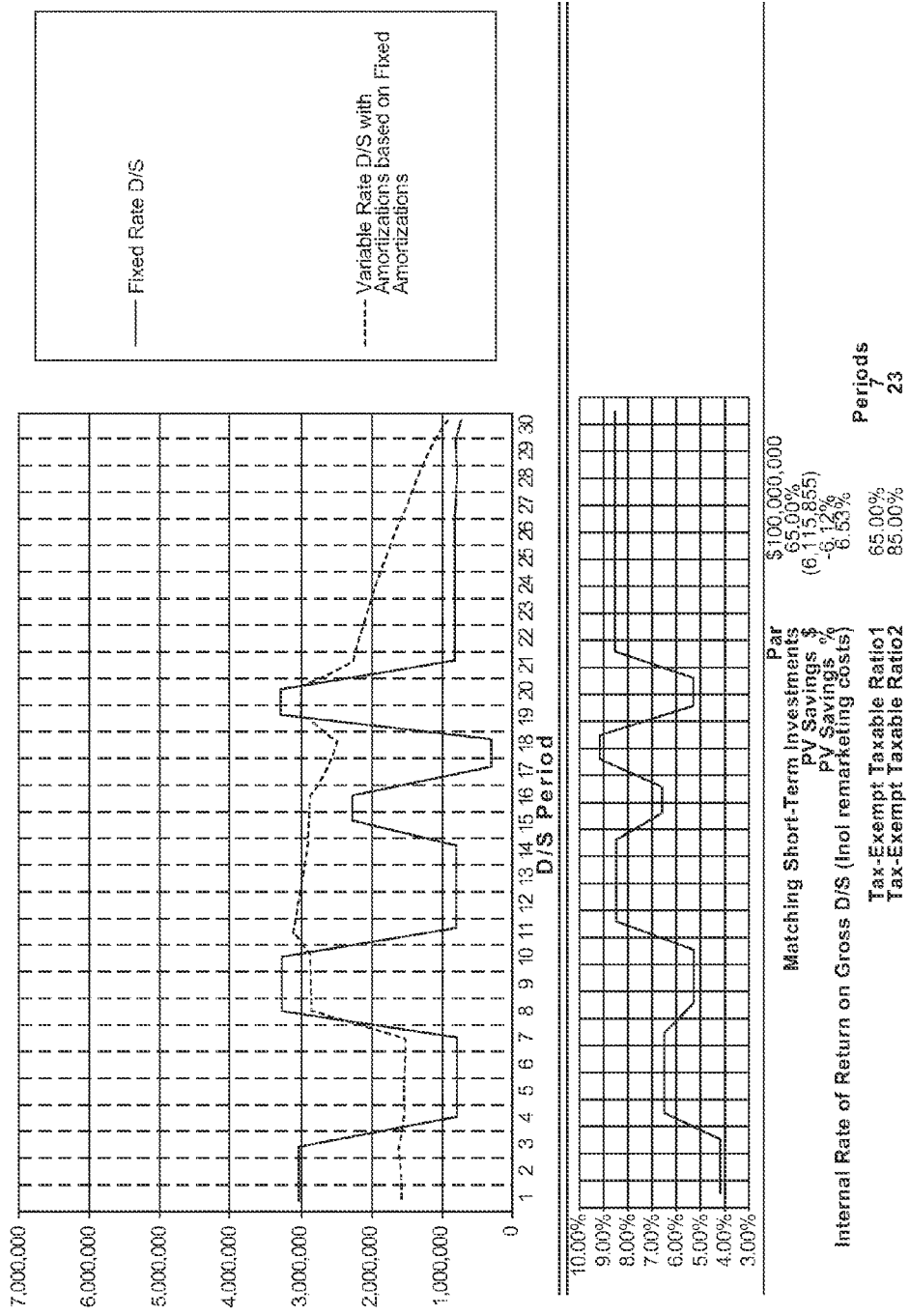
Figure 19:
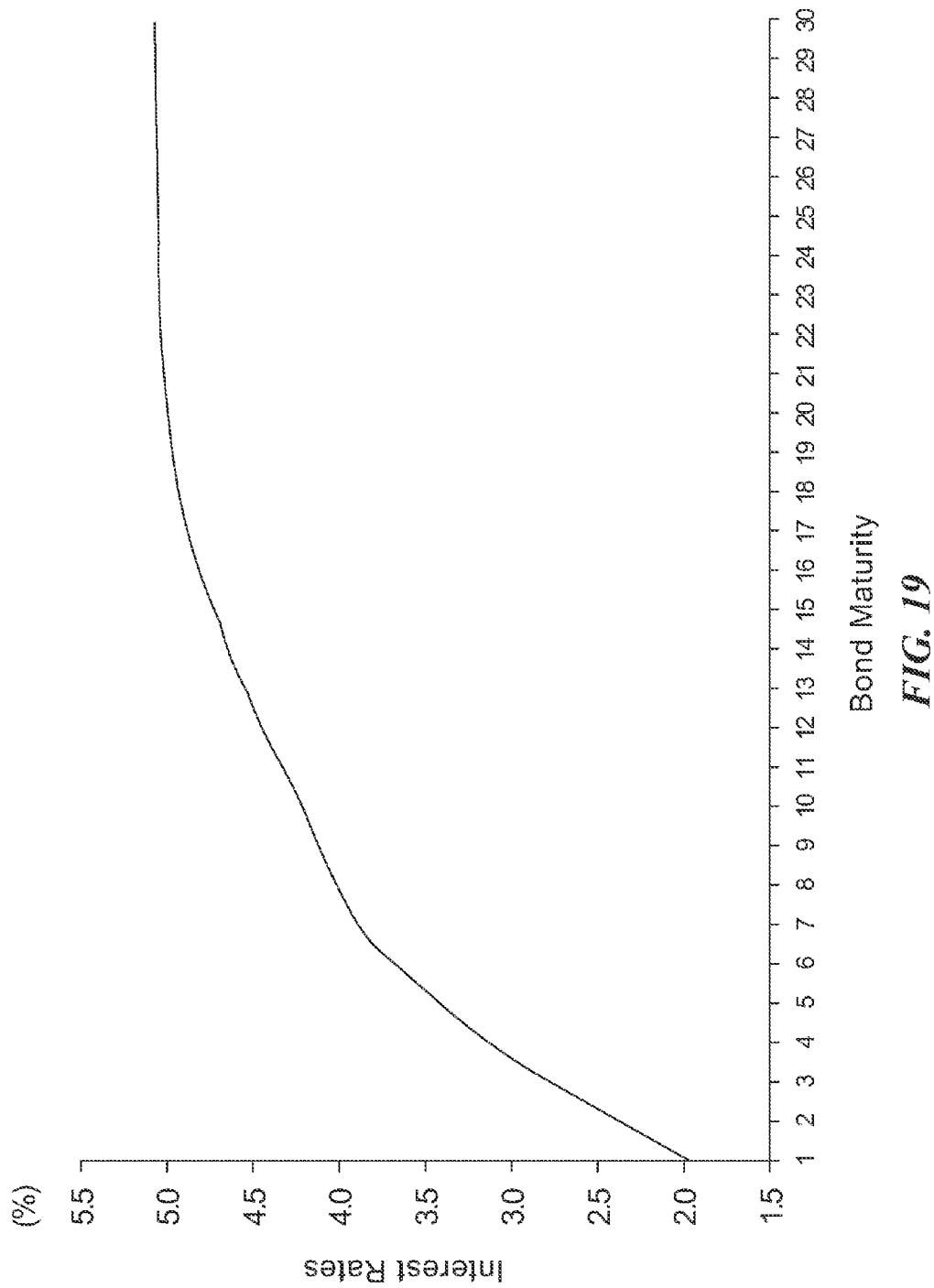
FIG. 19 shows a graph illustrating that the yield curve is generally upward sloping because bondholders must be paid a higher "premium" for protecting an issuer against the risk of bond ownership for a longer period of time.
Figure 20:
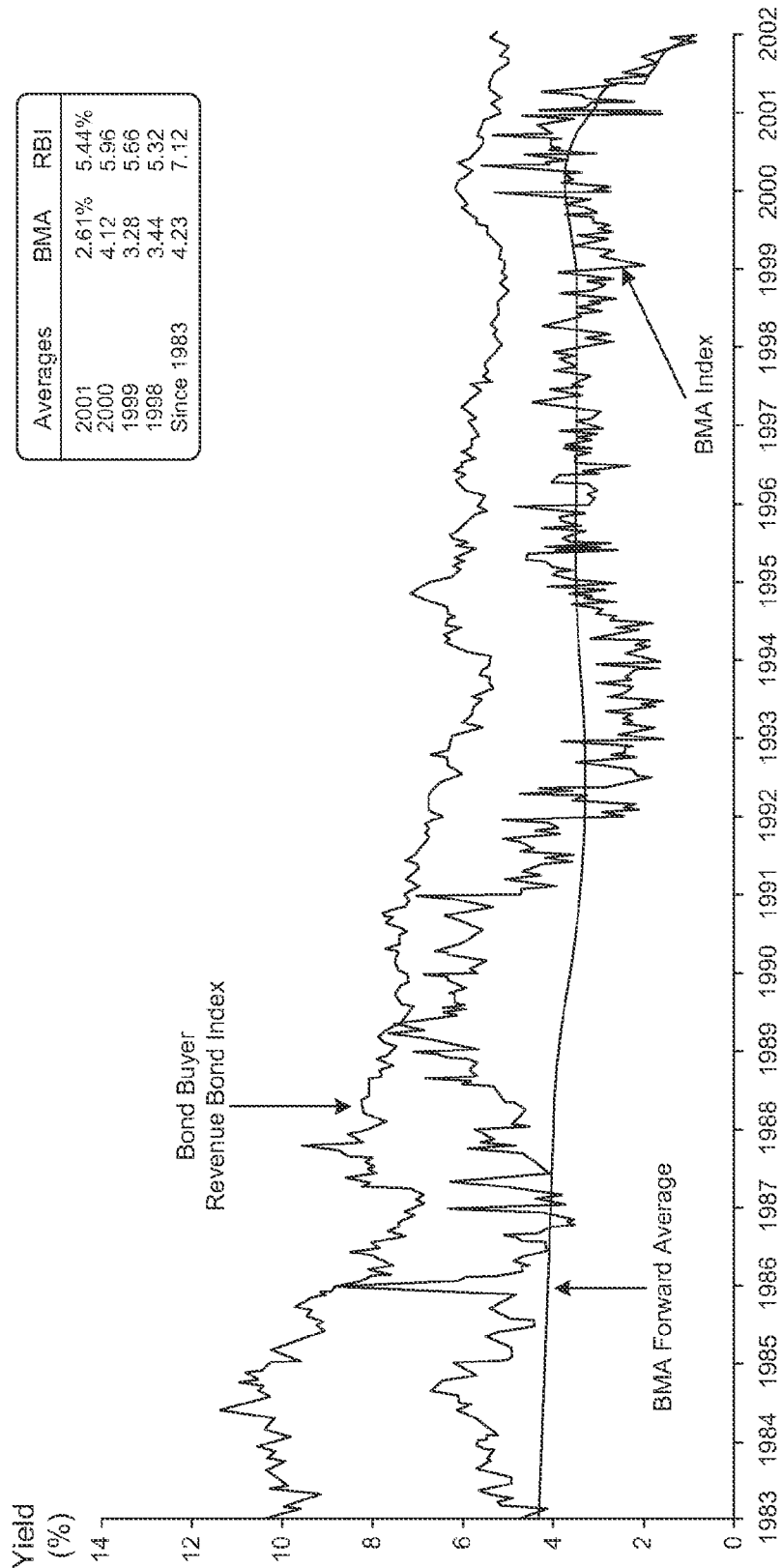
FIG. 20 shows a graph illustrating that since 1983 variable rate financing has essentially always resulted in a lover borrowing cost relative to fixed rate.
Figure 21:
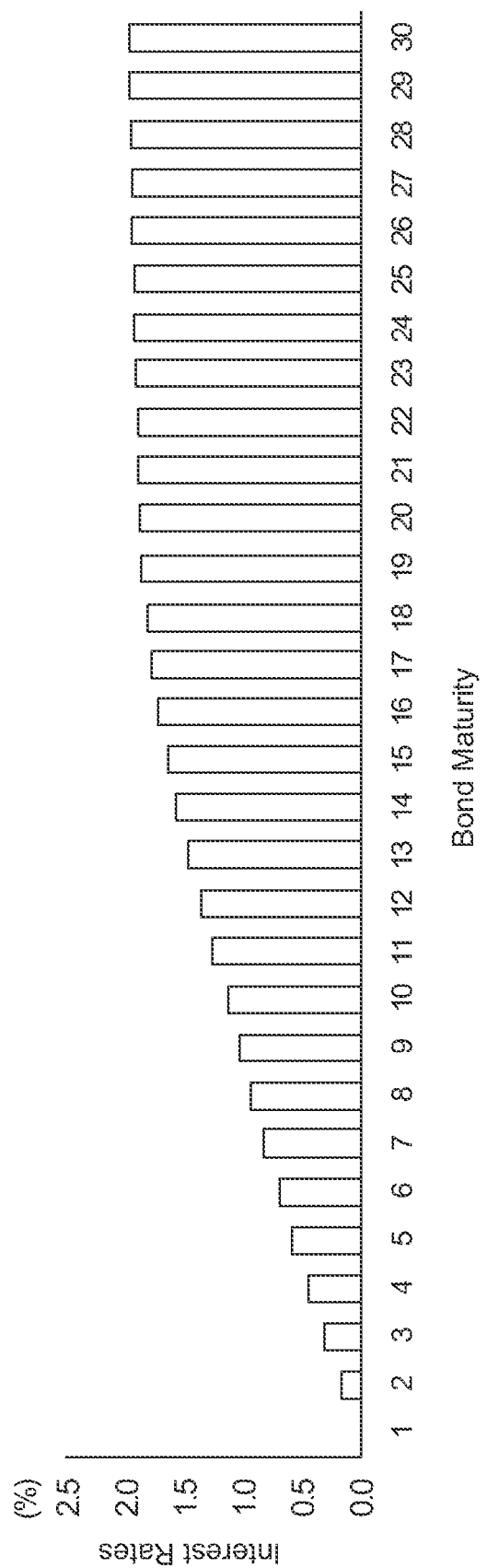
FIG. 21 shows a graph illustrating that in effect, fixed rate bonds impose higher costs than would otherwise be necessary on current ratepayers in order to protect future ratepayers against risks of bond ownership.

Referring now to FIG. 3, a block diagram of a system according to one embodiment of the present invention is shown. As seen in this Fig., Computer 301 includes Memory 303 for storing a software program (not shown) and CPU 305 for processing the software program. Monitor 307, Keyboard 309, Mouse 311, and Primer 313 are connected to Computer 301 to provide user input/output. Input/output to the software program may also be accomplished via a storage medium (e.g., a hard drive or a CD) and/or a network, each of which is not shown. The software program stored in Memory 303 and processed by CPU 305 may of course be one of the software programs of the present invention. In any case, the details of each of Computer 301, Memory 303, CPU 305, Monitor 307, Keyboard 309, Mouse 311, and Printer 313 are well known to those of ordinary skill in the art and will not be discussed further.

In another embodiment of the present invention, the MIRRMP may be applied to aid an issuer in maximizing current savings from the use of variable rate debt while essentially achieving budgetary certainty for a current year. It is noted that this embodiment of the present invention does not necessarily eliminate budgetary volatility from year to year but, rather, essentially gives the issuer certainty that the budgeted amount for a current year will be the actual debt service due.

More particularly, as an alternative (and/or accompaniment) to requiring that an issuer budget conservatively (for example, at a higher interest rate than is actually expected) in order to insure that budgeted funds are sufficient, application of the MIRRMP approach according to this embodiment of the present invention makes use of the flexibility to modify the amortization of variable rate debt to essentially provide budgetary certainty for a current year.

One particular example of this embodiment of the present invention (which is intended for illustration only, and is not intended to be restrictive), may operate as follows:

(A) The issuer would be required to budget for the expected amount of interest on its variable rate bonds ("VRDBs"). The determination of the expected amount of interest could be left either partially or entirely to the issuer and/or the expected amount of interest could be required to equal at least some minimum, such as the prior year's interest, for example.

(B) In addition, the issuer would be required to increase or decrease the amount budgeted under (A) for the current year by the amount by which the prior year's actual interest exceeded or was less than the amount budgeted under (A) for the prior year.

(C) The planned principal amortization for the current year would be: i) increased or decreased by the amount by which the actual interest for the current year is less than or greater than the amount budgeted under (A) for the current year; and ii) increased or decreased by the amount increased or decreased under (B) for the current year.

Thus, the amount budgeted for principal and interest would equal the actual principal and interest payable in the current year. However, the allocation between principal and interest could be different than the amount initially reflected in the budget by the difference between the actual interest rate and the rate budgeted under (A).

With regard now to yet another embodiment of the present invention (which embodiment will be discussed in more detail below), it is noted that when municipalities have issued VRDBs in the past they have traditionally structured the principal amortization of the bonds based on level debt service assuming an interest rate somewhere between (1) either the current VRDB rate or the average expected variable rate over the life of the bonds and (2) the Fixed Rate at which the bonds could have been issued. However, both approaches have shortcomings. More particularly, if (under either approach) short-term interest rates are high during certain years, then the annual VRDB debt service during those years might be higher than it would have been if the bonds had been issued as fixed rate bonds, i.e., there might be budget dissavings in those years.

In addition, even if the use of VRDBs initially achieves annual budget savings and, as expected, achieves present value savings over the life of the bonds, there may be adverse political fallout for the issuer as a result of the budget dissavings produced by VRDBs during a period of high interest rates. The use of an amortization based on the Fixed Rate would minimize the VRDB principal required to be amortized in the early years and so would increase annual budget savings in the early years, but would create an increased possibility of budget dissavings (and an increased possibility of present value dissavings) if in later years the VRDB interest rate were to rise above the Fixed Rates at which the bonds could have been issued. On the other hand, the use of a VRDB amortization based on the current or expected average VRDB rate would amortize VRDB principal more quickly and, therefore, reduce the impact (both on annual debt service and present value savings) of a rise in interest rates during the later years. But that approach would increase the likelihood that a rise in interest rates during the early years might result in annual budget dissavings.

Thus, even though it is hard to argue with the proposition that VRDBs are expected to have lower debt service ion a present value basis than fixed rate bonds, many (if not most) municipal issuers have shied away from issuing VRDBs. It is believed that a principal reason for issuers' reticence to use VRDBs is their concern over being second-guessed during periods in which there are budget dissavings as a result of having issued VRDBs (i.e., the annual VRDB debt service for the year exceeds what the debt service would have been if fixed rate bonds had been issued).

In this regard, and as discussed above, the MIRRMP approach of the present invention uses a variety of techniques to: (i) moderate or eliminate the annual budget impact of interest rate volatility on VRDB debt service, and/or (ii) reduce the impact of future interest rate increases on the present value savings from issuing VRDBs rather than fixed rate bonds. More particularly, in one embodiment the MIRRMP approach of the present invention may utilize the adjustment of the bond amortization as a means of moderating interest rate risk and/or basis risk and enhancing the economic results from issuing VRDBs. Such a MIRRMP approach shall hereinafter sometimes be referred to as the "adjustable amortization approach". Of note, the analogue for synthetically created VRDBs may be the adjustment of the amortized amounts or term of the swap. If there is an equal likelihood that the adjustments will extend or shorten the swap, it may be practicable to reflect and price such risk into a swap. In any case, such techniques may include, but are not limited to, the following:

Structure each VRDB as a term bond with a long nominal maturity and with required sinking fund installments determined by formula either to ensure that actual debt service equals or closely approximates budgeted debt service and/or to ensure (with the exception noted below) that the annual debt service in each year will equal (or, at least, will not exceed for as long a period as possible) a predetermined amount ("Expected Debt Service").

Expected Debt Service might be derived, for example, based on the Expected Final Maturity and on debt service on the VRDBs at some identified Target Rate that is between the initial VRDB rate and the Fixed Rate at which the bonds could have been issued. Based on the Expected Debt Service and the Target Rate, an Expected Principal Amortization (i.e., expected sinking fund payments) could be derived. Alternatively, Expected Debt Service could be established to achieve a desired savings pattern (e.g., up-front savings, savings throughout the life of the bond, or savings at the end of the life of the bond) versus fixed rate debt service. The issuer would realize annual budget savings from the VRDBs, compared to fixed rate bonds, as a result of the difference between Expected Debt Service and similarly structured debt service based on the Fixed Rate.

Certain issuers prefer for strategic reasons to keep their current debt service high. By structuring Expected Debt Service to equal Fixed Rate debt service, savings can be pushed to the back end of the VRDB issue. By establishing the Target Rate at or above the Fixed Rate, an issuer could keep its current debt service high while achieving savings from the use of VRDBs. Such savings would be reflected in a further shortening of the actual maturity of the VRDBs as compare to fixed rate bonds.

To take advantage of low rates, the issuer could either: (i) reduce its current debt service and/or (ii) apply the excess of (a) Expected Debt Service over (b) the Expected Principal Amortization plus actual VRDB interest, to make additional sinking fund payments (i.e., to accelerate the amortization of principal). Further, such excess could be applied either to amortize the VRDBs or other bonds of the issuer (which could include other VRDBs or fixed rate bonds that are then callable). In one example, which example is intended to be illustrative and not restrictive, it will generally be advantageous for an issuer to apply such excess to retire its highest coupon bonds, which for any regular issuer will typically be fixed rate bonds.

Alternatively, rather than being used directly to retire VRDB bond principal (or in combination therewith), such excess could be used to fund an invested sinking fund for the VRDBs (e.g., in longer term municipal bonds) or for other bonds of the issuer. Since an invested sinking fund is yield restricted to the yield on the related bonds, it will generally be advantageous for the issuer to apply any bond sinking fund to pay its highest yielding fixed rate bond issue. From a yield perspective, it will be more cost effective to retire the issuer's highest coupon callable bonds rather than investing at the yield on the VRDB bond issue. In particular, it would be economically advantageous to apply such savings to retire or defease any very high cost debt such as taxable bonds or tobacco bonds. There may be practical limitations, however, on the yield that is available in the market in any year for sinking fund investments. Consequently, the actual yield on the sinking fund may be less than permitted yield.

Alternatively, rather than being used directly to retire VRDB bond principal (or in combination therewith), such excess could be used for other expenditures, in particular any expenditures (such as funding pension costs) with a higher return. The ability to use interest savings to fund higher cost activities is very powerful because in addition to producing an economic advantage, it is believed to be free from any potential tax complications under federal arbitrage regulations. Also such excess could be generated either by actual VRDBs or by synthetically created variable rate debt. In addition, an issuer utilizing this approach would likely be much less sensitive to increases in variable rates than others exposed to the difference between variable rates such as other VRDB issuers and the holders of the inverse-floating rate bonds under tender option programs. Strategically, this should cause issuers to increase their use of variable and synthetic variable rate obligations.

For bond issues that do not have an above-market bond yield, the permitted investment yield may be substantially less than the available taxable investment yield. In a market environment in which the spread between long tax-exempt interest rates and VRDB rates is wide, it may be advantageous for the issuer to purchase tax-exempt securities to economically defease lover coupon fixed rate bonds. Thus the issuer can take advantage of steepness of the yield curve in the future without regard to the bond yield or interest coupon of the bonds being defeased.

In any year in which interest rates are so high as to create budget dissavings, the issuer could reduce the principal amortized to an amount below the Expected Principal Amortization to prevent the debt service actually paid from exceeding the Expected Debt Service. If an invested sinking fund has been funded with prior year excess funds, monies on deposit in the sinking fund could be also be used to offset the impact of higher interest rates in order to keep the amount payable in the current year from exceeding the Expected Debt Service. By using such funds to pay either interest or earlier maturing principal on the bond issue for which the sinking fund is established, the impact of the higher rates can be offset without affecting the permitted yield on the sinking fund. Similarly, if other expenditures (or a reserve therefore) have been funded with prior years' debt service savings, by using such accumulated funds toward the current year's budget for such expenditures, the impact of current higher rates may be offset.

If necessary as a result of an extended period of high VRDB rates to prevent actual debt service from exceeding the Expected Debt Service, principal payable in the current year could be reduced by extending the principal amortization on the VRDBs beyond the Expected Final Maturity (but not longer than the nominal maturity, for example ((which example is illustrative and not restrictive)). In this regard, the nominal maturity of the VRDBs may limit the extent to which the principal amortization could be deferred. A minimum amortization of principal of the VRDBs might be required to assure that the VRDBs can be fully amortized by their nominal maturity. The minimum amortization might be determined, for example (which example is illustrative and not restrictive), based on the level annual debt service payment that would be required to fully amortize the VRDBs by their nominal maturity at the current annual VRDB rate. The minimum amortization requirement could cause the annual debt service on the VRDBs to exceed the Expected Debt Service.

For VRDBs that have been synthetically fixed, the MIRRMP could be used to eliminate the budgetary impact of variations between the issuer's actual variable rate and the variable swap payment. The basis difference could reflect, tax risk, credit or other issuer-related risks, or pure interest rate risk, or any combination thereof. For example, if the issuer has synthetically fixed bonds using a BMA knockout swap, the VRDBs could be used to fix the total net amount paid by the issuer to a fixed amount during the term of the swap. In addition, if the swap is knocked out (which would take place in a very high interest rate environment), the VRDBs could be amortized so that the total amount of debt service equals the same or another fixed amount. Thus the ultimate risk of utilizing a knockout swap could be deferred until after the expected final maturity of the VRDBs, and unless rates remain relatively high over the remainder of the expected term of the bonds, there could even be interest savings in aggregate (after the swap is knocked out) that result in an acceleration of the final payment of the VRDBs.

By adjusting the amortization of VRDBs issued using the MIRRMP approach, an issuer could also mitigate interest rate volatility (including basis risk) on other bonds such as traditional VRDBs, VRDBs that have been synthetically fixed, or fixed rate bonds that have been synthetically converted to VRDBs. Such other bonds could include both bonds issued using the same credit as the MIRRMP. Such other bonds could include bonds issued under other credits.

Also, the VRDBs issued using the MIRRMP could also be used to achieve budgetary stability taking account of other expenditures or various sources of revenue of the issuer or financial products in addition to swaps. For example, if VRDBs are issued which from a balance sheet perspective are matched by short-term assets of the issuer, the amortization of the VRDBs could be adjusted to achieve a constant net payment (VRDB debt service less interest on such short-term assets). In another example, the amortization of VRDBs could be used to achieve budgetary stability after taking account of variations from a budget target in the price of natural gas (or other expense or cost) for a municipal utility that is heavily dependent upon such expense or cost (e.g., heavily dependent on natural gas). This a powerful concept that is believed should have no adverse credit consequences if used in circumstances in which there is an equal likelihood of both favorable and unfavorable variations in the price of the hedged expenditure or revenue source. The VRDBs could provide additional budgetary stability even if they are synthetically fixed using an interest rate swap. If over time, the variations between budgeted and actual performance were favorable, the bonds would be amortized more quickly than expected. If the variations were unfavorable in aggregate, the period of amortization would be extended. Alternatively, the variations could automatically be built into the budget for the succeeding year.

A corollary of the use of VRDB debt service to mitigate budgetary volatility is that a municipality or other entity could utilize the adjustment of the amounts or timing of any other ongoing stream of expenditures (and perhaps revenues) to moderate the volatility of any other ongoing stream of revenues or expenditures. Indeed to the extent that the probability of a variation in both directions is equal, such municipality or other entity could utilize this capability to provide protection against similar volatility to other parties. Also, available reserves (such as a debt service reserve fund, for example) could be used to fund unfavorable variations between budgeted and actual expenditures with adjustments made in budgets for other years to offset such amounts.

The method for adjusting the amortization of the VRDBs could take the foret of any formula, process, system, policy, or practice that is designed to achieve or achieves the desired protection from budgetary uncertainty related to variable interest rates. The method could be reflected in a variety of places, including the VRDB bond documents, the issuer's fixed rate bond documents, agreements or understandings with bond insurers or rating agencies, or simply in formal or informal policies of the issuer. Examples of the above include, but are not limited to:

Annual principal equals the budgeted amount of debt service less the actual amount of interest payable during the year. This approach would provide budgetary certainty in each year and allow the issuer to determine on an annual basis how much debt service to pay. In effect the issuer would be determining annually how much savings or dissavings to take relative to the debt service it would have paid if it issued fixed rate bonds.

At the time of issuing the VRDB determine the annual amount of debt service that the issuer will pay in each year. Such amounts could be equal in each year or could vary in different years. For example the issuer could pay in each year an amount equal to the debt service it would have paid if it had issued fixed rate bonds, effectively placing any debt service savings or dissavings from issuing VRDBs rather than fixed rate bonds at the end of the issue. Alternatively, the issuer could structure debt service so that the debt service in each year would be lower that if it had issued fixed rate bonds, thereby creating budget savings in each year. Or, the issuer could take some savings in the first few years and the leave the remainder of the savings (and any dissavings) to the end of the issue.

If rates are so high as to cause the principal amortization to be deferred to the point that the principal required to be paid in any year exceeds the expected principal amortization (e.g., because the bonds are not fully amortized by the Expected Final Maturity), the prescribed method of amortizing such amounts could include: (a) continuing to pay the prescribed annual debt service until the VRDBs are retired; (b) amortizing such amounts on a level debt service basis from the Expected Final Maturity to the nominal maturity; and (c) allowing the issuer to determine the amortization schedule at that time.

An additional minimum amortization requirement may need to be established to assure that the bonds meet any amortization requirements proscribed by state law and/or federal tax law.

The nature of the issuer's obligation (if it is a legal obligation) to amortize the VRDBs prior to the nominal maturity date thereof could take a variety of forms. Such obligation could be on a parity with the obligation to pay at the nominal maturity or could be a subordinate obligation, a covenant, a contingent or subject to appropriation obligation, or an obligation secured by a completely different credit. If the obligation to retire VRDB principal prior to the nominal maturity thereof is not a parity obligation, the principal will be retired before it is legally due and will never be counted in the issuer's rate covenant coverage calculation. Thus, an issuer can achieve revenue relief and/or enhance its debt service coverage.

A feature of VRDBs which can be realized with less risk using the MIRRMP is that in the cases of both new money and refunding VRDBs, the issuer may realize savings from variable rates or, if tax-exempt fixed rates fall subsequently, the issuer may fix its interest rates either with a swap or fixed rate bonds, thereby locking in its savings.

The ability to realize the potential savings from VRDBs while essentially assuring budgetary certainty makes it possible to consider new uses of VRDBs. For example, which example is illustrative and not restrictive, rather than issue fixed rate bonds to refund outstanding fixed rate bonds in an environment where there is significant negative arbitrage, it may make sense to issue the refunding bonds as VRDBs and invest the escrow in tax-exempt bonds (which are not restricted to the yield on the VRDBs). It is believed that this approach actually would create the possibility or even likelihood that the issuer will realize positive arbitrage during the escrow period. By structuring VRDB expected debt service so that the issuer pays the same annual debt service as if it had done a fixed rate refunding, the issuer may: (i) achieve the expected budgetary savings; (ii) replace the certain negative arbitrage it would realize from a fixed rate refunding with the likelihood of positive arbitrage during the escrow period (or with essentially the certainty of no dissavings if taxable investments are used), and (iii) have the expectation of additional savings from the early retirement of principal if, as expected, variable rates over time are less than the fixed rate. Given these inventive techniques, VRDBs should also be a useful vehicle for refundings to extend the maturity of issuer's debt. If taxable investments are used in a debt extension, it is believed that there would be no cost or gain prior to the call dates for the refunded bonds. If tax-exempt investments are used, it is believed that there could be savings or dissavings depending on the relationship between the actual VRDB rates and the tax-exempt escrow yield.

Of note, obtaining the securities for such a tax-exempt escrow may be more challenging that funding a taxable escrow with treasuries or agencies. It may be advantageous to accumulate the securities over a period of time either by taking advantage of available temporary periods in which the escrow can be invested in taxable securities or by having the provider of the securities provide tax-exempt securities on a temporary or permanent basis that do not precisely match the escrow revenue requirement, but that will be purchased by the provider at par or a predetermined price sufficient, together with the remaining escrow cash flow to meet the escrow requirement.

Traditionally, variable rate refunding with a taxable escrow has been viewed as untenable because of the inability to be assured that the escrow will not be invested at a yield higher than the VRDB yield. It is theoretically possible that the yield on the VRDBs could go to zero so that the issuer could not average down the yield on the refunding escrow by investing it at a zero percent return. This issue may be addressed in an embodiment of the present invention by building into the mechanism for determining the variable rate a feature that increases the yield on the VRDBs to the extent, needed to assure that the VRDB yield is not below the escrow yield. For example, which example is illustrative and not restrictive, it might be sufficient to build in a minimum yield on the VRDBs and have the VRDBs be non-callable during the escrow period. It is believed that any minimum yield on a put bond might have to be off market (i.e., below current market yields). Further, it may be necessary to make the VRDBs non-callable during the escrow period to assure that they are outstanding for a sufficient time for the escrow yield restrictions to be met. Further still, a VRDB refunding issue combined with a fixed rate new money issue might enable the refunding escrow to earn a taxable variable rate higher than the VRDBs.

Another example of a new use of VRDBs, which example is illustrative and not restrictive, would be to refund non-callable bonds where the escrow is invested in tax-exempt bonds. The savings over time would be determined by the difference between the yield on the tax-exempt escrow (i.e., current tax-exempt fixed rates) and the VRDB rates over time. Thus, the interest coupon on the defeased bonds is essentially irrelevant and even very low coupon non-callable bonds could be refunded. Economically, the issuer would derive the same benefit as if it issued new money bonds as VRDBs rather than as fixed rate bonds. By using the MIRRMP approach of the present invention, the debt service on the VRDBs could be structured to take a portion of the savings either up front or over time with the balance of the expected savings or any amount by which the actual savings are less than the expected savings reflected in either: (a) a further reduction of debt service; or (b) an increase in debt service (in each case as compared to the refunded fixed rate bonds).

A third example of a new use of VRDBs (which example is illustrative and not restrictive) is as parity bonds with the issuer's working lien(s). Traditionally, the inability to know for certain the amount of the debt service requirement (and therefore the coverage requirement) has provided a disincentive for issuers to issue VRDBs as parity bonds. Uncertainty as to the amount of annual debt service posed challenges, both in meeting the annual coverage requirement and in ascertaining the debt service reserve fund requirement (typically, maximum annual debt service). Instead, VRDBs are typically issued as subordinate bonds. The certainty possible under the MIRRMP as to the amount of the debt service requirement should make it practical for issuers utilize their parity lien(s) for the debt service payments (although the issuer's obligation, if any, to purchase bonds that are put should probably remain subordinate) on their VRDBs, particularly PARS or ECNs, for which there is no put to the issuer and the bondholders are not protected by a liquidity facility. Since the DSRF could be invested in taxable securities with a long maturity, this presents the opportunity for the issuer to earn and retain arbitrage on its DSRF.

A fourth new use of VRDBs is in the context of SRF financings under an SRF General Obligation ("GO") approach. By issuing variable rate SRF GO bonds and making fixed rate SRF loans, a state (such as, without limitation, Connecticut) could significantly reduce the amount of additional assistance that the state has to contribute above the required state match. At today's rates, the bans might fully fund bond debt service, and even if variable rates average more than the loan interest rate over time, the state's contribution would be likely to be significantly reduced from current levels. The state's contributions (when and if required) could be in the form of contract assistance (as in Massachusetts, for example) or in the form of variable interest on a state obligation. In addition, it is believed that no contribution would be required by the state so long as equity could be applied to fund any required subsidy consistent with the perpetuity requirement. Also, to the extent that the loan rate fully covered the bond interest, it is believed that it would not be necessary for any of the equity to be used as a sinking fund, and even if the variable rate were to rise, the amount of equity required to fund a sinking fund (even if only interest could be used) would be greatly reduced. Note that the use of VRDBs to fund SRF loans should be a good strategy for SRFs if legislative arbitrage relief is enacted. The ability to invest the equity at an unrestricted yield would make it virtually impossible that the amount of equity could be adversely affected by the use of variable rate funding.

Even without the SRF GO approach, the use of VRDBs to fund SRF loans could make economic sense with either the SRF issuer or the underlying borrower taking the variable rate risk. For EFC and NYCMWFA, for example, it might make economic sense for the water authority to take the variable rate risk and to have EFC invest the DSRF in fixed rate tax-exempt securities (which are not subject to arbitrage yield limitations). This approach would enable the water authority to realize the benefits of variable rate debt without any reduction in its interest subsidy. Thus the net cost of funds in the current market would be less than zero %. Alternatively, a state such as Connecticut, for example, could issue VRDBs to fund leveraged loans and invest in tax-exempts. The amount of the state contribution required to maintain the fund in perpetuity would be variable. In all likelihood, the contribution would be significantly reduced, but if variable rates were very high over time, the contribution would be increased. Note however, that viewed in the context of an ongoing program for which bonds would be issued in various interest rate environments, the state should benefit significantly as a whole. The use of DSRF liquidity arrangements should enable the SRFs to utilize municipals in their reserve funds without any adverse credit consequences.

In addition, in connection with hedging activities related to the MIRRMP, the present invention gives rise to a new clans of risks for the purpose of: (1) hedging the amortization risk of the VRDBs, i.e., the risk that the amortization will be extended beyond some expected maturity date; (2) creating synthetic products that essentially mirror the characteristics of such VRDBs; and/or (3) creating investment vehicles such as GICs for investment of the savings or excess created by the use of VRDBs. Such risks are hybrids representing a combination of variable rate risk with other risks. Examples of such risks or hedging opportunities include, but are not limited to:

A hedging vehicle in which the issuer's counter-party agrees to lock the issuer into (or cap the issuer at) a fixed rate and/or a fixed amount and/or present value savings and/or predetermined annual amounts of savings and can achieve that result either by leaving the issuer with a variable rate obligation or at any time putting the issuer into a swap or cap.

Similar to existing swaps, the results could be locked in either with or without taking account of various risks such as tax risk. As a result of the MIRRMP, this vehicle can be viewed over the term of the bonds as VRDBs since the MIRRMP delays the day of reckoning if variable rates exceed the target fixed rate for some period of time. Thus the counter-party would not have to make any payment unless at the end of the expected term of the VRDBs there is principal remaining outstanding. Also, even if fixed rates rise, the value of the instrument from the counter-parties perspective would not necessarily decline since short-term rates could still remain low enough to average less than the target rate. If, on the other hand, fixed rates decline, the counter-party can lock in the fixed rate under circumstances in which its position is at a premium.

A hedging vehicle in which the counter-party agrees to fix or cap the period of amortization of the issuer's VRDBs and in which the risk of extension of the maturity of the VRDBs beyond the target date is a function of: (i) variable rates; or (ii) variable rates and any of the other risks that may be hedged by the VRDBs; or (iii) variable rates and the investment return the is earned on the savings or excess realized from the VRDBs. Note that the investment return might vary depending upon whether such savings were used to retire VRDBs, to defease fixed rate bonds, or to fund other costs such as pension costs.

An investment vehicle in which the provider agrees to guarantee a return on the savings or excess from the VRDBs issued under the MIRRMP (or a portion thereof) and where the amount and timing of the invested amounts is a function of variable rates or variable rates in combination with any of the other risks than can be hedged using the MIRRMP.

Similar approaches may be employed to hedge the risks (and/or lock in the benefits) from the further applications discussed below.

While the above-described embodiments of the MIRRMP approach use a variety of techniques to: (i) moderate or eliminate the annual budget impact of interest rate volatility on VRDB debt service; and/or (ii) reduce the impact of future interest rate increases on the present value savings from issuing VRDBs rather than fixed rate bonds, in another embodiment of the present invention the economics of the MIRRMP approach can be further enhanced by allowing all of the principal amortization requirement relating to the VRDBs to be applied at the option of the issuer to other bonds (as opposed to only the portion of the principal amortization requirement in excess of the Expected Principal Amortization). This mechanism may hereinafter sometimes be referred to as "Further Application 1".

More particularly, in one example (which example is intended to be illustrative and not restrictive) if a regular issuer of municipal bonds (i.e., an issuer that is in the market on at least an animal basis) is required to amortize $100 of bond principal in any year, but is given the alternative of either amortizing that amount of outstanding VRDBs or of using the same amount to (1) call or economically defease any of its outstanding fixed rate bonds that are not then payable and (2) amortize the VRDBs on the date on which such fixed rate bonds are payable, the issuer should elect to retire its highest yielding debt which would generally be fixed rate bonds.

By defeasing fixed rate bonds rather than paying the VRDBs, the issuer would, in effect, have the ability to create a "virtual swap" in which its variable rate is its actual VRDB cost of funds and the fixed receiver rate is the rate at which the funds used for the defeasance can be invested. The investment rate on such funds would be the lower of: (a) the arbitrage yield on the high coupon fixed rate bonds; or (b) the taxable investment yield available for the same maturity. If such funds were used to retire the fixed rate bonds, thereafter, the fixed receiver rate on the virtual swap would be the coupon on such retired bonds. If the arbitrage yield on the fixed rate bonds were above current market yields for the defeased maturity of fixed rate bonds, by creating such a virtual swap, the issuer would achieve the benefit of owning a premium fixed receiver swap. The market prediction imbedded in the yield curve would be that the VRDBs' yields over time would be lower than the fixed receiver rate, suggesting that the issuer would achieve savings simply by retaining the virtual swap.

However, by hedging or reversing the virtual swap, the issuer could lock in savings (as compared to its cost if it simply retired the VRDBs). If simultaneously with creating such a virtual swap, the issuer were to enter into a mirror fixed payor swap, the issuer would lock in savings equal to: (1) the amount of funds used for the defeasance times (2) the difference between the investment rate on such funds and the fixed payor swap rate. If the fixed payor swap were at market, the savings would be realized over time. If the fixed payor rate were to equal the fixed receiver rate on the virtual swap, the issuer would receive an up front payment from the swap provider and, thereafter, its cash flows would be essentially the same as if it had retired the VRDBs.

Of note, an issuer could produce an essentially equivalent economic benefit to the market fixed payor swap by remarketing its VRDBs as put bonds with a put on the maturity date of the defeased fixed rate bonds. For tax reasons, it may not be possible to place an above market rate on the remarketed VRDBs during the put period in order to replicate the upfront payment received from a premium swap.

The economic benefit achieved if the issuer enters into the mirror fixed payor swap would be essentially the same as if the issuer could do a tax-exempt advance refunding for savings of such fixed rate bonds with: (a) the ability to refund bonds that are otherwise non advance refundable; (b) the ability to refund to maturity or to any call date, even though the refunding produces savings; and (c) the ability to invest the refunding escrow at up to the yield on the refunded bonds. In this regard:

The ability to invest at up to the refunded bond yield would allow the issuer to realize savings even from a refunding of non-callable bonds. Similarly it would allow an issuer to realize economic savings prior to the call date of callable fixed rate bonds. Thus, the issuer could realize greater savings from a defeasance of callable bonds than could be realized by a tax-exempt refunding.

If the issuer defeases an early maturity of a prior issue of fixed rate bonds, the interest coupon for such maturity would likely be less than the bond yield on the prior bonds. Since the defeasance escrow can be invested at up to the prior bond yield, the savings achievable through this approach might even exceed the savings that would be realized from a tax-exempt current refunding of the same maturity.

The benefit of a defeasance is determined by the difference between the yield on the defeasance investments (louver of arbitrage bond yield or available investment rate) and the yield on the VRDBs, whether left floating or fixed either synthetically or by remarketing the VRDBs as put bonds. So, all else being equal, the issuer should choose to defease maturities from the bond issue with the lowest bond arbitrage yield that equals or exceeds the available investment rate. By contrast, the benefit from a refunding is determined by the difference between the coupon on the refunded bond and the yield of the refunding bonds. So, if used to defease callable bonds, funds available to create a virtual swap should be used to defease the bonds with the lowest coupon.

Of further note, an issuer could benefit from creating a virtual swap and entering into a mirror swap at essentially any point along the yield curve at which its outstanding bonds are above current market rates. For a regular issuer, the worst case result (even if rates are at a peak) should be that by defeasing its recently issued tax-exempt fixed rate bonds, the issuer achieves the same outcome as having entered into a market fixed receiver swap. Also, by defeasing a very short maturity, the issuer can preserve its option to create a virtual swap until market conditions are more favorable. If interest rates are below relative highs, there should be fixed rate bonds outstanding with above market yields that could be selected by the issuer to be defeased.

An important premise of this approach is that the yield curve continues to be positively sloping which, it is believed, has always been the case in the tax-exempt market. In fact, the issuer need not actually take interest rate exposure since the VRDBs could be swapped to fixed to their expected principal amortization dates. If the issuer elects to create a virtual swap rather than retiring VRDBs, the VRDBs could again be swapped to fixed to their new expected principal amortization date.

Thus, if the issuer were able to make such an election at each VRDB maturity date, the amortization of the VRDBs would, over the course of time, be deferred as long as permitted under the state law governing the issuance of the bonds and under federal tax laws governing the issuance of tax-exempt bonds, making the bonds essentially mimic "permanent variable rate debt".

For an issuer to take full advantage of its ability to create virtual swaps, the VRDBs should have as long a nominal maturity as possible, even though the Expected Final Maturity would be shorter. As above, there would be: (a) an Expected Debt Service requirement based on a Target Rate and debt service to the Expected Final Maturity; and (b) an Expected Principal Amortization. The principal amortization requirement for the VRDBs in each year could be defined in a number of ways. For example, which example is intended to be illustrative and not restrictive, it could be the Expected Principal Amortization requirement. In another example, which example is again intended to be illustrative and not restrictive, it might be defined as (i) the Expected Debt Service less (ii) the actual annual VRDB interest rate times the VRDB principal outstanding. The latter approach would have the effect of accelerating principal when rates are low and deferring principal if rates rise and remain high for a sustained period. In any case, the principal amortization requirement could be applied to any of the issuer's other bonds not then payable.

If the issuer opts to call or defease other bonds, there are a variety of approaches available for establishing a new Expected Maturity Date for the VRDB principal. Several examples (which examples are illustrative only and not restrictive) are as follows:

Make the new expected maturity date for the VRDBs the same as the maturity of the fixed rate bonds that are called or defeased.

Define a minimum amortization requirement on all of the issuer's bonds that Cakes account of amounts applied to pay or defease other bonds in lieu of the VRDBs. For example (which example is illustrative only and not restrictive), aggregate annual and cumulative amortization requirements could be defined as follows:

The aggregate annual amortization requirement for each year to and including the current year might equal the sum of: (a) the principal amounts payable in such year on all other bonds of the issuer then outstanding (excluding any bonds paid in connection with a refunding), including any principal amounts payable in such year that were called or defeased as a result of the application of principal amortization requirements on the VRDBs or as a result of any principal retired as a result of the cumulative amortization requirement plus (b) the principal amortization requirement on the VRDBs for such year, regardless of whether actually applied to pay the VRDBs.

The cumulative annual amortization requirement might equal the sum of the annual amortization requirements from the date of issue of the VRDBs to the current year.

Of note, in each year the issuer may be required to retire an amount of VRDBs, including the principal amortization requirement on the VRDBs, such that the cumulative amounts applied to pay principal of VRDBs or other bonds (or alternatively, the cumulative amounts of such bonds paid or defeased) from the date of issue of the VRDBs through the current year (other than in connection with a refunding) would at least equal the cumulative amortization requirement.

Regardless of the mechanism used to establish the new Expected Principal Amortization and the amortization requirement in each year, the amortization requirement could be applied to retire other bonds in the same manner as described above. In one embodiment the maximum deferral period of the VRDB amortization would be determined based on federal and/or state law constraints and/or based on tax constraints resulting from the average useful lives of the projects financed.

The ability to create virtual swaps could exist whenever an issuer has funds that are available to retire VRDBs (including bonds with longer puts under a multi-modal structure) prior to the date under which such bonds are required to be retired under the bond documents, applicable law and tax regulations. The accumulation of such available funds (prior to the date on which the VRDBs are legally required to be paid) could: (i) be required under the issuer's bond documents (e.g., as contemplated in the above in VRDB documents or as an aggregate amortization requirement in the fixed rate bond documents); (ii) be a requirement imposed by a third party (such as rating agencies, bond insurers, or trustee); and/or (iii) merely be a policy or practice of the issuer.

To summarize, one way to think about this adjustable amortization period approach is as follows:

In structuring their debt, issuer's should put their VRDBs' maturities (which are expected to be the lowest cost debt) as long as possible to take advantage of the fact that VRDB holders typically do not charge an issuer for the flexibility to either pay the debt early or leave it outstanding to maturity.

However, from the perspective of the issuer's credit, ratings and financial policy, in lengthening the maturities of its VRDBs, the issuer should not lengthen the average maturity of its debt taken as a whole.

Accordingly, if as a matter of practice the issuer generally amortizes its debt over 20 years, for example (which example is intended to be illustrative and not restrictive), the issuer will likely want to retire either the VRDBs or other debt (as determined by the issuer from year to year) so as not to extend the overall average life of its debt. The mechanism for assuring that the overall amortization of the issuer's debt remains consistent with its policy could take a number of forms and could represent: (i) a legal obligation of the issuer to the VRDB bondholder, other bondholders, bond insurer, credit or liquidity providers, or others; (ii) an issuer policy or practice; and/or (iii) a commitment to the rating agencies.

The economic impact of this adjustable amortization period approach may be understood by breaking the transaction into distinct components or steps as follows:

The first step in the analysis is a comparison of the economics of a variable rate issue to a level debt service fixed rate issue that the issuer could have alternatively issued, assuming that the amortization of the VRDBs is identical to that of the fixed rate bonds. By issuing VRDBs rather than fixed rate bonds, the issuer is in effect entering into a series of fixed receiver swaps maturing on each principal payment date in which the fixed receiver rate for each swap is the same as the yield on the corresponding maturity of the fixed rate bonds. If over the life of the swap the VRDB rate is less than the fixed receiver rate, the issuer will have achieved savings from its VRDBs. By hedging the VRDBs with BMA fixed payor swaps, the issuer would offset the fixed receiver swaps and achieve fixed rate tax-exempt financing.

The next step in the analysis is to give the issuer an option either to retire the VRDB principal on each maturity date or create a virtual swap by using the same amount of money to call or defease other bonds of the issuer. More particularly:

If the issuer elects to pay other fixed rate bonds callable at par, the issuer would in effect be entering into a fixed receiver swap maturing on the date on which such other fixed rate bonds would have matured and with a fixed receiver rate equal to the interest coupon on such other bonds.

If the issuer economically defeases the other fixed rate bonds to maturity, it is in effect entering into a fixed receiver swap that matures on the maturity date of such other bonds and that has a fixed receiver rate equal to the yield at which the funds used for the defeasance are invested. The taxable investment yield would be the lower of: (1) the yield on the bond issue of which such other bonds are a part; or (2) the maximum investment return available in the market for taxable investments maturing on the maturity date of the defeased bonds. In a future market environment with a steep tax-exempt yield curve, an issuer might choose to defease bonds by purchasing tax-exempt securities, as described above, if that results in a higher return than being restricted to the yield on the defeased bonds. The ability to apply current excess to purchase tax-exempt bonds fixed rate bonds would serve to mitigate the impact of increasing short-term rates since in such an interest rate environment, tax-exempt fixed rates should continue to be significantly higher than VRDB rates.

A third option would be for the issuer to economically defease such other fixed rate bonds to a call date (assumed here to be the par call date). This would have the effect of the issuer entering into a step coupon fixed receiver swap maturing on the maturity date of such other bonds. The initial fixed receiver swap rate would be the investment yield on the defeasance investments maturing on the call date. The fixed receiver rate for the remainder of the swap would be the interest coupon on the defeased bonds.

Of note, there should be significant value in the fact that the issuer would own an option on each principal payment date of the VRDBs to create one of the above virtual swaps where (assuming some volatility of interest rates) on many of the option dates the fixed receiver rates available to the issuer would be above the then current market for a tax-exempt fixed receiver swap.

The third step is to analyze the impact of either accelerating or deferring the amortization of VRDB principal as compared to the fixed rate bonds that the issuer could alternatively have issued. More particularly:

In the first step above, it is assumed that the VRDBs are amortized at the same rate as the fixed rate bonds that could have been issued instead, i.e., the principal amortization is based on the yields on the individual maturities of the fixed rate bonds. If instead either: (a) the VRDBs were amortized at a lower yield or yields; or (b) in each year, ail or some portion of the interest savings resulting from the use of VRDBs were used to retire VRDB principal, then the VRDBs would be amortized more quickly than the fixed rate bonds that the issuer could alternatively have issued. On each principal payment date, the economic effect of amortizing the extra principal would be the same as if it defeased its variable rate payment on the swap relating to the bond maturity for which principal is accelerated. The maturities for which principal would be accelerated are the longest maturities of the bonds since as a result of an accelerated amortization the VRDBs would be fully amortized by the dates on which such maturities would have been payable. Thus, the impact of amortizing principal more quickly is that the fixed receiver swaps relating to the longest maturities of the bonds become converted into swaps in which the issuer is simply entitled to receive a payment equal to interest on the accelerated principal at the fixed rate relating to the accelerated maturity.

If, on the other hand, principal amortization of the VRDBs is deferred (e.g., to keep the actual VRDB debt service from exceeding the Expected Debt Service) the impact is the same as if the issuer's right to receive a fixed rate payment on the swap relating to the deferred maturity were terminated. Thus, until the deferred principal is paid, the issuer is simply obligated to pay interest thereon at the variable rate.

If the second and third steps were combined, the issuer would both accelerate the amortization of principal and have the option on each payment date to use all of the principal payable on that date (including both the amount that's accelerated and the amount that would have been amortized: without any acceleration) either to retire the VRDBs or to call or defease other bonds of the issuer. More particularly:

If on any payment date the issuer retires VRDB principal, the economics are as described in step 3, above, with respect to that portion of the principal amortization that is accelerated as compared to the amortization of the issuer's fixed rate bond alternative.

If, on the other hand, the issuer opts to call or defease other fixed rate bonds, the economic impact is the sum of the impacts described in steps 2 and 3, above. That is the impact is the sum of:

Defeasing the variable rate portion of the fixed receiver swap relating to the accelerated principal with the result that the issuer is left only with the right to receive the fixed receiver payment on the portion of the swap relating to accelerated principal, plus Executing a fixed receiver swap: (i) in an amount equal to all of the principal payable on that date; (ii) maturing at the maturity of the other bonds paid or defeased; and (iii) with a fixed receiver rate or rates determined as described in step 2, above.

Of further note, it may be possible for the issuer to capture the benefit of its future options today by executing on a forward basis: (1) a virtual fixed receiver swap; and (2) a reversing premium fixed payor swap. In this regard a party could agree to deliver to the issuer both the defeasance investments necessary to create the virtual swaps and the reversing fixed payor swaps. In one example, which example is intended to be illustrative and not restrictive, savings could be enhanced by structuring the transaction as a series of options. In exchange for an option premium, a party to the transaction could have the option on each VRDB Expected Maturity Date to provide to the issuer: (a) the defeasance investments necessary to create a virtual swap; and (b) the matching fixed payor swap. In either event, after taking account of the offsetting swaps, the issuer's debt service would be the same as if it had paid off the VRDBs and retained its fixed rate bonds. The issuer would have received the benefit of its options up front as a premium on the forward swaps or as an option premium. Rather than actually delivering defeasance investments (which under arbitrage regulations may have to be bid), the party to the transaction might agree to adjust the fixed payor rate by any variation between investments actually purchased at the time the transaction is implemented and a pre-arranged investment rate.

A more particular example of the economics of one embodiment of the MIRRMP approach according to the present invention, which example is intended to be illustrative and not restrictive, will now be described. Detailed cash flows of this example economic analysis are shown in FIGS. 5-17C. As seen in these Figs., an issuer plans to issue approximately $620 million of General Obligation bonds maturing over 12 years. The issuer plans to issue the bonds as fixed rate bonds. In the current market, the yield on the fixed rate bonds would be about 4.279%. Having been presented with the MIRRMP approach of the present invention, the issuer is evaluating the potential benefits of that alternative. The issuer proposes that the VRDB alternative be analyzed based on assumed annual variable rates equal to 1.893% in year 1, increasing to 6% in year 12 and averaging 3.965%. Investment yields are to be based on LIBOR less 25 basis points. Remarketing and the issuer's VRDB trading spread to BMA are assumed to total 38 basis points. All rates are to be as of Dec. 18, 2001. The issuer would like to realize budget savings of $8 million in the first year. Thereafter, the issuer will pay annual debt service in the same amount as if it had issued fixed rate bonds.

Given the assumed variable rates, in addition to the savings taken by the issuer in year 1, the issuer will realized savings of about $20.3 million in year 12. If actual VRDB rates were higher than assumed, the increased cost would not affect annual debt service in years 2 through 11, but would be reflected, first in the reduction of savings realized in year 12 and thereafter in an extension of the amortization to year 13. Therefore, the issuer would realize budget dissavings in year 13. If actual rates were lower, the interest savings would similarly not affect annual debt service in years 2 through 10, but would be reflected first in lower debt service in year 12 and thereafter in lower debt service in year 11. Accordingly except for the budget savings taken in year 1, the issuer's taxpayers in year 12 would have both the risk and receive the benefit of variable rates over the life of the issue.

In addition, if the issuer applies the amounts available to be used to retire bond principal in years 1 through 8 to defease fixed rate bonds rather than the VRDBs (assuming the candidates available for defeasance in the future are equivalent to those available today) and if the issuer simultaneously enters in the a mirror fixed payor swap, the issuer will realize additional gross savings in excess of $28 million. The Present Value savings relating to the same period will be more than $22 million. If the issuer chooses to take the savings from each such transaction in the form of a premium received from a swap counterparty (so that the benefit would be discounted at the swap counterparty's higher discount rate), the total of such swap premiums would still exceed $20 million.

Of note, the "permanent VRDB structure" created by an embodiment of the MIRRMP approach may be used equally with VRDBs issued for new money purposes and/or with variable rate bonds issued to refund outstanding bonds, such as: (i) outstanding non-callable bonds; and (2) outstanding VRDBs whether unhedged or synthetically fixed with a swap. In the case of permanent VRDBs issued for refunding purposes, the maturity of the refunding VRDBs would be extended beyond the original maturity schedule, and the issuer may have the ability to select the bonds that it retires in order to meet some aggregate amortization requirement or policy.

By extending the maturity of its variable rate debt and utilizing the techniques described above with reference to Further Application 1, an issuer may achieve a significant economic benefit. However, that benefit may be limited by the fact that in defeasing its high cost debt, the issuer may be restricted to the lower of: (a) the market rate for a taxable security having the same term; and (b) the arbitrage yield on the bond issue to which the defeased maturity belongs.

More particularly, with reference to Further Application 1, the rationales for retiring other high cost debt rather than simply reducing the issuer's expenditures in the years in which principal would have been payable but for the extension of the maturity of the VRDBs included: (a) avoiding adverse credit consequences with both rating agencies and holders of the issuer's fixed and variable rate bonds of merely deferring costs to future years; and (b) maintaining the integrity of the issuer's fiscal policy regarding the rate of debt retirement (which also reflects the issuer's views on the cross-generational fairness). Both of those considerations may be addressed by the approach described below (hereinafter sometimes referred to as "Further Application 2") without requiring any substantial yield restriction of the funds applied to address credit and cross-generational concerns.

As above, this Further Application 2 takes advantage of the fact that the holders of VRDBs (including, we believe, auction rate securities) will not charge issuers either for: (i) extending the maturity of their VRDBs to the end of their debt structures; or (ii) retiring their bonds prior to the expected payment date. The predicate to achieving the benefit of this Further Application 2 is issuing VRDBs that will be retired beyond the dates on which the issuer would typically retire fixed rate bonds. In one example, which example is intended to be illustrative and not restrictive, such bonds may have maturities that are as long as legally possible under applicable state and/or federal tax restrictions.

However, rather than addressing credit and cross-generational concerns by retiring debt, an issuer may fund or establish a reserve for future non-debt expenses. Of note, certain types of costs such as pension and healthcare related costs, for example, may be costs allocable to prior periods that are actually paid in the future. In any case, it is believed that a reserve established for future non-debt expenses (and thus neither a pledged fund nor a sinking fund for any of the issuer's debt) would not be subject to any yield restriction. Also, if the issuer were to prepay non-debt expenditures, it is believed that the issuer should receive a discount on such payments that reflect the payee's ability to earn a taxable rate on such funds either by investing them directly in securities or by otherwise utilizing them in the issuer's business. In one example, which example is intended to be illustrative and not restrictive, long-dated prepayments of expenses such as insurance may be made. However, prepaying expenses may expose the issuer to any deterioration in the payee's credit. In another specific example of this approach, which example is intended to be illustrative and not restrictive, the issuer may increase the level of its contributions to its pension plans or fund healthcare costs (which are not generally funded on a current basis). Amounts applied to fund such costs (whether on not deposited into a reserve) could be applied to reduce current expenditures for such purposes in years in which interest on the VRDBs is high so as to maintain budgetary stability.

Of note, in each of the above examples the return realized by the issuer on the amounts applied to pay expenses could either be fixed or variable (reflecting the ultimate application of the funds by the recipient) or, in the case of funds paid to a pension fund, could reflect the investment rate assumed by the plan's actuaries. In all cases, this enhanced approach may create significant benefits to the issuer as compared to issuing its debt as fixed rate bonds and even as compared to issuing its debt as VRDBs and accelerating the retirement of its other fixed rate bonds.

In addition, the commitment to apply available funds to pay expenses or fund reserves therefore could be reflected in the issuer's bond documents, could be a requirement in an agreement with a third party, and/or could merely be a policy or practice of the issuer. Examples of third parties with whom a funding commitment might be made include, but are not limited to: (i) rating agencies, bond insurers, or a bond trustee; (ii) parties obligated to provide future services for which prepayments are to be made; and/or (iii) the beneficiaries or trustees of the issuer's pension funds. Such commitment could be an alternative to retiring VRDBs or other debt so that the issuer retains the option to determine the best course of action in the future, or could be an absolute requirement so that the issuer does not retain the option to retire debt in lieu of paying expenses or funding reserves.

Further, the transaction could be structured so that the economic savings achieved by prepaying expenses could be realized at the time that best meets the issuer's needs, e.g., immediately or over some longer period.

To restate and generalize, it is noted that municipal issuers typically voluntarily accelerate the amortization of their tax-exempt debt not only faster than required by federal tax law (which generally requires that the weighted average maturity of a bond issue not exceed 120% of the weighted average maturity of the financed projects), but also significantly faster than the useful life of the financed projects. For example, a municipality that finances projects for (i) schools and other public buildings or (ii) water and sewer systems, which generally have a useful life of 30 to 50 years, might typically amortize the bonds as quickly as 20 years. This actually results in current taxpayers paying costs which more appropriately should be allocated to taxpayers in future years and which, it could be argued, represent a poor discretionary use of revenue given the low cost of tax-exempt bonds.

It is believed that this practice is virtually universal. But, given that most municipalities have very modest, if any, long-term reserves or endowment type funds (the funding of which, in addition to being financially prudent, would likely have a higher return than the return realized by accelerating the amortization of tax-exempt bonds), the practice may be considered financially unwise.

Nevertheless, it is believed that virtually all general governments also fail to fully fund costs associated with the current and prior years such as pension costs, retiree health care costs, and unemployment insurance costs, which represent costs for current and past employees but which are actually paid out in the future. It is believed that payments to fund such costs would have a much higher return than payments applied to retire bonds (tax-exempt or taxable).

Viewing these municipal practices together, it is seen that municipalities traditionally defer to the future present and past costs with a high cost of deferral (i.e., a high return on current payments) and accelerate to the present future costs with a low cost of deferral (i.e., a low return on current payments). From the perspective of both economic rationality and cross-generational fairness, the combination of these practices may be deemed imprudent. As compared even to a merely balanced approach in which all cost are funded in the period to which they are most appropriately allocated, the cost of the existing approaches is very high. The cost is even higher as compared to the most economically rational approach in which the costs with the highest cost of deferral are funded as early as possible and the costs of the activities with the lowest cost of deferral are the last costs funded.

This practice is perhaps unwittingly encouraged by the rating agencies, which consider the speed of amortization of municipal debt as a positive rating factor. At the same time, however, the rating agencies also view the deferral of pension and other such costs as a credit negative. In fact, if a municipality were in financial difficulty, it is believed that un-funded past service costs would be viewed as potentially competing with payment of debt for available funds. Consequently, it is believed that that funding more of such costs up-front rather than accelerating the amortization of municipal bonds should be viewed as credit neutral at worst.

Moreover, it is noted that the MIRRMP approach of the present invention (including, but not limited to, the Further Application 1 and Further Application 2 described above) has applications using fixed rate debt. This mechanism may sometimes hereinafter be referred to as "Further Application 3". More particularly, Further Application 3 may include, but not be limited to:

Fixed rate application of Further Application 1: If an issuer bas outstanding fixed rate bonds issued in a significantly higher interest rate environment, the issuer could achieve savings by extending the life of its currently issued bonds and accelerating the retirement (or defeasance) of the outstanding high cost bonds. The monies applied to defease the previously issued bonds may be restricted to the higher yield of the prier issues. This approach would work well with an issuer like MWRA, for example, that has a significant amount of non-callable advance refunding bonds outstanding. Since the retirement/defeasance would be accomplished with revenues, the issuer would have the option to defease the bonds to maturity or to call.

Fixed rate application of Further Application 2: An issuer may also achieve savings by extending the maturity of its fixed rate debt and accelerating the payment of other obligations such as required pension fund contributions. Even though by extending the maturity of fixed rate bonds the issuer will increase its debt-related costs, there may still be significant savings in many cases from paying other expenses (such as pension fund contributions) earlier than they would otherwise have been paid.

One example of the operation of Further Application 3 of the MIRRMP approach according to the present invention, which example is intended to be illustrative and not restrictive, will now be described. More particularly:

- An issuer has outstanding voter approved fixed rate general obligation bonds payable from real estate taxes. The issuer has little or no variable rate bonds.
- The issuer issues fixed and/or variable rate refunding bonds to refund outstanding non-callable and/or callable fixed rate bonds. Refunding is structured as an economic or legal defeasance with tax-exempt fixed rate bonds deposited in the funding escrow.
- By economically defeasing, but not legally defeasing, its voter approved fixed rate bonds, the issuer does not affect the tax-levy approved by the voters to pay the refunded bonds. That levy is now available to meet other obligations of the issuer until the refunded bonds are retired.
- The refunding bonds are issued either as general obligation bonds or as limited tax or subject to appropriation bonds with maturities longer than the refunded bonds freeing up revenues of the issuer to meet other expenses.
- The issuer uses its now surplus revenues to make contributions to its pension fund, effectively earning a yield on such funds equal to the investment return assumed by the pension plan's actuaries. By accelerating the funding of the pension plan (i.e., reducing the amount of the deferral), the issuer may achieve significant savings as compared to accelerating the amortization of debt prion to the date when the bonds are required to be funded under state and federal law.
- Alternatively, rather than issuing refunding bonds, the issuer could structure its new money bonds with a longer maturity than it would under its current practice and similarly use current revenues to fund higher cost activities.
- Also, the issuer could simply convert its existing or new money bonds from fixed to variable (with or without an extension of the maturity) and use the savings or a portion thereof to fund other expenditures (such as pension fund costs, for example) rather than simply reducing its current revenue requirement or casing the savings to retire the VRDBs or other debt.
- The issuer could also issue a combination of long-dated VRDBs for which savings are used to fund pension costs (for example) and/or other pseudo-fixed rate VRDBs for which a significant portion of the expected savings are taken up front. It is believed that this should practically eliminate the possibility that the issuer loses money by issuing VRDBs.
- Alternatively, if necessary for tax purposes, rather than issuing tax-exempt advance refunding bonds to stretch out its debt, the issuer could do the advance refunding with short-term taxable debt and then current refund or refinance the taxable debt with tax-exempt bonds. It is believed that this approach essentially eliminates any argument that the issuer unnecessarily or abusively has two tax-exempt financings outstanding for the same purpose. Issuing tax-exempt advance refunding bonds and investing the escrow in tax-exempts should also address any concern with unduly burdening the tax-exempt market. Also, the issuer could issue taxable short-term debt to fund the deposit into the pension fund. Such taxable debt may be retired from revenues. If, for example, the issuer sold taxable bonds to make a pension fund contribution and sold tax-exempt advance refunding bonds to stretch out the amortization of its capital costs, it would be clear that the tax-exempt proceeds did not go into the pension fund. Also, unlike the facts in the so-called Alabama ruling, it would be essentially impossible to argue that there was any sinking fund for the tax-exempt bonds. Another version of this approach would be to issue taxable bonds to fund pension costs and issue new money bonds that begin to amortize later than under existing practice and use the revenues that might have been used to retire the new money to retire the taxable bonds.

It is believed that one or more of the above variations or similar approaches will work because fundamentally there is no abuse. The issuer is only doing what it clearly could have done and what, from the perspectives of economic rationality and cross-generational fairness, it should have done in the first place. Virtually every municipal issuer in the country has accelerated the amortization of capital cost properly allocated to future periods and deferred the funding of pension or healthcare costs that are properly allocated to past periods. It is believed that correcting this situation by eliminating the deferral of such past service costs and amortizing capital cost so that project cost are fairly allocated as between current and future uses should not be viewed as involving any tax abuse.

In another embodiment a method for managing one or more liabilities is provided, wherein the method results in a savings and/or an elimination (or reduction) in volatility. In one example, a power authority which purchases fuel (a volatile cost) may use the present invention to "hedge" the price of fuel by budgeting debt service as provided hereunder.

It is further noted that white federal law typically requires that tax-exempt bonds mature over a period no longer than 120% of the useful life of the financial asset, many issuers use current revenues to amortize debt significantly more quickly than is required for tax-exempt debt under federal law. In other words, municipal issuers typically voluntarily retire obligations (e.g., repay principal) earlier than they have to (i.e. such issuers typically retire obligations (e.g., repay principal) prior to the end of the corresponding legal amortization period). In one embodiment relating to municipal bonds, the present invention allows a municipality to manage its liabilities by structuring a variable rate municipal bond as follows: setting an expected principal amortization period for the variable rate municipal bond; setting a budgeted debt service for the variable rate municipal bond, wherein the budgeted debt service minus an actual interest equals an actual principal paid; and permitting adjustment of the expected principal amortization period to the extent that actual principal remains to be paid.

Using the mechanism of the present invention significant savings may be achieved by using current revenues to fund costs or expenditures for which the cost of deferral is greater, rather than retire VRDBs. In this regard it is noted that: VRDB bondholders typically do not charge for extending the amortization of VRDBs, funding required expenditures such as pension fund costs and/or retiree health care costs could result in significant savings, retiring high-cost fixed rate debt rather than VRDBs could also result in significant savings, and amortizing fixed rate bonds over a longer period and using current revenues for other costs or expenditures may also result in savings.

In another embodiment the risks associated with variable rate debt may be managed will retaining much of the benefit. More particularly, the present invention provides a bond structure that mitigates the budgetary risks of variable rate debt and allows issuers to manage the timing of both favorable and unfavorable budgetary impacts. This structure may replace and/or improve upon traditional risk strategies including the following: rate stabilization funds, budgeting very conservatively, and assuming risk in the current budget. In addition, interest rate swaps may allow issuers to fine tune the portion of the risks/benefits that they retain.

In another embodiment, by structuring a variable rate bond as a term bond with sinking fund installments determined by formula, both the cost benefits and budgetary risks of VRDBs may be managed.

More particularly, the formula used to determine sinking fund installments may be used to eliminate (or reduce) budgetary risk as follows:

(a) Within Each Year—The sinking fund installment equals budgeted VRDB debt service minus actual interest; and (b) Over The Term Of The VRDBs—Each year's sinking fund installment is such that annual debt service will equal an amount determined at bond issuance.

In one example, the term bond would have a longer legal maturity (e.g., 21 years) than its expected maturity (e.g., 20 years). Any principal deferrals resulting from high VRDB interest rates would be reflected in a required payment in year 21. Any principal acceleration resulting from low VRDB interest rates would be reflected in a reduction of debt service in year 20.

As described above, it is seen that embedded in an embodiment of the MIRRMP approach of the present invention is the concept of debt for which the maturity is not fixed and can be deferred from the expected maturity in accordance with a formula or process specified in the bond documents for the purpose of: (a) creating budgetary stability from period to period with respect to VRDB debt service (including PARS, for example) payable by an issuer in spite of interest rate volatility; and/or (b) providing an issuer the option to retire other higher cost debt or to meet other obligations of the issuer rather than VRDBs.

More particularly, it is noted that one embodiment of the invention provides a mechanism for applying the concept of an extendible or long-dated maturity bond to auction rate securities, such as PARS. With auction rate securities the liquidity is provided by the existing holder whose ability to put its bond is subject to the availability of other buyers willing to purchase the PARS at auction (with a traditional variable rate demand bond the bondholder is secured by a liquidity facility (e.g., letter or line of credit)).

In another embodiment a method for managing liabilities associated with a borrower, wherein the liabilities include at least a first credit, a non-volatile cost (e.g., pension cost), and a volatile cost (e.g., fuel cost) is provided. The method may include setting an expected principal amortization period associated with the first credit; adjusting the expected principal amortization period associated with the first credit; and applying at least part of an amount made available from the adjustment to pay at least part of a the non-volatile cost early; and subsequently deferring payment of the non-volatile cost to pay the volatile cost (e.g., during increased cost periods, such as high fuel prices, for example). In one example, the prepaid non-volatile cost may in effect "hedge" the volatile cost.

In another embodiment a method for managing liabilities associated with a borrower, wherein the liabilities include at least a first liability (which may be a non-volatile liability (e.g., pension cost)) and a second liability (which may be a volatile liability (e.g., fuel cost)) is provided. The method may include some degree of prepayments associated with the first liability along with later deferral of some payments associated with the first liability, wherein some portion of the deferred payments are applied to the second liability (e.g., during increased cost periods, such as high fuel prices, for example). In one example, the prepaid first liability may in effect "hedge" the second liability.

While a number of embodiments of the present invention have been described, it is understood that these embodiments are illustrative only, and not restrictive, and that many modifications may become apparent to those of ordinary skill in the art. For example, the liabilities managed hereunder may include one or more costs and/or one or more credits, which credit(s) may in turn comprise one or more bonds. Further, at least one of a) a portion of the current budgetary excess and b) a portion of the accumulated budgetary excess may be applied by the borrower across different credits within a fund of credits. Further still, at least one of a) a portion of the current budgetary excess and b) a portion of the accumulated budgetary excess may applied by the borrower across a series of credits issued at different times. Further still, at least one of a) a portion of the current budgetary excess and b) a portion of the accumulated budgetary excess may be applied by the borrower across a series of credits including both a variable rate credit and a fixed rate credit. Further still, in the event that during any year, budgeted fields for interest and funds set aside for interest mitigation are not sufficient to cover debt service, a Debt Service Reserve Fund ("DSRF") might be made available to fund the excess. Monies could then be budgeted to fund the DSRF deficiency in the succeeding year(s). Also, in the event that the interest rate were to exceed the amortization rate, an alternative approach could be to make the reserve available to delay the point at which the issuer would have to budget in excess of the amortization rate. (This feature may create credit concerns with some rating agencies). Further still, other reserves not typically available to pay debt service (e.g., a renewal and replacement fund intended to be used only for extraordinary repairs) could be similarly used. Further still, the methods described may be carried out via requirements included in one or more legal or financial instruments. Further still, the present invention may be utilized to manage risk (e.g., interest rate risk) in the context of unhedged, and/or imperfectly hedged variable rate and/or fixed rate debt (either "natural" or synthetic"). Further still, the first predetermined low interest rate level and/or the second predetermined low interest rate level may be equal to or different from the first predetermined high interest rate level and/or the second predetermined high interest rate level. Further still, various interest rates indicated as being below predetermined interest rate levels may, of course, be below or equal to the predetermined interest rate levels. Likewise, various interest rates indicated as being above predetermined interest rate levels may, of course, be above or equal to the predetermined interest rate levels. Further still, the term "current" (used with the phrase "current budgetary excess", for example) may apply to any appropriate current period, such as this year, this month, or this week, for example. Further still, the term "accumulated" (used with the phrase "accumulated budgetary excess", for example) may apply to any accumulation from an appropriate prior period, such as last year, last month, or last week, for example. Further still, the memory of the system may comprise a magnetic hard drive, a magnetic floppy disk, a compact disk, a ROM, a RAM, and/or any other appropriate memory. Further still, the computer of the system may comprise a stand-alone PC-type micro-computer as depicted or the computer may comprise one of a mainframe computer or a mini-computer, for example. Further still, another computer could communicate with the software program and/or computer of the system by utilizing a local area network, a wide area network, or the Internet, for example. Further still, the desired savings, the target interest rate, the budgeted debt service and/or the expected debt service may vary as desired. For example, the expected debt service may be selected to be $100 the first year, $120 the second year, $155 the third year, and $90 the fourth year. The value may, of course, increase, decrease, or remain steady as desired. Also, the value may change periodically (e.g. monthly or yearly, for example) or at any other desired schedule or time.

What is claimed is:

1. A method for structuring a variable rate municipal bond, comprising:
    setting, by a computer, an expected maturity for the bond;
    setting, by the computer, a legal maturity for the bond, wherein the legal maturity is longer than the expected maturity;
    periodically budgeting, by the computer, for debt service on the bond;
    periodically making, by the computer, sinking fund installments, wherein each of the sinking fund installments is substantially equal, for at least a part of a life of the bond, to the budgeted debt service minus actual interest on the bond; and
    making, by the computer, one or more payments until the legal maturity to the extent that principal remains to be paid on the bond after the expected maturity.

2. The method of claim 1, wherein the variable rate municipal bond is a term bond.

3. The method of claim 1, wherein the budgeted debt service is set periodically over the life of the variable rate municipal bond.

4. The method of claim 1, wherein the budgeted debt service is set yearly over the life of the variable rate municipal bond.

5. The method of claim 1, wherein the budgeted debt service remains substantially constant over the life of the variable rate municipal bond.

6. The method of claim 1, wherein the budgeted debt service varies over the life of the variable rate municipal bond.

7. The method of claim 1, wherein the variable rate municipal bond is selected from the group including: (a) a single issue variable rate demand bond; and (b) a series of variable rate demand bonds.

8. A method for structuring a variable rate municipal bond, comprising:
    setting, by a computer, an expected maturity for the bond;
    setting, by the computer, a legal maturity for the bond, wherein the legal maturity is longer than the expected maturity;
    setting, by the computer, an expected debt service schedule on the bond, wherein the expected debt service schedule identifies a number of expected debt service payments;
    periodically making, by the computer, sinking fund installments, wherein each of the sinking fund installments does not exceed, for at least a part of a life of the bond, a corresponding one of the expected debt service payments; and
    making, by the computer, one or more payments until the legal maturity to the extent that principal remains to be paid on the bond after the expected maturity.

9. The method of claim 8, wherein the variable rate municipal bond is a term bond.

10. The method of claim 8, wherein the expected debt service remains substantially constant over the life of the variable rate municipal bond.

11. The method of claim 8, wherein the expected debt service varies over the life of the variable rate municipal bond.

12. The method of claim 8, wherein the variable rate municipal bond is selected from the group including: (a) a single issue variable rate demand bond; and (b) a series of variable rate demand bonds.

13. The method of claim 1, wherein the budgeted debt service is based on a budget estimate of what a short-term interest rate is or will be at the time the estimate is made.

14. A non-transitory, computer-readable medium for structuring a variable rate municipal bond, the computer-readable medium having computer-readable instructions stored thereon which, when executed by one or more processors, configure the one or more processors for:
    setting an expected maturity for the bond;
    setting a legal maturity for the bond, wherein the legal maturity is longer than the expected maturity;
    periodically budgeting for debt service on the bond;
    periodically making sinking fund installments, wherein each of the sinking fund installments is substantially equal, for at least a part of a life of the bond, to the budgeted debt service minus actual interest on the bond; and
    making one or more payments until the legal maturity to the extent that principal remains to be paid on the bond after the expected maturity.

15. A system for structuring a variable rate municipal bond, comprising:
    a memory; and
    a processor in communication with the memory, the processor operable to execute software modules, the software modules comprising:
        a module configured to set an expected maturity for the bond;
        a module configured to set a legal maturity for the bond, wherein the legal maturity is longer than the expected maturity;
        a module configured to periodically budget for debt service on the bond;
        a module configured to periodically make sinking fund installments, wherein each of the sinking fund installments is substantially equal, for at least a part of a life of the bond, to the budgeted debt service minus actual interest on the bond; and
        a module configured to make one or more payments until the legal maturity to the extent that principal remains to be paid on the bond after the expected maturity.

16. A non-transitory, computer-readable medium for structuring a variable rate municipal bond, the computer-readable medium having computer-readable instructions stored thereon which, when executed by one or more processors, configure the one or more processors for:
    setting an expected maturity for the bond;
    setting a legal maturity for the bond, wherein the legal maturity is longer than the expected maturity;
    setting an expected debt service schedule on the bond, wherein the expected debt service schedule identifies a number of expected debt service payments;
    periodically making sinking fund installments, wherein each of the sinking fund installments does not exceed, for at least a part of a life of the bond, a corresponding one of the expected debt service payments; and
    making one or more payments until the legal maturity to the extent that principal remains to be paid on the bond after the expected maturity.

17. A system for structuring a variable rate municipal bond, comprising:
    a memory;
    a processor in communication with the memory, the processor operable to execute software modules, the software modules comprising:
        a module configured to set an expected maturity for the bond;

a module configured to set a legal maturity for the bond, wherein the legal maturity is longer than the expected maturity;

a module configured to set an expected debt service schedule on the bond, wherein the expected debt service schedule identifies a number of expected debt service payments;

a module configured to periodically make sinking fund installments, wherein each of the sinking fund installments does not exceed, for at least a part of a life of the bond, a corresponding one of the expected debt service payments; and a module configured to make one or more payments until the legal maturity to the extent that principal remains to be paid on the bond after the expected maturity.

* * * * *